United States Patent [19]
Archer et al.

[11] Patent Number: 5,517,626
[45] Date of Patent: May 14, 1996

[54] OPEN HIGH SPEED BUS FOR MICROCOMPUTER SYSTEM

[75] Inventors: Jordan J. Archer; Ajit J. Deora, both of San Jose; Kent S. Leung, Milpitas; Leon Peng, Mountain View; Robert C. Schopmeyer, Los Altos; David J. Scott, Gilroy; Sanjay Sharma, Sunnyvale; Virgil Stevens, Rounonent, all of Calif.

[73] Assignee: S3, Incorporated, Santa Clara, Calif.

[21] Appl. No.: 11,449

[22] Filed: Jan. 29, 1993

Related U.S. Application Data

[62] Division of Ser. No. 521,042, May 7, 1990, abandoned.

[51] Int. Cl.$^6$ .................................................. G06F 13/00
[52] U.S. Cl. ........................... 395/290; 395/306; 395/445; 395/285
[58] Field of Search ..................... 395/325, 725, 395/425, 275, 290, 306, 457, 445, 853, 733, 735

[56] References Cited

U.S. PATENT DOCUMENTS

| | | | |
|---|---|---|---|
| 4,138,732 | 2/1979 | Suzuki et al. | 395/275 |
| 4,543,628 | 9/1985 | Pomfret | 395/275 |
| 4,594,653 | 6/1986 | Iwashita et al. | 395/800 |
| 4,594,660 | 6/1986 | Guenthner et al. | 395/250 |
| 4,709,329 | 11/1987 | Hecker | 395/275 |
| 4,774,659 | 9/1988 | Smith et al. | 395/400 |
| 4,787,026 | 11/1988 | Barnes et al. | 395/700 |
| 4,827,409 | 5/1989 | Dickson | 395/250 |
| 4,860,201 | 8/1989 | Stolfo et al. | 395/800 |
| 4,933,845 | 6/1990 | Hayes | 395/325 |
| 4,949,252 | 8/1990 | Hauge | 371/29.1 |
| 5,003,471 | 3/1991 | Gibson | 395/250 |
| 5,029,074 | 7/1991 | Maskas et al. | 395/325 |
| 5,091,846 | 2/1992 | Saehs et al. | 395/250 |
| 5,125,084 | 6/1992 | Begun et al. | 395/375 |
| 5,168,568 | 12/1992 | Thayer et al. | 395/725 |
| 5,191,657 | 3/1993 | Ludwig et al. | 395/325 |
| 5,237,676 | 4/1993 | Arimilli et al. | 395/550 |
| 5,274,780 | 12/1993 | Nakao | 395/325 |

OTHER PUBLICATIONS

*Digital Bus Handbook*, Joseph DiGiacomo, ed., Chapters 5–7, McGraw-Hill Publishing Company, 1990.

Primary Examiner—Glenn A. Auve
Attorney, Agent, or Firm—Skjerven, Morrill, MacPherson, Franklin & Friel; Norman R. Klivans

[57] ABSTRACT

An open high-speed local system bus for a microcomputer system which is decoupled from I/O and provides a consistent interface to the CPU subsystem, memory subsystem, graphics subsystem and peripheral subsystem. The local system bus supports discrete and burst transactions, pipelining in both the transactions, multiple microprocessor and distributed interrupts.

44 Claims, 92 Drawing Sheets

* In systems with only an X Bus the cache controllers recieve the vector directly from the X bus.

Adr&Ctl = SAZ-31, SMEM#, SD/C#, SBE0-3#.

Adr & Ctl = SAZ-31, SMSM#, SD/C#, SBEO-3#.

Adr&Ctl = SA2-31, SMEM#, SD/C#, BE0-3#, SWRITE#.

Adr&Ctl = SA2-31, SMEM#, SD/C#, SBE0-3#.

FIG. 38(a)
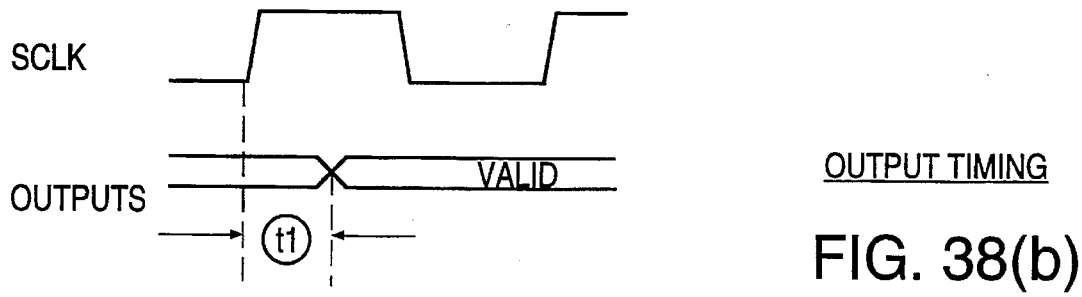
OUTPUT TIMING
FIG. 38(b)
t1 = s2, s3a, s4a, s7, s8, s9
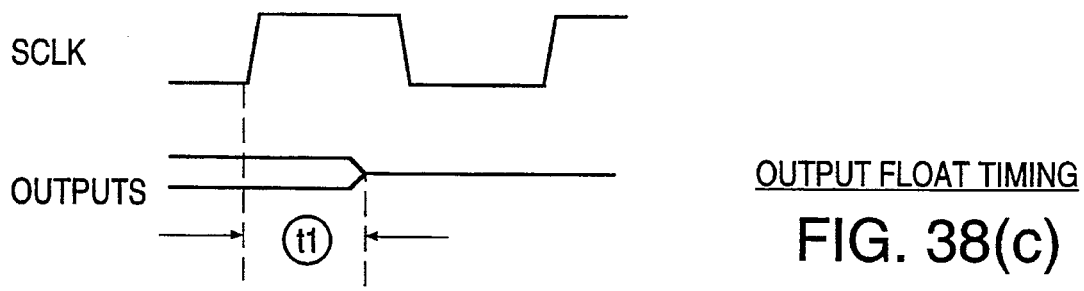
OUTPUT FLOAT TIMING
FIG. 38(c)
t1 = s3b, s4b
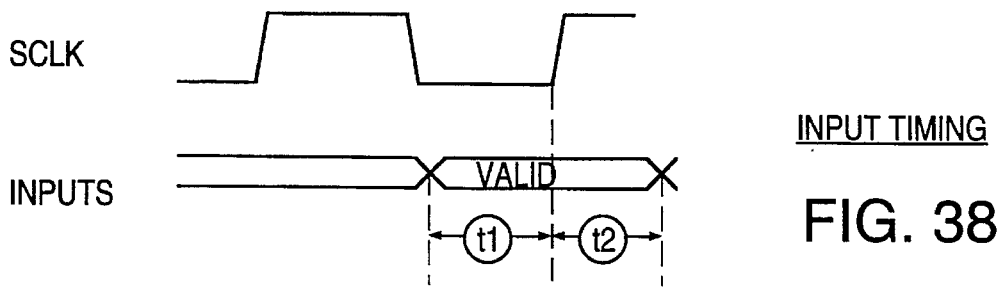
INPUT TIMING
FIG. 38(d)
t1 = s5a, s6a
t2 = s5b, s6b

OUTPUT TIMING t1 = i2a, i3a, i4a, i5a, i6a, i7, i13, i15

OUTPUT FLOAT TIMING t1 = i2b, i3b, i4b, i6b

INPUT TIMING t1 = i9a, i11a, i12a
t2 = i9b, i11b, i12b

PROPOGATION DELAY t1 = 1a, 1b, 2 t1 = 6a, 7a, 8a
t2 = 6b, 7b, 8b
t3 = 6c, 7c, 8c t1 = 3a, 4a, 5a
t2 = 3b, 4b, 5b

LATCH TIMING t1 = 9a, 10a
t2 = 9b, 10b

INPUT TIMING

OPEN HIGH SPEED BUS FOR MICROCOMPUTER SYSTEM

CROSS-REFERENCE TO RELATED APPLICATIONS

This application is a divisional application of U.S. patent application Ser. No. 07/521,042, filed May 7, 1990, entitled "Microcomputer System with Open High Speed Bus", now abandoned.

BACKGROUND OF THE INVENTION

1. Field of the Invention

This invention relates to an open high-speed bus for microcomputer systems, and especially to an open high-speed local system bus which is decoupled from the I/O and provides a consistent interface to the CPU subsystem, memory subsystem, graphics subsystem and peripheral subsystem.

2. Description of the Prior Art

I/O (input/output) bottlenecks are typically present in current PC (personal computer) architectures. In the IBM PC AT/MCA or industry standard EISA architecture, the CPU (central processing unit) is closely coupled with I/O peripherals. That coupling occurs through the I/O bus, which is simply a buffered CPU local bus. With this tightly coupled architecture, any bus activity by peripherals on the I/O bus will affect the CPU and system memory performance. As CPU speed increases, the I/O performance penalty is multiplied.

Intel's 386/486 microprocessors place even greater demands on the traditional PC AT/MCA architecture. While the traditional highly integrated chip set approach offers cost benefits, it cannot overcome the inherent performance limitations of the PC AT/MCA architecture.

SUMMARY OF THE INVENTION

An object of the invention is to provide the core system building blocks of a high-performance microcomputer system: the CPU and memory subsystems, industry standard I/O subsystem and graphics subsystem. To create new products, designers may mix and match individual subsystems based on a familiar architecture and basic system design, as opposed to design fully on each new product as is done with prior art systems.

Provided is an "Advanced Chip Interconnect" (ACI) bus, which is an open, high-speed local system bus. Decoupled from the I/O, ACI provides a consistent interface to the CPU subsystem, memory subsystem, graphics subsystem and peripheral subsystem.

Each transaction on the ACI bus is made up of a sequence of phases to handle arbitration, command, address, data and status. The arbitration, command and address phases for next transaction can start during the data phase of the present transaction.

The ACI bus includes lines for carrying an address driven by the current master and received by the bus slave; lines for carrying data driven by the bus master and received by the bus slave during a write transaction, or driven by the bus slave and received by the master during a read transaction; lines for carrying signals generated by the current master and received by the slave, defining a transaction in progress and appearing during the command phase; lines for carrying control signals necessary for processor operations; and lines for carrying status signals asserted by the slave for indicating the status of the slave.

The ACI bus further includes lines for carrying signals for partial read and write operations that are smaller than 32 bit; lines for carrying signals for indicating the even parity of the data.

The command signal lines includes a line for carrying a signal for indicating whether the transaction involves memory operation or I/O operation; a line for carrying a signal for indicating data transactions or instruction fetch transaction; a line for carrying a signal for indicating whether the transaction involves write operation or read operation; a line for carrying a signal for indicating whether the transaction is a normal transaction or a locked transaction; and a line for carrying a signal for supporting copy back and/or write-through operation.

The control signal lines includes a line for carrying a signal for indicating a valid address being on the bus; a line for carrying a signal for indicating the end of the data cycle; a line for carrying a signal for indicating the bit size of the master involved in the current cycle; a line for carrying a signal for indicating the bit size of the slave recipient of the current cycle; and a line for carrying a signal for indicating the slave being ready to receive the next line address to support full speed pipelining in memory read operations.

The status signal line includes a line for carrying a signal for indicating the slave having provided valid data in response to a read or having accepted data in response to a write; a line for carrying a signal for indicating the slave can fulfill the request of the master for transfers; a line for carrying a signal for indicating the data transfer being able to be burst transferred to or from the slave; a line for carrying a signal for indicating the slave being not ready to handle the requested transaction to cause the requesting master to back off the bus; a line for carrying signal asserted by any participating slave for extending the snoop cycle of the current transaction; a line for carrying a signal asserted by any participating slave for indicating a parity error on the data lines during a data cycle; a line for carrying a signal for indicating that a non-master cache controller will retain a copy of addressed data in a current transaction; a line for carrying a signal for indicating whether the current transaction is cacheable; and a line for carrying a signal for indicating a processor controller intervening in the transaction.

The ACI bus includes lines for carrying interrupt signals which comprises a line for carrying an interrupt request signal, and a line for carrying a signal for a non-maskable interrupt; lines for carrying arbitration signals which comprises lines for carrying local system bus request signals, lines for carrying an ACI bus grant signal to one of the controllers, a line for carrying a bus hold request for permitting another controller to gain control of the ACI bus, a line for carrying an acknowledge signal for indicating whether the ACI bus is given up in response to a bus hold request. The ACI bus further includes lines for carrying signals for supporting a distributed arbitration.

The ACI Bus provides: distributed decoding through CSR (Control Status Registers); programmable decoding for I/O and memory space between a high speed local bus and a standard bus (ISA, MCA, EISA); concurrent programmability of CSR's with ongoing I/O operations using a dedicated Y Bus; multiprocessor and single processor architecture combined in a single unified architecture; distributed interrupts for a multiprocessor; ACI arbitration; and configurability of identical circuits in a system design.

The system memory architecture includes: a FIFO/ECC design integrated onto a single chip; a programmable option of either syndrome bits (for ECC) or parity bits using the same memory bits; an algorithm for determining memory sizes and configurations with multiple memory controllers; and software programmable configurations for different memory organizations (selecting ½ or 4 way memory sets).

The cache architecture includes an integrated cache buffer with FIFO that allows a simultaneous read operation from memory, while doing a cache line eviction operation from the cache RAMs.

An EISA controller provides intelligent FIFO for I/O traffic. A software controlled slew rate buffer is also included.

The system supports an automatic distribution of hardware interrupts, while maintaining compatibility with standard ISA, MCA and EISA interrupt controller interfaces.

BRIEF DESCRIPTION OF THE DRAWINGS

FIGS. 38(a) to 38(j) and 39–41 are DMA controller timing diagrams.

DETAILED DESCRIPTION OF THE INVENTION

The following description is in the context of a particular set of integrated circuit chips, which for convenience are herein designated by proprietary name and number. It is to be understood that this is one embodiment of the invention, and is not limiting.

1. SYSTEM ARCHITECTURE 2.1. System Components

Figure 1:
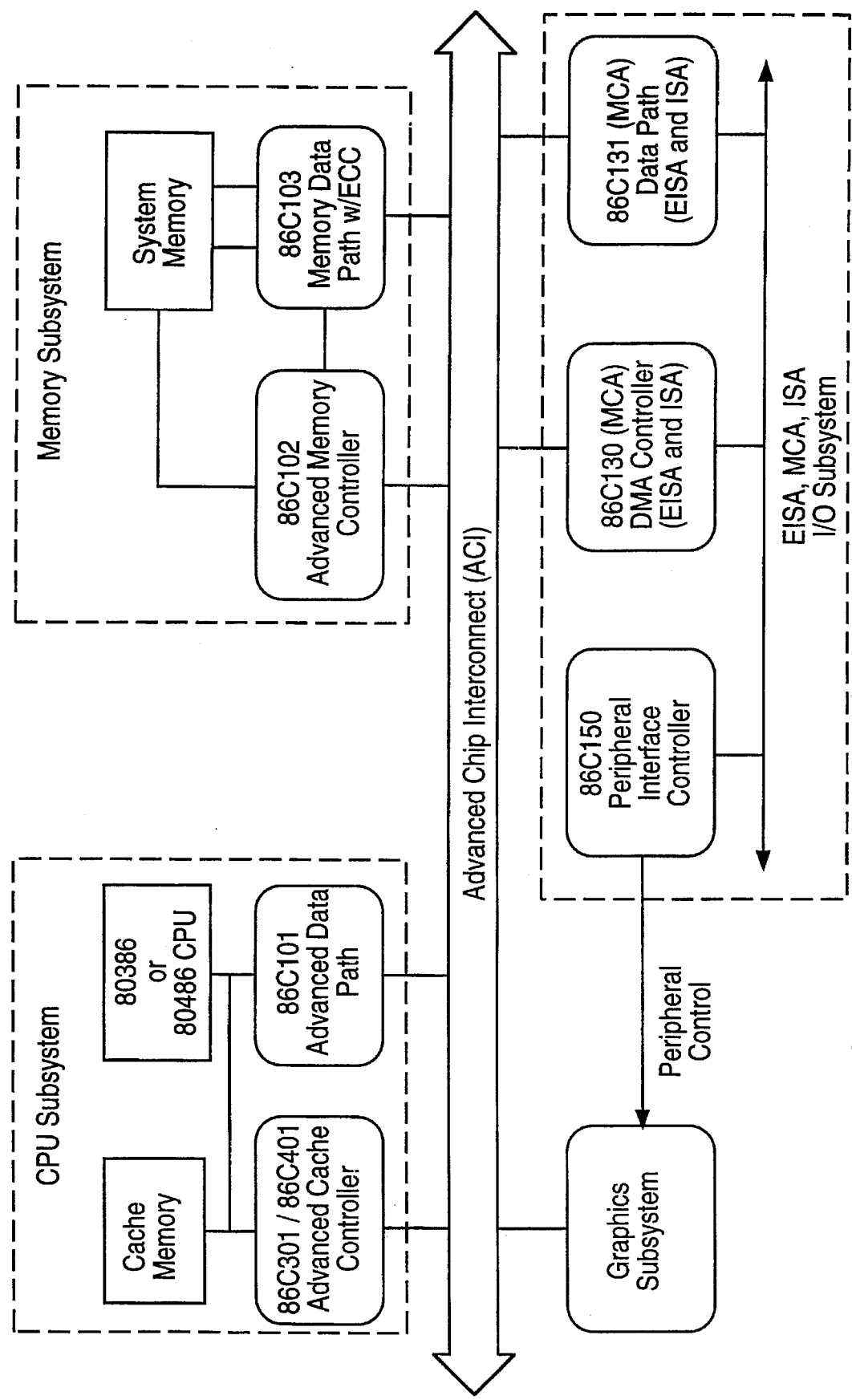
FIGS. 1–4 are systems in accordance with the invention.

One embodiment is a CMOS chip set as shown in FIG. 1 designed to provide PS/2, PC-ISA, or PC-EISA compatibility along with features to provide workstation performance. The chip set includes a cache controller and cache buffer set which supports write-through or write-back modes, a memory controller, a peripheral interface controller, and standard bus controllers and bus buffers for ISA, MCA, and EISA. All of these parts connect directly to a common high speed internal bus.

2.1.2. ISA bus

Figure 2:
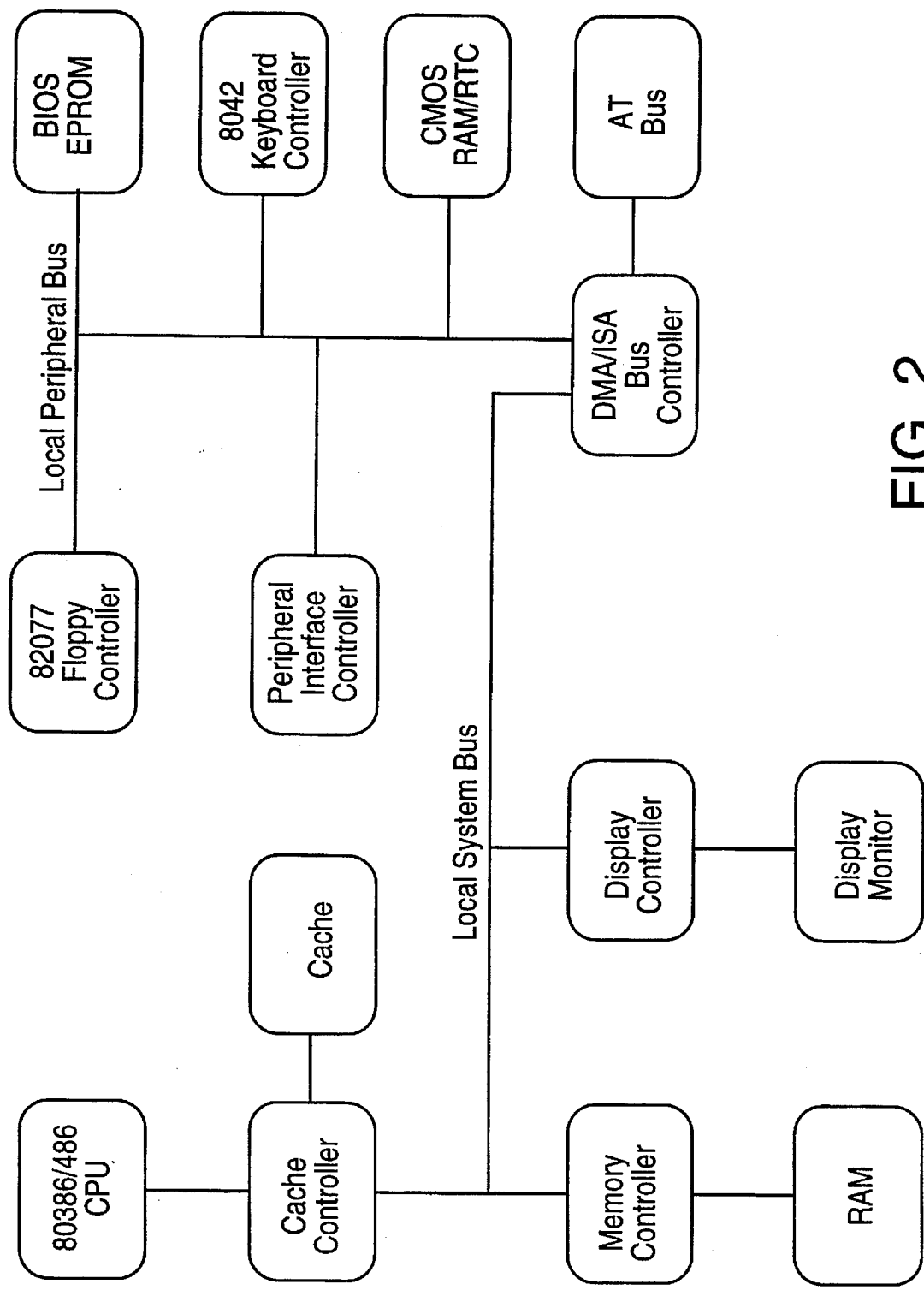

FIG. 2 shows a PC Workstation chip set-ISA Bus Implementation.

2.1.3. Micro Channel

Figure 3:
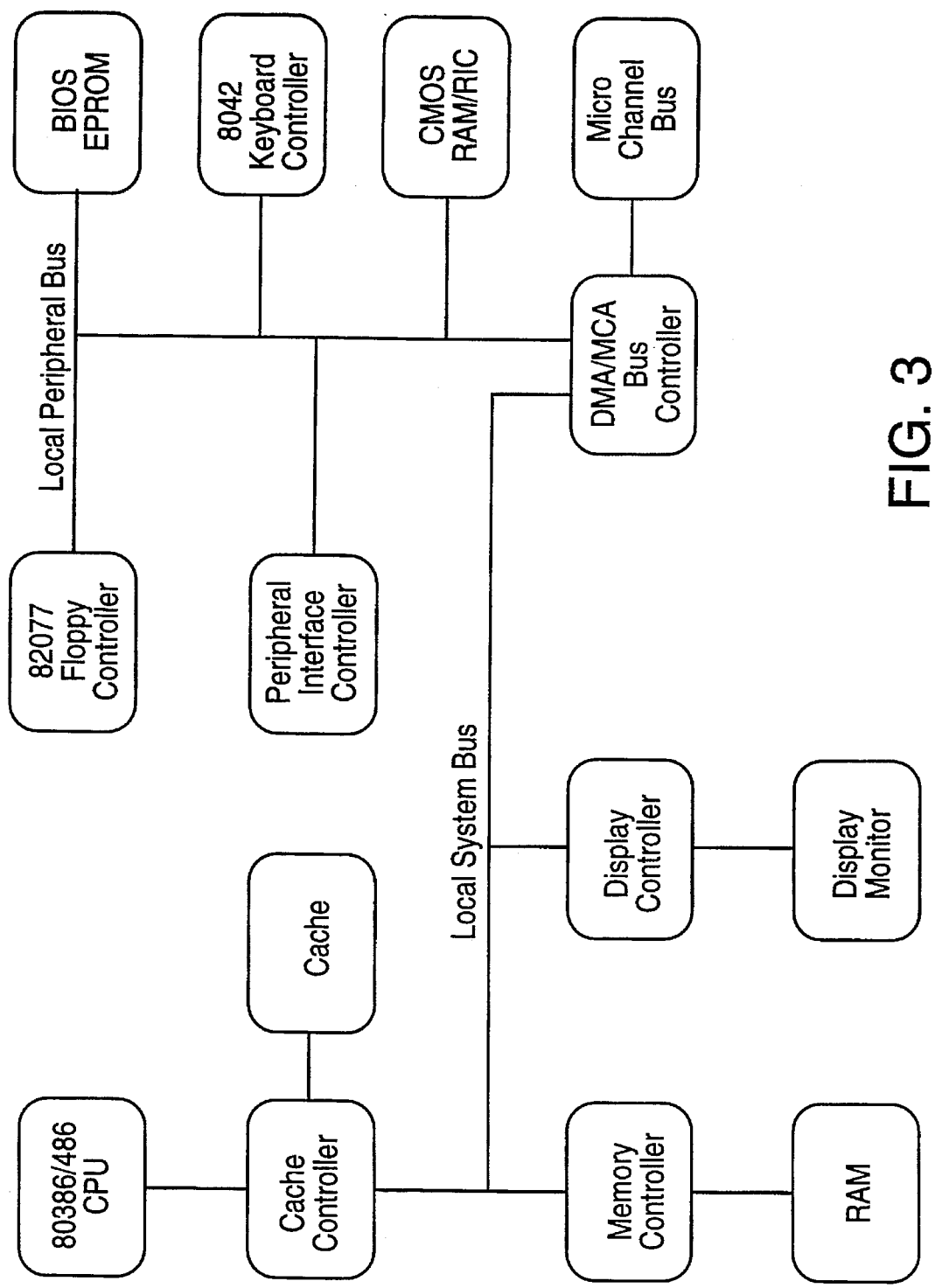

FIG. 3 shows a PC Workstation chip set-MCA Bus Implementation 2.1.4. EISA Bus

Figure 4:
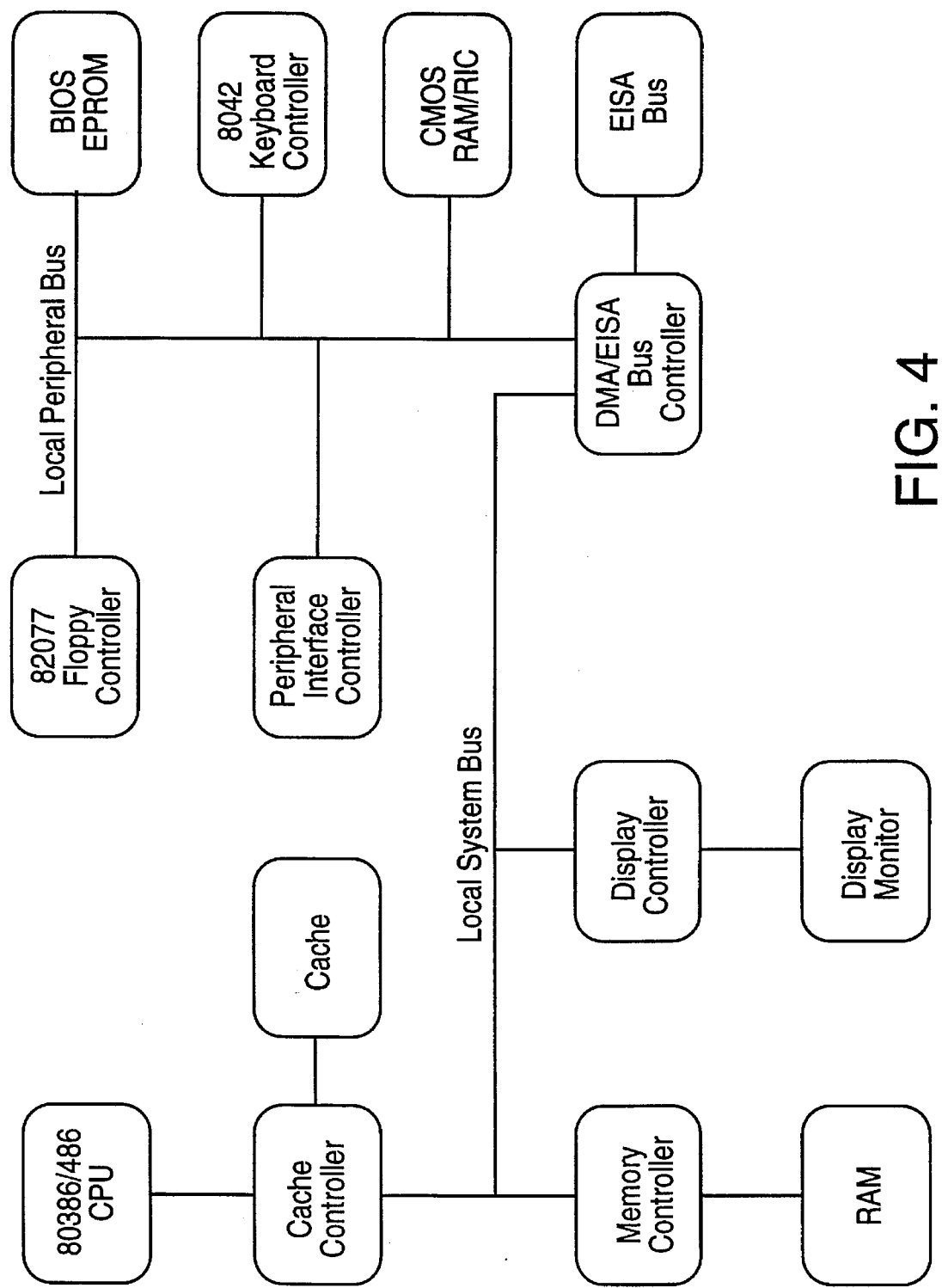

FIG. 4 shows a PC Workstation chip set-EISA Bus Implementation 2.1.5. Processor Organization The Chip Set and the Advanced Chip Interconnect (ACI) provide the signals and transactions required to support both single processor and multiple processors applications. The chip sets are used to support the Intel 80386/486 and 80960/derivatives and/or other RISC processors. The multiple-CPU system can be heterogeneous, if proper precautions are taken to handle the I/O transfers and proper tagging of files within the OS.

2.1.5.1. Single

Both Write-through and Write-Back processors/caches can be connected to the ACI interfacing to the chip set to form single processor systems (servers as well as workstation). The chip set provides mode programming via BIOS and initial setup to configure the functions.

2.1.5.2. Multiple

The chip set supports at least three possible multiple processors configurations: multiple Write-Through processors, multiple Write-Back processors, multiple mix of Write-Through and Write-Back processors.

2.1.6. Processor Type

For one embodiment, only the Intel 80386DX and the Intel 80486 processors are supported. Since the ACI and the Chip Set can be used with other processors, other processors are supported in other embodiments.

2.1.6.1. 386DX and 387DX

The 86C301/86C401 Cache Controller and the 86C101 data path provide the cache protocols and the interface to the ACI. Either Write-Through or Write-Back cache operations can be supported.

2.1.6.2. 486

The Intel 80486 can be connected directly to the ACI as a Write-Through Master. The Write-Back mode is used with the 86C301/401 Cache Controller and the 86C101 data path chip set.

2.1.6.3. 486 and Second Level Cache

The 86C301/401 Cache Controller and the 86C101 data path are used with the Intel 80486 to provide a second hierarchy of cache memory, thus improving the cache hit rate to reduce the average memory access time. Since Write-Back, Write-posting, and bursting are supported in the cache chip set, the cache miss rate and the amount of bus bandwidth required to handle misses are greatly reduced. A near linear performance increase can be achieved as the system designer adds similar processors on the bus.

2.1.6.5. Other Processors

Other processors that the chip set supports can be any of the ones available. The processors can be connected to the ACI via a processor agent that conforms to the signal and transaction convention defined by the ACI. These processor agents can either be Write-Through or Copy-Back cache masters and have to handle both master/slave transactions.

2.2. System Configurations

Many configurations are possible because of the features supported in the ACI. Several examples are given here to illustrate the flexibility of the chip set.

3. Advanced Chip Interconnect

3.1. General Description

The signals are defined to support the following features: pipelined transactions, cache line transactions up to 64 bytes, burst write cycles, centralized and distributed arbitration with parking, copy back cache coherency protocol, multi-processors, distributed interrupts.

3.2. Clocked, synchronous, pipelined bus, clock frequencies supported

The bus transactions are processed synchronous to the bus clock. The CPU clock can run at the same frequency or at a different frequency than the bus frequency.

Each chip that interfaces with the bus runs on a dedicated single phase clock that is distance- and impedance-controlled from the clock generator.

Each transaction is made up of a sequence of phases to handle arbitration, command, address, data, and status. These phases are pipelined in that the phases are staggered with respect to one another. The arbitration, command and address phases for the next transaction can start during the data phase of the present transaction.

The transactions can run at bus speeds of 25 MHz and 33 Mhz.

Figure 5:
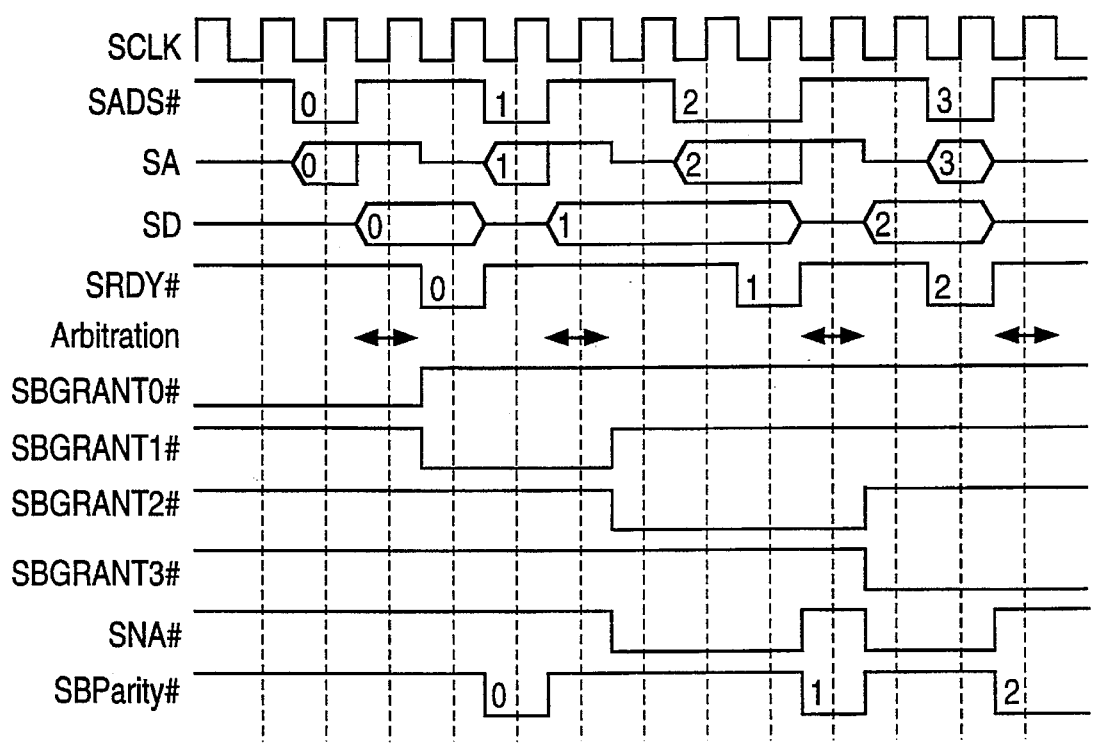
FIG. 5 is a transaction phases diagram.

FIG. 5 shows the transaction phases timing diagram.

3.3. Bus Signal

3.3.1. Clock

3.3.1.1. SCLK, Clock (active)

System clock provides fundamental timing for devices in the system.

3.3.2. Address Field

3.3.2.1. SA[31:2], bus address (tristate)

There are 30 bidirectional bus address lines, SA[31:2], that carry the addresses during the address phase. The address lines are always driven by the current master and received by the participating slaves. These are active high signals and when no master is on the bus these signals are not driven.

3.3.2.2. SBE[7:0]#, byte enables (tristate)

Separate low-asserted byte-enables are used to control partial reads and writes that are smaller than 32-bits. Eight byte-enables are decoded from the address lines to support the 64-bit interface, SBE[7:0]#. Four are used to support the 32-bit interface, SBE[3:0]#. These byte enable lines are driven by the master and interpreted by all participating slaves.

3.3.3. Data field

3.3.3.1. SD[63:0], bus data (tristate)

These are 64 active high hi-directional bus data lines, SD[63:0], that carry the data signals. Only the least significant 32 lines are used for the 32-bit bus. Data may be driven in either direction: it is driven by the current master during a write transaction, and by the selected slave during read transactions.

3.3.3.2. SDP[7:0], bus parity (tristate)

Eight even bus parity bits are used, each indicating the even parity for each byte lane for the 64-bit data signals. Four are required by the 32-bit interface. These signals observe the same timing as the bus address and data signals.

3.3.4. Command field

3.3.4.1. SC[4:0]#, alias SLSB, SLOCK#, SM/IO#, SD/C#, SW/R#, bus commands (tristate)

These are bus command lines that carry information from the current master to the slaves regarding the transaction in progress. These commands are encoded based on the 80486 command lines, such that an entry level 80486 without second level cache can directly connect to the bus without interface circuitry. These command signals only appear during the command phase and are driven valid as the SADS# signal is asserted.

The encoding follows the table below as much as possible, depending on the operating mode, as indicated by the CSR control bits programmed during power-up. The command signals are meaning at both logic level during the command phase.

3.3.4.1.1. SLSB (SC4), local system ACI mode (tristate)

provides for additional ACI encoding. When SLSB is high, copy back masters are on the bus besides write-through masters..

3.3.4.1.2. SLOCK# (SC3), locked cycles (tristate)

SLOCK# indicates whether the transaction is a normal transaction or a locked transaction. The central as well as the distributed arbiter in any master should not arbitrate the next transaction to a different master. When SLOCK# is low, the cycle is a locked cycle.

3.3.4.1.3. SM/IO# (SC2), memory/IO cycles (tristate)

SM/IO# indicates the transaction involves memory operations. When SM/IO# is low, it means a read/write operation to I/O space. Operations to I/O space are mainly used to perform CSR/port programming.

3.3.4.1.4. SD/C# (SC1), data/code transactions (tristate)

SD/C# differentiate data transactions from code fetches. This has little meaning to the Memory Controller other than code operations can only be read operations issued from Cache masters.

3.3.4.1.5. SW/R# (SC0), write/read operations (tristate)

SW/R# controls the direction of data movement with memory and I/O.

| SC4 | SC3 | SC2 | SC1 | SC0 | bus cycles |
|-----|-----|-----|-----|-----|------------|
| x | — | 0 | 0 | 0 | interrupt acknowledge [486] |
| x | — | 0 | 0 | 1 | halt/special [486] |
| 0 | x | 0 | 1 | 0 | I/O read [486] |
| 0 | x | 0 | 1 | 1 | I/O write [486] |
| 0 | x | 1 | 0 | 0 | code read [486] |
| 0 | x | 1 | 0 | 1 | 486 reserved [486] |

| SC4 | SC3 | SC2 | SC1 | SC0 | bus cycles |
|---|---|---|---|---|---|
| 0 | x | 1 | 1 | 0 | memory read [cache master]   [486] |
| 0 | x | 1 | 1 | 1 | memory write [broadcast]   [486,CB] |
| 1 | x | 1 | 1 | 0 | memory read [non-cache master] |
| 1 | x | 1 | 0 | 0 | memory read with intent to modified   [CB] |
| 1 | x | 1 | 1 | 1 | memory write [non-cache data-copyback]   [CB] | where — indicates the signal meaning is ignored, and x indicates the command have same meaning with both logic and the meaning of the command bit is observed.

3.3.5. Control field

These signals are necessary for both single processor and multiprocessor operations.

3.3.5.1. SADS#, address data select (tristate)

SADS#, the address data select control, indicates that valid address and command phase is on the bus. This control signal is used internally to qualify address and command signals onto the bus. This also starts off a transaction sequence. SADS# is active low and is not driven when there is no bus activity.

3.3.5.2. SBLAST#, burst last (tristate)

SBLAST#, is a signal to indicate the end of the data cycle to assist bursting programmable line size and block move. The burst cycle ends at the cycle SBRDY# is asserted.

3.3.5.3. SS64#, 64 bit slave (tristate)

This signals to the system that a 64 bit slave is the recipient of the current cycle. The timing is identical to the ready timing.

3.3.5.4. SM64# 64 bit master (tristate)

This signals to the system that a 64 bit master does the current cycle. The timing is identical to the address timing (active at ADS time).

3.3.5.5. SA20M#, gate A20 mask (active)

SA20M#, the gate A20 mask, connects the gate A20 port (through CSR register gating if 86C201 is used) back to the processor. The signal is asynchronous, and has to meet set-up and hold times.

3.3.5.6. SNA#, next address (tristate)

SNA# is used to indicate that the slave is ready to receive the next line address to support full speed pipelining in memory read operations, even if the end of the current transaction is not finished. This is mainly used in cold starting the cache doing consecutive line reads.

3.3.6. Status field

One or more status lines are asserted by one or more slaves to indicate the status of the slaves and their interpretation of the information received from the master. The status lines are driven only by the participating slaves.

3.3.6.1. SRDY#, ready (tristate)

SRDY#, the non-burst ready, is used to signal the master that the selected slave has provided valid data in response to a read or accepted data in response to a write. This status signal applies only to non-burst transactions.

3.3.6.2. SBRDY#, burst ready (tristate)

SBRDY#, the burst ready input, is used to signal the master that the selected slave has provided valid data in response to a read or accepted data in response to a write and that the data transfer can be burst transferred to/from the slave.

3.3.6.3. SEBRDY#, early burst ready (tristate)

SEBRDY# is an early burst ready signal that tracks SBRDY#, but comes one clock earlier than burst ready (SBRDY#). If a slave can fulfill a master's request with a burst it must issue SEBRDY# in addition to SBRDY# to cause the burst operations to start. Data transfers timing is still coincident with SBRDY# for burst transfers. Wait states can be inserted by the slave by dropping SEBRDY# first, then one clock later SBRDY#. If the transfer is terminated with SBLAST#, SEBRDY# will go inactive in the same clock as SBRDY#. The transfer however stops when SBRDY# goes inactive. If no burst transfer is required SRDY# is the sole transfer control signal.

3.3.6.4. SBOFF#, back off

A selected or participating slave asserts SBOFF# to indicate that it is not ready to handle the requested transaction. SBOFF# causes the requesting master to "back off" of the bus and wait until SBOFF# is cleared. When SBOFF# goes away the master that was backed off has to restart its cycle all over.

3.3.6.5. SSWAIT#, snoop wait (open drain)

Any participating slave can assert SSWAIT# to extend the snoop cycle of the current transaction. Because SSWAIT# is open drain any number of slaves can extend the snoop cycle.

3.3.6.6. SBPARITY#, bus error (tristate)

Any participating slave can assert SBPARITY# if it detects parity error on SD[31:0] during any of the data cycles. The SA[31:0] and the SD[31:0] that caused the parity problem should be recorded in the CSR of the parties that caused the error (in this case, both the active master and the selected slave.)

3.3.6.7. SYERR#, system error (open drain)

System error is flagged anytime a ACI master or participating slave detects an error that is fatal or requires attention. Usually the master-slave pair that caused the system errors would have the violating conditions stored in the corresponding CSRs to assist later probing with software via traps or other vehicles. ACI masters or slaves are not affected by SYERR# status.

3.3.6.8. SIV#, intervene (tristate)

A processor agent asserts SIV# if it is intervening in the transaction. The agent maintains the assertion of SIV# until the end of the transaction. When SIV# is asserted memory controllers that might otherwise have provided read data or have taken write data do not provide SRDY# or SBRDY# for the transaction.

3.3.6.9. SCS#, cache sharing (open drain) (60 pf load)

A non-intervening cache agent asserts SCS# when it will retain a copy of the addressed data at the end of the transaction. The agent maintains the assertion of SCS# until the end of the transaction. This signal is open drain and actively pulled up only at cached masters.

3.3.6.10. SKEN#, cache enable (tristate)

The cache enable signal is used to determine whether the current line/memory transaction is cacheable. This is an open drain signal driven by any participating memory agent in the same cycle as SBLAST#. The signal is passively pulled up in the 80486 or actively pulled up in the cached master.

3.3.7. Interrupt control signals 3.3.7.1. SINTR, interrupt request (open drain)

SINTR has the function of the interrupt request line (generated by the PIC).

3.3.7.2. SRESET, reset (active)

SRESET, is a master signal that resets the entire machine, either at power up, or under circuit control. SRESET is asynchronous to the ACI but must meet set-up and hold time requirement with respect to the bus clock. This signal should be generated by either the Micro Channel Controller or the EISA Controller based on the PWRGOOD signal from the system power supply. The delay time is controlled by the Controller involved and should be compatible to the IBM AT or PS/2 machine timing.

3.3.7.3. SNMI, non-maskable interrupt (active)

Non-maskable interrupt is connected to every cache controller that interfaces with the ACI. Each cache controller is programmed through CSR programming to mask enable the non-maskable interrupt before relating the signal to the corresponding processor.

3.3.7.4. CPU_RESET (active)

CPU_RESET is a processor only reset initiated under software control. The sources for CPU_RESET are the keyboard controller and in the case of MCA System Control Port A. CPU_RESET is also asserted on detection of the 386/486 special cycle shutdown. The cache controller will provide a method to mask the bus CPU_Reset and also provide a register for a private version of CPU reset.

3.3.8. Arbitration field

3.3.8.1. SBREQ#[3:0], bus request (active)

For centralized arbitration, one bus request signal is assigned to each of four maximum masters that connect to the ACI. These request signals are asserted anytime during the data phase of present transaction. SBREQ#0 is used in conjunction with SHOLD and SHLDA.

3.3.8.2. SBGRANT#[3:0], bus grant (active)

At the last cycle of the data phase of the present transaction, or the following cycle after the bus request (if there is no bus traffic), one of the dedicated bus grants will be asserted, signaling the winning master that next transaction can proceed as soon as the following cycle permits.

3.3.8.3. SHOLD, bus hold request (active)

SHOLD allows another master to gain control of the ACI from a CPU. A SHLDA will be generated as a response to SHOLD.

3.3.8.4. SHLDA, hold acknowledge (active)

SHLDA goes active in response to a SHOLD request indicating that the ACI has been given up and the bus is tristated.

3.4. Other Signals

These are signals required for a functional system, but not directly part of the ACI.

3.4.1. Distributed Arbitration Controls

3.4.1.1. ARB, arbitration (tristate)

ARB signals that a cache controller can arbitrate for the bus. It starts arbitration by driving the signal inactive. The cache controller that wins arbitration is the one that drives this signal active.

3.4.1.2. GNT#, grant (tristate)

GNT# is driven active by the cache controller that presently owns the bus and is giving up the ownership to the winner of arbitration.

3.4.1.3. ARN[4:0], arbitration number, (open drain)

ARN[4:0] is driven during arbitration. Bits 3:0 are the four least significant bits of the device id. Bit 4 is a fairness release signal when high.

3.4.2. X and Y Buses

The X and Y bus are identical buses to provide a back channel 8 bit only interface for I/O operations. These buses use the I/O controllers byte steering capability to eliminate the requirement that all chips support a full 32 bit data path. The X bus is provided for shared I/O devices (i.e. serial controller). The Y bus is provided for system I/O support (i.e. CSR accesses) and interrupt acknowledge vectors. The X and Y bus can be the same physical lines in a system that does not allow concurrent activity by a I/O channel master and a ACI master.

3.4.2.1. XD[7:0], YD[7:0], data buses (tristate)

These are 8 bi-directional data lines. The control signals to determine when data is valid or to drive data on this bus are on all buses in the system. For a device on the ACI bus the ACI command and ready are used.

During an interrupt acknowledge cycle both the XD[7:0] and YD[7:0] buses will be driven with the interrupt vector from the interrupt controller. This is to allow for multiprocessor interrupt processing.

3.4.3. Serial field

Five signals are included to support scanning and diagnostics.

3.4.3.1. SCAN_IN (active)

SCAN_IN is a serial input line to each of the chip from the SCAN_OUT signal of the previous chip. The first SCAN_IN should come from a window register that supports real-time scanning or should be connected to AC ground in the system if real-time scanning is not supported. This signal can be used for chip/board diagnostics as well as chip screening on testers.

3.4.3.2. SCAN_OUT (active)

SCAN_OUT is a serial output line to connect to the next chip's SCAN_IN. The last SCAN_OUT should be connected to the system window register or left open if real-time scanning is not used.

3.4.3.3. SCAN_MODE[1:0] (active)

Two bits are encoded to handle the various modes of operations. These are namely boundary scan right, hold, scan right, normal.

| SCAN MODE[1] | SCAN MODE[0] | meaning |
| --- | --- | --- |
| 0 | 0 | normal |
| 0 | 0 | hold |
| 1 | 0 | scan right |
| 1 | 1 | boundary scan |

3.5. Physical Signals

3.5.1. Clock Generation

Systems designed with the chip-set should follow a very strict clock generation and clock distribution convention to minimize clock skew and unnecessary radiation.

Figure 6:
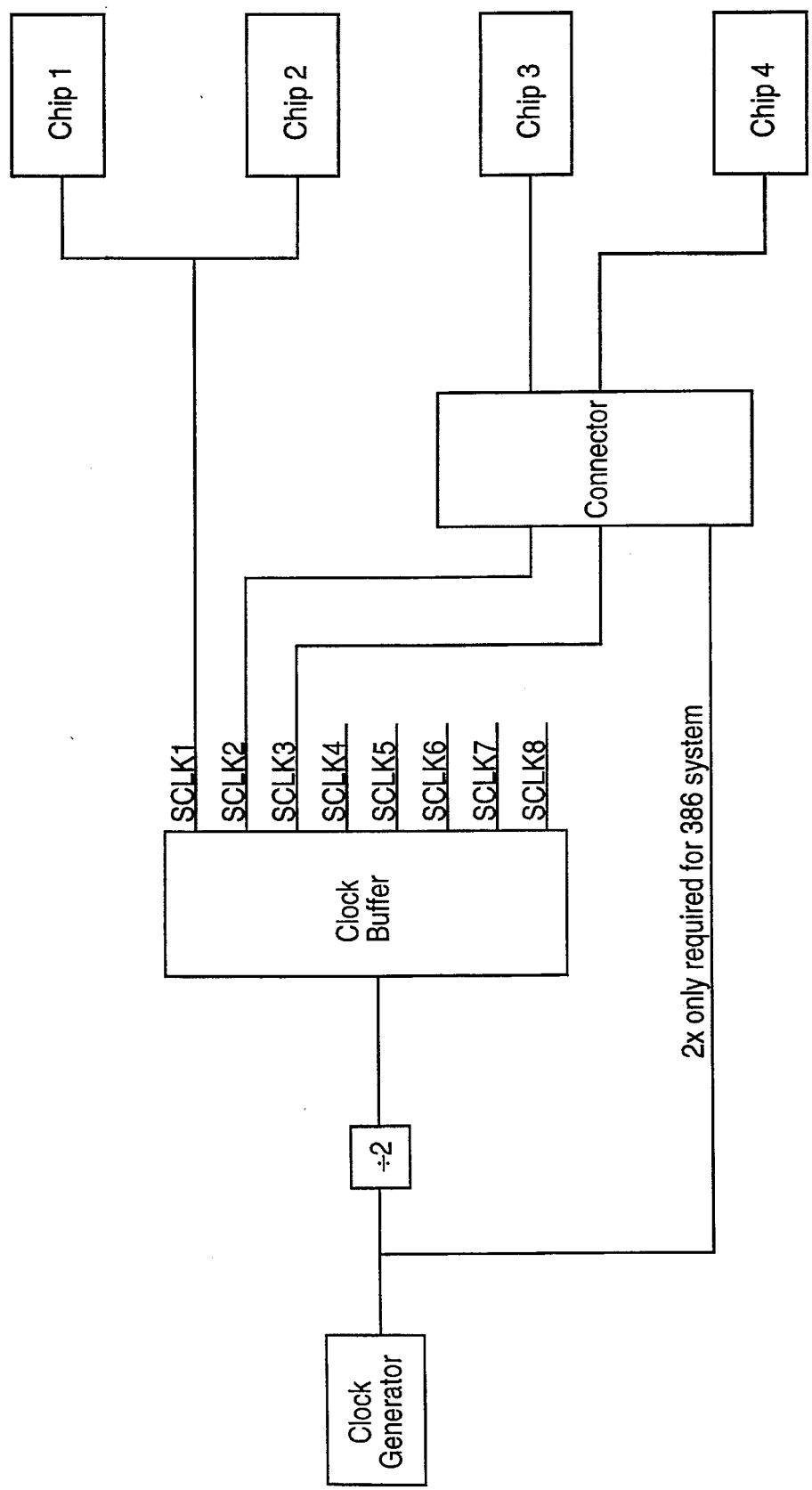
FIG. 6 is a clock generation diagram.

FIG. 6 shows clock signal distribution.

3.6. Arbitration

3.6.1. Central Arbiter Specification

The ACI uses a synchronous arbitration implementation. The SBREQ# (request for arbitration) lines are enabled by the rising edge of the ACI clock.

The rules for arbitration are as follows:

1—If there is no ACI cycle in progress, an arbitration cycle is started as soon as any of the SBREQ#[3:0] lines are sampled active. The arbitration cycle will take only one clock period.

2—If a ACI cycle is in progress an arbitration is started cycle when any SBREQ#[3:0] is sampled active and only when SADS# is sampled active. The arbiter looks for an active SADS# as soon as a SBGRANT# line was made active. meaning a ACI cycle is "in progress". Normally a master will assert ADS# as soon as it receives the SBGRANT# active and it sees the SRDY# active for the current cycle. As soon as SADS# is active the arbiter can start another arbitration cycle.

3—An arbitration cycle is completed as soon as the arbiter samples the SRDY# active for the cycle in progress.

4—A master can start a new cycle only when it samples its SBGRANT# line active. At this point we have the choice to pipeline the addresses. If a master cannot pipeline then it samples SBGRANT# and waits for SRDY# to go active before asserting SADS#. If a master can pipeline then it has to sample its SBGRANT# line and the SNA# line; if SBGRANT# and SNA# are active then the master can assert SADS# and its addresses before the end of the current cycle. It then has to wait for the SRDY# in order to assert its data on the bus. Notice two facts: 1) A pipelined cycle can be started only if the current cycle has at least one wait state (for very obvious reasons). 2) We have to allow for a "dead" clock tick between the end of the current cycle and the moment the pipelined master can assert its data on the bus (in order to avoid clashes on the bus). A pipelined cycle will still last for two clock ticks minimum and therefore the cycle tracking state machines of the slaves will not be too complicated.

5—The bus arbiter will have to detect that a bus cycle is pipelined and in such a case it will start a new arbitration cycle as soon as SRDY# becomes active (instead of waiting for the SADS# line to become active).

6—The arbitration when there is not a cache in the system uses HOLD and HOLDA lines of the CPU and the timing is special. If the CPU asserts LOCK# the ACI is kept for the duration of the locked cycles (the locked cycles will be done as an atomic transaction).

7—The ACI is held for more than one cycle when the Micro Channel controller does a series of Micro Channel cycles while the BURST# line on the Micro Channel bus is asserted.

8—When an NMI happens the CPU(s) are enabled on the bus at the end of the current cycle and the arbitration is frozen until the CPU resets the right bits inside port 90h.

3.6.2. Multiple Processor Arbitration

In the case of multiple processors the arbitration needs to be expanded to support additional cache controllers. The cache controllers arbitrate amongst themselves to determine the bus owner. It is a distributed arbitration that includes fairness. Each cache controller that requires the bus monitors the ARB signal. When it is active the cache controllers that want the bus drive ARB inactive and ARN[3:0]# with the four least significant bits of its device id and ARN4# with its fairness state. The logic connected to ARN[4:0]# will settle within 200 ns to determine which cache controller wins the arbitration. Once it wins it sets its fairness release bit which decreases its arbitration number below the other competing cache controllers. Once all competing cache controllers have been serviced, then on the next arbitration ARN4# will be high signaling all cache controllers that they can reset their fairness release bit. When a cache controller looses arbitration it stops driving ARB and ARN[4:0]# and waits for ARB to become active again to restart its arbitration.

When a cache controller wins arbitration it waits for the current bus owner to drive GNT# active. It then assumes bus ownership and drives ARB active and then tristates to allow the next round of arbitration.

The current bus owner handshakes with the central arbiter via SHLDA, SHOLD and SBREQ# in the same way that a 80486 uses these signals.

Parking is the state of the bus master retaining ownership of the bus until another request "kicks" it off. A bus master parks by continually asserting SBREQ#. If its SBGRANT# signal is active during SRDY#, then the present bus master retains bus ownership.

Figure 7:
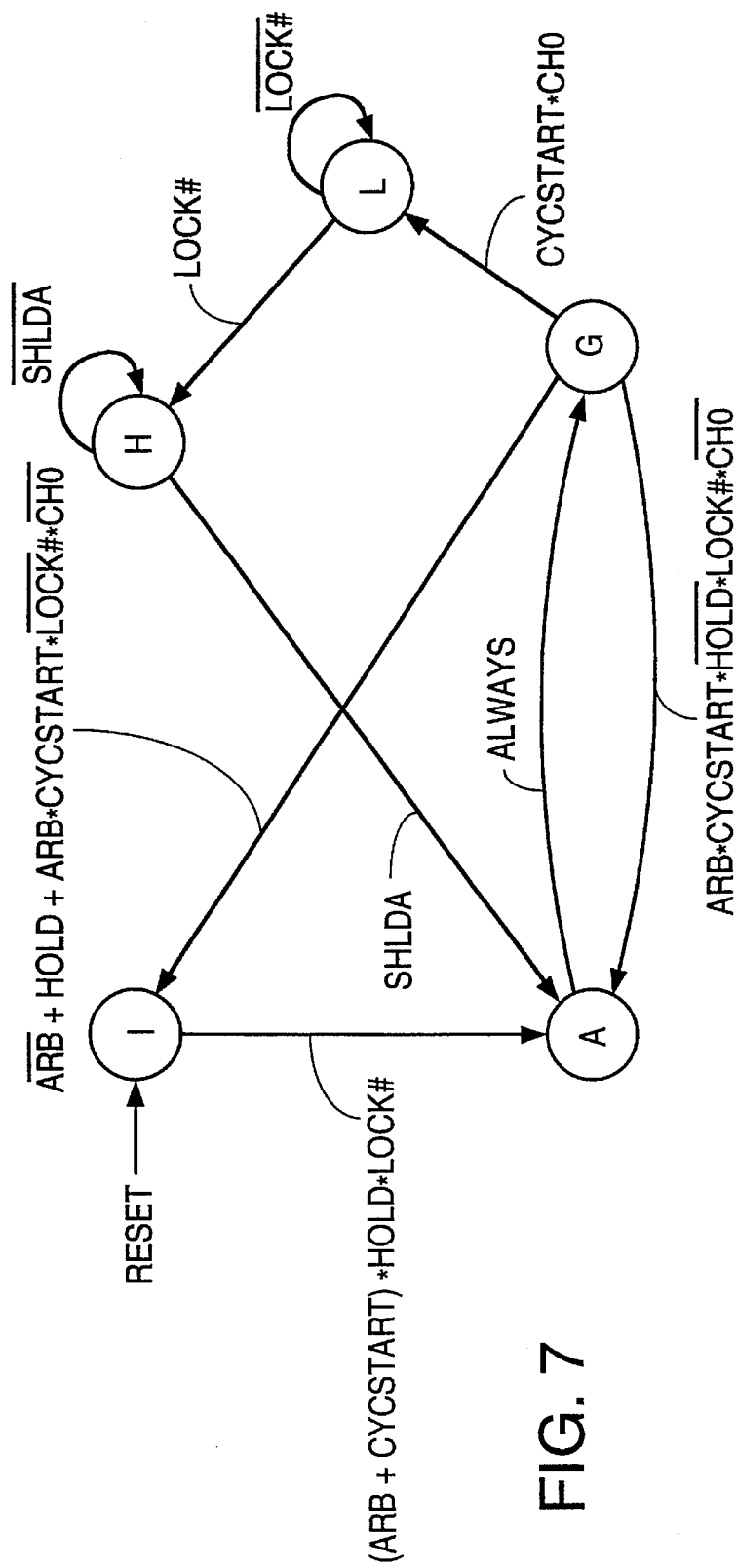
FIGS. 7–8 are state diagrams.
Figure 8:
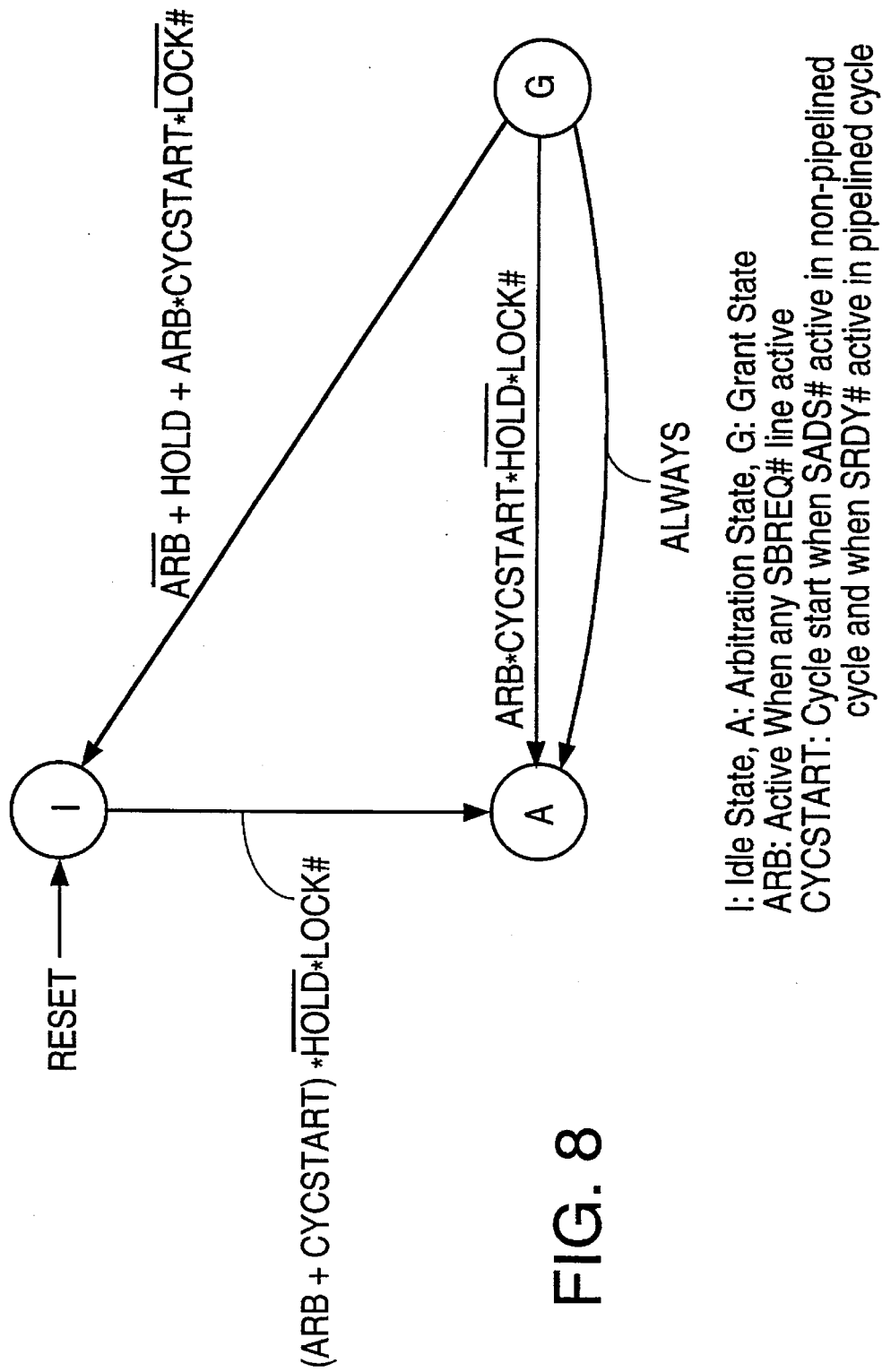

FIG. 7 shows an Arbitration state machine for a 486 CPU System. FIG. 8 shows an Arbitration state machine for a CPU with Cache Controller System.

3.7. Bus Protocols 3.7.1. Masters and Slave Definition 3.7.1.1. Masters

A master is a device which can initiate a cycle on the ACI. A master must arbitrate for the bus by using the SBREQ# and SBGRANT# lines.

3.7.1.2. Slave

A slave cannot initiate a cycle on the bus. A slave can only respond to a cycle initiated by a master and it can prolong a cycle by delaying the enabling of the SRDY# or SBRDY# line.

3.7.2. Numbering of Bytes, Words, Double Words

The bus uses the Little Endians byte, word and long word number convention.

3.7.3. Bus Transactions Cycles

These are the definitions of the different transaction cycles which can occur on the ACI.

3.7.3.1. Interrupt Acknowledge

Response to interrupt request. The interrupting device drives interrupt vector onto SD[7:0].

3.7.3.2. Halt/Special

Depending upon SBE[3:0] one of four cycles. 1) Shutdown 2) Flush 3) Halt 4) Write Back. Bus will return SBRDY—for these cycles and in the case of shut down will assert CPU_RESET.

3.7.3.3. I/O Read

Read from I/O address space.

3.7.3.4. I/O Write

Write to I/O address space.

3.7.3.5. Code Read

Instruction fetches from memory.

3.7.3.6. Memory Read (Cache Master)

Read of data from memory 3.7.3.7. Memory Write (Broadcast)

Non-Burst write, Snooping caches will invalidate.

3.7.3.8. Memory Read (Non Cache Master)

Read from memory by non-cache masters. Allows caches to remain in E or M state.

3.7.3.9. Memory Read (Non Cacheable Memory)

Memory read to memory locations which are not cacheable.

3.7.3.10. Read (With Intent to Modify)

Read from memory with intent to modify. Snooping caches will invalidate. If the read is to an area in memory which is noncacheable a write broadcast cycle will follow.

3.7.3.11. Write [copyback] (Non Cacheable Memory)

Copy-back or writes to non-cacheable memory. Caches will not snoop. Used by masters writing to non-cacheable memory (i.e. video)

3.7.4. Descriptions of Basic Bus Transactions

These bus transactions can be either single cycle or multiple cycle, burst or non-burst, cacheable or noncacheable.

Figure 65:
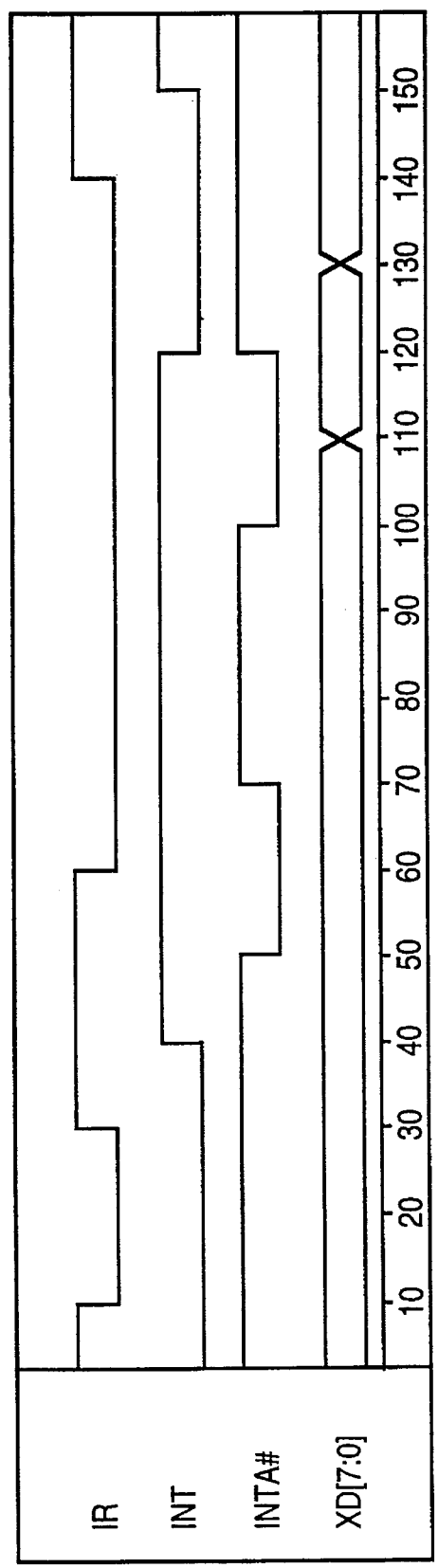

3.7.4.1. Interrupt Acknowledge Transactions 3.7.4.1.1. Single Processor Interrupts The cache controllers or 486 microprocessor generates interrupt acknowledge cycles in response to an interrupt request input SINTR. FIG. 65 shows the interrupt acknowledge timing. As shown interrupt acknowledge cycles are generated in locked pairs. Data returned during the first cycle is ignored. The interrupt vector is returned during the second cycle on the lower 8 bits of the data bus, SD[7:0].

Figure 9:
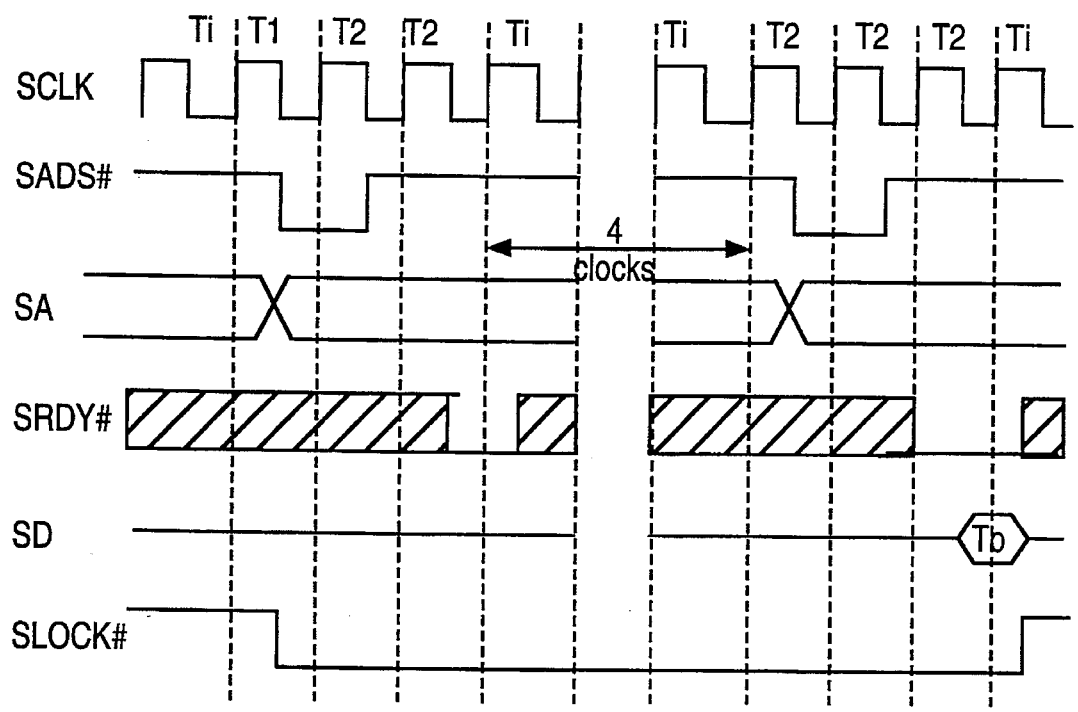
FIG. 9 is an interrupt acknowledge timing diagram.

FIG. 9 shows the interrupt acknowledge cycle.

3.7.4.1.2. Distributed Interrupts for Multiple Processors

In multiprocessor systems interrupts can be sent to a single processor for processing, or they can be sent to a single processor and redistributed by that processor to other processors, or they can be automatically distributed to any of the processors.

3.7.4.1.2.1. Automatic Distribution of Interrupts

Interrupts are automatically distributed using logic in the cache controllers.

In this automatic distribution system, the SINTR signal from the interrupt controller (included on the peripheral interface controller) is connected to the master cache controller. In a system with more than one cache controller one controller is designated to be the master cache controller. The master cache controller will acknowledge the interrupt request (SINTR) with an interrupt acknowledge sequence, causing two INTA cycles to be generated. When the vector is placed on the XD[7:0], YD[7:0] and ACI buses for the second INTA pulse of an interrupt sequence by the interrupt controller all cache controllers capture this vector. This vector is compared in each cache controller with three sets of compare circuits. Each compare circuit has two registers, a five bit register for the fixed upper field of the interrupt vector (UFR) and a eight bit register (Lower Field Register, LFR) for the lower three bits of the vector. (The eight bits of the LFR correspond to eight interrupt masks. From left to right D7 is the mask for interrupt level 7, D6 is the mask for interrupt level 6, etc. to D0 which is the mask for interrupt level 0.) The 8 mask bits are "anded" to the outputs of the 8 to 1 decode of the three lower vector bits. If a mask bit is set to one and the eight to one decode from the vector is enabled a match is said to occur. If one of the UFR's compares equal and a match occurs with the LFR and the decoded lower 3 bits the cache controller is enabled for this interrupt. The controller will pass a INTR to its 80386/80486. The subsequent interrupt acknowledge cycle from the CPU will be serviced by the enabled cache controller, no signals for the acknowledge will pass to the system bus. The enabled cache controller will provide RDY# at the appropriate time. The cache controller accepting the interrupt prevents the master cache controller from acknowledging any subsequent interrupts by forcing SINTR low. When the interrupt request sent to this cache controller associated CPU is acknowledged by the CPU, the cache controller releases SINTR which allows the master cache controller to see new interrupts requests from the PIC.

Figure 10:
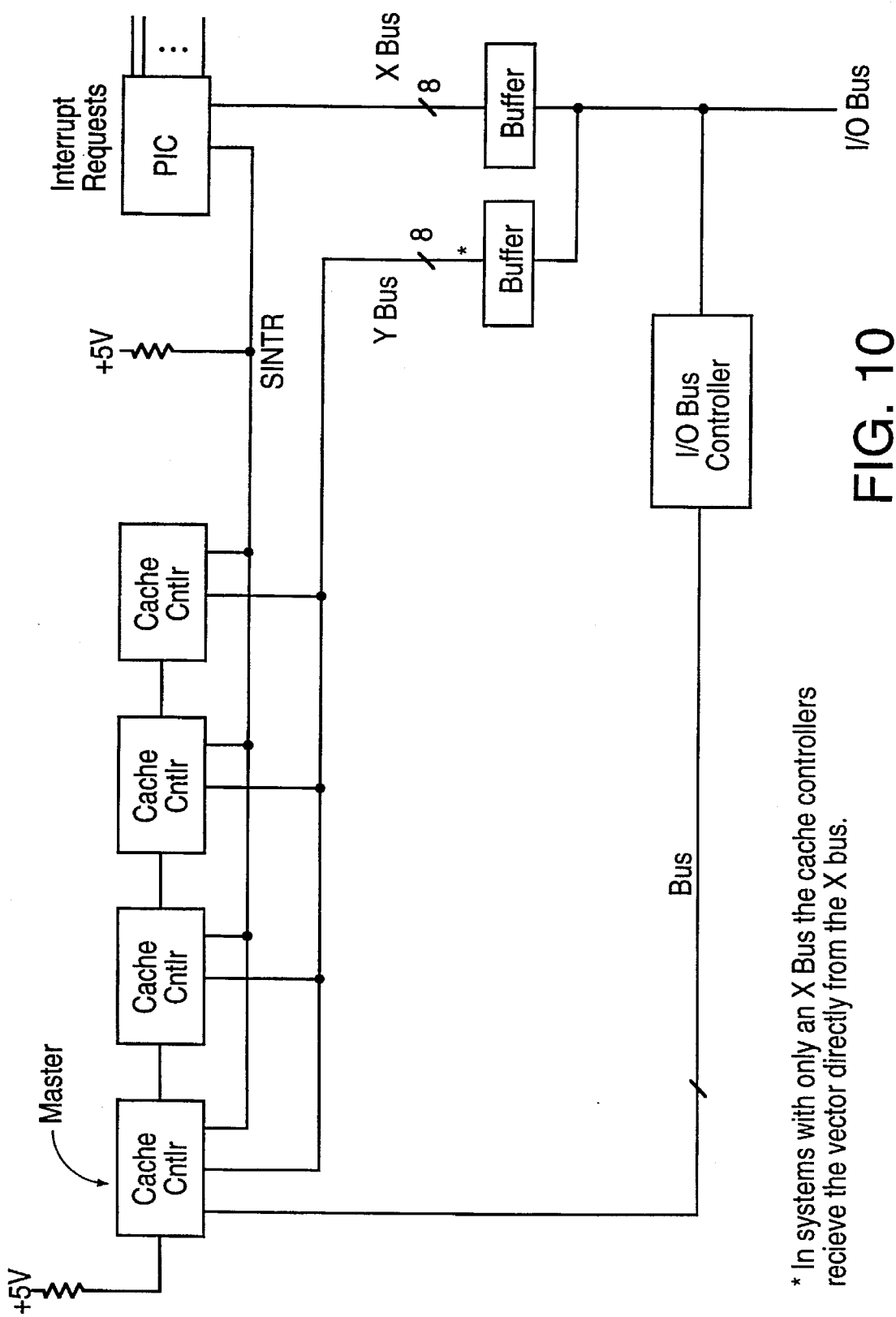
FIGS. 10–12 are portions of the automatic distributed interrupts within the cache controller.

FIG. 10 shows the Interrupt System Block Diagram.

Figure 11:
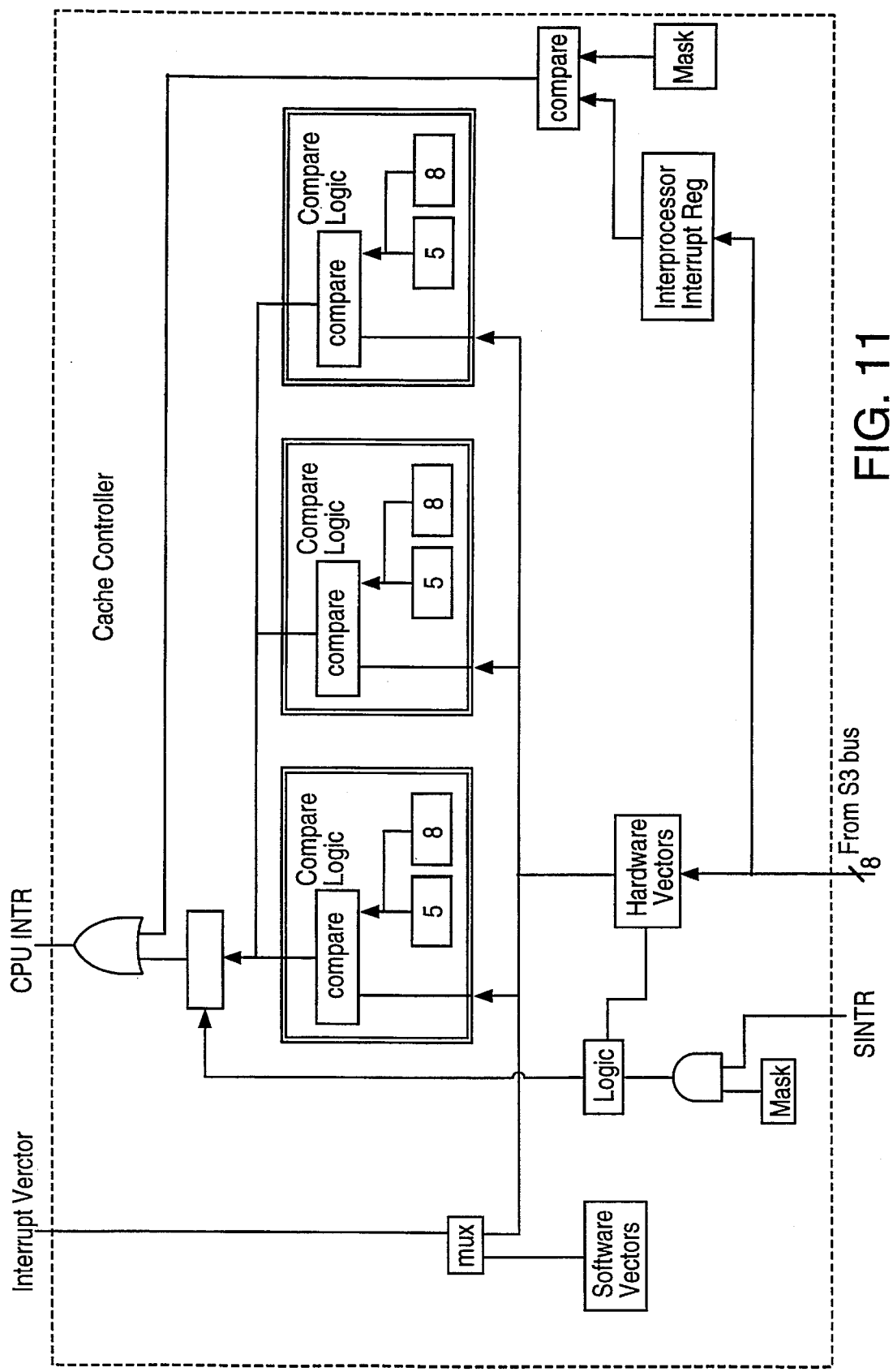

FIG. 11 shows the Cache Controller Interrupt Block Diagram.

Figure 12:
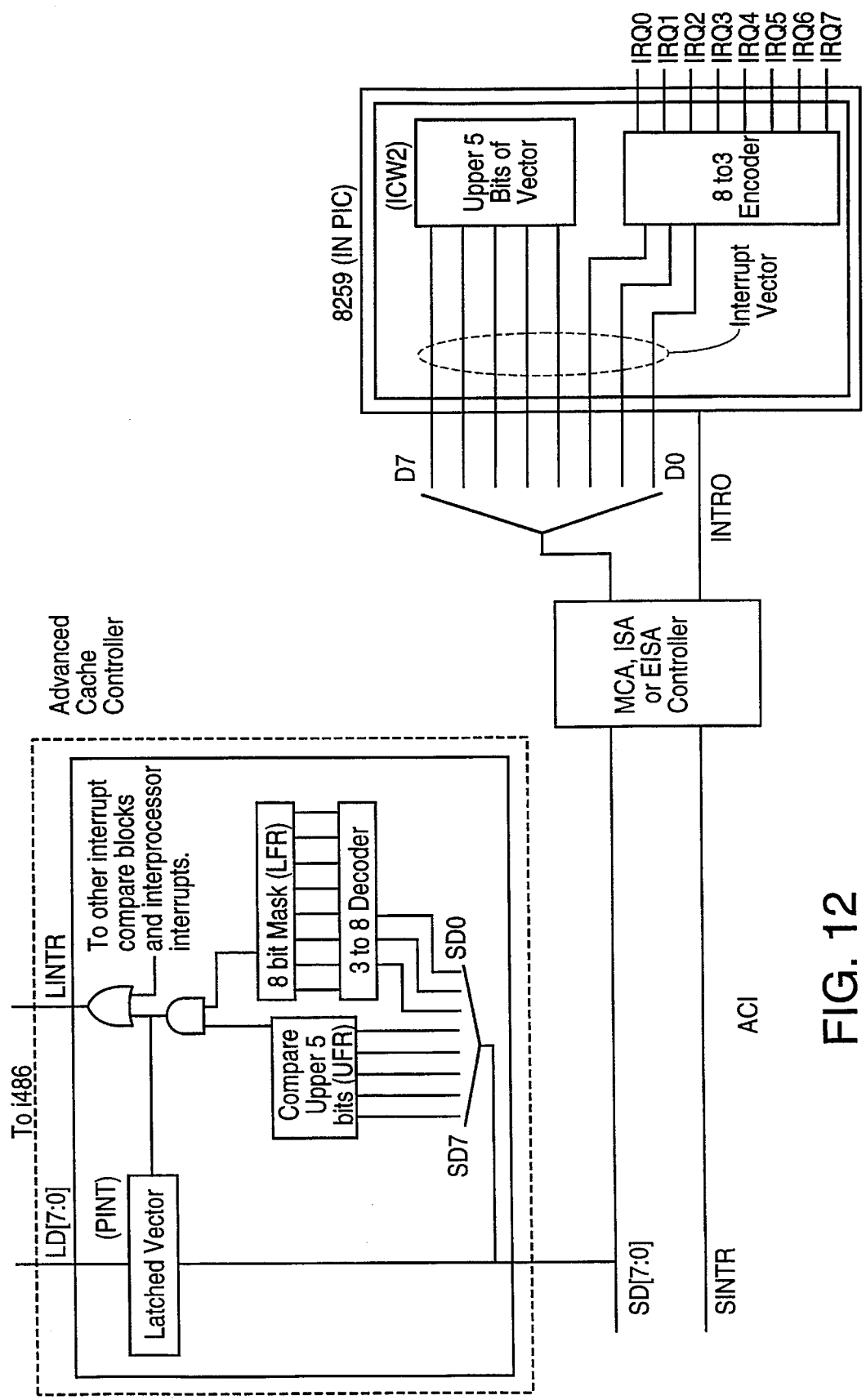

FIG. 12 shows the Cache Controller Interrupt Compare Logic to 8259 Interface.

The resultant sequence for automatically distributing interrupts is as follows:

An interrupt request is signaled to the system from the peripheral interface controller on SINTR.

If the system is set up for automatic distribution of interrupts the master cache controller will acknowledge the interrupt request.

During the acknowledge cycle the vector is captured by all cache controllers.

Each cache controller checks to see if it is enabled for this vector. The enabled cache controller signals its corresponding CPU to acknowledge the interrupt by enabling the appropriate INTR.

The CPU acknowledges the interrupt, a vector provided by the cache controller from the vector that was captured from the bus is returned back to the CPU.

The interrupted CPU releases SINTR allowing the the master cache controller to see subsequent interrupt requests.

Figure 13:
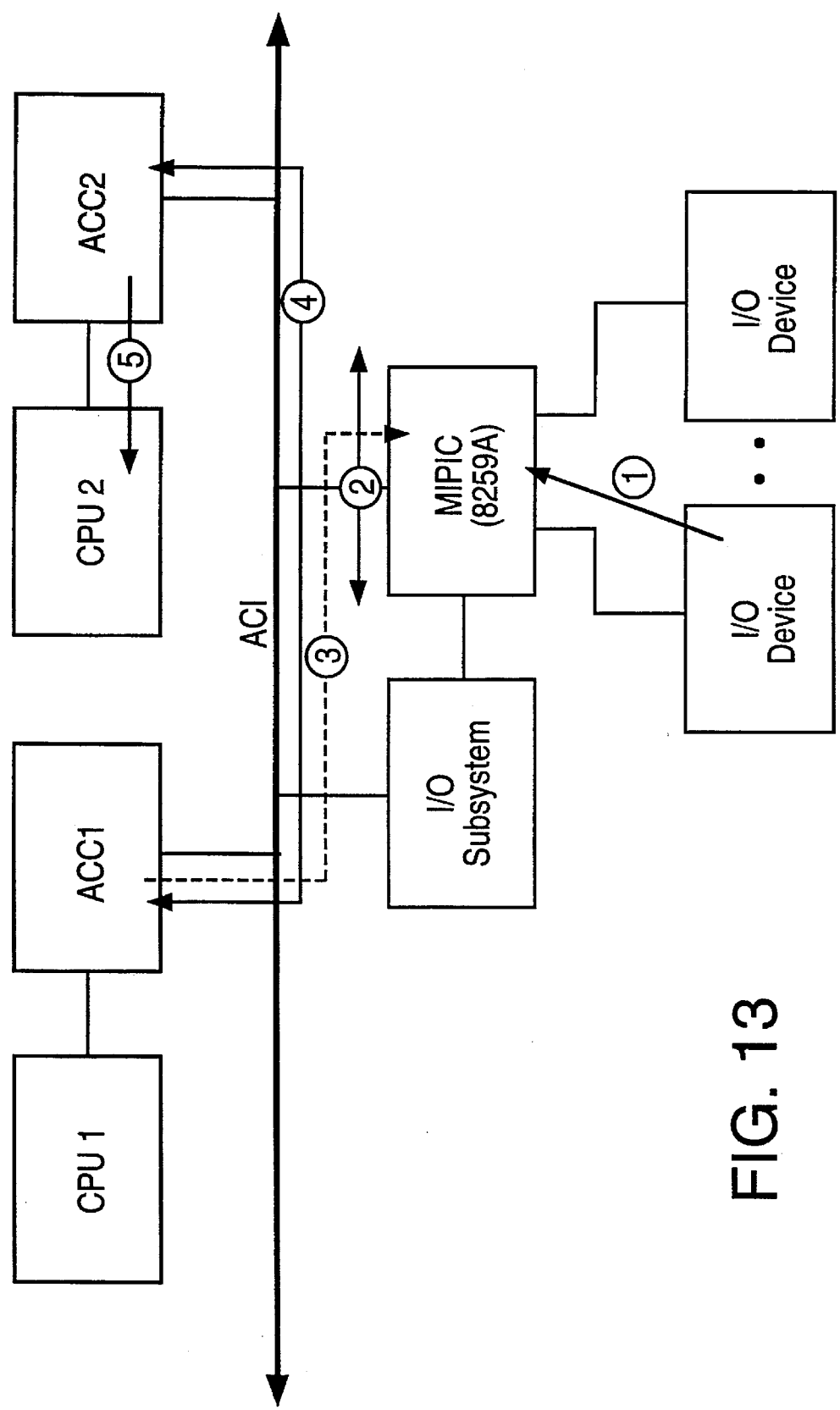
FIG. 13 is a diagram of the distributed interrupt mechanism.

See also FIG. 13 illustrating hardware distributed interrupts. As shown, in step 1 the device signals an interrupt to the PIC. In step 2, the PIC signals "INTR" on the ACI. In step 3, the master cache controller performs the "INTA" cycles. In step 4, all cache controllers capture the interrupt vector and compare it against their internal tables. In step 5, if a match occurs the corresponding CPU is interrupted and provided with the vector.

3.7.4.1.2.2. Software Controlled Distribution of Interrupts

In addition to this automatic interrupt distribution system, interrupts can be distributed under software control. The master cache controller's processor is interrupted for all hardware interrupts, and distributes the interrupt handling responsibility using the interprocessor interrupt mechanism.

3.7.4.1.2.3. Interprocessor Interrupts

Two interprocessor interrupts are supported in the cache controller, each with a separate programmable interrupt vector. For these two interrupts there are two methods of triggering, one for interrupting only one processor and one for interrupting multiple processors.

The first trigger method is for an interrupt to a single processor. Each processor has an I/O location that contains two bits (one for each interprocessor interrupt) that when set assert the associated interrupt. This register is in the cache controller and called the Individual Interprocessor Interrupt register (IIPI). The interrupt is cleared by the action of the 386/486 performing an acknowledge cycle to its cache controller.

The second trigger method is for interrupting multiple processors, or groups of processors. Each cache controller has a Broadcast Interprocessor Interrupt Mask register (BIPIM), that contain two 4 bit masks, one for each of the two interprocessor interrupts. Also there is a system wide Broadcast Interprocessor Interrupt register (BIPI) that contains two 4 bit fields. When the BIPI is written each cache controller uses its BIPIM to mask the bits, and if there are any bits in both the BIPI and BIPIM that are both 1 the corresponding interprocessor interrupt is generated.

Since there are 4 bits for each interprocessor interrupt one can actually create four groups of processors to interrupt, or in four processors these can be used as a single processor interrupt. And since the masks for all processors are I/O operations any task can dynamically adjust the groupings.

3.7.4.2. Noncacheable Transactions

For non cacheable bus cycles at least 3 clocks are required. The cycle starts with SADS# at the rising edge of the first clock. The cycle is completed when SRDY# is returned. If the burst last signal SBLAST# is asserted (low) by the 1st clock after SADS#, the transfer is completed after one transfer. If the burst last signal is not asserted by the first clock after SADS# a burst request is indicated. The slave indicates that the burst transfer can continue by returning SBRDY#. A burst cycle is completed by the master activating SBLAST# or by the slave returning SRDY# instead of SBRDY#. The slave indicates to the master that the data is not cacheable by returning SKEN# inactive one clock before it returns SRDY# or SBRDY# active (only for the first acknowledge on a burst).

Figure 14:
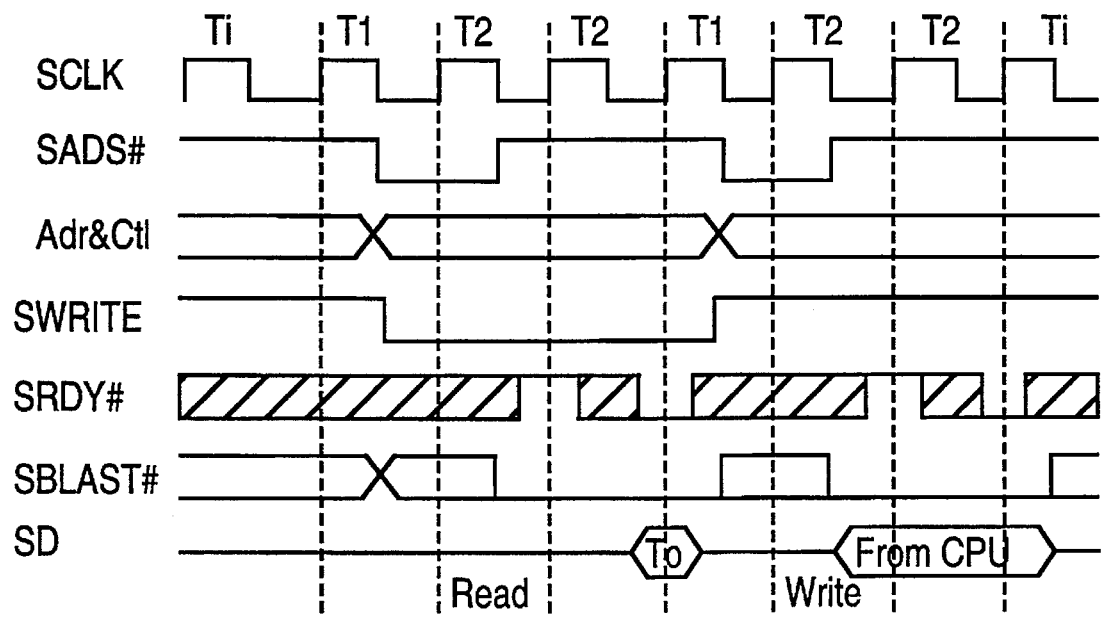
FIGS. 14–17 are timing diagrams for cache transactions.

FIG. 14 shows the basic bus cycle.

Figure 15:
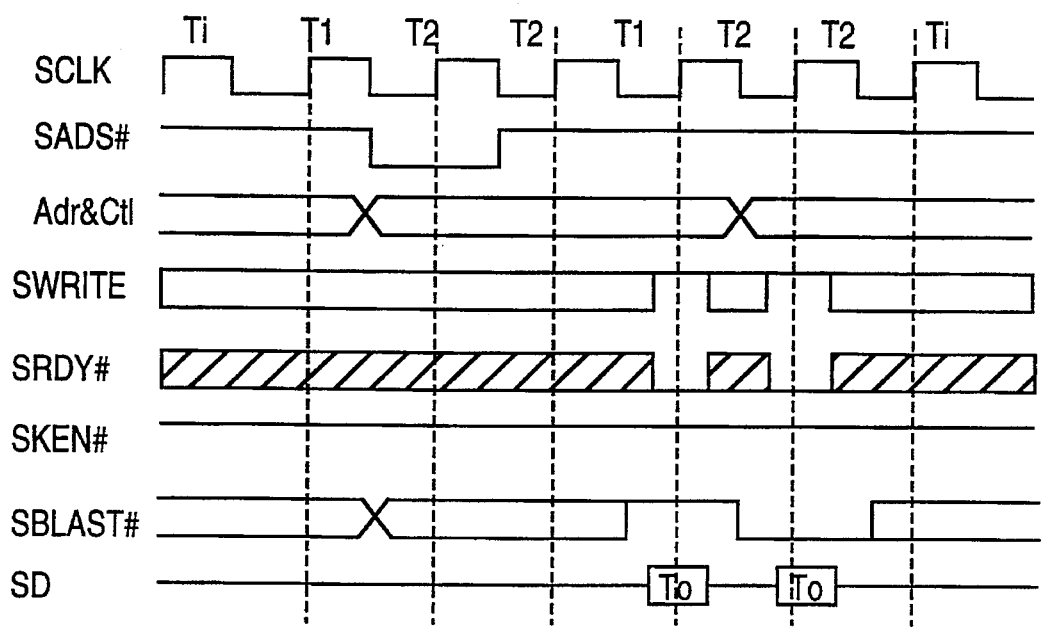

FIG. 15 shows the non-cacheable burst cycle.

3.7.4.3. Cache Transactions

Memory transactions which are cacheable are so indicated to the master by the slave by signaling SKEN#. SKEN# is driven active (low) one cycle before the slave sends back SBRDY# or SRDY# to indicate a cacheable transaction. Transactions which are cacheable can be either non burst operations or burst operations as indicated by the slave returning SRDY# or SBRDY# respectively. To complete a line fill to the cache controller or the processor when it is connected directly to the bus SKEN# must be active the cycle before the last SRDY#/SBRY#.

Figure 16:
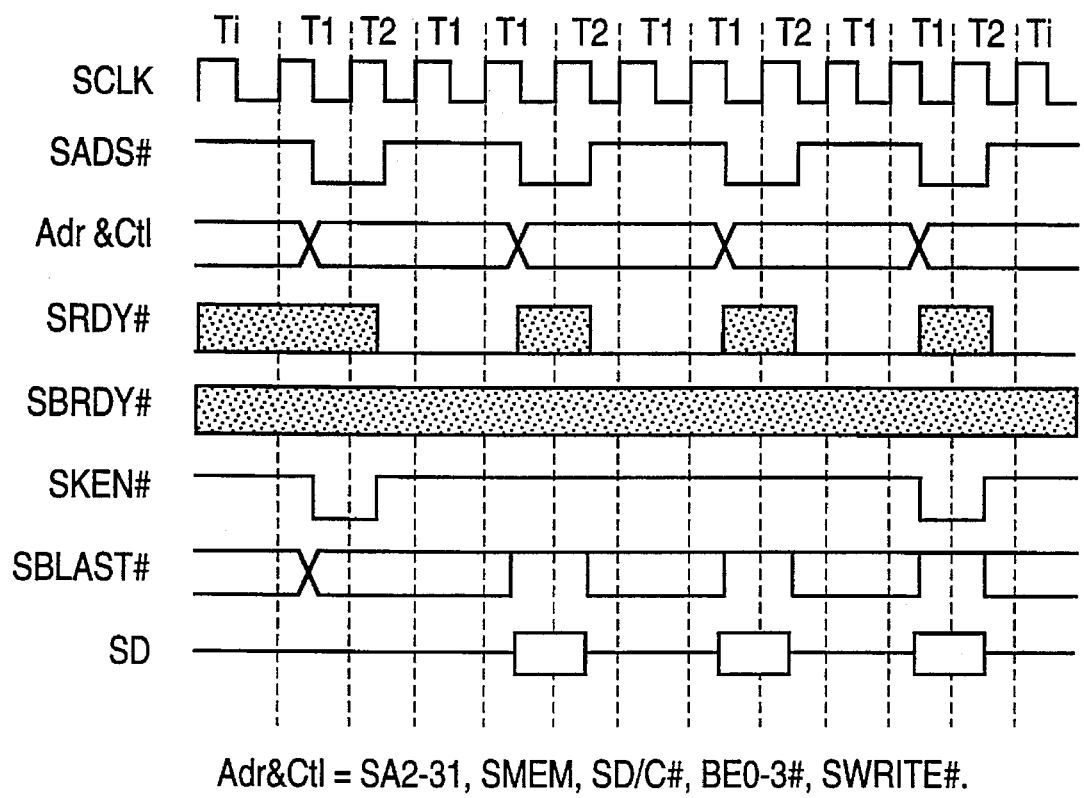

FIG. 16 shows the non-burst cacheable cycle.

Figure 17:
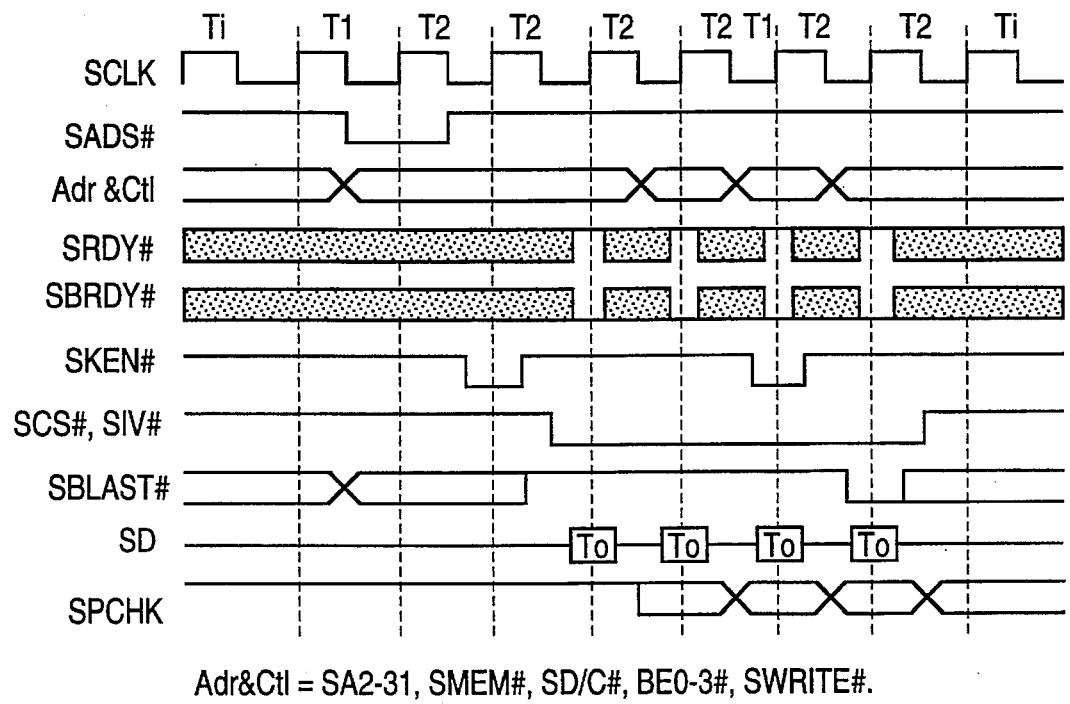

FIG. 17 shows the burst cacheable cycle.

3.7.4.3.1. Cache Coherency

In a multiprocessing system with multiple caches, a bus and state protocol is required to maintain cache coherency. The ACI uses the MESI protocol. MESI stands for the four states:(M)odified, (E)xclusive, (S)hared, and (I)nvalid. Modified state represents a line that has been modified by its CPU and that is the only valid copy of that line in the system. Shared state represents a line that resides in more than one cache and that this line is consistent with system memory. Exclusive state represents a line that resides in one cache only and is consistent with system memory. Invalid state represents a line with invalid data and this is the state to which all lines are initialized at system reset.

Caches communicate with one another via the bus. The command type communicates what the bus cycle is doing. The ones of importance to caches are: Read (data or code), Read (with intent to modify), Broadcast, Write (copy-back), and Read (noncache master). Two status lines are used for communication: SCS# is driven active by caches that are maintaining a copy of line being accessed, and SIV# is driven active by a cache that has the only valid copy of the line being accessed.

3.7.4.3.1.1. CPU Cycles

All cached lines are initialized to the invalid state. Any access to a line will be a miss requiring a line fill. There are three paths that allow the I state to transition to another state. The state transition from I to E occurs on a read cycle when no other cache asserts SCS# or SIV# during the line fill. If another cache does assert SCS#, then the state changes from I to S. If another cache asserts SIV#, then a state transition from I to M occurs. The write miss cycle will generate Read Modify cycle on the bus and the state will change from I to M. Also notice that the only path to the I state via a CPU cycle is via flush. There are two paths from the E state. A read miss generates a read bus cycle and if SCS# is active the state changes to S. The second transition path is from E to M. Three conditions trigger this transition: 1) write hit, 2) read miss the SIV# active, and 3) write miss. Write miss in fact reads new data into the cache using the read with intent to modify transaction, then writes the new data into the cache. All other caches if they had been at S will have been invalidated by the read with intent to modify.

If data is in the S state and a read miss occurs, reading the new data will cause S to go to E if SCS# is inactive or to remain in S if SCS# is active. A write hit will cause a broadcast cycle which will invalidate all caches, allowing the line to become exclusive. During a broadcast the memory controller will capture the data and write it into memory. When more than one party can take part in a transaction the SBRDY# or SRDY is returned by the memory controller. A write miss or a read miss with the current data in the S state will cause S to change to E if no SCS# enable and no SIV# to S if SCS# is enabled and to M if SIV# is enabled. If a line is in the M state and a read or write miss occurs, then a copy back cycle occurs. A read miss with SCS# inactive forces a change to state E. A read miss with SCS# active changes the state from M to S.

Figure 18:
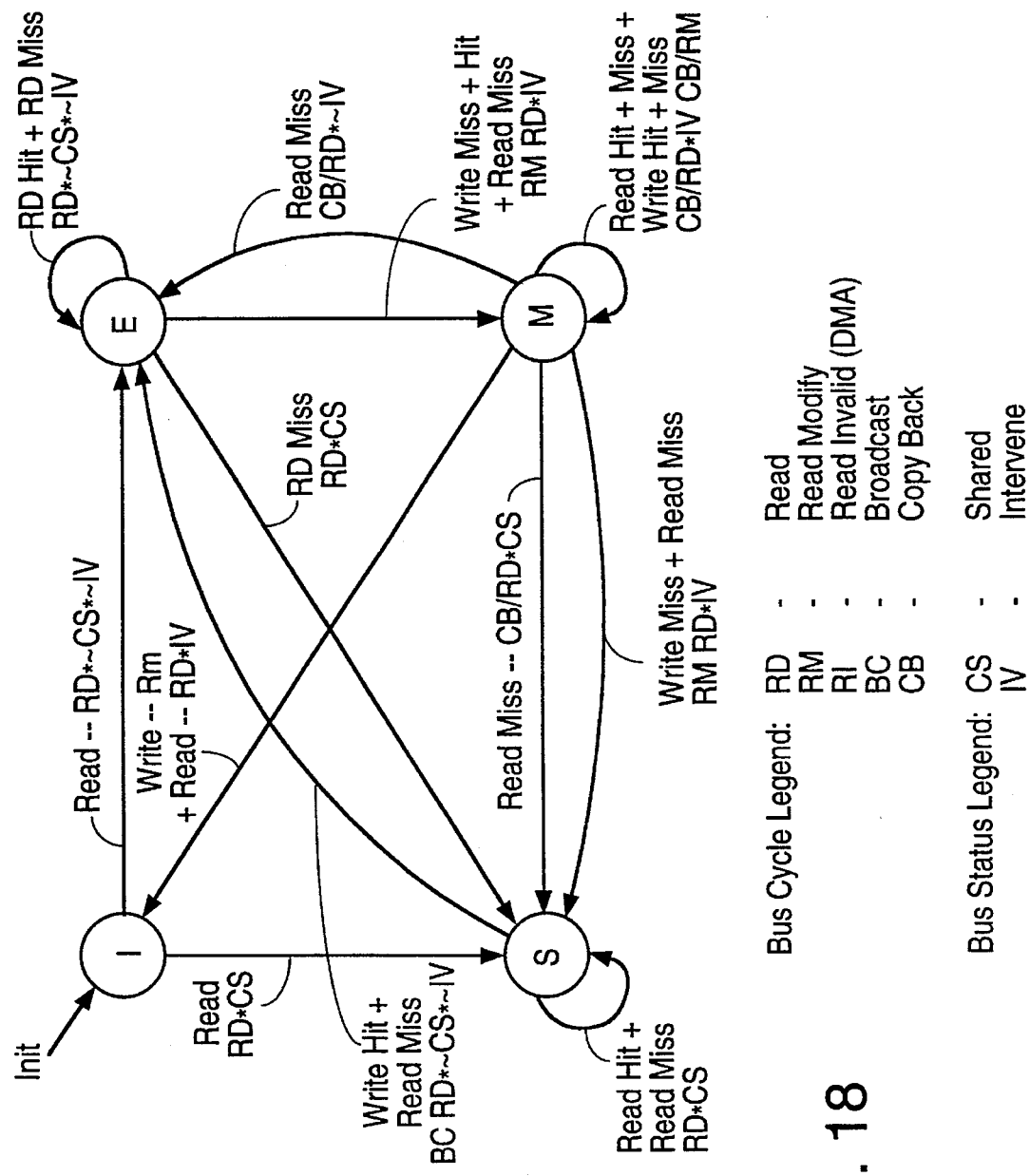
FIGS. 18–19 are state diagrams.

FIG. 18 shows cache states with CPU cycles.

3.7.4.3.1.2. Bus Cycles

The I state has no exits. A bus cycle cannot cause a line in the I state to change to another state. Also a copy back bus cycle by another cache is only legal with other caches in the I state prompted by a read modify or a read cycle. Starting at the M state also means that the snooping cache will assert SIV#. The E state has two exit paths: 1) A read with SCS# active will force a change to S. A read modify or a broadcast will stimulate a change from E to I. Also SCS# is asserted only on reads while in the E or S state.

Figure 19:
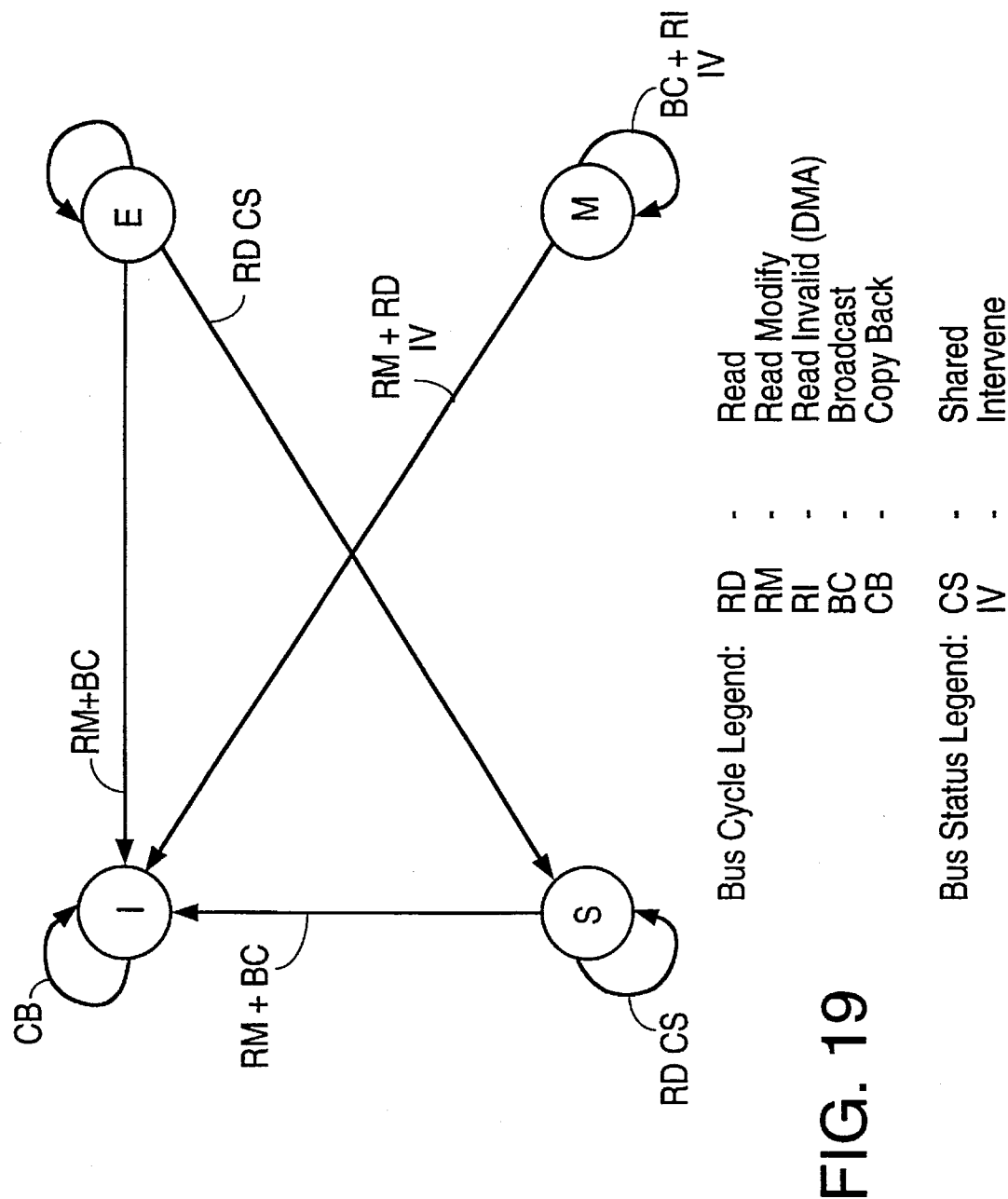

FIG. 19 shows bus cycle states.

3.7.4.4. Description of special transactions 3.7.4.4.1. Reset

The following summarizes the causes of resets and the devices affected in a uniprocessor environment. This applies for 386/486 based machines with ISA/MCA/EISA interfaces. The 3 resets are:

SRESET System reset which resets all the devices in the system. CPURST Resets the processor only. COPRST Resets the 80387 only.

In a multiprocessor system only one processor will be affected by CPURST. This is done by having all other processor mask the CPURST line with the SCPURST# mask bit in the cache controller.

3.7.4.4.1.1. Shutdown

Shutdown is caused by a software caused fault condition. The processor is to be reset upon a shutdown. Shutdown is detected on SBE[3:0]# during a 386/486 halt/special bus cycle.

For a non-cached single processor system the I/O Controller (MCA, EISA or ISA) must supply SRDY# for the processor, and drive the CPU_RESET line.

For a cached system the cache controller will supply the RDY# for the processor, and drive the 386/486 reset without interaction on the system bus.

3.7.5. Description of transaction modifiers

Three additional signals affect all of these operations NMI, SLOCK# and SBOFF#.

3.7.5.1. BACKOFF

The backoff mechanism is implemented using the SBOFF# line. It is provided in order to avoid deadlock on the bus. A slave can interrupt an ongoing transaction or it can prevent further transactions from being initiated. The use of backoff in this architecture is to prevent deadlocks between the ACI and the I/O bus. A backoff is initiated when a Master wants to perform an operation on the I/O bus (ISA, EISA or MCA) and at the same time the I/O Controller (ISA, EISA or MCA) wants to initiate a transfer on the ACI. If the SBOFF# line is asserted anytime within an on-going transaction, the current bus master withdraws from the bus during the next bus clock cycle and tristates all of its signals. The bus arbitration will continue to run, but all bus grants will be driven inactive and the MCA or EISA controller will be given the ACI.

The ACI master which was forced to back off will rerequest the bus and retry its transaction after SBOFF# is deasserted.

In the present system this master can be either a cache controller or the 486 processor or another master trying to transfer data to the Micro Channel or EISA bus.

3.7.5.2. SNMI Timing

NMI can be enabled any time during a transaction to indicate a major error has occurred. SNMI can be set by the slave indicating the failure, two cycles after the SADS# for that cycle and up to one cycle past the SRDY# acknowledge for the given cycle. The intent is to have the NMI condition returned to only the cache controller or CPU which caused the NMI condition. Hence, each cache controller must gate off SNMI when another controller has the bus during the timing as specified above. One cache controller should be configured to observe the SNMI when no bus cycles have been executed to account for the case where the Micro Channel controller or EISA bus controller gets a NMI from a DMA operation.

Figure 20:
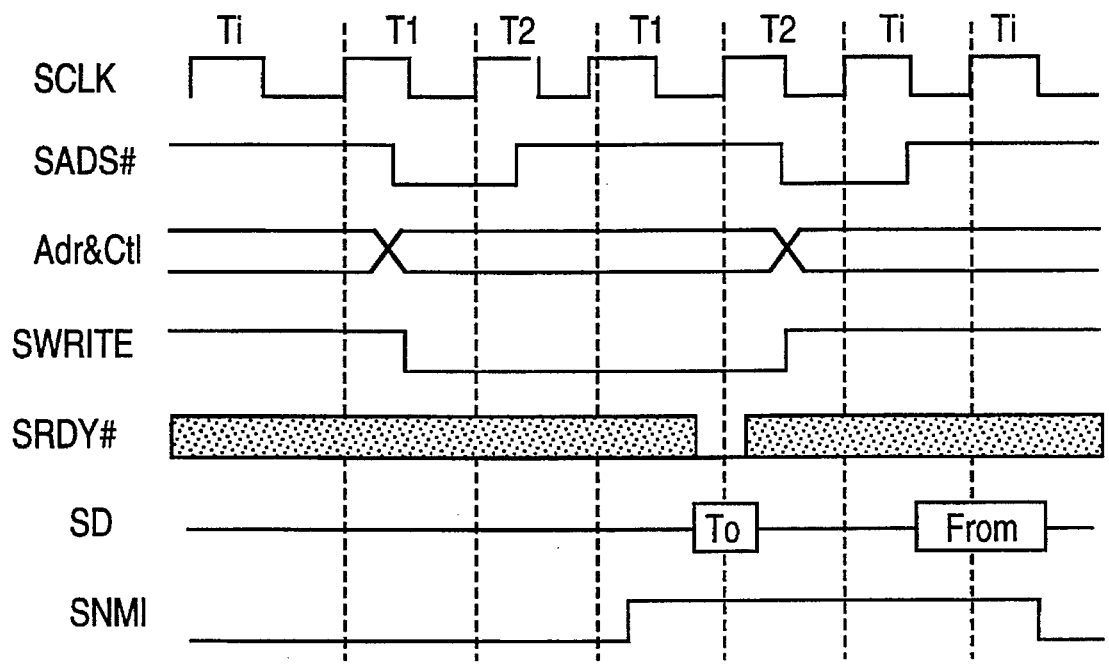
FIG. 20 is a timing diagram of bus cycles.

FIG. 20 shows bus cycles with NMI.

The Micro Channel bus has the following sources of NMIs:

1) CD_ChCK (channel memory) 2) Channel timeout (DMA timeout) 3) Watch dog timeout (INT 0) 4) ACI memory parity error Sources 2 and 3 cannot be masked off. Sources 1 and 4 can be masked off. All CPUs will see the NMI and will take action. The Micro Channel arbitration will be stopped until the CPU has the time to reset certain bits inside port 90H.

Figure 21:
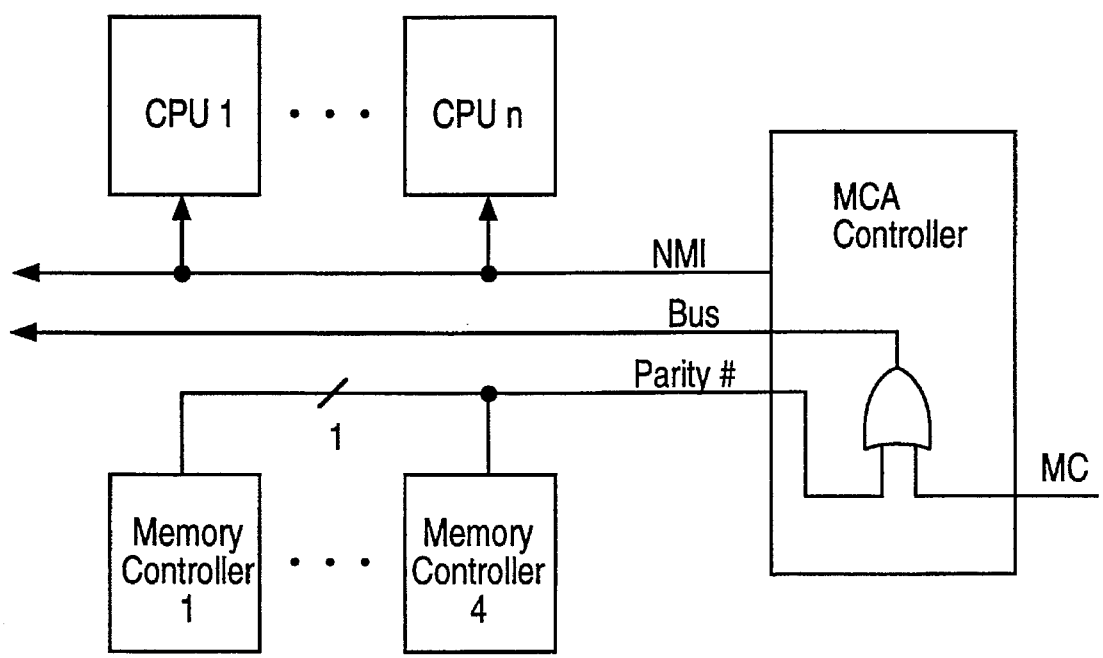
FIG. 21 is SNMI connections.

FIG. 21 shows SNMI connections.

3.7.5.3. LOCK CYCLES

Locked operations are generated by software for certain operations that are required to be completed in total before other bus master can be given the bus. For the duration that the locked signal is low, which could be many cycles, no other master will be granted the bus.

Figure 22:
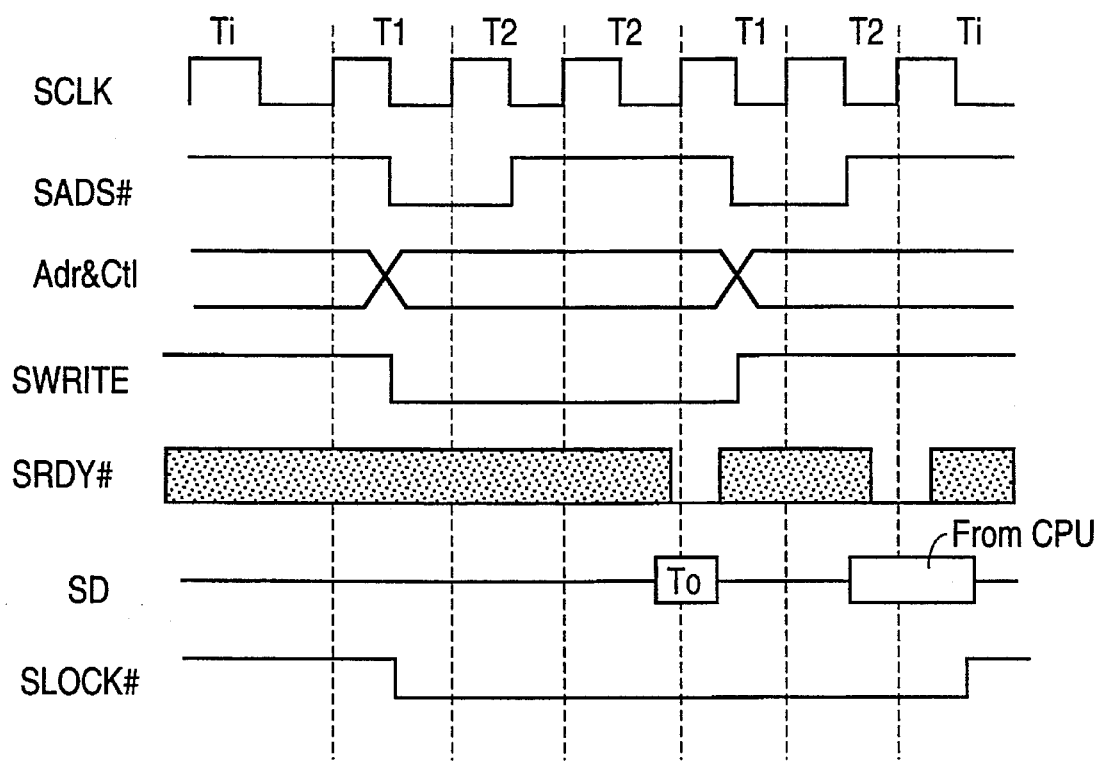
FIG. 22 is a locked bus cycle.

FIG. 22 shows the locked bus cycle.

The cache controller will also support an address based lock, by setting the locked line to the modified cache state. When in the modified state other bus address transactions can continue, and the cache controller will issue a backoff to any device accessing the locked address, as it snoops, as long as the lock cycle is in progress. This allows other bus masters to continue using the ACI bus and maintain the atomic requirements of a locked operation.

3.7.6. Initialization/Serial Transactions

The system has included SCAN IN and SCAN OUT lines on every controller to assist in initializing the system. If the scan mode is set to normal (00) the scan control will indicate that a initialization cycle is taking place. Scan initialization works as follows:

Controllers are connected in order left to right with SCAN IN of one (on the left) connected to another SCAN OUT (on the right). After power on all SCAN OUT lines are set to +0 V except the first which is set to +5 V. This first controller has a defined ID address after power up. If multiples of this type of controller can be in this system the ID will be set by software command to a different ID, which will be unique in this system. After receiving the new ID the controller can be commanded to make its SCAN OUT +5 V which will allow the next controller to be initialized.

3.7.7. CSR Operations
3.7.7.1. Programming

All control and status registers are addressed through four I/O locations. Locations 22h, 23h and 26h are write only ports, used to address the CSR and chip. Ports 22h and 23h selects the chip and port 26h is the index into the individual CSR in the chip. This allows for 65,536 different chip types, and up to 256 CSRs with each chip. I/O port 27h is the data which is to be read/written to within the chip. All chips will be assigned a number by S3 to be used upon reset. Every chip will support a method to reprogram the chip number under software control after reset. (See description of Programmer's Interface below). This requires that all chips watch all I/O activity to ports 22h, 23h, 26h and 27h, but only respond when ports 22h and 23h matches their chip number.

3.8. Bus Performance
3.8.1. Transaction Performance

The bus supports discrete and burst transactions. Both these types of transactions also support pipelining.

nonpipelined discrete transaction 3T min.
    pipelined discrete transaction 3T min.
    nonpipelined burst transaction 6T min.
    pipelined burst transaction 5T min.

3.8.2 Bus Bandwidth

| Transaction | 25 Mhz | 33 Mhz |
| --- | --- | --- |
| Discrete | 33 MByte/Sec | 44 MByte/Sec |
| Burst (non-pipelined) | | |
| 64 Byte Line | 89 | 121 |
| 32 Byte Line | 79 | 106 |
| 16 Byte Line | 67 | 88 |
| Burst (pipelines) | | |
| 64 Byte Line | 95 | 124 |
| 32 Byte Line | 89 | 117 |
| 16 Byte Line | 80 | 107 |

3.8.3. 32/64-bit

The ACI can accommodate a mixture of 64 bit masters and slaves and 32 bits masters and slaves. The bus has only the lines used in the communications protocols but it does not have any devices for data swapping or address translation. Each master or slave will have to do its own data swapping or address translation as the case may require.

Two lines on the bus are called SS64# (slave 64) and SM64# (master 64). When a 64 bit master does a cycle it observes the SS64# line at the same time it observes ready. If SS64# is high then the master assumes a 32 bit slave and it does a second cycle with the high four bytes of data swapped onto the low four bytes (that means that 32 bit slaves do not need the line; it is simply pulled high). The 64 bit master has to also swap SBE[7:4] onto SBE[3:0] for the second cycle. If SS64# is low (driven by a 64 bit slave) then the cycle is over (it does not have to be repeated). The 64 bit master also has to assert the SM64# low in order to declare itself to the slaves.

When a 32 bit master does a cycle, SM64# is high (pulled high), and the 64 bit slaves will have to use this line and address lines AD2 and AD3 in order to figure out what data to receive or supply. The 32 bit slaves do not have a problem. The 64 bit slaves will only observe SBE[3:0]#.

32M→32S—DATA[31:0] used; SS64#=1, SM64#=1
    32M→64S—DATA[31:0] used; SBE[3:0]# used; SS64#=0
    64M→64S—DATA[63:0] used; SBE[7:0]# used; SS64#=0, SM64=0
    64M→32S—DATA[31:0] used; SBE[3:0] used, SS64#=1, SM64#=0

Figure 23:
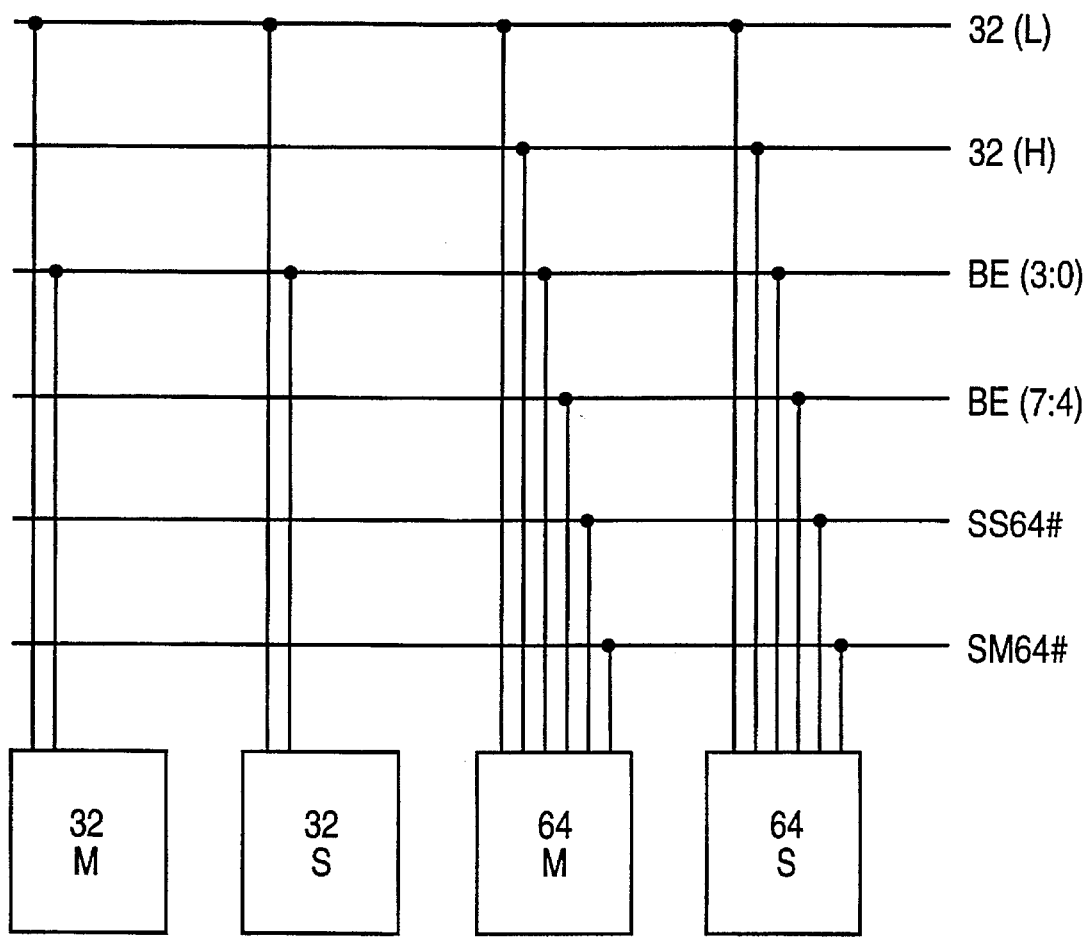
FIG. 23 is bit data paths.

FIG. 23 shows 64/32 bit data paths.

3.8.3.1.32/64 Bit

Mixing 32 bit masters with 64 bit masters is according to the following rules:

1—The memory will always be aligned on 64 bit boundaries. 2—The 64 bit masters will still have to produce A2 (A2=1 for the upper 32 bits in a 64 bit word. A2=0 for the lower 32 bits).

The ACI allows mixing 32/64-bit masters with 32/64 bit slaves in the system. Through the use of SS64#, SM64# and SBE#[7:0] transfers between mismatched devices are supported.

64-bit masters have to provide the swap logic to interface to the 32-bit slaves. This ensures that no cycles are lost when a 64-bit master is interfacing to 32-bit slaves.

The following rules are followed for the transfer:

1. The proper value of SA2 is always asserted on the bus.
2. For 64-bit transfers to 64-bit devices, the transfers will complete in one bus cycle.
3. For 64-bit transfers to 32-bit devices will (a) complete in one bus cycle if the transfer is totally contained in the upper or lower 32-bit dword; (b) complete in two bus cycles if the transfer spans the upper and lower 32-bit dwords.

4. If the transfer is totally contained in the upper 32-bit dword (a) write data will be duplicated on the lower 32-bit dword also; (b) data will be read from the lower 32-bit dword during read cycles. In both the above cases, discontiguous byte enables will result.

The byte enables are asserted according to the following rules.

1. The byte enables always indicate which data bytes are involved in a transfer.

2. The byte enables are always contiguous except as noted in number 3 above.

4. I/O Interface

The architecture supports a number of I/O connects, ranging from the low-cost ISA bus, to the micro-channel as used in the IBM PS/2 machines, or the EISA bus. A high performance channel processor for multiple SCSI-2 and Ethernet or FDDI connect is also available for high bandwidth block IO transfers co-existing with one of the low-cost connects.

4.1. ISA

The IBM PC AT machine established the well known Industrial System Architecture later cloned in most ISA compatible machines.

6. PROGRAMMER'S INTERFACE

6.1. Configuration and Status Register.

There are three types of I/O in the system, compatible, CSR and special I/O. Compatible I/O is the I/O spaces and function defined by MCA, ISA or EISA. CSR I/O is used by the ROMs to test and configure the components of the system. Special I/O are non-compatible I/O locations that are required for normal system operation. After configuration the CSR programming interface should not be depended upon to provide access to non-compatible functions. These functions are accessed through a special I/O operation.

For cases that require a special I/O space, the location of the special I/O space has a programmable I/O address. The programming of this special I/O space is done through the CSRs. For maximum flexibility the special space is able to be programmed to any location range in the 64K I/O map.

6.1.1. CSR Programming

All CSRs are addressed through four byte I/O locations. Locations 22h, 23h and 26h are write only ports, used to address all CSRs and chips. Ports 22h and 23h contain the device id assigned at initialization, and port 26h contains the index into the individual CSRs in the chip. I/O port 27h contains the data to be read/written to the chip. To address a chip's CSRs a processor master performs this series of I/O operations:

1. The processor writes the device_id to I/O addresses 22 and 23. This requires all chips on the ACI to capture the device_id from the data bus and store it internally. The I/O controller responds with SRDY#.

2. The processor writes the index to I/O address 26h. This requires all chips on the ACI to capture the index from the data bus and store it internally. The I/O controller responds with SRDY#. The processor does not have to update the device_id to address different CSRs within a chip. Only the index needs to be written.

3. If processor wants to read from a CSR, then it reads port 27h. The slave which matches the device_id puts the content of CSR_index onto the ACI data lines. The slave then responds with SRDY#. If processor wants to write to a CSR, then it writes port 27h. The processor puts data onto the data bus. The slave which matches the device_id will take the data and store it in the CSR_index. The I/O controller will respond with SRDY# to signal that the operation is finished. Any number of I/O access can be made to a CSR (port 27h) without having to update the device_id or index.

6.1.2. Common and Broadcast Control and Status Registers

The following defines the required CSRs for any chip that has non-special control and status registers. The first 32 locations, indexes 00h to 1Fh, are architecturally defined to have same meaning for all S3 compatible chips. The balance of the 256 locations are free CSRs that can be assigned from chip to chip.

These registers can also be classified as either Control Registers or Status Registers. All registers are readable and writable. Control Registers will keep the content after they are read. Status Registers, however, will be automatically cleared the cycle after they are read.

6.1.2.1. Common CSRs.

The common CSR indexes are a set of functions that are supported by all chips. Every chip supports these registers, but only the chip selected by the device id programmed into ports 22h and 23h will respond or be affected by I/O to port 27h.

6.1.2.1.1. FIDR, Functional_id Registers (Indexes 00h and 01h) (read only)

Each chip is assigned a functional id which is hard programmed into the chip and can not be changed. This functional id is kept in FIDR, a Control Register. This is the default device id to which the chip will respond until it's device id has been programmed.

6.1.2.1.2. DIDR, Device_id Registers (Indexes 02h and 03h)

This Control Register contains the assigned device identification of the chip after the system has been configured. All CSRs accessed via I/O programming to the chip will rely on this device_id for decoding. The programmed device_id does not take affect until both indexed 02h and 03h have been programmed.

6.1.2.1.3. IR, Index Register, (Index 04h, same as port 26h)

This Control Register contains the offset which points to which of the 256 CSRs the processor agent is interrogating.

6.1.2.1.4. DR, Device Registers, (Index 05h and 06h, same as ports 22h and 23h)

This Control Register contains the content of ports 22h and 23h, the device_id that the processor master is interrogating. When the processor accesses port 27h for read or write, the device which compares the DR successfully with DIDR will process the data. In case the index register points to any phantom CSRs, the selected chip, will be required to respond with SRDY# and send garbage data with proper parity to the processor. The processor can test CSR existence by first writing followed by reading the CSR location. If the contents don't match, then the CSR does not exist.

6.1.2.1.5. CREV, Chip Revision Number Register, (Index 07h) (read only)

This register contains the chip revision number. This is to allow tracking and detection of the various revision of the chip. Chips that are functionally different do not use this as a method of differentiation, they are assigned a different Functional ID.

6.1.2.1.6. MR, Chip Mode Register, (Index 08h)

This Control Register controls the mode of the chip. Bits within this register control various functions of the chip.

Bit 0 Scan out control/status. This controls the state of the SCAN_OUT line of the chip.

Bit 1 Scan in status. Read the current status of the SCAN_IN pin of the chip.

Bits 2–7 Reserved

Bits 0 and 1 are used to support configurations of identical chips in a system (chip chaining).

6.1.2.2. Broadcast CSRs

The Broadcast CSRs are a set of CSR indexes that all chips take the data written to port 27h. This allows a single I/O sequence to change a CSR in all chips. For reads from port (27h) only the chip selected by the device id programmed in ports 22h and 23h supplies data.

6.1.2.2.1. Broadcast Mode Register, (Index 10h)

Bit 0 This Control Register indicates if I/O programming via ports 22h, 23h, 26h and 27h is enabled. This feature is added to allow these ports to be ignored for compatibility if there exists an I/O conflict. This bit defaults to 0. Once this bit is set all accesses to ports 23h, 24h, 26h and 27h are ignored. The only way to restore access to ports is to reset the chips.

Bit 1 CSR setup enable. This bit disables all non-broadcast CSR ports to protect the CSR setups from problematic software. When this bit is 0 the CSR registers are disabled and all chips ignore all CSRs indexes except for broadcast CSR indexes, which are indexes 10h–1Fh. This requires that all chips ignore all writes to 22h and 23h, and all read/writes to port 27h will be ignores if the last value written to 26h is not in the range 10h–1Fh. When this bit is 1 all CSRs are available from ports 22h, 23h, 26h and 27h. The difference between this bit and bit 0 is that this bit can switch between modes without resetting the system. The reenabling of normal CSR access is done by writing a 10h to port 26h followed by a write to port 27h with bit 1 set. This bits default to 0 (disabled).

Bits 2–6 Reserved
Bit 7 Reserved

6.1.2.2.2. System Control Register, (Index 11h)

Bit 0 Hot Reset. This bit provides a fast method for resetting the CPU. The transition of changing this bit from 0 to 1 causes a CPU reset. This bit will stay set to 1 until software sets it back to 0 so software can determine the method of reset. Default value is 0.

Bit 1 Alternate A20 Gate. This bit is logically ORed with the keyboard controller A20 gate and in the case of an MCA machine also logically ORed with system control port A. Setting this bit to 1 enables address A20 to operate normally. When this bit, keyboard controller and system control port A's A20 are all 0, A20 is disabled from the processor and set to 0. This bit defaults to 0.

Bits 2–6 Reserved.

Bit 7 System speed control. This bit controls the ISA turbo mode. When this bit is 1 the system emulates the CPU throughput of a 6 to 8 Mhz 286 CPU. When this bit is 0 the system runs at full speed. This bit should be set to 0 for MCA machines. This bit defaults to 0 (turbo mode).

6.1.2.2.3. Bus Speed Register, (Index 12h)

Bits 0–7 This tells all chips the speed of the system bus.
Value Bus Frequency

FF–F1 Reserved

F0 20 Mhz

EF 25 Mhz

EE 33 Mhz

ED 40 Mhz

EC 50 Mhz

EB–01 Reserved

00 Default

The default value for this register is 00 for the highest bus speed.

6.1.2.2.4. Interprocessor Interrupt Registers 0–3, (Index 14h)

This register provides support for interprocessor interrupts under software control.

Bits 0–7 Each bit when set to 1 will signal a software interprocessor interrupt to all processor that have a corresponding mask bit set for this software interrupt. These registers are write only, the read value is undefined.

6.1.3. Functional IDs

6.1.3.1. Device Types

There are three classes of devices (supporting CSRs) supported in the system.

A—Those residing completely on the ACI, providing their own CSR data and byte steering. These devices have IDs in the range 8000h to FFFFh.

B—Those residing on the ACI by depending on the I/O controller (MCA, ISA or EISA) to provide byte steering (e.g. Memory Controller). These devices have IDs in the range 0000h to 3FFFh.

C—Those residing on the I/O bus and providing their own CSR data and buffer enables (e.g. Peripheral Interface Controller). These devices have IDs in the range 4000h to 7FFFh. Writes to 22, 23, 25 and 27 Propagate to the I/O Bus. Reads from 27 Propagate to the I/O only for devices in classes B and C.

6.1.4. Chip Chaining

Chip chaining is required if there are to be multiple chips with the same functional id in the system. Cases of this would be for a system with several memory controllers, or several cache controllers. Since each chip has a fixed functional id all would respond to CSR programming for the common functional id. Chip chaining solves this problem. Chip chaining enables only one chip at a time, using the SCAN_IN and SCAN_OUT pins. All chips with the same functional id chain their SCAN_OUT pin into the next chip's SCAN_IN pin. The first chip in the chain will have its SCAN_IN pin tied high. After reset all SCAN_OUT pins default to low. If a chips SCAN_IN line is low it will stay in reset until its SCAN_IN line is raised high. This allows the first chip to be programmed with a device id (CSR indexes 02h and 03h) that would not conflict with the other chips in the chain. After the device id is programmed the chip can be commanded to raise SCAN_OUT line (CSR index 08h, bit 0) allowing the next chip in the chain to be programmed with using its functional id.

6.1.5. Chip Unique CSRs and Special Registers.

These are the CSR and special registers for each chip. See descriptions of the individual chips for their unique CSR's and special I/O registers.

6.2.1. Initialization Implications

6.2.1.1. Power On Defaults

All chips will power up in a state that would run a standard BIOS. This requires chips that support multiple system types (MCA, ISA) to have configuration pins to determine the system type. The power on default configuration will not be the best for performance, i.e memory controller will assume slowest memory chips.

6.2.1.1.1. Common Defaults

The memory controller will not decode or respond to address in the range A,0000–F,FFFF. Caching will also be disabled for this region.

The cache controller will be disabled.

6.2.1.1.2. MCA Unique Defaults

The default value for the system board POS register 103h and 104h are FEh and E7h. This specifies a 486 with one megabyte of memory on the system board and no external cache. These ports are contained in the PIC.

6.2.1.2. Configuration information storage

6.2.1.2.1. MCA

For MCA machines the configuration information is stored in extended CMOS RAM. There is a requirement for an additional 2K CMOS RAM above the normal MCA 2K RAM to store configuration information. Access to this second 2K RAM is through the normal extended CMOS addresses (74h–76h). This extra CMOS RAM is enabled through a CSR bit in the PIC. When the CSR bit is 0 only the normal 2K CMOS RAM is visible and will wrap the addressing at the 2K boundary. When the CSR bit is 1 the configuration CMOS is addressed through ports 74h–76h. The CSR bit controls a pin on the RTC used by the extended CMOS address decoder to control accesses. The simplest method is to 'and' this pin with address line A12.

6.2.1.2.2. ISA and EISA

For ISA machines the configuration information is stored in an extended CMOS RAM. This RAM is similar to the MCA CMOS RAM, using the same addressing technique, ports 74h–76h. Access to the extended CMOS RAM is controlled through a CSR bit, which can enable/disable the CMOS RAM. This is to provide protection for the CMOS RAM area and ISA compatibility for normal port 70h–71h aliasing. As an lower cost alternative to the CMOS RAM almost any other non-volatile memory device can be used. One example is a serial non-volatile memory device requiring a clock and single bit data. The clock is generated by using the port 74h decode, and data read and write can be one bit of the data port 76h.

6.2.2. I/O Issues

Devices that reside on the ACI, but are using the I/O controller for byte steering (using the X or Y bus), are not accessible from I/O channel masters.

6.2.3. ROM 6.2.4. Single CPU System 6.2.5. Multiple CPU System 6.2.5.1. Interprocessor Software Interrupts The broadcast CSR indexes 14h–17h provide support for 4 separate software controlled interrupts for up to 8 processors. Two or more of these CSRs can be chained together by programming the processor agents (cache controllers) to only take one of the software interrupts. Under this situation the first 8 processors agents get software interrupts if their bit was set in CSR index 14h, and the second 8 processors agents interrupted for CSR index 15h.

6.3. Complete Memory and I/O Maps 6.3.1. I/O Address Space

The I/O address space is as defined originally by the IBM PC AT and PS/2.

86C102 MEMORY CONTROLLER

1. OVERVIEW

The memory controller function is implemented with two chips: 86C102, the memory controller, which receives and decodes the addresses and commands from the Local System Bus, and provides all the necessary signals to control the memory arrays, and 86C103, an optional memory data path buffer, which steers the data to/from the memory array, plus performing all the necessary parity check/generate or error detection/correction, and interface to the Local System Bus.

Figure 24:
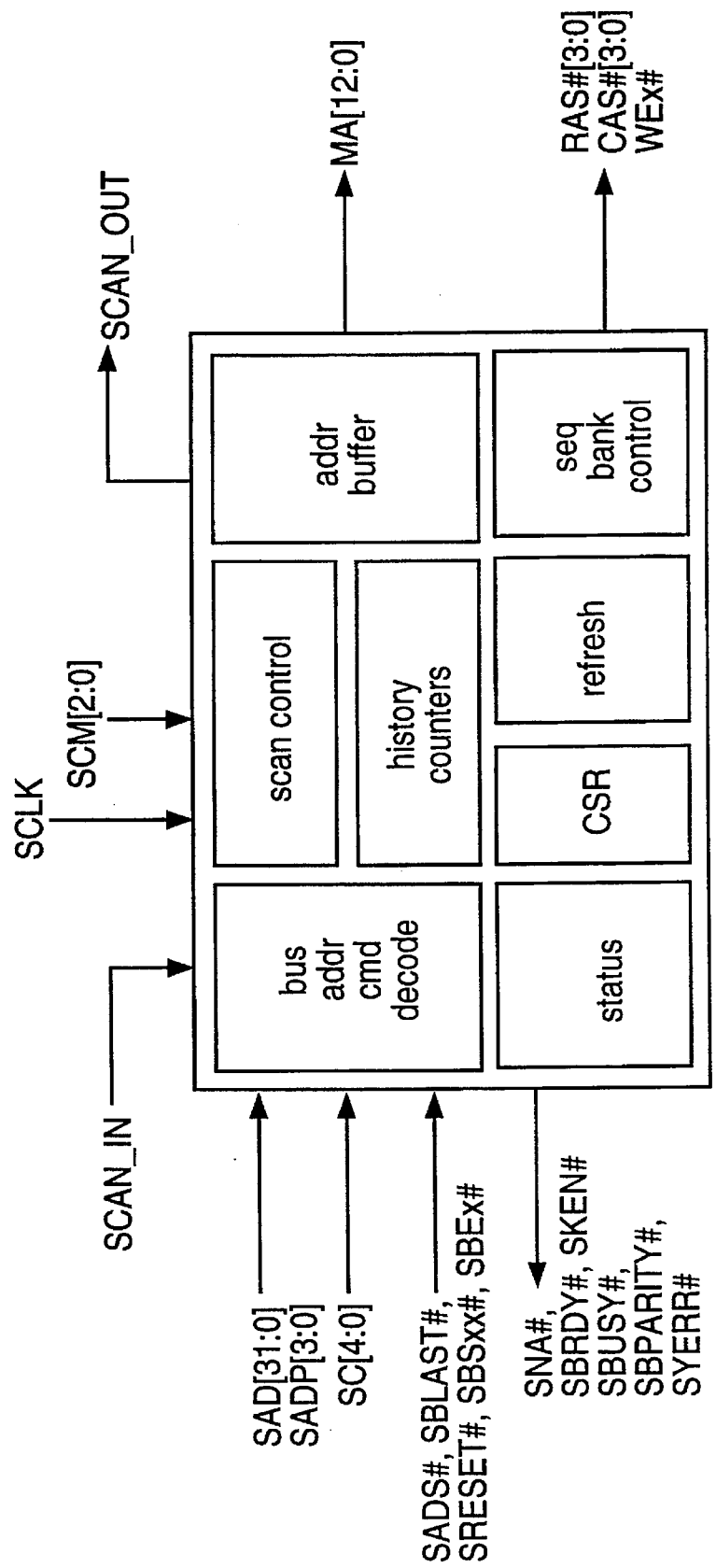
FIGS. 24–25 are memory controller block diagrams.

The description here pertains to the operation of the 86C102, the memory control function. This part can be used to interface with minimal numbers of discrete logic for entry-level implementations or with the optional 86C103, the memory buffer, which provides the multi-bank interleaving and buffering of memory data together with ECC. FIG. 24 shows the Memory Controller.

1.2 Pin Signal Description

The 86C102 Memory Controller requires signals that fall into five functional areas: These are:

clock and scanning
local bus interface
memory array interface
memory buffer interface
AC ground

2. GENERAL ARCHITECTURE 2.1 OVERVIEW

The memory controller services the memory read/write transactions on the Local System Bus. It decodes memory addresses and provides control signals for memory read/write, row and column address select, as well as the proper sequencing for single or multi-bank interleaving or non-interleaving operations. The parity version of the memory controller also handles parity checking for both data between the Local System Bus and the memory controller, and between the memory controller and DRAM. It can drive one bank of DRAM directly without address buffers.

The architecture is unique in that the memory controller decodes memory space only for system wide global space. It is designed to interface directly with the Intel 80486, the local system bus, and any other masters and slaves that support the local bus protocols. It supports other Intel microprocessors, such as the 80386, only via the Cache Controller device. The memory controller supports a modular architecture and can be used compatibly to handle memory control functions for ISA, EISA, and MCA architectures with minimal external logic.

2.2 MEMORY CONTROLLER FUNCTIONS

The memory controller uses memory in several modes:
1) sequential mode
   a) 1 bank only
   b) 4 banks
2) interleaving mode,
   a) 2 way interleaving
   b) 4 way interleaving
3) mixed sequential and interleaving mode
4) 64-bit mode.

2.2.1 Sequential Banks

Memory banks that are arranged in 32-bit wide data and 4-bit parity can be addressed together as a bank. The memory controller can control up to four banks of memory operating in fast page mode (static column can operate in fast-page mode) sequentially. These memory banks are in contiguous memory space with the exception of the areas that are programmed to be mapped out.

2.2.2 Interleaving

The four banks of memory can also be arranged in an interleaving mode. Consecutive accesses are directed to banks 1, 2, 3, then 4, and repeat in that fashion. Interleaving allows slower memory to be accessed in a staggered fashion to overlap and hide the RAS access time from the processor. After paying the initial RAS access penalty, following accesses can be done at clock speed.

2.2.3 Mixed Sequential Banks and Interleaving

Memory banks can be arranged as pairs of interleaving banks. Every two banks are interleafed, and every two banks accesses as sequential memory. Consecutive accesses go to bank1, bank2, and repeating until the addresses sequentially span across to new set of two banks.

2.2.4 64-bit mode

The DRAMs can be arranged in 64-bits wide plus parity/syndrome bits. 64 bits are accessed at one time but multiplexed into 32-bits inside the Memory Buffer to provide similar performance as interleaving memory arranged as 32-bits.

2.2.5 Page Mode mechanism

Fast page mode is used for memories denser than 1 Mbit. Since static column memory also supports fast page mode, the memory controller is designed to take advantage of fast page mode operation. When memory addresses stay within the same page, the memory chips only are required to be RAS at less frequent intervals, thus allowing accesses to locations within the same page in time required to satify the CAS precharged and CAS select time. Using 100 nsec memory, locations within the same page thus can be accessed in approximately 50 nsec. Coupled with interleaving scheme, memory access that matches the bus access time can be achieved.

2.2.6 LIM 4 Support

Twelve optional window registers are supported to handle Expanded Memory Mapping in the C-, D-, and E-segments if the system base memory is specified as 640K. Eight more optional window registers are supported to handle Extended Expanded Memory in the 8- and 9-segments if the system base memory is specified as 512K. Sixteen more optional window registers are supported in the 4-, 5-, 6-, and 7-segments if the system base memory is specified as 256K.

2.3 BASIC OPERATION

The Memory Controller is a passive slave. It supports only some of the bus transactions. The bus cycles described described here include all passive slave transactions as well as CSR related operations that other functions such as DMA or graphics subsystem will also have to support.

2.3.1 IO Read Cycles

IO read cycles refer to processor controlled 32-bit or partial transfers that are addressed to IO space as supposed memory space. These cycles are not burst cycles, and are indicated by the proper command encoding 02H or 0AH. These data cycles cannot be locked, and are used to read IO ports, hidden registers, or CSRs in each chip. Only processor agents can issue these commands, namely 486/386 or cache master on behalf of processor.

2.3.2 IO Write Cycles

IO write cycles have similar behavior and constraints as the IO read cycles. These data cycles are used to program IO ports, hidden registers, or CSRs in each chip. These are encoded as 03H or 0BH.

2.3.3 CPU Memory Write Cycles

Memory write cycles are bus memory updates. These data cycles are issued only by processor agents and can be single data cycles or line transactions (meaning burst cycles.) The data on the bus are always posted at the slave to minimize bus tenure. These cycles support the full combination of locking option. Partial cycles are also supported. These cycles can be write-through cycles (write invalid, 13h or 1Bh) or copy-back cycles (1Fh).

2.3.3.1 Burst line

The memory controller supports line bursts of 16/32/64 bytes. The memory buffer contains a write fifo up to 64 deep to guarantee consecutive quadlet transfer every clock cycle.

2.3.3.2 Quadlet

These are full 32-bit transfers.

2.3.3.3 Partial

Partial transfers are supported if any of the bus byte enables are not active during the data phase. Partial transfer also suggest non-burst transfers.

2.3.4 CPU Memory Read Cycles

Memory read cycles are bus read cycles. These can be either data or code (04H or 0CH), and are issued only by processor agents. These can be single or burst cycles. Since the memory access speed is involved, these cycles are usually slow and take up many bus cycles. For cache based systems, these are only initiated after a read miss. These can be memory read (06H or 0EH), read modified (14H or 1CH), read shared (16H or 1EH). Locking is supported for all combinations.

2.3.4.1 Quadlet

These are full 32-bit transfers.

2.3.4.2 Line

Line sizes of 16/32/64 bytes are supported. The penalty is only paid once if the line address is not within the page register address for the bank involved. The memory controller also supports line wrap-around. This is indicated by a received address that is not line aligned when the command encoding corresponds to any of the line bursting cycles. The bus address phase supports two possible schemes, and is controlled by control bits in the CSR whether a direct-486 mode or a cache-agent mode is requested. In the direct-486 mode, the address phase overlaps with the data phase, and addresses can be in total random order during the 4 cycles within the address phase. In the cache-based mode, only the address passed in the first cycle of the address phase is used to determine if line-wrap-around is requested, and the rest of the line is accessed consecutively until the line wrap around. The number of data cycles is equal exactly to the line size divided by the number of byte lanes.

2.3.4.3 Partial

Partial transfers are allowed as indicated by the byte enables. These transactions are the most inefficient in the system, and are used to implement semaphores. The cycles can be locked.

2.3.5 DMA to Memory Transfers

These transfers are indicated by the command write invalid (can also be used by write-through masters), 13H or 1BH). This operation support full combination of locking and partial transfers. These operations require all bus masters to snoop and invalidate any hit addresses.

2.3.5.1 Quadlet

These are 32-bit transfers, and are indicated by having all byte enables asserted. They can be locked to form block moves that need to be atomic operations or for synchronization support.

2.3.5.2 Byte

These are indicated by the corresponding byte enables. It is the responsibility of the DMA device to ensure the proper Endian alignment be done before the transfer.

2.3.5.3 Word

These are similar to the byte handling.

2.3.5.4 Block

Block moves can be handled as a combination of byte, word, quadlet, line moves, followed by quadlet, word, or byte, depending on how the block address is aligned. These moves can be locked or can span multiple transactions.

2.3.6 Memory to DMA Transfers

These are indicated by DMA masters issuing read invalid operations (12H or 1AH). All bus masters will have to snoop to determine if there is need to intervene. Memory is required to update.

2.3.6.1 Quadlet

These are 32-bit transfers and can be locked.

2.3.6.2 Byte

Byte operations are indicated by the assertion of the corresponding byte enables.

2.3.6.3 Word

Similar to byte contraints.

2.3.6.4 Block

Block moves can be done via multiple byte, word, quadlet, line read invalid operations.

2.3.7 Cache Line Eviction

Line eviction is done as copyback operations. Since the operation is controlled by processor agents, such as caches, and it is only necessary to make room for a new line, it is up to the cache policy as when eviction takes effect.

2.3.8 Cache Line Fetch

Again, line fetches are required when the cache encounters a miss. It is totally up to the cache when this takes effect. These operations can be locked to ensure atomicity. No special transactions are designed to handle eviction and fetch as one short transaction. The advantages gained are not overwhelming, yet introducing significant complexity that are not scalable.

2.3.8.1 Misses

Read misses are handled by line fetches if eviction is not required. This translates to a line read operation which has been discussed. Write misses, however, can be handled many ways. The memory controller, in general, does not pay attention to the cache policy. It only needs to reflect intervened data and capture it.

2.3.8.2 Cold Start

When a new process starts, code has to be brought in fast to the cache. The cache can perform back-to-back burst line read cycles by pre-fetching the address for the next line. When the address stays within the same page, memory can be read into the bus 32-bits every clock cycle.

2.3.9 Interventions

Intervention refers to third party transactions when a snooping cache confirms a hit and provides the requested data. The memory controller in this case does not have the most up-to-date information, and thus should not provide the data read from the memory array. In addition, it has to update memory with the new data.

2.4 CONTROLLER ORGANIZATION

2.4.1 Block Diagram

The 86C102 Memory Controller contains the following blocks:
  the Clock Generator,
  the Control Status Registers,
  the Bus Slave Interface,
  the Non-cacheable Region,
  the LIM4 EMS Address Translation,
  the 386K Relocation Mapper,
  the Bad Block Re-mapper,
  the Address-In-Range Detector,
  the Address Generation,
  the Page History Registers,
  the Pipeline Control,
  the Memory Sequencer,
  the RAS Generator,
  the CAS Generator,
  the Interleaving Control,
  the Hidden Refresh Generator, and
  the Error Handler.

Figure 25:
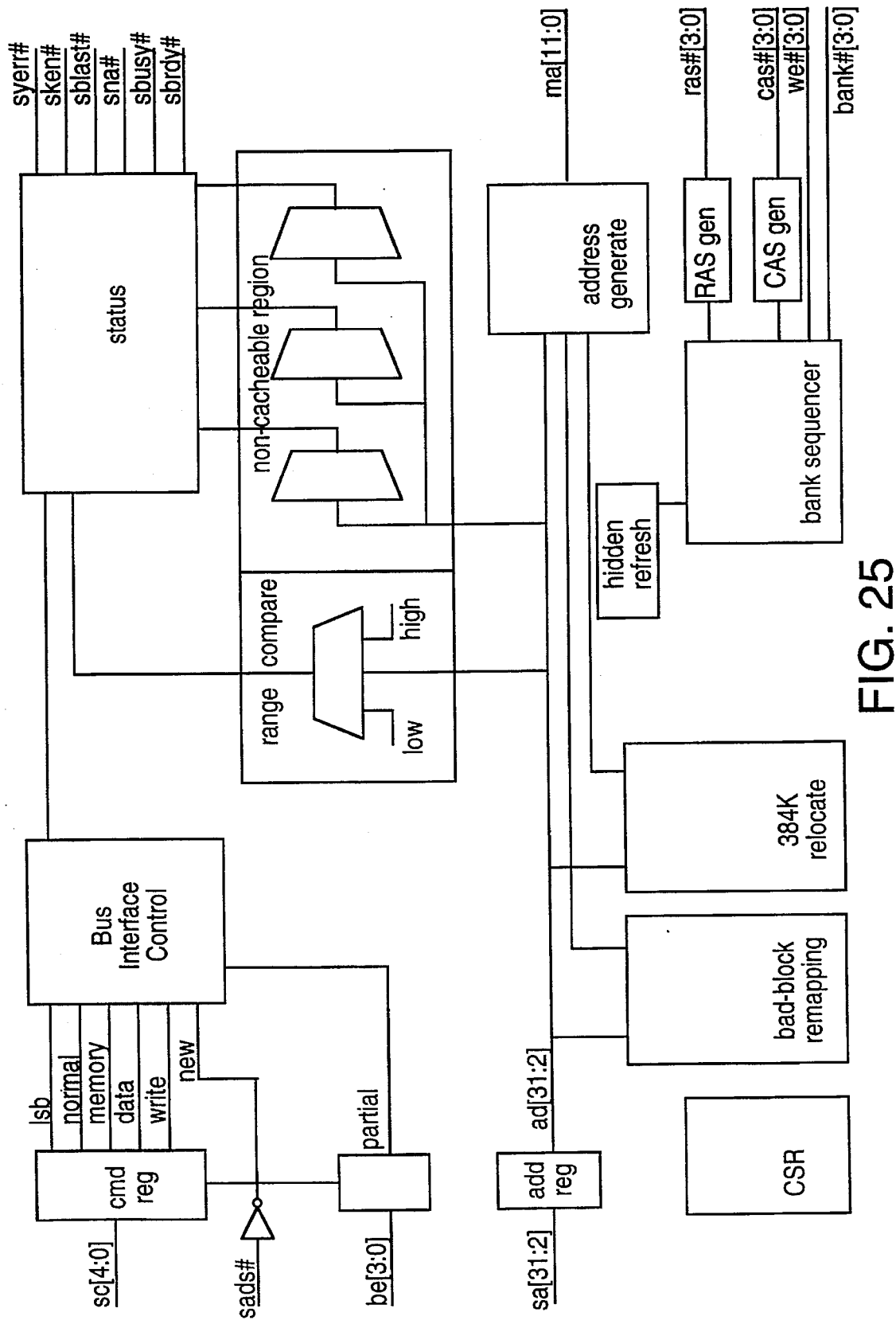

FIG. 25 shows the memory controller in a detailed block diagram.

2.4.1.1 Clock Generation

A phase-locked clock generator is used in the memory controller to provide either divide-by-two or same frequency clock to the internal circuit. This phase-locked clock generator allows thes internal clocks to be in phase to the in-coming clock, the eliminating the variable clock generator delay in most VLSI. This has significant performance impact, especially eliminating the dead-time; otherwise system designers have to allow to meet extra set-up and hold time requirements for signals between chips. The clock generator used here conforms to the same implementation used in the other chips of the set, thus totally eliminating this dead margin. Clock skew across chips depends now mainly on how well the incoming clocks are controlled across chips.

2.4.1.1.1.1 Taps and Delay Lines

Delay lines are integrated inside the memory controller for the accurate control of critical RAS, CAS, and pre-charged time based on user programmable parameters that are entered for the support of different memory types. This allows optimal performance based on uniform memory types used within the same memory array.

The memory controller also supports non-uniform memory usage. However, optimal performance cannot be guaranteed across processor types and bus speed. This feature is valuable only if the divide-by-two clock generation scheme is used, and is particularly useful for 386-based systems.

2.4.1.1.1.2 Phase Control

The internal delay line also offers finer tap to allow phase transitions as granular as 10% of the clock to be available for phase control of critical signals that are used to satisfy memory CAS pre-charged time.

2.4.1.1.1.3 Output Pad Gating

The same phase controlled clocks can be used to gate ouput pads. This offers an alternative to logic gating of signals in the core. The advantage is these control signals control the pad switching directly, especially any operation of open-drain types of outputs for the interface with the local system bus.

2.5 HARDWARE INTERFACE

2.5.1 Cold Boot and Initialization

The memory controller is assigned a functional id 20H 50h and the memory buffer a functional id of 21h. At power up or cold boot, the IO controller, either ISA, EISA or Microchannel controller, will indicate which is to be the master processor that wakes up first (the first processor agent to its right). The scan mode will be set to normal (00). The first time this is done, all chips in the system will drive their SCAN_OUT line to logic 0. The IO controller, through the processor master control, will program the chips one at a time, starting with the one to the right of the IO controller (which is the first processor agent). By the time the device to the left of the memory controller enables the SCAN-OUT signal, the memory controller will be the next to be set up. The system will issue the broadcast IO address (00H) and the memory controller will respond with its functional id (20H 20h) which indicate to the master that the first memory controller has been addressed. A new device id (dynamically allocated during this configuration process) is then assigned to the memory controller. The system will keep a map of device id to functional id. The memory controller will respond to this new device id assigned hence.

2.6 SOFTWARE INTERFACE

2.6.1 Memory Configuration

The following memory configurations are supported by the memory controller:
  memory type speed min peak performance arrangement
  256K×1 static column 60, 70 ns non-interleaving or interleaving
  256K×1 static column 80, 100 ns interleaving
  256K×4 static column 60, 70 ns non-interleaving or interleaving
  256K×4 static column 80, 100 ns interleaving
  256K×4 fast page 60, 70 ns non-interleaving or interleaving
  256K×4 fast page 80, 100 ns interleaving
  1M×1 static column 60, 70 ns non-interleaving or interleaving
  1M×1 static column 80,100 ns interleaving
  1M×1 fast page 60, 70 ns non-interleaving or interleaving
  1M×1 fast page 80,100 ns interleaving
  1M×4 static column 60, 70 ns non-interleaving or interleaving
  1M×4 static column 80,100 ns interleaving 1M×4 fast page 60, 70 ns non-interleaving or interleaving
1M×4 fast page 80,100 ns interleaving
4M×1 static column 60, 70 ns non-interleaving or interleaving
4M×1 static column 80,100 ns interleaving
4M×1 fast page 60, 70 ns non-interleaving or interleaving
4M×1 fast page 80,100 ns interleaving 2.6.2 CSR Programming The memory controller contains Control and Status Registers, CSR, that are accessible via IO read or write operations or via memory mapped operations.. All Control Registers are byte wide, readable and writable, and the individual bits may be D type or JK type depending on the design needs. The Status Registers are also byte wide, but only readable, and may contain individual bits which are D type or JK type. Since the 86C102 Memory Controller has only a byte lane connect to the local bus, data can only be read byte-wise.

All Control Registers should be programmed during initialization. However, they can also be dynamically changed by OS.

CSRs can be addressed two ways: via memory mapped locations as byte reads or byte writes, and via IO addressing to maintain compatibility.

2.6.2.1 IO CSR programming

All CSRs are addressed through four I/O locations.

Locations 22h, 23h, and 26h are write only ports, used to address all CSRs and chips. Port 22h and 23h will contain the device id assigned at initialization, and port 26h will contain the index into the individual CSRs in the chip. I/O port 27h will contain the data to be read/written to the chip.

To address any of the CSRs in the memory controller, the processor master needs to perform a series of IO operations:

1. write device_id into port 22h and 23h—processor writes device_id to IO address 22h and 25h 23h; this requires all chips on the ACI bus to capture the device_id from XD[7:0] and store it in IDR, (slave which match the device_id reponds with SRDY#.)

2. write index into port 26h—processor writes index to IO address 26h; this requires all chips on the S3 bus to capture the index from XD[7:0] and store it in the IR, (slave with matching device_id responds with SRDY#.)

3. if processor wants to read from CSR, then read port 27h—slave which matches the device_id puts the content of CSR_index onto the S3 data XD[7:0]. Slave also responds with SRDY#.

If the processor wants to write to CSR, then write port 27h—processor puts data onto XD[7:0]; the slave which matches the device_id in port 22h and 23h will respond with SRDY# when the operation is finished.

296.3 Definition of Control and Status Registers

The following defines the CSRs required. More may be assigned with this 256 locations or these locations may be moved. The first 16 locations, index 00H to 0FH, are arhitecturally defined to have same meaning for all compatible chips of the chip set. The balance of the 256 locations are free CSRs that can be assigned from chip to chip.

These registers can also be classified as either Control Registers or Status Registers. All registers are readable and writable. Control Registers will keep the content after they are read. Status Registers, however, will be automatically cleared the cycle after they are read. All Control and Status Registers are strung together and can be scanned. Contents of Status Registers can be obtained via serial scan without being cleared.

2.6.3.1 System Common CSRs

These CSRs define chip specific identification information.

2.6.3.1.1 FIDR_L, Functional_id Register (low byte) (index 00h)

2.6.3.1.2 FIDR_H, Functional_id Register (high byte) (index 01h)

The memory controller is assigned a functional id equal to 0050h. This number is hard programmed into the memory controller and cannot be changed. This functional id is kept in FIDRH and FIDRL, two Control Registers.

2.6.3.1.3 PDIDR_L, Programmable_Device_id Register (low byte) (index 02h)

2.6.3.1.4 PDIDR_H, Programmable_Device_id Register (high byte) (index 03h)

These two Control Registers together contain the assigned device identification of the memory controller after the system has been configured. All CSRs accessed via IO programming to the chip will rely on this programmable device_id for decoding.

2.6.3.1.5 IR, Index Register, (index 04h, port 26h)

This Control Register contains the offset which points to which of the 256 CSRs the processor agent is interrogating.

2.6.3.1.6 DR, Device Register (low byte), (index 05h, port 22h)

2.6.3.1.7 DR, Device Register (low byte), (index 06h, port 23h)

These two Control Registers contain the content of port 22h and 25h, the device_id that the processor master is interrogating. When the processor accesses port 27h for read or write, the device which compares the DR successfully with DIDR will respond with SRDY# and process the data. In case the index register points to any phantom CSRs, the selected chip, the memory controller in this case, will be required to respond with SRDY# and send garbage data with proper parity to the processor. The processor can test CSR existence by first writing followed by reading the CSR location. If the contents don't match, then the CSR does not exist.

2.6.3.1.8 CREV, Chip Revision Number Register (index 07h)

This Control Register contains the chip revision number. This is to allow tracking and detection of the various revisions of the chip.

2.6.3.1.9 MR, Chip Mode Register, (index 08h)

This Control Register controls the fuctional mode of the chip.

Bit 7:2 Reserved

Bit 1 Scan in status contains the current status of the SCAN_IN pin of the chip.

Bit 0 Scan out control status. This controls the SCAN_OUT signal of the chip.

2.6.3.2 Broadcast CSRs

The broadcast CSRs are CSRs within the index range of 10h and 1Fh that take the data written into port 27h independent of device id. This allows a single I/O sequence to change a CSR in all chips.

2.6.3.2.1 BMR, Broadcast Mode Register (index 10h)

This Control Register indicates the machine organization the Memory Controller is supporting.

bit 7:2 reserved bit 1 CSR disable (default 0) 1=CSR setup enable; all non-broadcast CSRs can be accessed via indexing and port 22h–23h, 26h–27h. 0=CSR disable; only broadcast CSRs can respond co indexing bit 0 indicates if IO programming via port 22h, 23h, 26h, and 27h is enabled (default 0). This feature is added to allow these ports to be ignored for compatibility if there exists IO conflicts.

2.6.3.2.2 SCR, System Control Register (index 11h)

This Control Register encodes system wide parameters.

bit 7 TURBO#, Non-turbo Mode, (default 0); 1=turbo mode; 0=non-turbo (286 AT simulation) mode
bit 6:2 reserved
bit 1 FGA20, (default 0) alternate gate A20 implementation, does not affect Memory Controller bit 0 Hot Reset (default 0)

2.6.3.2.3 BSR, Bus Speed Register (index 12h)

This-Control Register encodes the ACI bus speed. This information is used to support non-turbo mode, proper memory refresh, and proper generation of timing dependent signals, such as RAS and CAS for memory arrays.

bit 7:0 SPEED, Bus speed (default 0000) FFh=8 MHz bus speed; FEh=16 MHz bus speed; others reserved. F0h=20 MHz bus speed; EFh=25 MHz bus speed; EEh=33 MHz bus speed; EDh=40 MHz bus speed; ECh=50 MHz bus speed; 00h (logical default; system to run slower non-turbo mode when powered up in the wrong configuration mode;) others reserved 2.6.3.2.4 OMR, Operating Mode Register, (index 13h) the Interprocessor Interrupt Register to index 14h.

This Control Register indicates which the machine organization the Memory Controller is supporting.

bit 7:6 indicates the machine organization: 00=MCA compatible; 10=ISA compatible; 11=EISA compatible bit 5 16M_ROM_ENABLE this is specified in index 11h; 1 is E and F segment below 16M is ROM; 0 is RAM (default)

bit 5:4 Memory Interface 00=Memory Buffer used; 1=Discrete Interface; others reserved bit 3:2 Line Size 2.6.3.3 Unique CSRs These are CSRs unique to the operations of the Memory Controller.

2.6.3.3.1 MPCR, Memory Parameters Control Register, (index 20h)

One Control Register is provided for the specification of the memory used.

bit 2 ECC, error check and correction when set, ECC is enabled bit 1 MPC, memory parity control when set, parity check is performed when memory is read and parity is passed to memory for writes, when clear, parity is ignored when memory is read, and parity is passed to memory for writes bit 0 BPC, bus parity control when set to 1, parity is checked when data is received from the bus, and parity is passed to the bus if there is no parity error, or parity is generated for ECC memory, when clear bus parity is ignored.

2.6.3.3.2 MRCR, Memory 384K Relocation Control Register, (index 21h)

| | | |
|---|---|---|
| bit 7 | Split Upper Limit | |
| 1 | 1M | |
| | 000FFFFFH for ISA/EISA machines, and | |
| 0 | 896K | |
| | 000DFFFFH for MCA machines | |
| | This applies only to ISA/EISA machines. | |
| | MCA programming is done via port E0h and E1h | |
| bit 6 | REMAP, relocation enable | |
| | has meaning only in ISA/EISA machines | |
| | MCA machine programming is done via port E0h and E1h | |
| 1 | when set, unused memory is re-mapped to memory space above top of memory space unused memory is defined as memory between base address limit and Split Upper Limit | |
| 0 | unused memory not mapped (wasted or shadowed) | |
| bit 5:4 | Base Memory | |
| | has meaning in ISA/EISA machine, | |
| | MCA uses Split Address from port E0h | |
| 00 | 640 Kbyte base memory is used | |
| 01 | 512 Kbyte base memory is used | |
| 11 | 256 Kbyte base memory is used | |
| 10 | reserved | |
| bit 3:0 | BIOS ROM enable pattern | |

2.6.3.3.4 TMAR, Top_Memory_Address_Register, (index 23h)

The maximum memory in the system is detected at power up by the BIOS. This number is programmed into this register to assist relocation. Since the system only supports up to 4 Memory Controllers, each managing at most 64 MByte, the maximum memory controlled have to be less than 256 MByte.

Bit 7:0 represent the number of MBytes in the system.

2.6.3.3.5 MBCR, Memory Bank Control Registers, (index 33:30h, 2F:2Ch, 2B:28h, 27:24h)

There are four Memory Bank Control Registers, each

| | | |
|---|---|---|
| bit 31:20 | start address range (assumes non-interleaving) | |
| bit 19:8 | reserved | |
| bit 7 | bank enable | |
| bit 6:4 | bank memory type | |
| | 000 256K × 1 | static column |
| | 001 1M × 1 | fast page mode/static column |
| | 010 4M × 1 | fast page mode/static column |
| | 011 reserved | |
| | 100 reserved | |
| | 101 256K × 4 | fast page mode |
| | 110 1M × 4 | fast page mode |
| | 111 reserved | |
| bit 3:2 | DRAM speed | |
| | 1100 60 nsec | |
| | 1001 70 nsec | |
| | 0110 80 nsec | |
| | 0011 100 nsec | |

2.6.3.3.6 Non-Cacheable Regions

Up to four Control Registers can be specified to block out four memory spaces that should not be cached within the address space of each memory controller (as defined by the Top_of_Bank_Address). Three of these four blocks can start at any 16K Byte boundary and the regions can be 1 to 256 16 Kbyte blocks.

Three Control Registers are required to represent each non-cacheable region.

| | |
|---|---|
| bit 31:14 | the starting address (only 28:14 are used, because 4 memory controllers can handle only up to 256MByte of memory) |
| bit 13:10 | reserved |
| bit 9 | non decoded memory region |
| 0 | decoded (default) |
| 1 | not decoded (memory can be external or mapped IO) |
| bit 8 | valid non-cacheable regions |
| 0 | cacheable |
| 1 | non-cacheable |
| bit 7:0 | up to 256 16KB blocks |

2.6.3.3.6.1 NCR_1, Non_Cacheable_Region_1, (index 37:34h)

Four consecutive bytes are used 2.6.3.3.6.2 NCR_2, Non_Cacheable_Region_2, (index 3B:38h)
Same as NCR_1.
2.6.3.3.6.3 NCR_3, Non_Cacheable_Region_3, (index 3F:3Ch)
Same as NCR_1.
2.6.3.3.6.4 NCR_4, Non_Cacheable_Region_4, (index 43:40h)
Four consecutive bytes are used to represent
bit 31:12 the starting address (only 28:12 are used)
bit 11:10 reserved
bit 9 non decoded memory region 0  decoded (default) 1
not decoded  (memory can be external or mapped IO)
bit 8  valid non-cacheable region
bit 7:0  up to 256 4KB blocks 2.6.3.3.7 BSR, Bad Segments Control Register, (index 47:44h)

The Control Register has similar contents as the Non_Cacheable_Region Control Register.

| | |
|---|---|
| bit 31:15 | the starting address |
| bit 14:10 | reserved |
| bit 9 | valid replacement remap |
| 1 | replacement memory is local |
| 0 | replacement memory is in space controlled by another Memory Controller |
| bit 8 | valid bad segments |
| 1 | bad block to be mapped out |
| 0 | bad block not in memory space of this Memory Controller |
| bit 7:0 up to | 256 4KB blocks |

2.6.3.3.8 NTR, Non-Turbo Register, (index 49:48h)

Two Control Registers encodes the wait states required to emulate the performance of an 8 MHz AT machine performance.

2.6.3.3.9 EASR, Error Address Status Register, (index 4F:4Ch49h)

Any time when memory read/write problems occur with the data, either parity error in the case of parity memory, or two-bit detect errors or 1-bit correct situation will cause SYERR# and SBPARITY# to be asserted in the bus. Four consecutive Status Registers are used to remember the pre-mapped address of the memory location that caused the error.

2.6.3.4 Compatible CSR's

Three compatible CSR's are supported and are decoded when OMR[7:6] matches a MCA machine. These three CSR's are assigned port E0h, E1h, and E2h. These CSR's are there mainly to guarantee compatibility, and can be addressed via their port addresses. In general, these encodings may show redundant meaning to some other CSR's involved. However, the Memory Controller remembers the same information in both Compatibility CSR's and unique CSR's and guarantees consistency. It is optional as how the system designers read these information.

2.6.3.4.1 MER2, Memory Encoding Register 2, (index 560h, port E0h)

This Control Register encodes, together with MER1, the amount of system board memory. Some of the encoding is peculiar to the way memory is expanded in the MCA machine, and only having meaning in the MCA model 70 machine organization. They are however updated automatically to represent corresponding encodings in the unique CSR's even in the ISA or EISA mode.

bit 7:4 IBM reserved, defaults 1110 bit 3:0 Split address, SPA[23:20], defines the starting address of the split memory block. When split memory is enabled, these bits determine the starting location of the new relocation address at any 1 MB boundary from 1 MB to 15 MB.

2.6.3.4.2 MER1, Memory Encoding Register 1, (index 561h, port E1h)

This Control Register encodes how the first 1 MB of memory is addressed, and is used together with MER2 to encode the amount of system memory enabled in the IBM model 70 MCA compatible organization.

| | | |
|---|---|---|
| bit 7:4 | IBM reserved, defaults 1110 | |
| bit 3 | ENSPLIT, split, default 0 | |
| | 0 | split enabled, relocations mapped by Split Address Register |
| | 1 | split disabled |
| bit 2 | SIZ640, base memory, default 0 | |
| | 0 | split at 640 K, (type 3 & 4 machines only support split at 640K) |
| | 1 | split at 512 K |
| bit 1 | ROMEN, BIOS shadow, defaults 1 | |
| | 0 | E & F segment in DRAM read from DRAM, write to channel |
| | 1 | E & F segment in ROM read from ROM, write to RAM |
| bit 0 | ENPRPCH, parity enable, defaults 1 | |
| | 0 | memory parity enable |
| | 1 | memory parity disabled, (for compatibility with other systems, enabling and disabling of parity checking should be done through system control port B at port 61h) |

2.6.3.4.3 MER3, Memory Encoding Register 3 (index 562h, port E2h)

This Control Register encodes information for the Type 3 system board and also provides control of the cache memory. This port only has meaning to model 70 compatible MCA machines.

| | | |
|---|---|---|
| bit 7 | IBM reserved | |
| bit 6 | PREEMPT#, preempt for Type 3 system memory board No meaning to Memory Controller | |
| | 1 | disable |
| | 0 | enable when cache misses |
| bit 5 | FLUSH#, cache disabled and flushed Need to gate KEN# | |
| | 1 | cache enabled |
| | 0 | diabled and flushed Note: KEN# has to be de-activated until bit5 is set, FLUSH# is asserted for 1 cycle only. |
| bit 3 | IBM reserved | |
| bit 2 | 2nd 8MB cachable | |
| | 1 | not cached |
| | 0 | cached |
| bit 1 | IBM reserved | |
| bit 0 | KEN#, cache enabled Need to gate KEN# | |

-continued

| | |
|---|---|
| 1 | cache disabled and flushed |
| 0 | cache enabled |

2.6.3.4.4 SCPB, System Control Port B (index 53h, port 61h)

This Control Register mimics the port 61h contents for compatibility. It is a passive port in the Memory Controller. The same port (master) appears in PIC, the Peripheral Interface Controller.

| | |
|---|---|
| bit 7 | Parity check |
| 1 | writing 1 resets IRQ0 (affects PIC only) |
| | writing 0 has no effect |
| | reading 1 means parity has occurred |
| | indicates that parity has been checked |
| 0 | not checked yet |
| | Writing |
| bit 6:3 | reserved and ignored |
| bit 2 | parity enable (powers up set) |
| 1 | disable and clear parity |
| | set during power-on reset |
| 0 | enables parity check |
| | 1-0 transition re-arms parity check |
| | in MCA machines, registered parity error is |
| | reported immediately in AT machines, registered |
| | parity error is forgotten |
| bit 1:0 | reserved and ignored |

This port over-rides the functions of the same information in MER1, MER2, and MER3.

2.6.3.6 LIM 4 Window Registers (index 80h:FFh)

Each LIM4 window register is assigned two consecutive byte-wide Control Registers. These registers are used internally as 16-bit registers and are described as used for convenience. The low byte contains the less significant portion of the Window Register and the high byte contains the more significant portion. These registers are not serially chained, but can be addressed using similar indexing scheme as the CSR's. Of the 64 potential index, each addressing 16 KByte, up to a maximum of 42 can be used to support mapping the EEMS space of 32 MByte Expanded Memory.

Each Window Register is encoded as:

| | |
|---|---|
| bit 15 | reserved |
| bit 14 | External/Internal EMS/EEMS |
| 1 | External (supported by external Expanded Memory) |
| 0 | Internal (supported in Memory Controller space) |
| bit 13 | KEN#, cache enabled |
| 1 | cached |
| 0 | not cached |
| bit 12 | VALID, valid Window Register |
| 01 | contains valid Expanded Memory Address |
| 10 | window register not used |
| bit 11 | WP, Write Protected |
| 0 | writable |
| 1 | write protected |
| bit 10:0 | Expanded Memory Address A[24:14] |

These indices are supported:

| index | window address | number | segment |
|---|---|---|---|
| F8:FFh | not supported | 0 | F |
| F0:F7h | 000E0000:000EFFFFh | 4 | E |
| E8:EFh | 000D0000:000DFFFFh | 4 | D |
| E0:E7h | 000C0000:000CFFFFh | 4 | C |
| DC:DFh | 000B8000:000BFFFFh | 2 | B |
| D8:DBh | 000B0000:000B7FFFh | 0 | B |
| D0:D7h | 000A0000:000AFFFFh | 4 | A |
| C8:CFh | 00090000:0009FFFFh | 4 | 9 |
| C0:C7h | 00080000:0008FFFFh | 4 | 8 |
| B8:BFh | 00070000:0007FFFFh | 4 | 7 |
| B0:B7h | 00060000:0006FFFFh | 4 | 6 |
| A8:AFh | 00050000:0005FFFFh | 4 | 5 |
| A0:A7h | 00040000:0004FFFFh | 4 | 4 |
| 98:9Fh | not supported | 0 | 3 |
| 90:97h | not supported | 0 | 2 |
| 88:8Fh | not supported | 0 | 1 |
| 80:87h | not supported | 0 | 0 |

The memory controller to DRAM interface is conventional.

86C103, MEMORY DATAPATH BUFFER 1.1 OVERVIEW

The Memory Datapath Buffer (also referred to as the Memory Buffer) is an optional chip that assists the memory control functions. Besides providing the proper data and timing interface to the Local System Bus, it also performs all necessary parity check/generate or error detection and correction function (ECC). It is useful for 486 bursting type of memory interface. It replaces many discrete ICs in applications such as bank interleafing and/or multi-processing applications.

Figure 26:
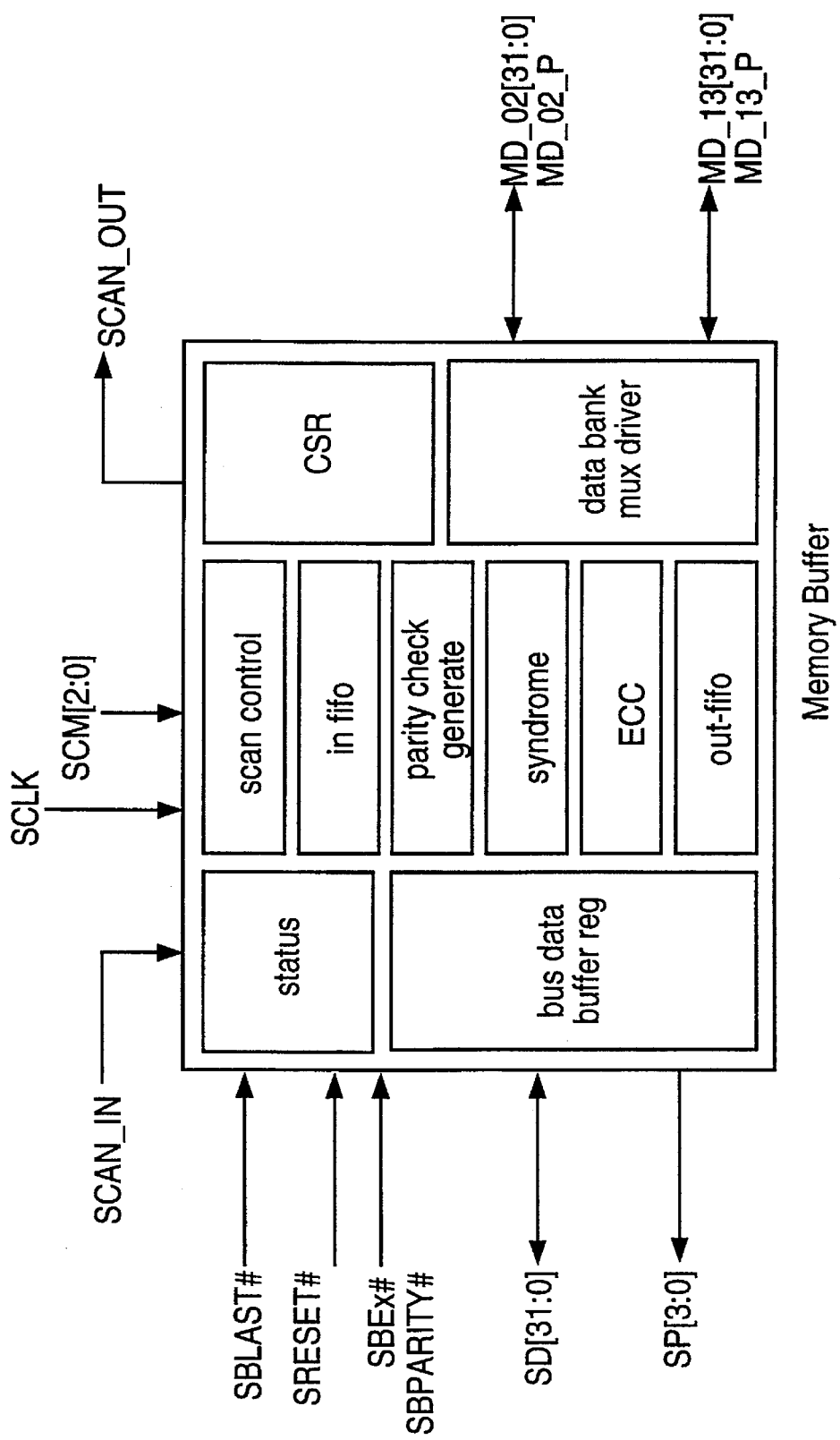
FIGS. 26–28 are memory data path block diagrams.

FIG. 26 shows the Memory Datapath Buffer.

The Memory Buffer requires signals that fall into five functional areas: These are:
 clock
 local bus interface
 memory control interface
 memory array interface
 AC ground A total pin count of 160 is required.

1.3.1 Clock and Scanning, [5]

Five signals are required to support both normal clocking function and scanning.

1.3.1.1 SCLK, system clock,(I, 5 pf)

SCLK is a controlled-distance controlled impedance system clock input which provides the fundamental timing reference for the operation of the Memory Control function and the proper synchronization of both control, address, and data between the Memory Array and the processor agents in the system.

1.3.1.2 SCM[1:0], scan mode,(I, 5 pf)

Two active high signals encode the mode of operation the Memory Controller is supposed to be in. These are:

| SCAN_MODE[1] | SCAN_MODE[0] | meaning |
|---|---|---|
| 0 | 0 | normal |
| 0 | 1 | hold |
| 1 | 0 | scan right |
| 1 | 1 | boundary scan |

1.3.1.3 SCAN_IN, scan in data, (I, 5pf)

SCAN_IN is a serial input line to each of the chip from the SCAN_OUT signal of the previous chip. The first SCAN_IN should come from a window register that supports real-time scanning or should be connected to AC ground in the system if real-time scanning is not supported. This signal can be used for chip/board diagnostics as well as chip screening on testers.

1.3.1.4 SCAN_OUT, scan out data, (O, 10 pf, 15 pf)

SCAN_OUT is a serial output line to connect to the next chip,s SCAN_IN. The last SCAN_OUT should be connected to the system window register or left open if real-time scanning is not used.

1.3.2 Local Bus Interface, (41)

These signals interface with the Local System Bus. Extra logic is required for this part to interface with the 486 directly. The extra logic is required mainly to provide other arbitration and control signals for the 486 which are otherwise provided by the 86C201 Cache Controller.

1.3.2.1 SBE[3:0]#, byte enables (I, 15 pf)

These are low-asserted byte-enables which inform the Memory Controller if a partial transaction is requested. These signals are also used in the Memory Buffer to control individual byte lane operations, and have similar timing as the system addresses and should be qualified by SADS#.

1.3.2.2 SBPARITY#, bus parity, (O,,20 pf)

The Memory Controller asserts SBPARITY# if it detects parity error on SD[31:0]during any of the data cycles. The SA[31:0] and the SD[31:0] that caused the parity problem should be recorded in the CSR of the parties that caused the error in this case, both the active master and the Memory Controller.

1.3.2.3 SD[31:0], bus data, (IO, 7 pf, 150 pf)

These 32 active high hi-directional bus data lines carry the data signals during the data phase. Data may be driven in either direction: it is driven by the current master during a write transaction, and by the selected memory buffer during read transactions. These signals are driven between phase boundaries

1.3.2.4 SP[3:0], bus parity, (IO, 7 pf, 150 pf)

Four even bus parity bits are used, each indicating the even parity for each byte lane for the 64-bit data signals. These signals observe the same timing as the bus address and data signals.

1.3.3 Memory Control Interface (12)

These signals are yet to be defined. They should be superset of the similar signals required to handle the direct connect 486 case.

1.3.4 Memory Array Interface, (92)

1.3.4.1 MD_AC[31:0], memory bank 02 data, (IO, 7 pf, 30 pf)

These memory data signals drives up to two banks of memory data input and output.

1.3.4.2 MP_IN_AC[6:0], parity in (O,,7 pf)

These are even parity inputs or input syndrome bits to the memory array for bank 0 or bank 2.

1.3.4.3 MP_OUT_02[6:0], parity out (O,,7 pf)

These are even parity outputs or output syndrome bits to the memory array for bank 0 or bank 2.

1.3.4.4 MD_BD[31:0], memory bank 13 data, (IO, 7 pf, 30 pf)

These memory data signals drives up to two banks of memory data input and output.

1.3.4.5 MP_IN_BD[6:0], parity in (O,,7 pf)

These are even parity inputs or input syndrome bits to the memory array for bank 1 or bank 3.

1.3.4.6 MP_OUT_13[6:0], parity out (O,,7 pf)

These are even parity outputs or output syndrome bits to the memory array for bank 1 or bank 3.

1.3.5 AC Ground, (34)

1.3.5.1.1 Vcc, clock, (1)
1.3.5.1.2 Vcc, bus control, (2)
1.3.5.1.3 Vcc, bus data, (4)
1.3.5.1.4 Vcc, memory data, (2)
1.3.5.1.5 Gnd, clock, (2)
1.3.5.1.6 Gnd, bus control, (2)
1.3.5.1.7 Gnd, bus data, (9)
1.3.5.1.8 Gnd, memory data, (2)

Figure 27B:
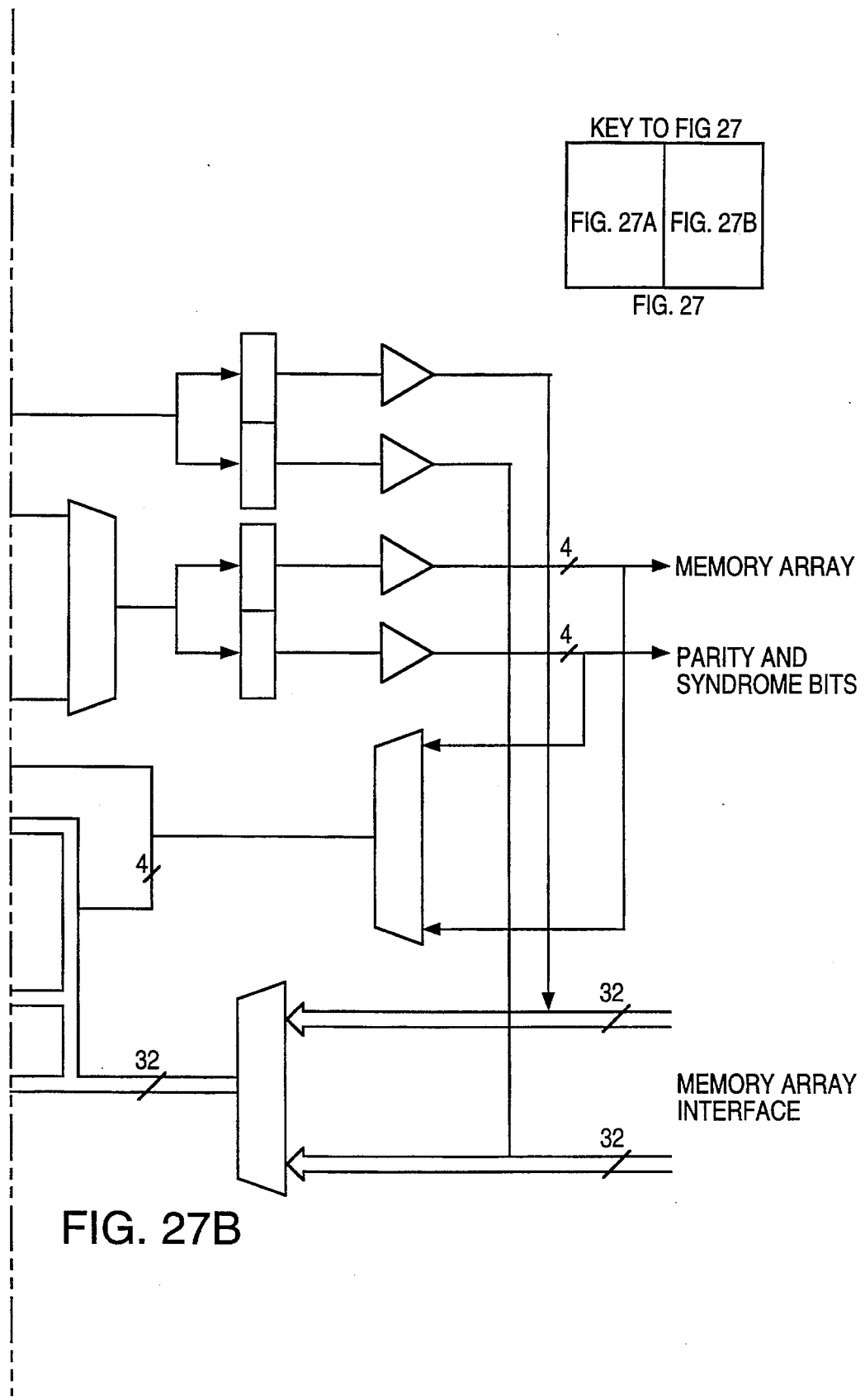
Figure 27A:
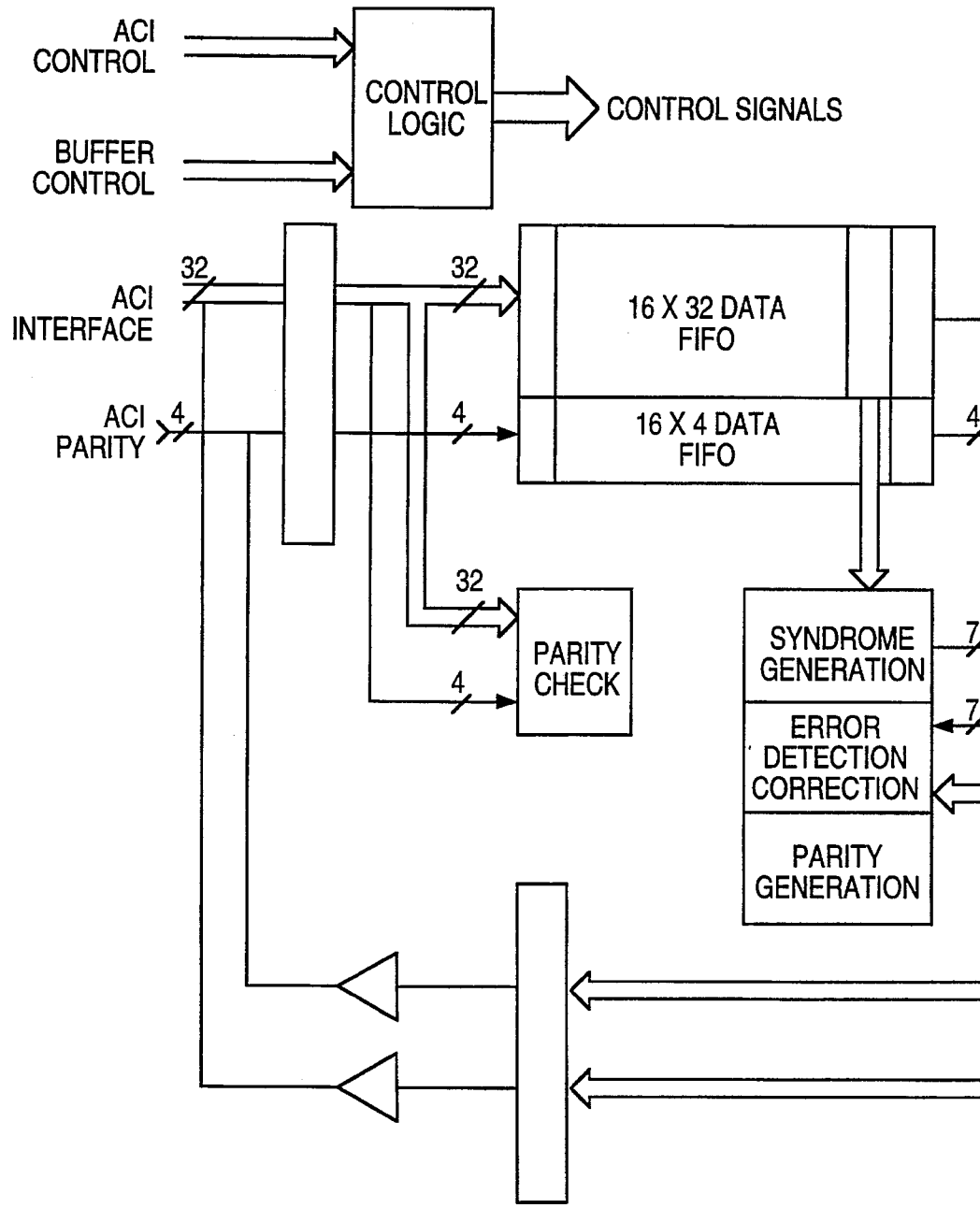

FIG. 27 shows a more detailed block diagram of the memory buffer.

1.4 Software Interface

1.4.1 CSR programming

1.4.2 Most of the Control and Status Registers are contained in the Memory Controller. The only ones required here are the ones necessary for error handling and duplicate information on the handling of the interleaving and multiplexing of data.

1.4.2.1 Error Data Status Register

The data quadlet that is involved in the error is kept in the Error Data Status Register to assist diagnosis.

1.4.3 TESTING

All CSRs in the Memory Controller can be read via both IO programming or as memory mapped locations. All register bits are shiftable and can be scanned if the proper software support is incorporated.

1.4.3.1 BOUNDARY SCAN

The Memory Controller supports full boundary scan as prescribed by the JTAG requirement. When the SCAN_MODE is in boundary scan mode (11), all input pads, output pads, are strung together, with proper latches or flip-flops added for both sampled pads or strobe pads such that the same SCLK can be used to shift signals from SCAN)IN to SCAN_OUT.

1.4.3.3 REAL-TIME SCANNING

Real-Time Scanning is supported in conjunction with the IO Controller or via proper interleaving of normal clocking and right shifting. A window register is required in the IO Controller, via which the master processor read from/write to via IO programming. The proper number of right shifts is used to move the window register content to the correct target CSR position before a normal load occurs. Similarly, patterns can be shifted out to the Window Register and captured. Real time shifting can be done only if the CSR register contents around the loop chain can be recovered after the operation.

Figure 28:
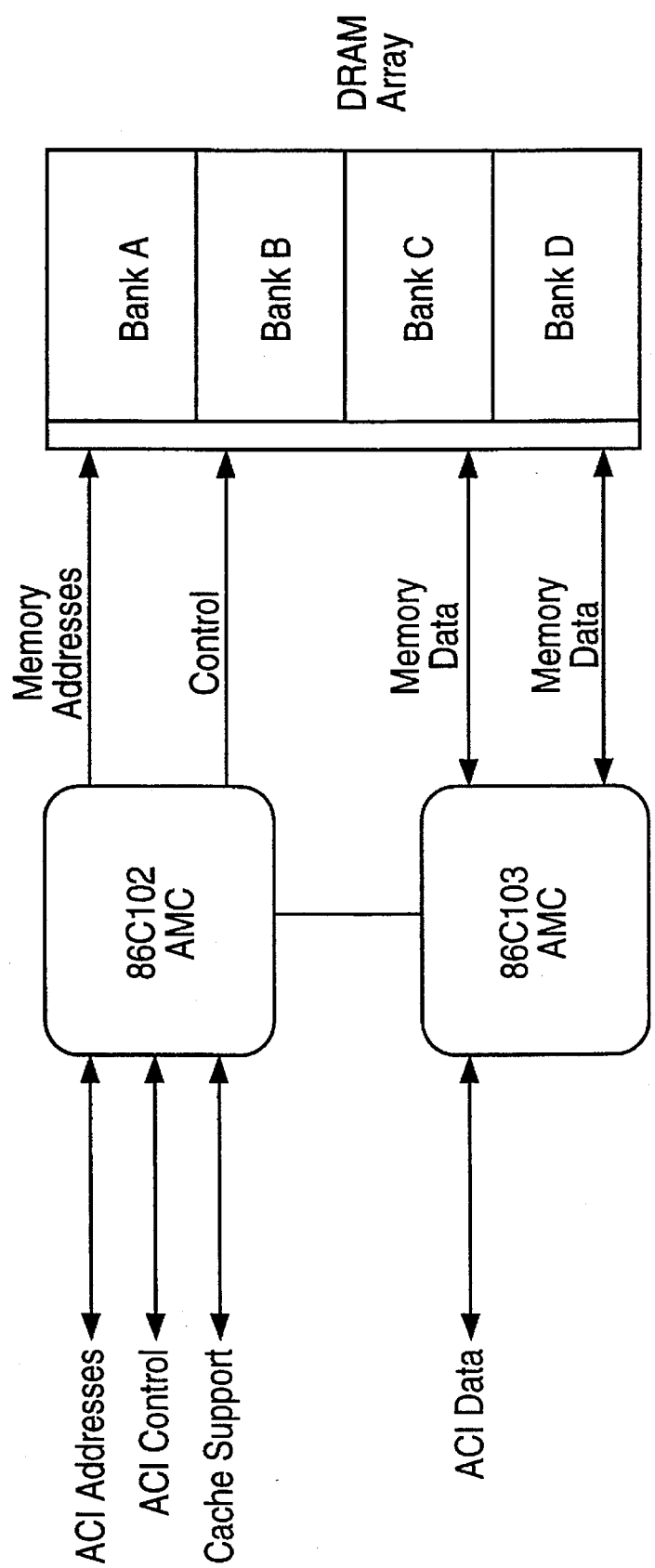

FIG. 28 shows the Memory Data Path (MDP) used in conjunction with the Memory Controller (AMC) and banks of DRAM.

86C301 1401 CACHE CONTROLLER

The 86C301/401 cache controller's main purpose is to allow fast access between the CPU and frequently accessed memory locations. The cache is located between the CPU and the local bus. This allows for reduced traffic on the local bus. Reduced traffic becomes more important in a multiprocessing or an intensive DMA system. It supports a secondary cache with a 80486 CPU. The 80486 has an internal primary cache. The cache controller "snoops" the local bus to maintain cache consistency at both the primary and secondary level. It will snoop bus cycles that are generated by non-cache masters as well as by cache masters.

Figure 29:
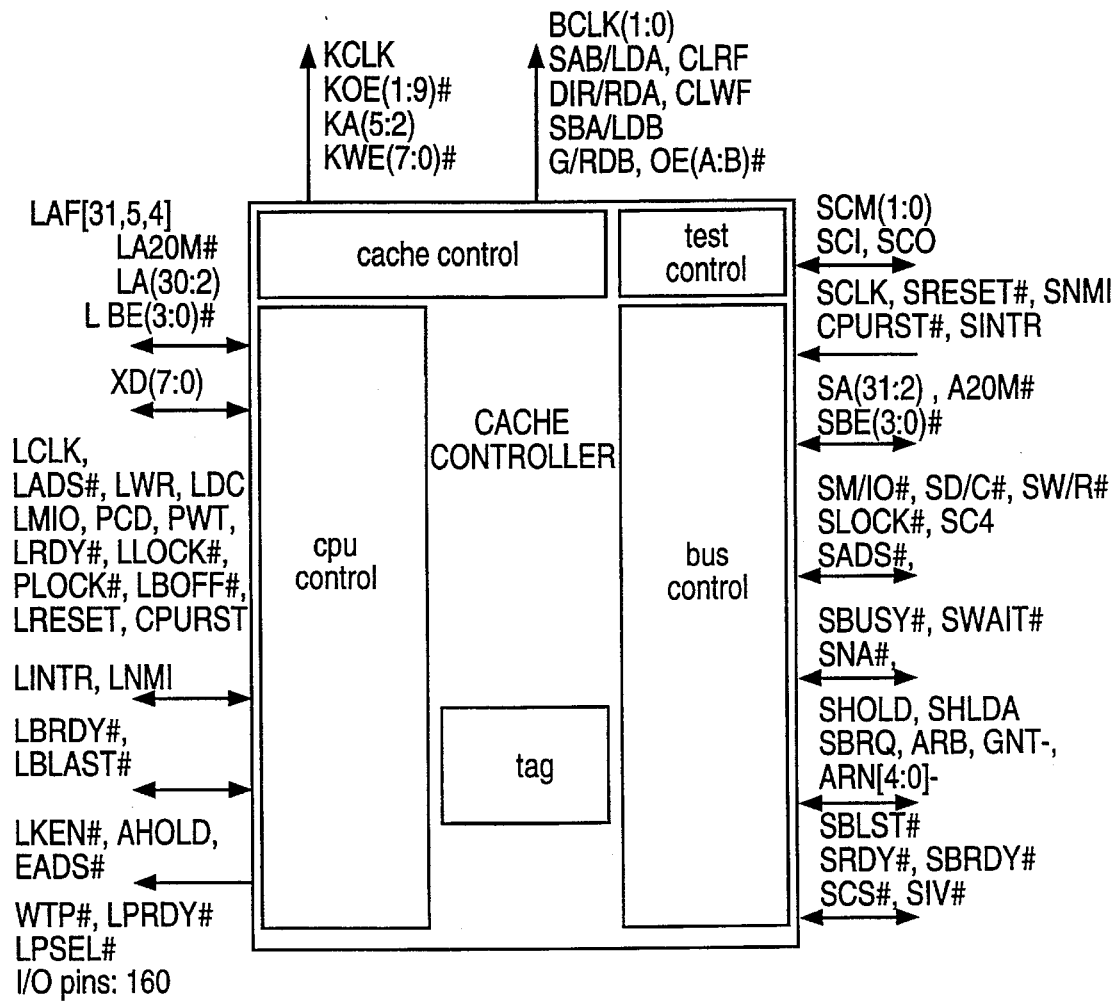
FIGS. 29–34 are cache controller block diagrams.

FIG. 29 is a block diagram of the cache controller.

Figure 30:
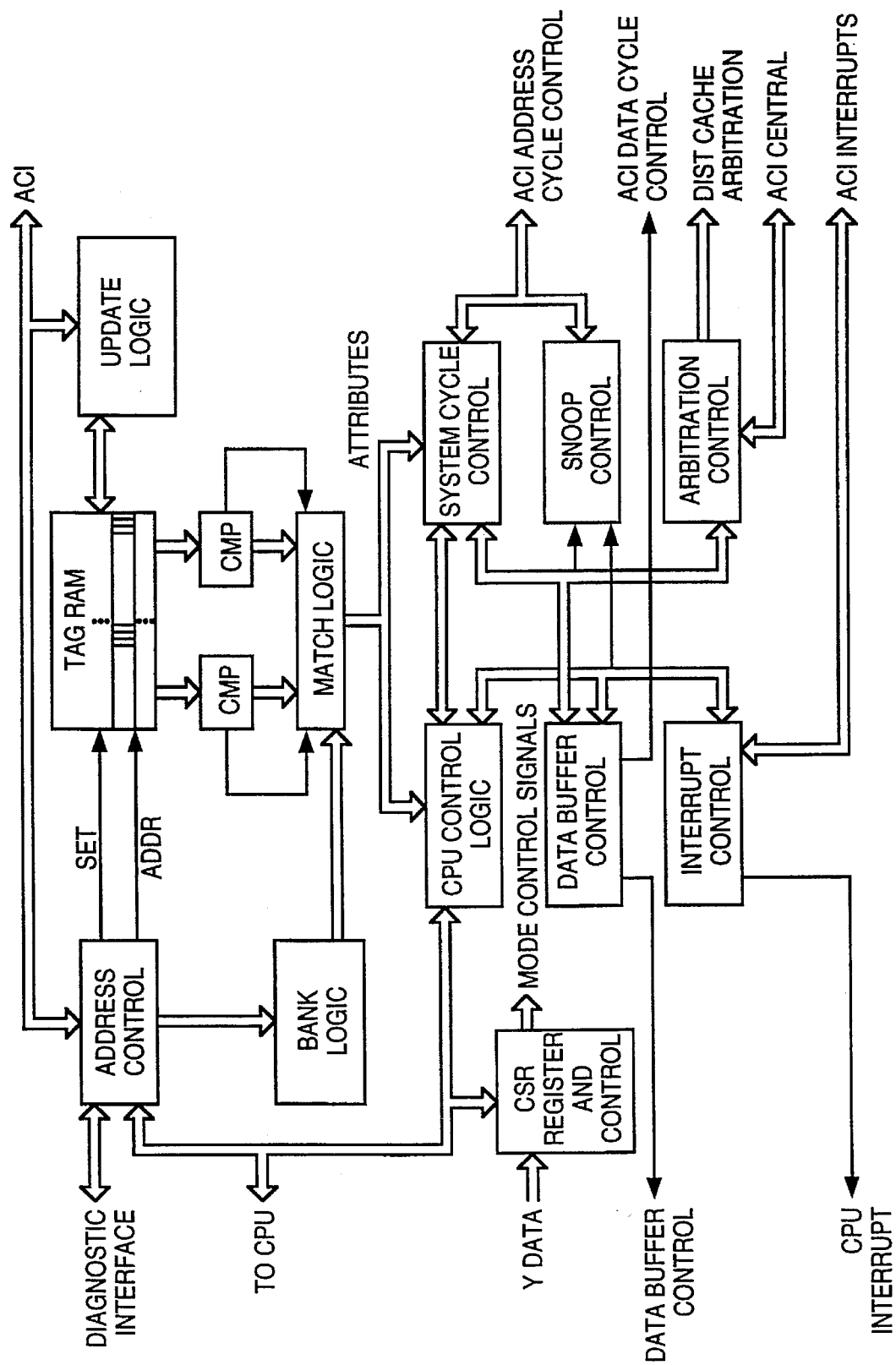

FIG. 30 is a more detailed block diagram.

2.1 OVERVIEW

The main function of the cache controller is to provide fast local storage for frequently accessed code and data. The cache controller intercepts 80486 memory references to check if the required location resides in the cache. If the location resides in the cache (a hit), the CPU cycle is completed without wait states. If the location is not in the cache (a miss), a line (16, 32 or 64 bytes) that contains the referenced location is fetched from system memory and the CPU cycle is completed.

Figure 31:
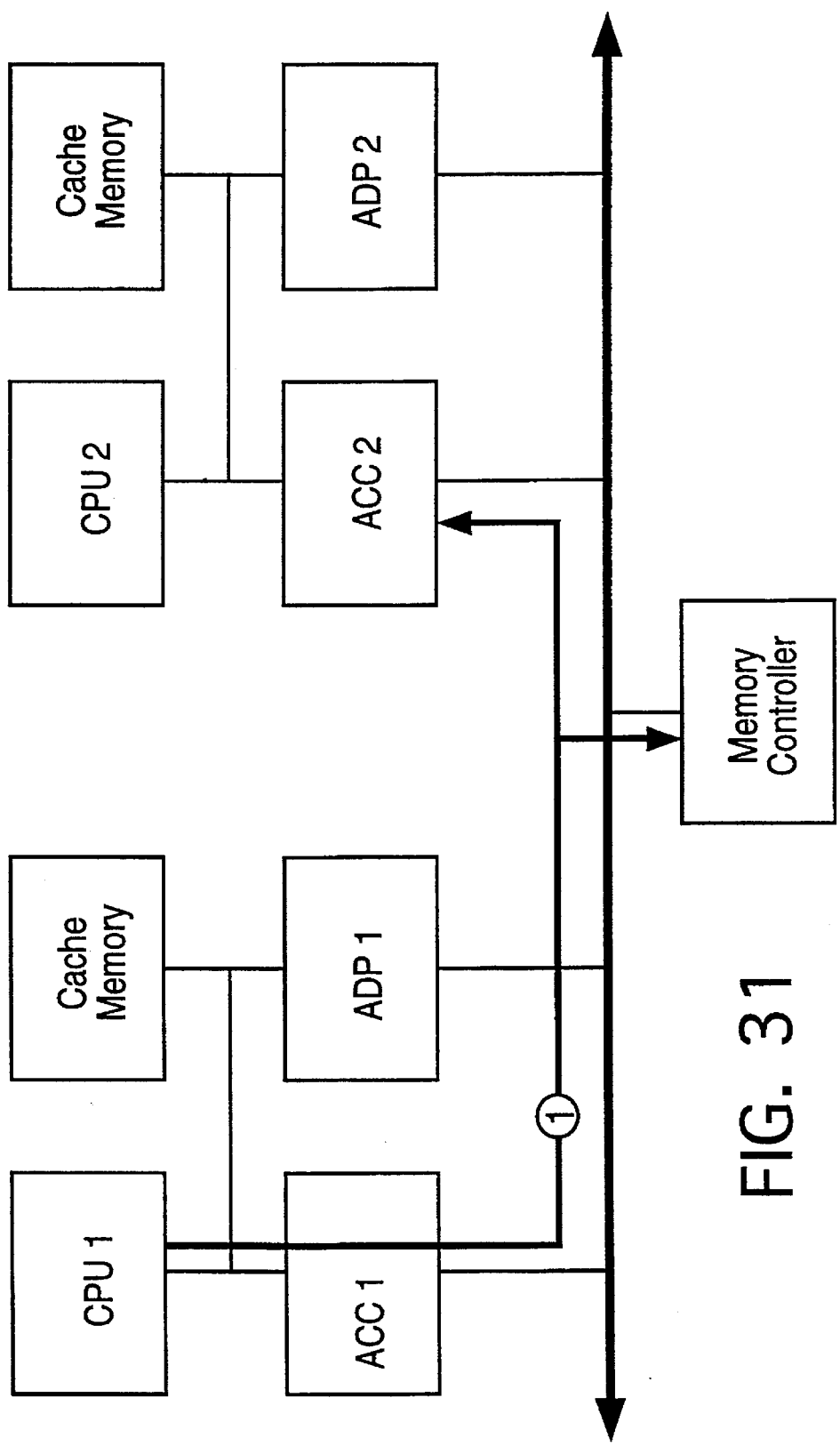
Figure 32:
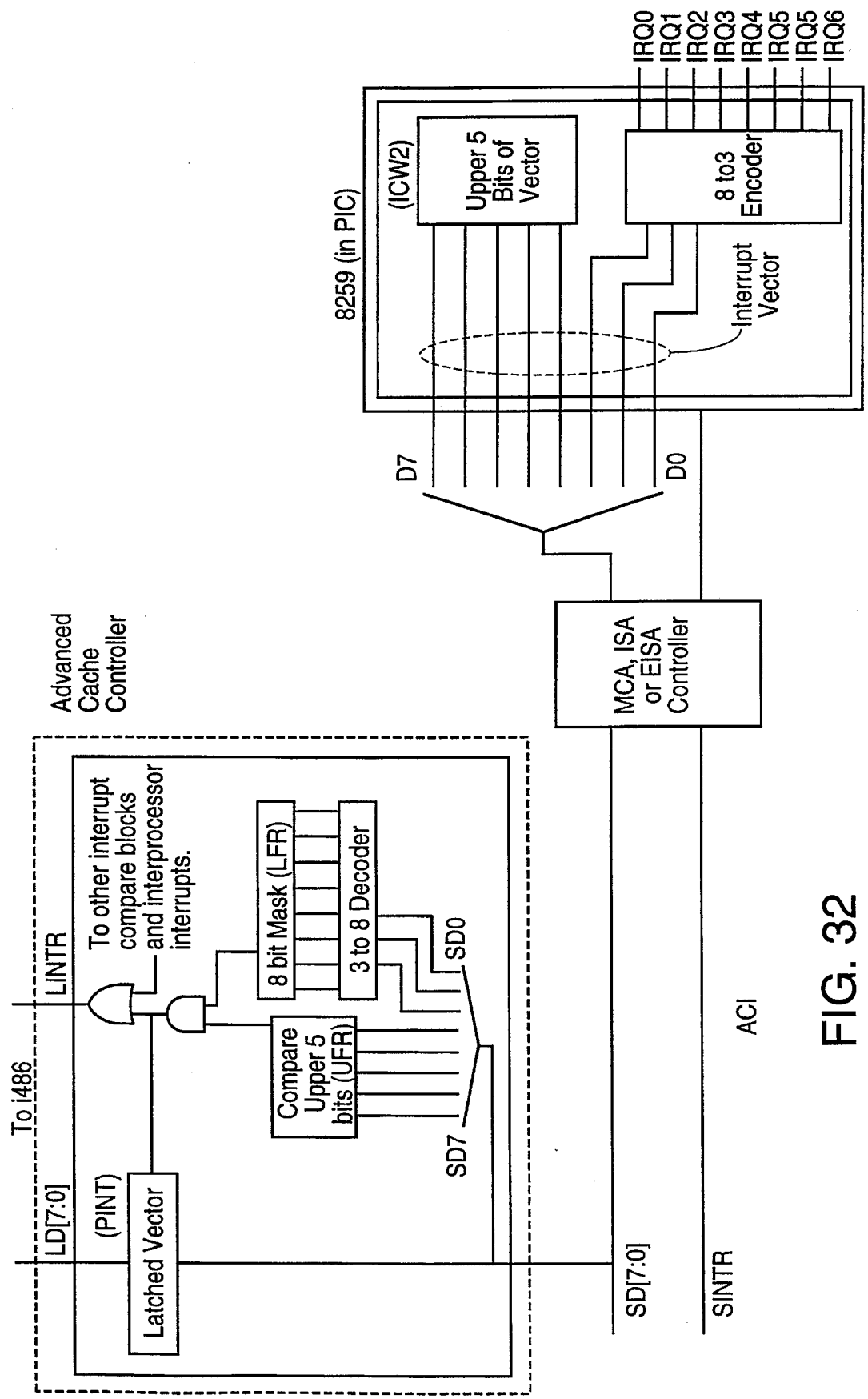

The cache controller integrates the cache directory (Tag) and cache management logic to support an external 64 kbyte, 128 kbyte cache or 256 kbyte cache. The internal Tag will map up to 4 Gbytes of system memory into the cache as well as support the line attributes for the MESI multi-processor cache consistency protocol. Portions of memory can be supported as non-cacheable. The cache controller supports multiple cache organizations. Cache sizes are 64, 128 and 256 kbytes. Set associativities are direct map and 2-way. Line sizes are 16, 32, and 64 bytes for the 64, 128, and 256 kbyte caches, respectively. The cache controller also has other multi-processor support features. It extends the bus arbitration to 39 other cache controllers to make up a maximum number of ten cache controllers in one system. It also supports a distributed interrupts: One of the cache controllers performs the interrupt acknowledge cycle and all the other cache controllers capture the vector, which in turn is masked to determine if the interrupt is to be service by its CPU. FIG. 31 shows for multiprocessor system a cache-to-cache transfer involving a CPU read from DRAM with a cache miss.

2.2 BUS STRUCTURE

FIG. 31 depicts a system with a cache controller attached to the local system bus. The CPU bus is isolated from the local system bus by the cache controller and the 86C101 data buffer. The local system bus ties to this front end as it would to an 80486 processor. The cache controller with the 86C101 data path isolates the 80486 processor and the cache memory from the local system bus to allow these two sub-systems to operate in parallel.

2.2.1 BUS ARBITRATION

The cache controller arbitrates amongst the cache controllers to determine the bus owner. It is a distributed arbitration that includes fairness. Each cache controller that requires the bus monitors the ARB signal. When it is active the cache controller drives ARB inactive and ARN[4:0]- with the four least significant bits of its device id and ARN5- with its fairness state. The logic connected to ARN[5:0]- will settle within 200 ns to determine which cache controller wins the arbitration. The cache controller with the highest number and with ARN5- driven low will win the arbitration. Once it wins it sets its fairness release bit which decreases its arbitration number below the other competing cache controllers. Once all competing cache controllers have won, then on the next arbitration ARN5- will be high signaling all cache controllers that they can reset their fairness release bit.

When a cache controller loses arbitration it stops driving ARB and ARN[5:0]- and waits for ARB to become active again to restart its arbitration.

When a cache controller wins arbitration it waits for the current bus owner to drive GNT- active. It then assumes bus ownership and drives ARB active and then tri-states to allow the next round of arbitration.

The current bus owner hand shakes with the central arbiter via HLDA, HOLD and BREQ in the same way that a 80486 uses these signals.

2.2.2 INTERRUPTS

In a single processor environment, the 86C201 transfers the SINTR directly to LINTR.

2.2.2.1 DISTRIBUTED INTERRUPTS FOR MULTIPLE PROCESSORS

In multiprocessor systems interrupts can be sent to a single processor for processing, or they can be sent to a single processor and redistributed by that processor to other processor, or they can be automatically distributed to any of the processors.

2.2.2.1.1 AUTOMATIC DISTRIBUTION OF INTERRUPTS

Interrupts are automatically distributed using logic in the cache controllers. In this automatic distribution system, the SINTR signal from the interrupt controller (included on the peripheral interface controller) is connected to the master cache controller. In a system with more than one cache controller, one of those controllers, with bit 7 of the Interrupt Control Register being zero, is designated the master cache controller. The master cache controller will acknowledge the interrupt request (SINTR) with an interrupt acknowledge sequence, causing two INTA cycles to be generated. When the vector is placed on the bus for the second INTA pulse of an interrupt sequence by the interrupt controller all cache controllers capture this vector. This vector is compared in each cache controller with three sets of compare circuits. Each compare circuit has two registers, a five bit register for the fixed upper field of the interrupt vector (UFR) and a eight bit register (Lower Field Register, LFR) for the lower three bits of the vector. (The eight bits of the LFR correspond to eight interrupt masks. From left to right D7 is the mask for interrupt level 7, D6 is the mask for interrupt level 6, etc. to D0 which is the mask for interrupt level 0.)

The 8 mask bits are "anded" to the outputs of the 8 to 1 decode of the three lower vector bits. If a mask bit is set to one and the eight to one decode from the vector is enabled a match is said to occur. If one of the UFR's compares equal to a match occurs with the LFR and the decoded lower 3 bits, the cache controller is enabed for this interrupt. The controller will pass an INTR to its 80486. The subsequent interrupt acknowledge cycle from the CPU will be serviced by the enabled cache controller. The enabled cache controller will provide RDY# at the appropriate time, cache controller to enable the acknowledge for the next subsequent interrupt request.

The resultant sequence for automatically distributing interrupts is as follows:

1. An interrupt request is signaled to the system from the peripheral interface controller on SINTR.
2. If the system is set up for automatic distribution of interrupts the master cache controller will acknowledge the interrupt request.
3. During the acknowledge cycle the vector is captured by all cache controllers. Each cache controller also drives SINTR inactive.
4. Each cache controller checks to see if it is enabled for this vector. If it is not enabled, it stops driving SINTR inactive. The enabled cache controller signals its corresponding CPU to acknowledge the interrupt by enabling the appropriate INTR.
5. The CPU acknowledges the interrupt, a vector provided by the cache controller from the vector that was captured from the bus is returned back to the CPU.
6. The interrupted CPU enables the master cache controller to allow it to acknowledge subsequent interrupts, by not driving SINTR inactive.

2.2.2.1.2 SOFTWARE CONTROLLED DISTRIBUTION OF INTERRUPTS

In addition to this automatic interrupt distribution system each cache controller has interrupt circuitry for distributing interrupts for software control as described below.

2.2.3 CACHE COHERENCY

The cache controller uses the MESI protocol to maintain cache coherency. While the cache controller is not the bus master it "snoops" the local system bus for master to memory operations. Depending on the type of bus transaction the cache controller snoops, updates its line attributes, intervenes and or generates an invalidate cycle to the 80486. The cache controller also initializes the cache by setting the line attributes to invalid. As the CPU does its bus activity, the cache controller updates the cache and the line attributes.

2.3 BASIC OPERATION

The following describes operation of an 80486/cache controller system.

2.3.1 CPU MEMORY CODE AND DATA READ CYCLES

2.3.1.1 READ HITS

When the CPU initiates a memory code or data read cycle, the cache controller compares the high order bits of the CPU's address bus with the appropriate addresses (tags) stored in its on-chip directory. If the cache controller determines that the requested data is in the cache, it issues the appropriate control signals that direct the cache to drive the requested data onto the local (CPU) data bus, where it is read by the CPU. If the CPU is a 80486, the cache controller will burst 4 of these cycles before terminating the cycle. Otherwise the cycle is terminated after one cycle. No changes are made to the attributes.

2.3.1.2 READ MISSES

If the cache controller determines that the requested data is not in the cache, a request for a line is generated to the local system bus. As the data returns from system memory, it is directed to the CPU and also written into cache. Concurrently, the 86C201 updates the cache directory with the tag address and its attributes.

The basic unit of transfer between main memory and cache memory is called the line size. In an 86C201 system the line size can be 16, 32 or 64 bytes, depending on the cache size. The cache controller will pass the requested data to the CPU, while storing the complete line into the cache. The minimum amount of data sent to a 80486 is a four 32 bit double-words.

2.3.1.3 MEMORY WRITE CYCLES

The cache controller copy back cache allows for zero waiting states on cache hits. Cache misses are allocated writes. That is, the line is replaced with a read modify cycle and then updated with the write cycle.

Concurrently with the write cycle into cache, the line attribute is changed to M (modified). This state implies ownership with the responsibility of updating memory if the line is replaced.

2.3.1.4 COPY BACK CYCLES

If a read or write cycle is a cache miss and the line to be replaced is a modified line, then that line must be written into system memory via the copy back cycle. This line is stored in the write FIFO of the 86C101 data path controller at the same time the new line is being read into the read FIFO. Then while the new line is being forwarded to the CPU and written into cache, the replaced line is being written into system memory. This operation of reading a line and then writing to memory is atomic. If 646 buffers are used instead of the 86C101 data path device, then the operations are reversed. The old line is written to memory before the new line is used. This operation is still atomic.

2.3.1.5 READ MODIFY CYCLES

If a cache miss occurs on a write cycle, a read modify cycle occurs on the local system bus and one of two cycle terminations will occur: if SKEN- is returned active the new line is fetched from memory. If SKEN- is returned inactive then the written data will be transferred to the selected slave with a subsequent memory write cycle. The read modify cycle will cause other snooping caches to invalidate the fetched line.

2.3.1.6 NON-CACHEABLE CYCLES

Non-cacheable cycles fall into one of four categories: cycles decoded as non cacheable via the PCD pin from the CPU, cycles decoded as non-cacheable via the SKEN-pin from the local system bus, cycles that are internally decoded as non cacheable and cycles that are by default non-cacheable. Non-cacheable cycles have no effect on the cache or cache directory.

The primary function of the PCD pin is to connect to the PCD pin of the 80486, which in turn is controlled by the PCD bit of CR3. This pin can also be controlled by an external decoder as long as it meets the set-up time to the beginning of T2.

SKEN- is driven active by system memory that has been defined as cacheable. If this line is inactive one cycle before SRDY- or SBRDY- is asserted, then the cycle is non-cacheable. If SKEN- is inactive on a read modify cycle, then the bus cycle will be followed by a memory write.

Internally two areas can be defined as non-cacheable. One is the video area that is located at address range, 000A0000 through 000BFFFF. This area can be cacheable through setting a bit in the CSRs. The cache controller defines certain cycles as non-cacheable without using its non-cacheable input pins. These include I/O cycles, interrupt acknowledge cycles, and halt/shutdown/flush cycles. During a halt/flush cycle, the cache controller duplicates the function of the CPU including responding to SHOLD. Bus snooping continues to function in this condition.

2.3.1.7.1 PWT MODE

In the 86C401 there is a software configuration register (CSR) that optionally ignores the PWT pin from the 80486. This allows copyback cache operations to continue when software is executing that is not copyback cache intelligent.

2.3.1.7 BUS SNOOPING

The cache controller qualifies the local system bus cycle when it detects an SADS. The cycle is qualified as cacheable or non-cacheable. Cacheable cycles are further classified as hit or miss. One more level of qualification is performed on hit cycles that determines whether the cache data has been modified or not. If a cycle is non-cacheable, then no further action occurs. If the cycle is cacheable and a miss, no further action is taken. If the cycle is a cacheable unit, not modified, and is generated by a cache master the SCS# line is asserted. If a non-cache master, such as a DMA controller, is generating a write cycle, then the cache line is invalidated. If the data is in the modified state, then the cache controller asserts SIV# and then performs the data portion of the cycle as if it were system memory.

2.3.1.8 CACHE FLUSH

The cache controller detects the flush cycle from the 80486 and will perform the type of flush as indicated by the type of cycle. The INVD instruction will cause the cache to invalidate all cache locations without a copy back occurring for locations that are modified. Under software configuration (CSR's) this instruction optionally causes a writeback cycle to maintain consistency of data in memory, for software that is unaware of copyback caches. A WBINVD instruction will cause modified locations to be copied back into system memory, before they are invalidated. A flush will also occur with a write to I/O location E2H if bit 5 is set to a 0 and bit 0 is set to a 1.

2.3.1.9 LOCKED CYCLES

Locked cycles are treated as write-through cycles on writes and non-cacheable cycles on reads.

2.3.1.10 SHUTDOWN CYCLES

When the cache controller detects a shutdown cycle it resets the CPU.

2.3.1.11 INVALIDATION CYCLES

Whenever the cache controller does a line eviction, it performs an invalidation on the 80486 CPU. The number of invalidation cycle is (secondary cache line size) divided by 16.

3. CACHE ORGANIZATION

The cache controller supports two cache organizations: direct mapped and two way set associative. This section describes the structure and operation of both organizations.

3.1 DIRECT MAPPED CACHE

In the direct mapped mode the cache directory (tag) is organized as a 4K×16 bit RAM with a 4K×2 bit RAM for attributes. This organization will support cache sizes of 64 kbytes, 128 kbytes and 256 kbytes with line sizes of 16, 32, and 64 bytes respectively. The two attribute bits will support the four MESI states for each line: (M)odified, (E)xclusive, (S)hared, and (I)nvalid.

3.1.1 READ HITS

When the CPU initiates a memory read code, the 86C201 uses the 12 bit directory address (A15 to A4 for 64 kbyte cache) to select one of 4096 directory entries. This same address is presented to the cache along with A3 and A2 to access one double-word. If the output of the directory matches the upper address from the CPU (A31 to A16) and if the attributes indicate that the line is not (I)nvalid, then the data is presented to the CPU. For a 80486 CPU, BRDY# is returned and A3 and A2 are sequenced until BLAST# is detected, thereby presenting 16 bytes to the 80486. Read hits do not alter the contents of the cache or tag.

3.1.2 READ MISSES

A read miss occurs in two ways. The first is when the line attribute indicates that the location is invalid. The second is when the upper address does not match the tag address.

If the line is invalid, exclusive or shared, then the new line simply replaces the old line and at the same time the requested data is presented to the CPU. If the line is modified, then that line must be copied back into memory before the new line can be put into the cache. The new attribute for the line is determined by two status lines on the bus: SCS# and SIV#. IF both signals are inactive on a data fetch, the new attribute is exclusive. If both signals are inactive on a code fetch, the new attribute is shared. If SCS# is active, the new attribute is shared; and if SIV# is active the new attribute is modified. Both signals active is an illegal state.

3.1.3 WRITE HITS

A write hit is qualified in the same way as a read hit. If the attribute is exclusive or modified, the data is written into cache and RDY# is returned in zero wait states. If the attribute is shared then the data is also broadcast on the local system bus, to allow other caches to invalidate. The resulting attribute is modified. The mode can be changed from copy back to write through by asserting PWT; in which cache, the data is broadcasted regardless of the line's attribute.

3.1.4 WRITE MISSES

A write miss is qualified in the same way as a read miss and the old line is evicted in the same manner, except the local system bus cycle is a read modify instead of a burst read. This is to inform other caches to invalidate that location. After the new line is in the cache, the data is written into it and the attribute is changed to modified. If SKEN# is returned inactive, then the read modify cycle is treated as a broadcast write. If PWT is asserted, the data will be broadcast with no line eviction.

Figure 33:
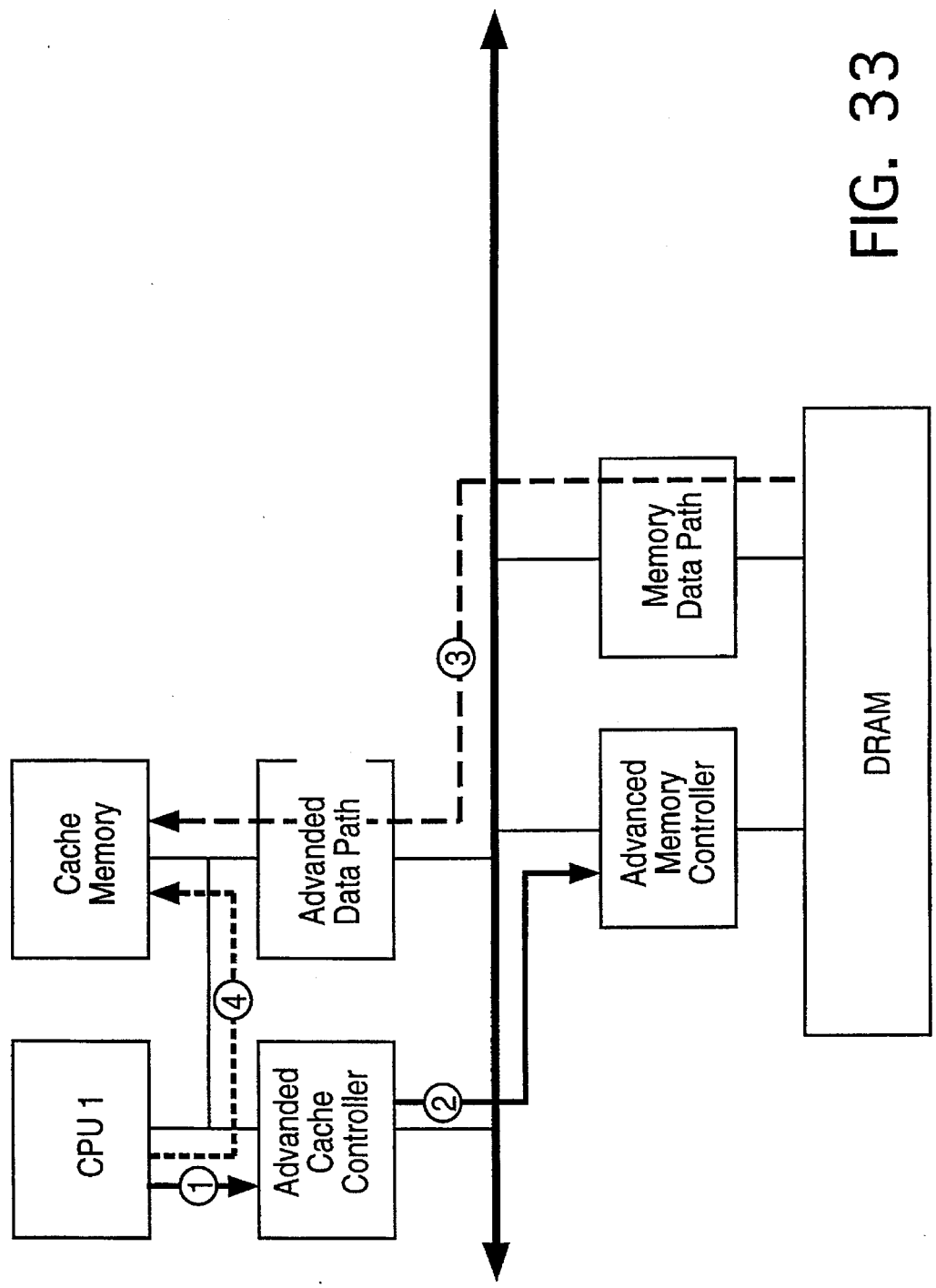

Allocate on write miss is shown in FIG. 33. In step 1, the CPU performs a memory write resulting in a cache miss. In step 2, the cache controller performs read access to memory. In step 3, the memory subsystem returns data to the cache subsystem. In step 4, the CPU completes a write into cache SRAM.

3.1.5 SNOOP HITS

If the cycle is a read and the attribute is exclusive or shared, then the cache will assert SCS" and change the attribute to shared. If the attribute is modified, the cache will assert SIV#; drive the requested data onto the bus; assert SRDY# or SBRDY#; and then change its attribute to invalid.

If the cycle is a write, by a copy back cache master, then the attribute is changed to invalid. A modified attribute is illegal.

If the cycle is a write, by a non-copy back cache master to a modified line, the cache asserts SIV# and completes the cycle by updating its cache and driving SRDY#. If the line is exclusive or shared, then the line is simply invalidated.

3.1.6 INTERNAL CACHE COHERENCY

In the uni-processor environment all writes by other masters generate an invalidate cycle to the 80486. In a multiprocessor environment, the secondary cache includes the primary cache by performing an invalidate cycle on secondary cache line evictions or snoop hits on write cycles by non-cache masters.

3.1.7 INITIALIZATION

When SRESET# is active the cache controller sets all lines to the invalid state. To fill a line with valid data, the cache must be enabled and a cacheable read or write cycle must be performed. After the tag RAM has been initialized, the TR bit in CSR will be set and it can be enabled for cache operations.

3.2 TWO WAY SET ASSOCIATIVE CACHE

The two way set associative cache directory is organized as two banks of 2K×18 bit RAMs: sixteen bits for tag and two bits for line attributes. One 2K×1 RAM is used for LRU status.

3.2.1 LRU REPLACEMENT ALGORITHM

The two way set associative directory has a "least recent used" (LRU) bit. On placing a new line into the cache, the LRU bit indicates which bank of RAM will be updated.

3.2.2 READ HITS

When the CPU initiates a memory read cycle, the cachec controller uses the 11 bit directory address (A14 to A4 for a 64 kbyte cache) to select one of 2048 directory entries. The two tags of each entry are simultaneously compared to the upper address from the CPU (A30 to A15 for a 64 kbyte cache) and the attribute is checked for validity. If a hit occurs on either compare, the corresponding cache bank is directed to provide the correct double word to the CPU. In the case of a 80486 CPU, the cache will burst the remaining 12 bytes of the line. The LRU bit is pointed to the other bank that did not provide the data.

3.2.3 READ MISSES

A read miss occurs when neither bank has a tag match or there is a match but the attribute is invalid. If the line is invaid, exclusive or shared, then the new line simply replaces the line, pointed to by the LRU bit, and at the same time the requested data is presented to the CPU. If the line, pointed to by the LRU bit, is modified, then that line must be copied back into memory before the new line can be put into the cache. The new attribute for the line is determined by two status lines on the bus: SCS# and SIV#. If both signals are inactive on a data fetch, the new attribute is exclusive. If both signals are inactive on a code fetch, the new attribute is shared. If SCS# is active, the new attribute is shared; and if SIV# is active the new attribute is modified. Both signals active is an illegal state.

3.2.4 OTHER OPERATIONS

Write hits, write misses, snoop hits, flushes, and 80486 invalidates are accomplished the same way as direct mapped, with either the exception of selecting the cache bank corresponding to the directory bank that provided the hit, or selecting the bank pointed to by the LRU bit.

3.2.5 CACHE CONFIGURATIONS

The following table outlines the different configurations of cache size, line size, tag size, and number of sets.

| Cache Size (Kbytes) | Line Size (bytes) | Tag Size (bits) | No. of Sets | Sys. Mem (Gbytes) |
|---|---|---|---|---|
| 64 | 16 | 16 | 1 | 2 |
| 64 | 16 | 16 | 2 | 1 |
| 128 | 32 | 15 | 1 | 4 |
| 128 | 32 | 16 | 2 | 2 |
| 256 | 64 | 14 | 1 | 4 |
| 256 | 64 | 15 | 2 | 4 |

3.2.6 ADDRESS SHIFTING

Figure 34:
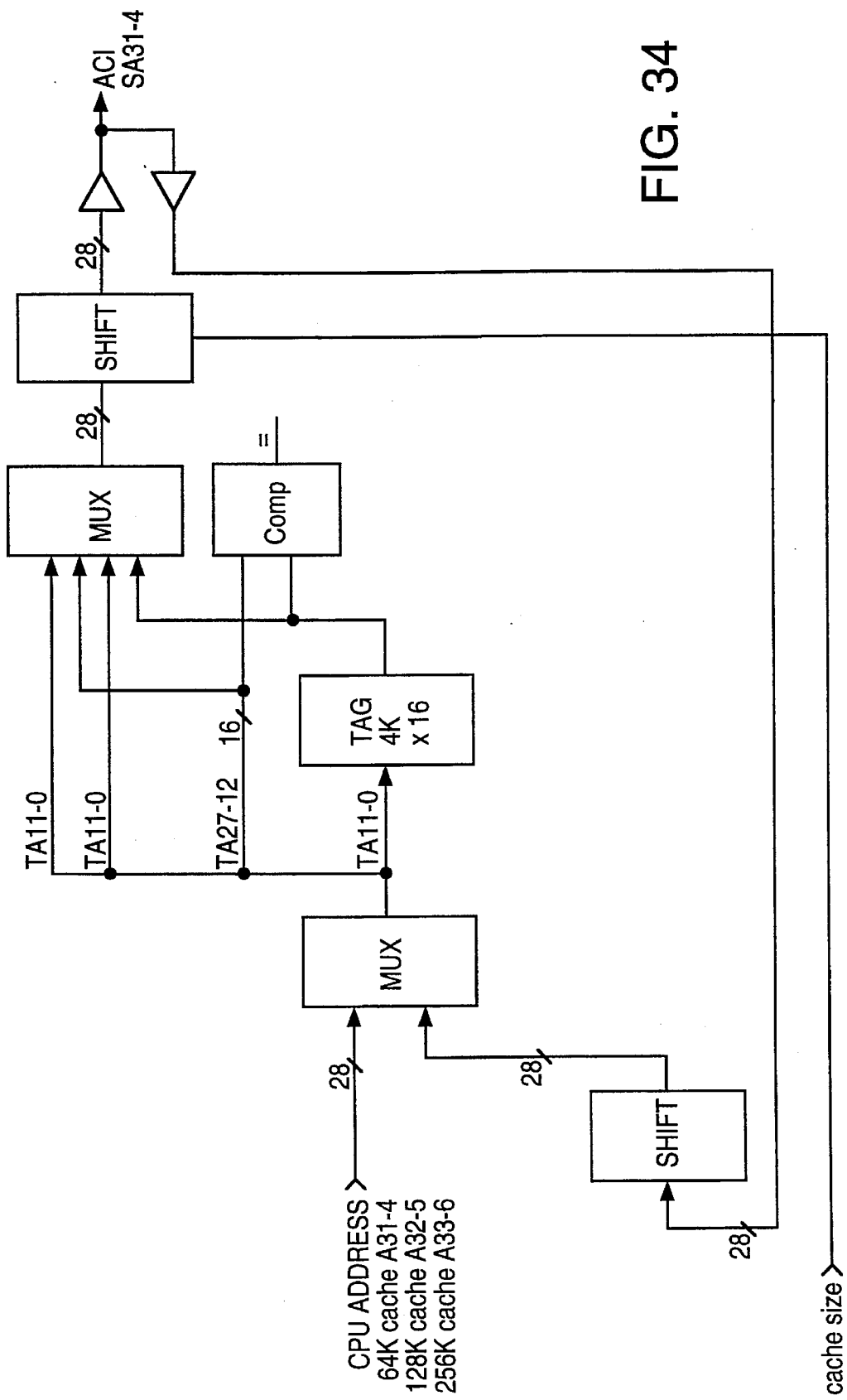

Shifting address to accomodate various cache sizes with a fixed tag size is a feature of the cache controller. To achieve minimum delay between the CPU address and the internal tag RAM no shifters are used to accomodate various cache sizes. The address is physically shifted by connecting the address lines to different pins based upon the cache size. If the CPU address or a tag address (for copy-back) has to be driven onto the ACI, then it is shifted to accomodate the ACI address pins which are always connected to the same pins. Shifting also occurs during snooping to allow the ACI address to match up with the CPU address. See FIG. 34 showing the address shifter feature of the cache controller.

5. HARDWARE INTERFACE

5.1 RESET and INITIALIZATION

Four of the pins have functions during SRESET, that configure the 86C301/86C401. These pins are OEB#, OEA#, KS1/RDA, and KS0/LDA. A 22 k ohm pull-up to VDD will drive the desired pin to a "1", while a 22 k ohm pulldown to VSS will drive it to a "0".

| | | |
|---|---|---|
| CSR20 | | |
| BIT 4 | (Weitek present) | |
| | 0 Weitek present | |
| | 1 Weitek not-present | |
| | This bit does not affect any ACC functions. | |
| CSR 21 | | |
| BITS 2, 1 | (cache size) | 00 64kbyte |
| | | 01 128kbyte |
| | | 10 256kbyte |
| | | 11 reserved |
| BIT 7 | (data path) | 0 reserved |
| | | 1 86C211 FIFO |

AHOLD and LA20M- are tri-stated during SRESET allowing a 22 k ohm pull-up or down to be attached for enabling the 80486 built-in self-test (BIST) or the 80486 external cache test. A pull-up on AHOLD will enable the BIST. A pull-down on LA20M- will enable the external cache test.

6.0 SOFTWARE INTERFACE

This describes the register, bit functions and the addressing scheme.

All addressing is done by byte boundaries.

All registers are readable, except for ports 224h, 235h and 26h.

6.1 CSR PROGRAMMING 6.2 Refer to above for a description of programming the control/status registers. The FIDR, Functional id Register (Index 00H) is hard coded with the Cache Controller code (40H). The CREV, Chip Revision Number Register, (Index 05H), is hard coded with E0H. This number will change, whenever the 86C201 is changed.

6.3 CACHE CONTROL/STATUS REGISTERS (CSR)

The cache control/status register configures the cache by selecting one of 6 different modes. Status is available for one of 3 cache sizes, one of 2 associate sets, zero or one wait state on cache hit reads, zero or one wait state on cache hit writes. These status bits reflect the state of 6 external pins that are used for configuration at reset. A status bit also indicates when the Tag RAM is initialized by invalidating all locations.

| index | | bit position |
|---|---|---|
| | | 7 6 5 4 3 2 1 0 |
| | | R R R WP SK M2 M1 M0 |
| M2,M1,M0 | Mode Bits: | |
| | 0 0 0 | Cache fills disabled, write-through enabled, copy-back disabled, cache test and tag test disabled. (DEFAULT) |
| | 0 0 1 | Cache fills disabled, write-through disabled, copy back disabled, cache test disabled, tag test enabled. The tag RAM is addressed through the tag address registers (CSR index 26 and 27). The tag RAM is tested as if it were configured to support a 64 kbyte, direct mapped cache. A15 through A4 selects the tag address and its two attribute bits. A1 high selects the attribute bits, while A1 low selects the tag address bits. A0 high selects the upper 8 bits of the tag address, while A0 low selects the lower 8 bits. The attribute bits are accessed via bits 0 and 1 of the data bus. |
| | 0 1 0 | Cache fills disabled, write-through disabled, copy back disabled, cache test enabled, tag test disabled. A19 high will select system memory, while A19 low will select the cache RAM. In a two-way set cache A18 high will select bank 1, while A18 low selects bank 0. |
| | 0 1 1 | reserved |
| | 1 0 0 | Cache fills enabled, write-through enabled, copy back disabled, cache test disabled, tag test disabled. |
| | 1 0 1 | Cache fills enabled, write-through disabled, copy back enabled, cache test disabled, tag test disabled. |
| | 1 1 0 | Reserved |
| | 1 1 1 | Same as 101 except writes to shared locations will remain in the S state. |

| index | | bit position |
|---|---|---|
| 21 | | 7 6 5 4 3 2 1 0 |
| | | FF CPU WS1 WS0 SA KS1 KS0 BN |
| BN | No. of cache banks: | |
| | 0 | two banks |
| | 1 | one bank (default) |
| KS1, KS0 | Cache Size: (Read Only) | |
| | External pins KS1/RDA, KS0/LDA | |
| | 0 0 | 64 kbytes |
| | 0 1 | 128 kbytes |
| | 1 0 | 256 kbytes |
| | 1 1 | Reserved |
| SA | Number of Sets: | |
| | 0 | Direct mapped (default) |
| | 1 | 2-way set associative |
| WS1, WS0 | Wait States: | |
| | 0 0 | 0 wait state cache reads, 0 wait state cache writes (default) |
| | 0 1 | 0 wait state cache writes, 1 wait state cache reads |
| | 1 0 | 1 wait state cache writes, 0 wait state cache reads |
| | 1 1 | 1 wait state cache reads, 1 wait |

```
                    state cache writes
CPU        CPU Type
               0    reserved
               1    80486
FF         Data Path Type (read only)
                    External pin 0EB#
               0    reserved
               1    FIF0
```

6.3.1      SIOL, Cache Controller Special I/O Address Low,
index      |       bit position
           |
22         |    7   6   5   4   3   2   1   0
           |
           |    lower address                    EN Bits 7-1   Special I/O Base Address bits 7-1. (Base
           address bit 0 is assumed to be 0).
Bit 0      Special I/O space enable. 0 = disabled (default),
           1 = enabled.

6.3.2.     SIOH, Cache Controller Special I/O Address High
index      |       bit position
           |
23         |    7   6   5   4   3   2   1   0
           |
           |    upper address
Bits 7-0   Special I/O Base Address bits 15-8.

6.3.3.     WRITE-THROUGH MEMORY REGISTER
index      |       bit position
           |
24         |    7   6   5   4   3   2   1   0
           |
           |    Boundary register (A[27:20])
index      |       bit position
           |
25         |    7   6   5   4   3   2   1   0
           |
           |    VM    R    IWT  IVCB  Boundary register (A[31:28])

Boundary register for write-through memory is a 12 bit fence register that allows for selecting address equal to it or greater to be write-through. The fence has a resolution of 1 Mbyte. The register is loaded so that address 20 bit is compared with index register 14H bit 0 and address 31 bit is compared with index register 15H bit 3. The boundary register bits are initialized with all ones.

```
VM              Video Memory Mask:
                1  Video Memory, address 000A0000
                   through 000BFF is write-through
                   (DEFAULT).
                0  address 000A0000 through 000BFFF is
                   copy-back
IWT    Ignore PWT;
                1  Ignore the PWT pin. (default)
                0  Unmask the PWT pin.
IVCB   INVD Copy-back
                1  Flush the secondary cache on the
                   INVD instruction, and copy-back
                   modified lines. (default)
                0  Flush the secondary cache on the
                   INVD instruction without copy-back.
```

6.3.4.     TAG ADDRESS REGISTERS index      |       bit position
           |
26         |    7   6   5   4   3   2   1   0
           |
           |    lower address
index      |       bit position
           |
27         |    7   6   5   4   3   2   1   0
           |
           |    upper address 6.3.5      TAG DATA REGISTERS index      |       bit position
           |
2C         |    7   6   5   4   3   2   1   0
           |
           |    lower address index      |       bit position
           |
2D         |    7   6   5   4   3   2   1   0
           |
           |    upper address
index      |       bit position
           |
2E         |    7   6   5   4   3   2   1   0
           |
           |                          EN  AT1  AT0

```
EN Write Enable:
                1 => Write the contents of 2C, 2D
                and bits 1 and 0 of 2E into the tag
                RAM addressed by 26 and 27. This
                bit is reset when the write occurs.
AT[1:0] Attributes:
                These bits correspond to the
                attribute bits in the tag RAM.
```

6.4 Special I/O 6.4.1 IPIV0, Interprocessor Interrupt Vector 0, (Special I/O+00h)

This is the interrupt vector to be supplied to the CPU when it performs an interrupt acknowledge cycle for interprocessor interrupt 0.

6.4.2. IPIV1, Interprocessor Interrupt Vector 1, (Sepcial I/O+01h)

This is the interrupt vector to be supplied to the CPU when it performs an interrupt acknowledge cycle for interprocessor interrupt 1.

6.4.3. BIPIM, Broadcast Interprocessor Interrupt Mask, (Special I/O+02h)

This mask is applied the broadcast interprocessor interrupt register data, and if the bits in this mask register and the broadcast interprocessor interrupt are both 1 the corresponding interrupt is generated.

Bits 0-3 For interprocessor interrupt 0.
Bits 4-7 For interprocessor interrupt 1.

This use of four bit allows four discrete groupings of processors to be interrupted per interprocessor interrupts, with the group determined by which of the four bits a processor will respond to for an interrupt.

6.4.4 IIPI, Individual Interprocessor Interrupt Register, (Special I/O+03h)

This register will generate one of both of the interprocessor interrupts for this cache controller only. Setting these bits does not affect the current status of unacknowledged interprocessor interrupt form this source or the broadcast interprocesor interrupt register.

Bits. 7-2 Reserved
Bit 1 When set to 1 will generate Interprocessor interrupt 1.
Bit 0 When set to 1 will generate Interprocessor interrupt 0.

This is a write only register.

6.4.5 ICR, Interrupt Control Register, (Special I/O+04h)

Bit 7 Interrupt Master bit. When this bit is 1 this cache controller will only snoop the int acknowledge (slave mode). When this bit is 0 this cache controller will be the interrupt master and perform the acknowledge cycle on the bus. (default 0)

Bits 6–2 reserved.

Bit 1 This bit controls the SINTR mask flip flop. If this bit is 0 SINTR is always enabled. If this bit is 1 SINTR becomes disabled when this cache controller acknowledges an interrupt. (default 0)

Bit 0 Ignore my broadcast. If this bit is set to 1 any write that this processor performs to the broadcast interprocessor interrupt register, will be ignored by this cache controller. If this bit is 0 all writes to the broadcast IPI register will be taken. (defaults to 0).

6.4.6 ISR, Interrupt Status Register, (Special I/O+05h)

Bit 7–4 Reserved

Bit 3 This bit is set to 1 if SINTR line flip flop is currently disabled. Setting this bit 0 will tenable SINTR.

Bit 2 This bit is set to 1 if a hardware interrupt is pending (Signaled, but has not been acknowledged by the processor). This bit is read only.

Bit 1 This bit is set to 1 if interprocessor interrupt 1 is pending (Signaled, but has not been acknowledged by the processor). This bit is read only.

Bit 0 This bit is set to 0 if interprocessor interrupt 1 is pending (Set, but has not been acknowledged by the processor). This bit is read only.

6.4.7 PINT, Pending Hardware Interrupt Register, (Special I/O+06h)

Bits 7–0 If the status register reports a pending hardware interrupt this vector will contain the vector. Once the interrupt is acknowledged by the CPU this vector is reset to 0, until the next vector comes in.

6.4.8 CCR, CPU Control Register, (Special I/O+07h)

```
Bits 7-3    reserved.
Bit 2       Internal NMI.
Bit 1       Local CPU Reset.
Bit 0       Local CPU A20 control.
NMI         Non-maskable interrupt:
                0    Internal NMI inactive (DEFAULT)
                1    Internal NMI active--generates an 8
                     clock NMI to the CPU and the clears
                     itself back to zero.
RST   CPU Reset:
                0    Local CPU reset is inactive.
                     (DEFAULT)
                1    Local CPU reset is active for 8
                     clocks and then clears itself back
                     to zero.
PRO   Protected Mode:
                0    Local CPU is in real mode, LA20 is
                     masked and LA20M# is driven active
                1    If SA20M# is inactive, then the
                     local CPU will be in protected mode.
                     (DEFAULT)
```

6.4.9 CMR, CPU Mask Register, (Special I/O+08h)

```
Bit 7       reserved
Bit 6       SNMI mask. SNMI from the bus is mask from LNMI
when this bit is 1. SNMI is transmitted to LNMI when this
bit is 0. (default 0).
Bit 5       SCPURST# mask.
Bit 4       SA20M# mask.
Bits 3-0    reserved.
A20M   Address 20 Mask Mask:
                0    SA20M# is transmitted to LA20M#.
                     (DEFAULT)
                1    SA20M# is masked from LA20M#.
RM    SCPURST# Mask:
                0    SCPURST# is transmitted to
                     LCPURST#. (DEFAULT)
                1    SCPURST# is masked from LCPURST#.
NM    NMI mask:
                0    SNMI is transmitted to LNMI.
                     (DEFAULT)
                1    SNMI is masked from LNMI.
```

6.4.10 UFR0, Upper Interrupt Field Register 0, (Special I/O + 09h)

```
          | 7  6  5  4  3  2  1  0
          |
          | upperfield(UFR)     R  R  R
UFR   Upper interrupt vector fields:
                Bits 3 through 7 are used t compare
                with the upper five bits of the
                interrupt vector. These three
                registers are paired with the LFR
                register 0Ah.
```

6.4.11 LFR0, Lower Interrupt Field Register 0, (Special I/O + 0Ah)

```
          | 7  6  5  4  3  2  1  0
          |
          | Lower field register(LFR)
LFR   Lower Field Register:
                This register contains the mask bits
                for the decode of the three least
                significant bits of the interrupt
                vector. These registers are paired
                with the UFR register 09h.
```

6.4.12 UFR1, Upper Interrupt Field Register 1, (Special I/O + 0Bh)

```
          | 7  6  5  4  3  2  1  0
          |
          | upperfield(UFR)     R  R  R
UFR   Upper interrupt vector fields:
                Bits 3 through 7 are used to compare
                with the upper five bits of the
                interrupt vector. These three
                registers are paired with the LFR
                register 0Ch.
```

6.4.13 LFR1, Lower Interrupt Field Register 1, (Special I/O + 0Ch)

```
          | 7  6  5  4  3  2  1  0
          |
          | Lower field register(LFR)
LFR   Lower Field Register:
                This register contains the mask bits
                for the decode of the three least
                significant bits of the interrupt
                vector. These registers are paired
                with the UFR register 0Bh.
```

6.4.14 UFR2, Upper Interrupt Field Register 2, (Special I/O + 0Dh)

```
          | 7  6  5  4  3  2  1  0
          |
          | upperfield(UFR)     R  R  R
UFR   Upper interrupt vector fields:
                Bits 3 through 7 are used to compare
                with the upper five bits of the
                interrupt vector. These three
                registers are paired with the LFR
```

-continued register 0Eh.

6.4.15 LFR2, Lower Interrupt Field Register 2, (Special I/O + 0Eh)

```
| 7 6 5 4 3 2 1 0
|
| Lower field register (LFR)
```
LFR   Lower Field Register:
    This register contains the mask bits for the decode of the three least significant bits of the interrupt vector. These registers are paired with the UFR register 0Dh.

6.5 INITIALIZATION

The scan mode must be normal by driving SCM[1:0] low for initialization to occur. Pins SCI and SCO are daisy chained among cache controllers and are used for orderly initialization of each cache controller. The first processor will awaken, will have its SCI pulled high at reset. The SCO pin will be low to keep the next processor from "waking up". If the SCI signal is low at reset then the cache controller will keep CPURST active to the CPU until SCI becomes active.

86C101 DATA PATH CONTROLLER

The 86C101 data path controller is a high performance data bus interface between the cache and local system bus and working in conjunction with an 86C301/86C401 Cache Controller. The 86C101 has two 64 byte FIFO to support copy-back bypass up to 64 byte line. The 86C101 runs at local system bus speeds of 25 or 33 MHz.

Figure 35:
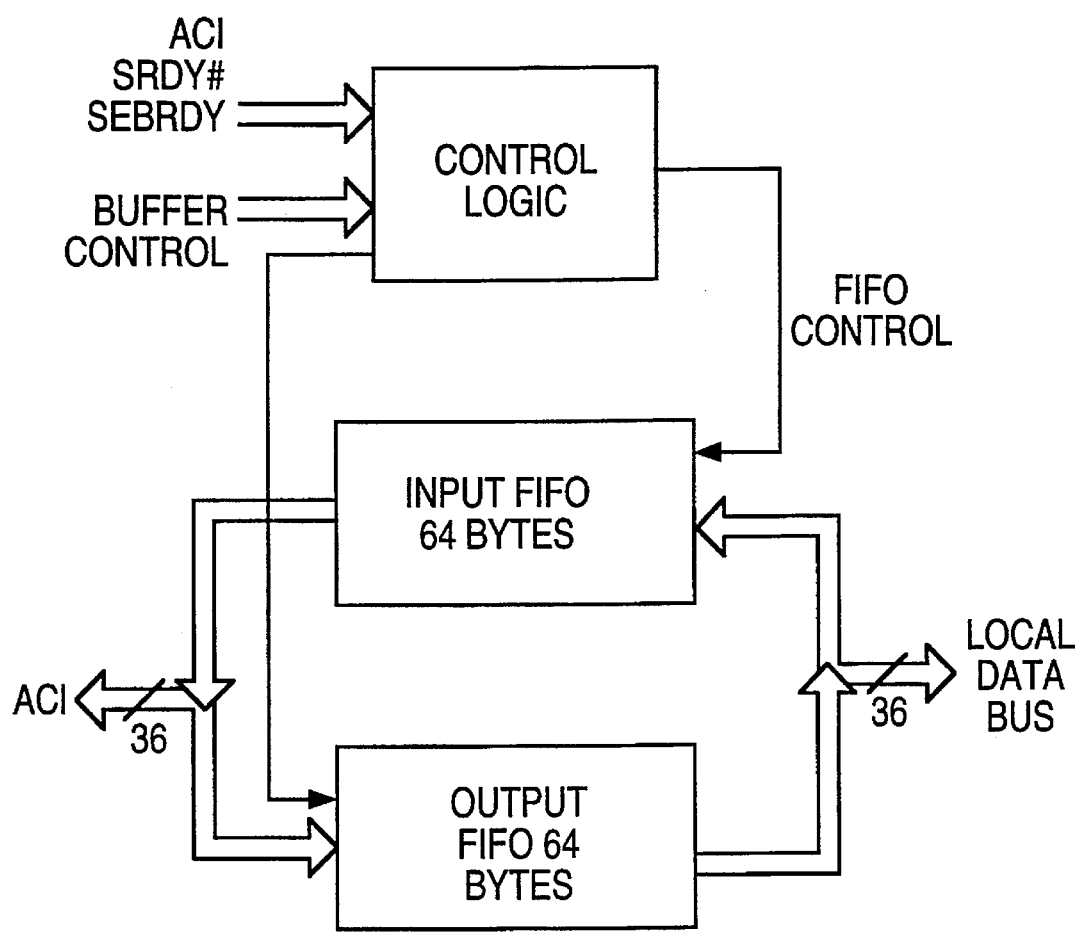
FIGS. 35–36 are datapath controller block diagrams.

FIG. 35 shows a block diagram of the data path controller.

Figure 36:
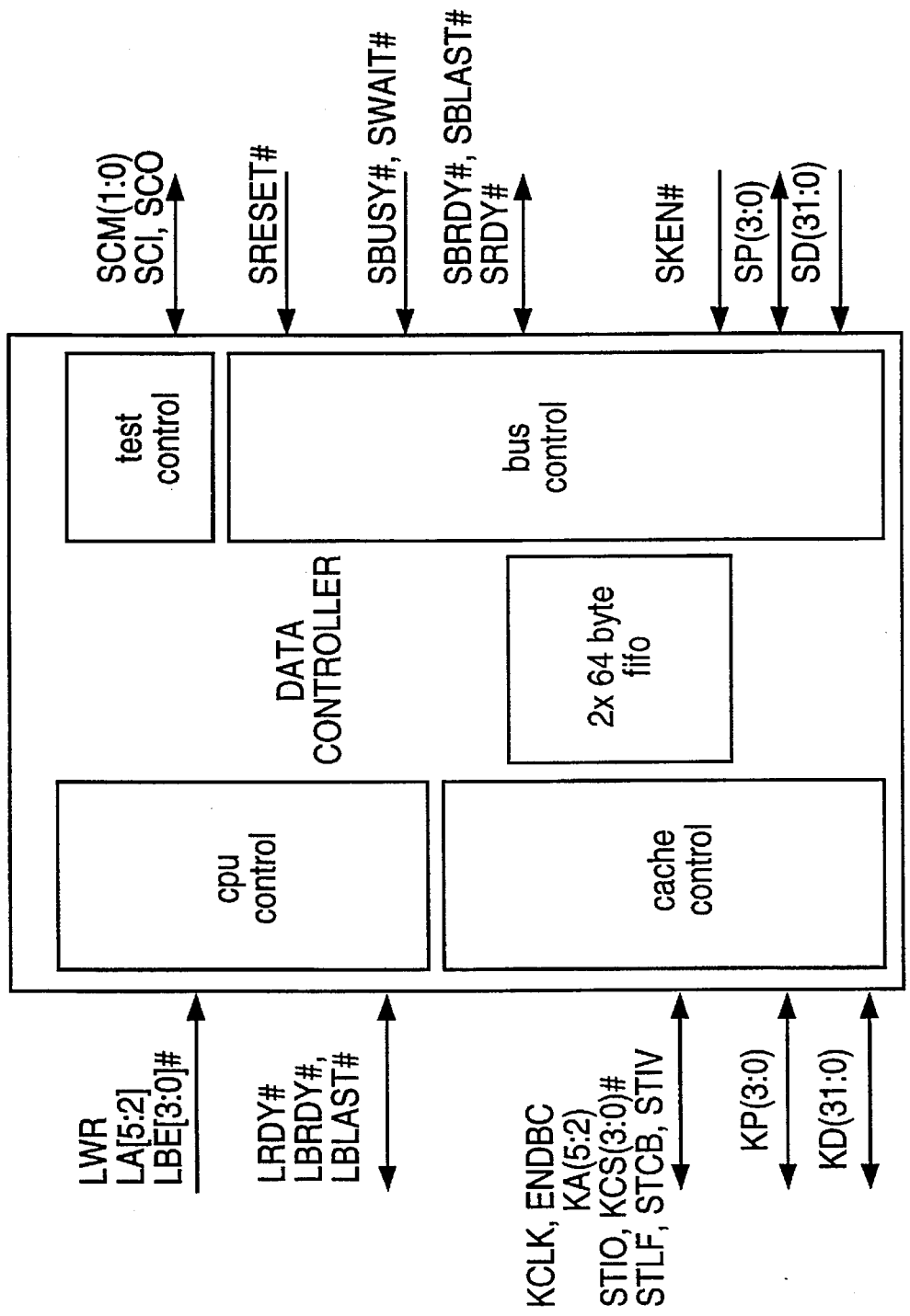

FIG. 36 shows a more detailed I/O block diagram of the data path controller.

The main function of the data path controller is to provide a fast data flow between the local system bus and the cache.

Figure 42:
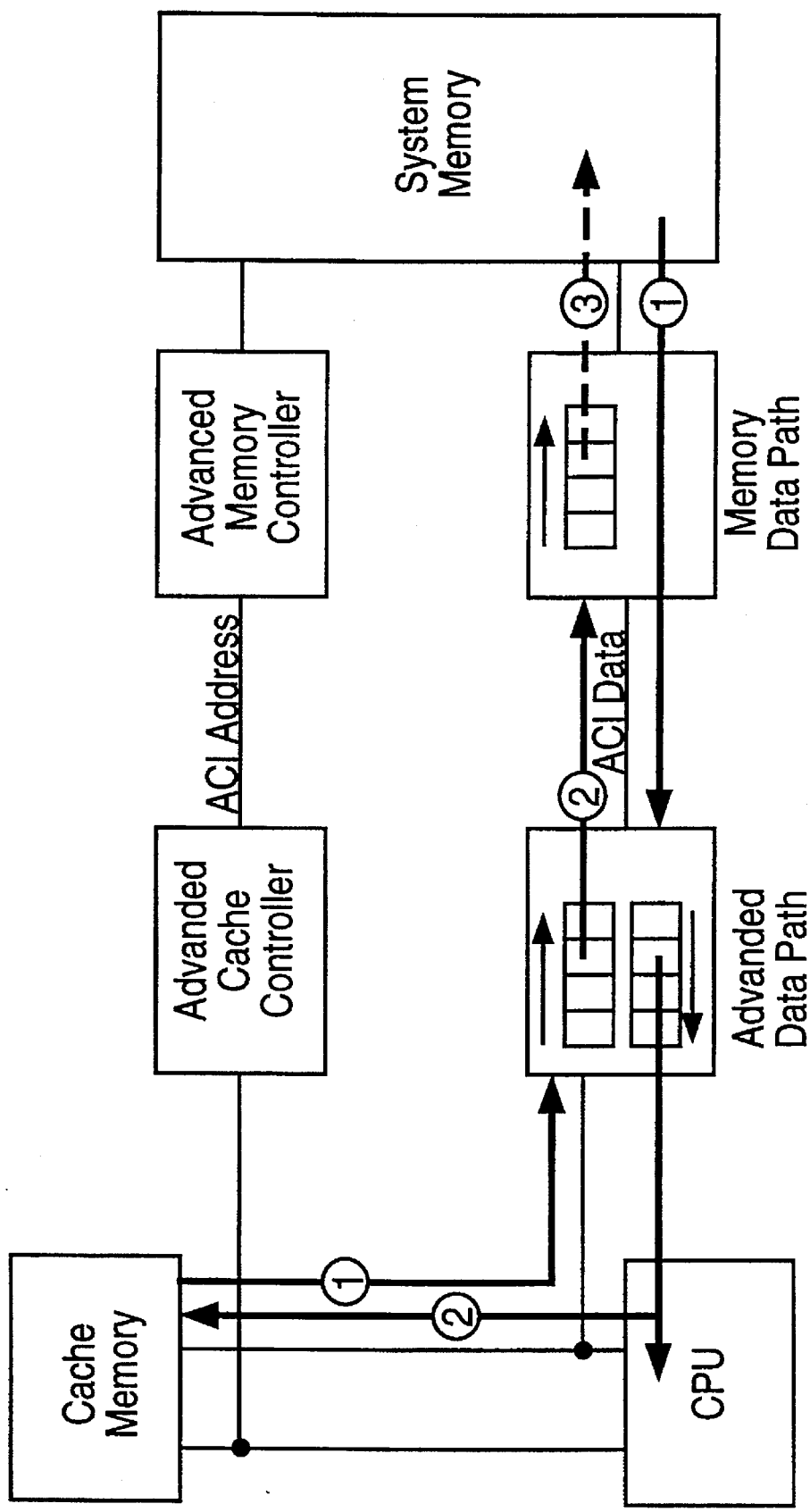
FIG. 42 is a cache controller write-back.
Figure 43A:
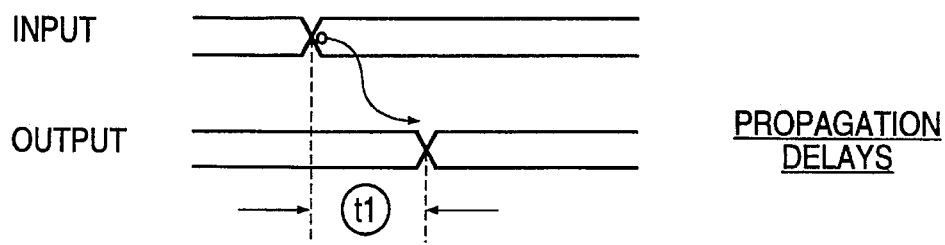
FIGS. 43(a) to 43(d) are ISA data path timing diagrams.
Figure 43B:
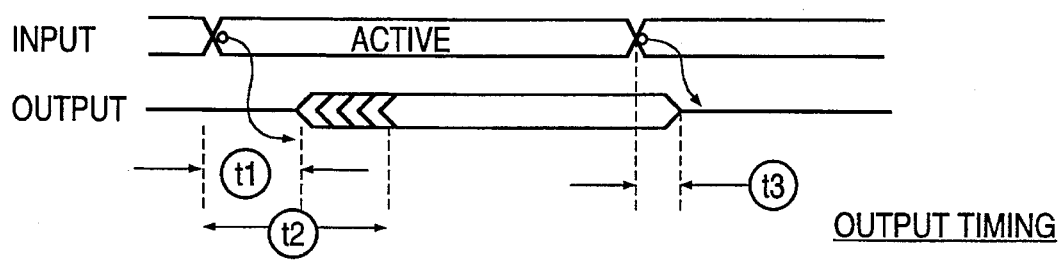
Figure 43C:
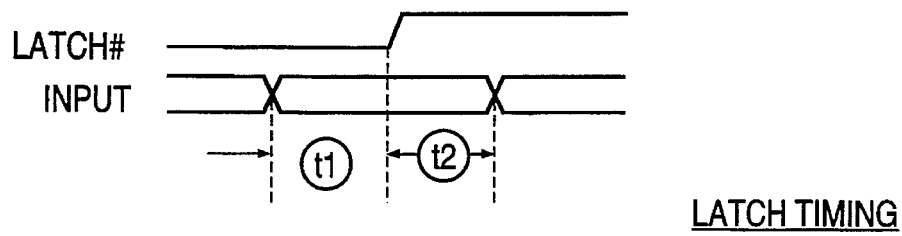
Figure 43D:
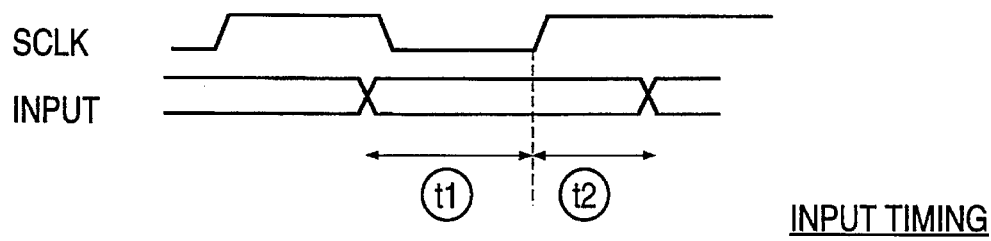

One feature of the Advanced Data Path is concurrent dirty line write-back as shown in FIG. 42. A "dirty" line is one modified by the CPU for copy-back of cache data. As shown, the IDMA (Advanced Data Path) is used in a system. In step 1, the processor performs a read that is a cache miss. Memory read fills the ADP FIFO while the cache controller evicts the dirty line to the ADP write FIFO. In step 2, the cache controller supplies the CPU and cache with requested data while dirty data is written to memory FIFO. In step 3, the memory controller empties the FIFO into DRAM.

86C120 ISA DMA CONTROLLER

1 OVERVIEW

The ISA DMA Controller (IDMA) integrates the complete ISA interface specific functions for 386 and 486 based systems. In conjunction with a data buffer part (IDATA) and with two other (CMC—Cache/Memory controller, PIC—Peripheral Interface Controller) devices it implements the complete mother board logic for ISA systems.

3 FUNCTIONAL BLOCKS

Figure 37A:
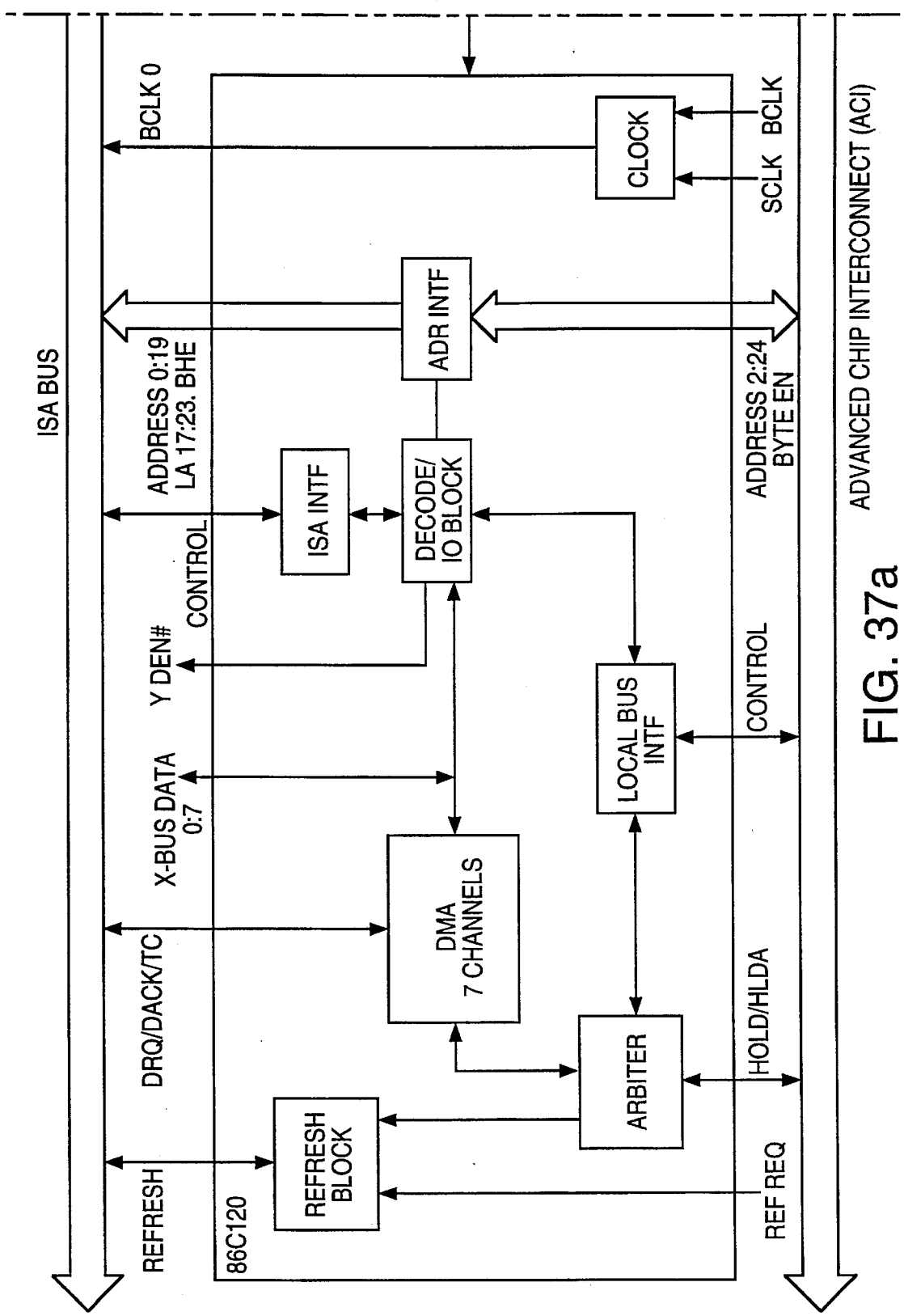
FIG. 37 is a DMA controller block diagram.
Figure 37B:
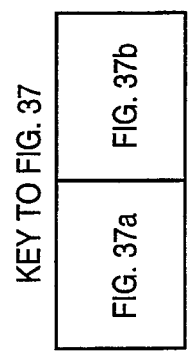
Figure 37B:
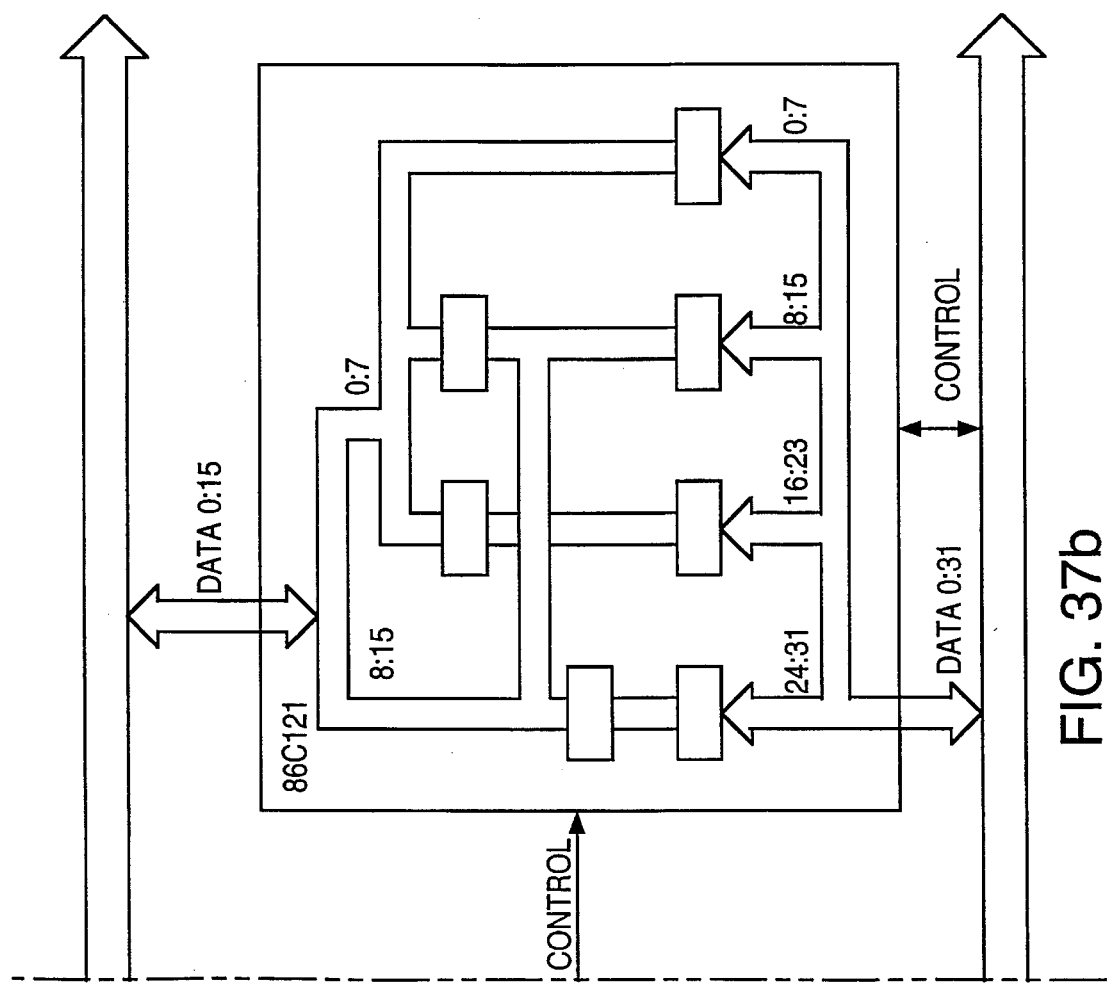
Figure 38E:
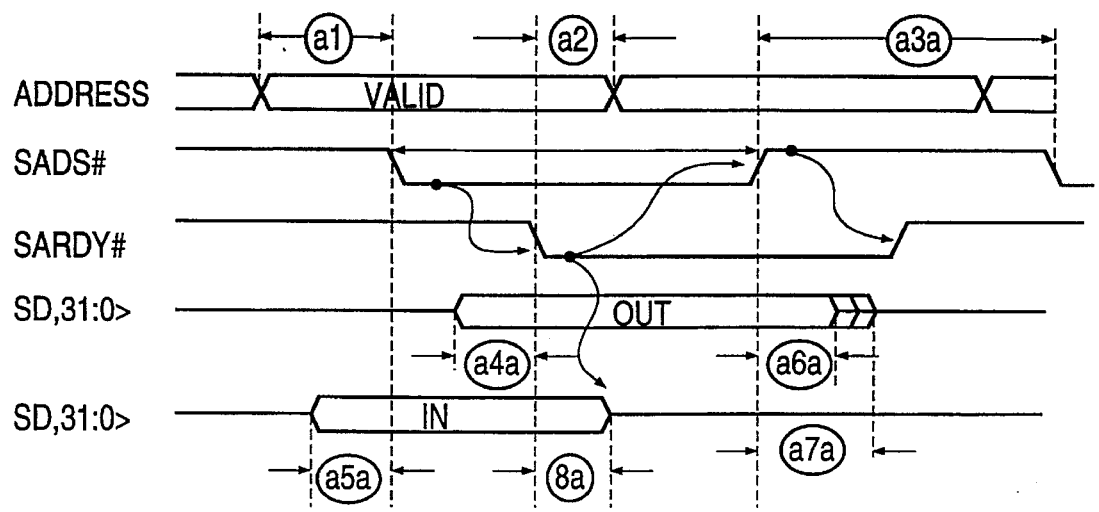
Figure 38F:
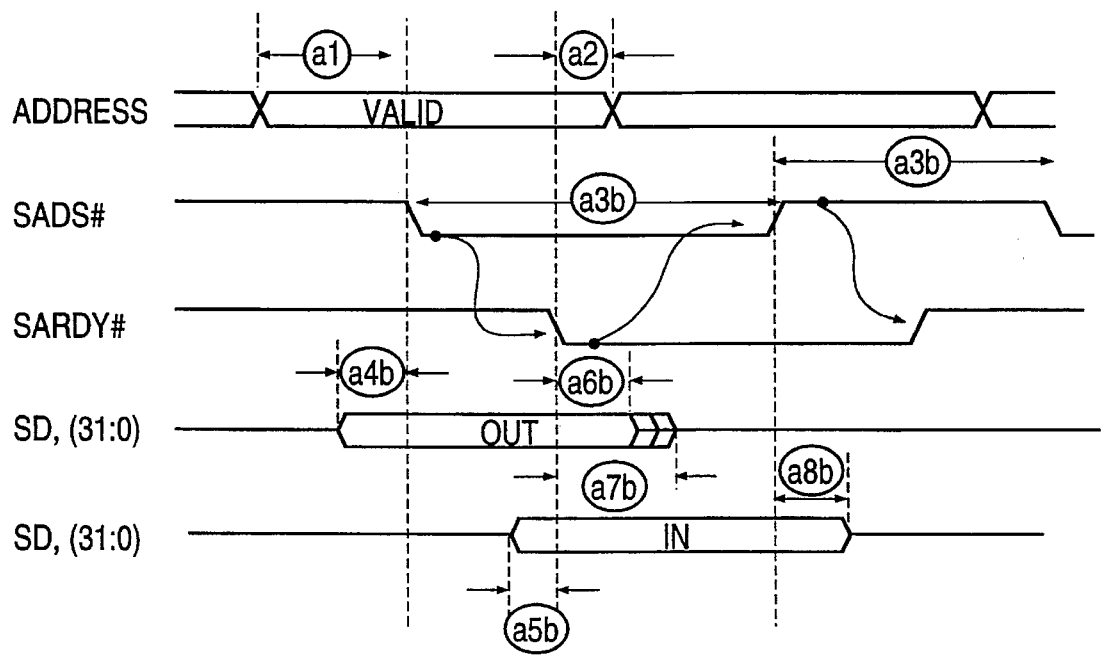
Figure 38G:
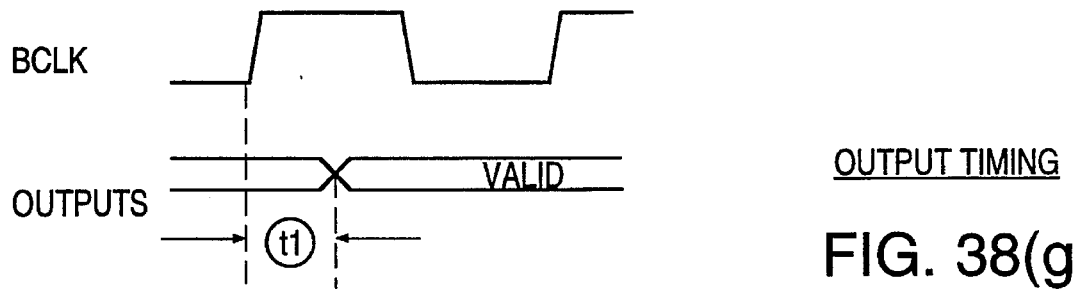
Figure 38H:
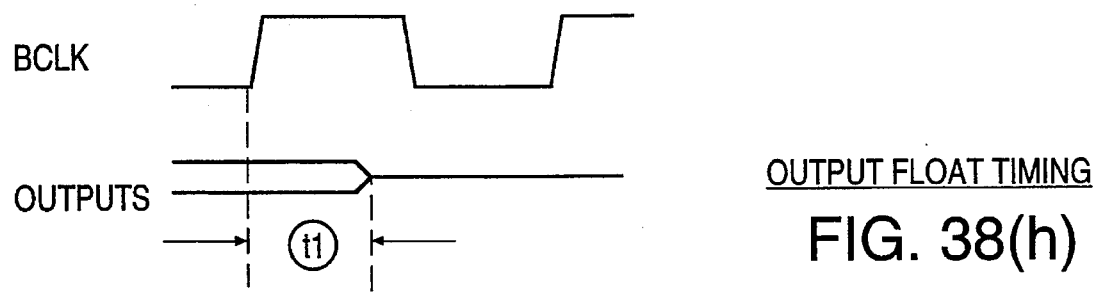
Figure 38I:
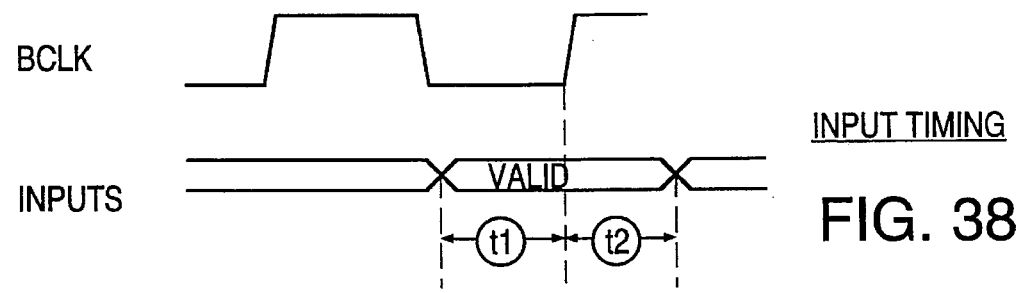
Figure 38J:
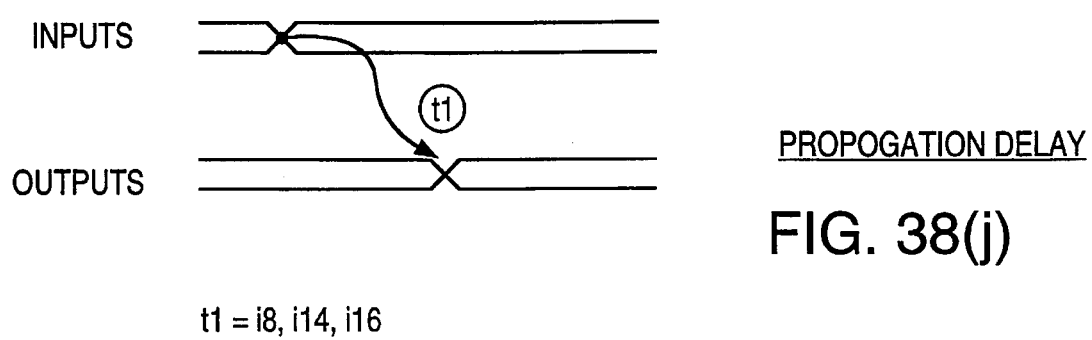

The following are the major functional blocks in the IDMA and its companion part the 86C121 as shown in FIG. 37.
    ACI Bus Interface (LBIF)
    ISA Interface (IIF)
    Address Interface (ADRIF)
    ISA DMA Controller (IDMA)
    Decodes (DECODE)
    IO Block (IOBLK)
    Miscellaneous (MISC)

3.1 ACI Bus Interface (LBIF)

The LBIF interface responds as a slave during CPU cycles to the ISA. The LBIF acts as a Master (on the ACI bus) during DMA or ISA-Master cycles to the mother board memory. When the LBIF acts as a Master it follows the complete protocol of the LB.

The IDMA part can operate synchronous or asynchronous to the ACI bus. The ISA Clock(BCLK) can be synchronus to SCLK or be generated by an independent oscillator. These combinations allow three system interface options. The different modes of operation are listed under the section on "Clock Modes".

The IDMA device presents a full 32-bit interface on the ACI bus. Mismatches between 32-bit transfers initiated by the ACI bus and the 16-bit ISA are handled by running multiple cycles on the ISA. The IIF block handles this function.

When enabled, the LBIF will buffer all Memory and/or IO Write cycles to the ISA in a 1-deep write buffer.

3.2 ISA Interface (IIF)

The ISA interface implements the bus controls for the ISA for the following cycles:
1. CPU-ISA Accesses
2. ISA Master-Motherboard Memory Accesses
3. ISA DMA cycles It generates the appropriate control signals on the ISA to complete the transfer. All timings on the ISA interface are referenced to the ISA clock, BCLK. The ISA timings are compatible to the 8 Mhz PC AT.

FIGS. 38(a) to 38(j) show as labelled timing diagrams for the ACI and ISA.

A 2.5 BCLK 'recovery' time is provided for back-to-back CPU IO cycles to the ISA. This allows correct operation of the ISA compatible IO devices. 2.5 BCLK is the delay between the trailing edge of IORC# or IOWC# to the leading edge of the next IORC# or IOWC#. The delay is not provided when multiple ISA cycles are run as a result of an ISA cycle. #ed. MRDC# is asserted in one and MWTC# in the other. Memory-Memory transfers can only be accomplished on Channels 0 and 1. For the PC AT memory-memory transfers can be initiated by the DMA controller however, no valid data will be transferred.

3. Verify transfers

Where a pseudo-read operation is initiated on the bus. i.e. all signals needed for a read transfer are activated except the command signals.

3.4.2 Transfer Modes

All the 8237 transfer modes are supported. The following lists the modes:
1. Single Transfer
2. Block Transfer
3. Demand Transfer
4. Cascade Auto-initialization for the channels is supported. Fixed and rotating priority for arbitrating amongst requests is supported.

3.5 IO Block (IOBLK)

The IO Block includes IO registers implemented in the IDMA device. Access to these registers is through ISD<7:0> data lines. The registers can only be accessed 8-bits at a time.

3.6 Miscellaneous (MISC)

This block implements the configuration, mode selection and other logic.

4 BUS CYCLES

The ISA bus cycles are always run synchronous to BCLK. The frequency of BCLK can vary from 8–8.33 Mhz in the system depending upon the implementation. The following lists the parameters for optimum performance.

| ( all numbers in BCLK ) | | | | | |
|---|---|---|---|---|---|
| Bus Cycle | M16 | MB | IO16 | IO8 | INTA |
| Standard Cycle | 3 | 6 | 3 | 6 | 6 |
| Each Wait State | 1 | 1 | 1 | 1 | 1 |
| NOWS Cycle | 2 | 3/4/5 | — | 3/4/5 | 3/4/5 |
| DMA Cycles | 8 | 8 | 8 | 8 | — |
| Each Wait State | 2 | 2 | 2 | 2 | — |

Figure 39:
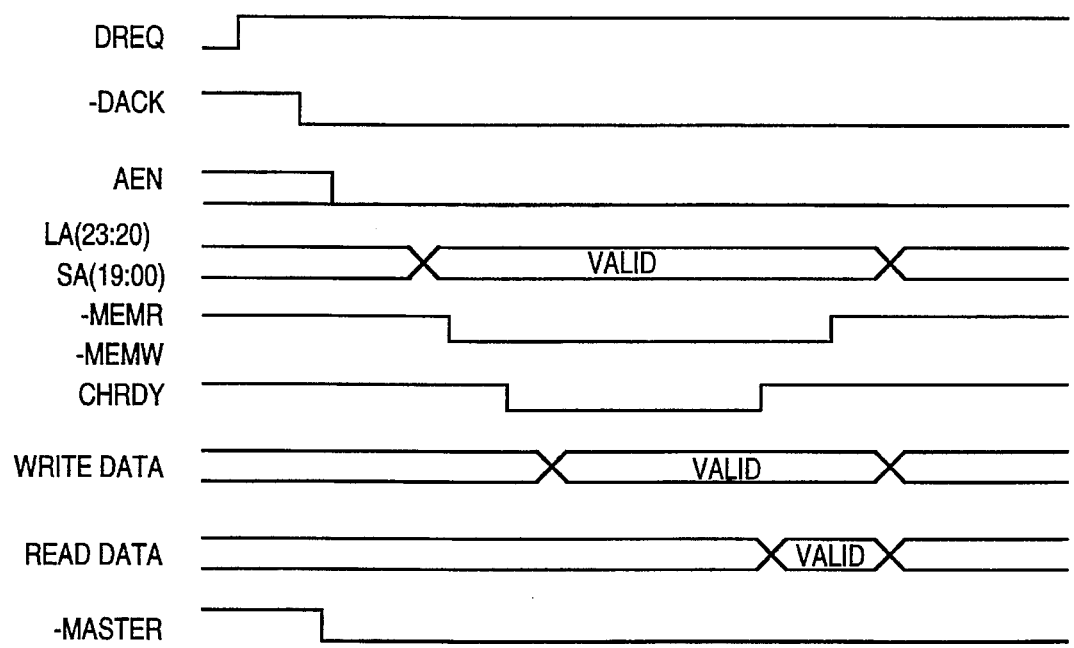
Figure 40:
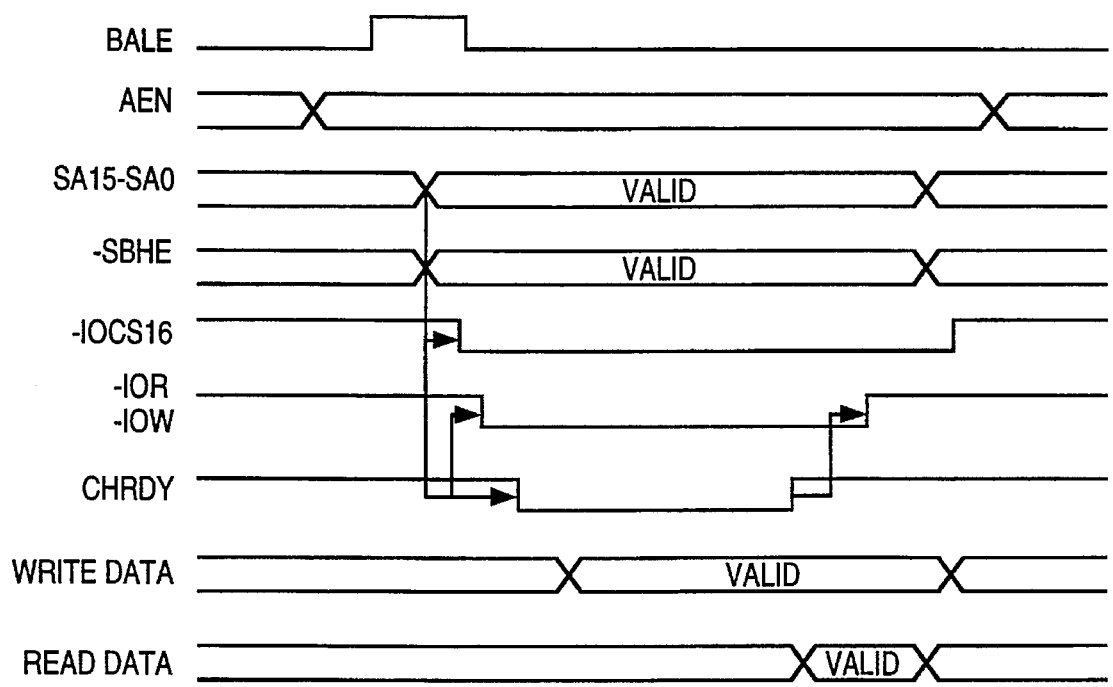
Figure 41:
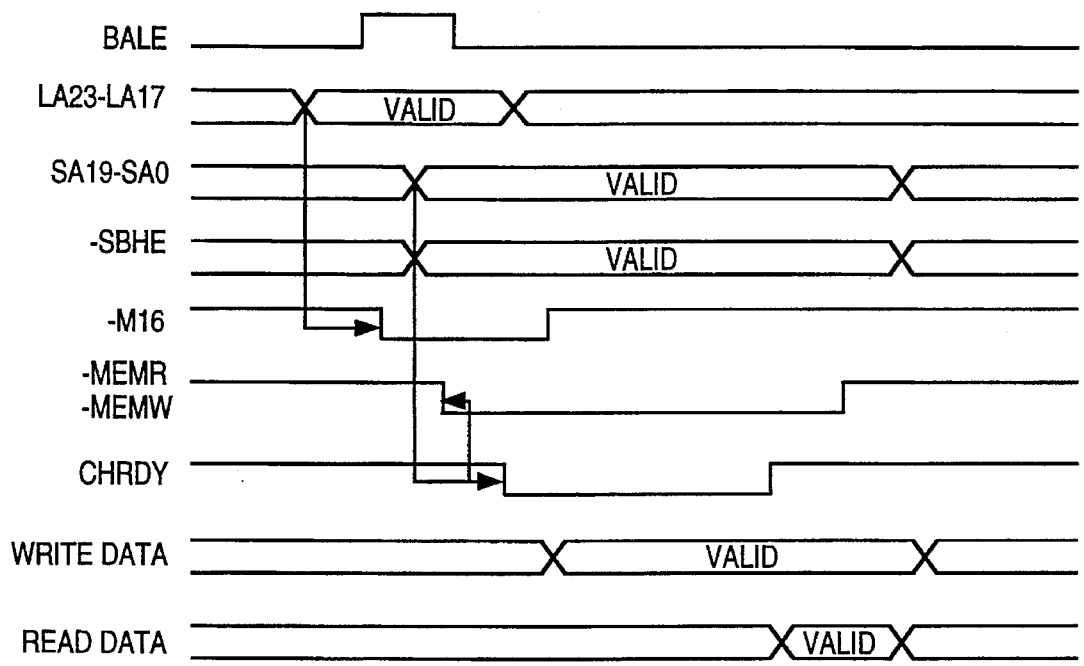

FIG. 39 shows a timing diagram for an ISA arbitration. FIG. 40 shows a timing diagram for an ISA I/O cycle. FIG. 41 shows a timing diagram for an ISA memory cycle.

| TRANSFER RATES | | | | |
|---|---|---|---|---|
| (All numbers are in MBytes/sec @ BCLK = 8 Mhz) | | | | |
| Bus Cycle | M16 | MB | IO16 | IO8 |
| Peak ( NOWS ) | 8 | 2.66 | 5.32 | 2.66 |
| Standard | 5.32 | 1.33 | 5.32 | 1.33 |
| DMA Peak | 2.66 | 1.33 | 2.66 | 1.33 |

5 FEATURES DESCRIPTION
5.1 System Interface

The IDMA offers the options of different system interfaces thus allowing the system designer flexibility to use the same part in systems with different cost, performance, feature requirements.

5.1.1 Clock Modes

The primary clock for the ACI bus (SCLK) and the ISA (BCLK) are different. The following options available to determine the relationship between the two buses. Irrespective of the relationship, the ISA clock operates at (about) 8 Mhz to maintain compatibility with the ISA timings.

1. Sync LB, Sync ISA Mode.

The LB interface is synchronous to SCLK. BCLK is generated from SCLK.

BCLK is generated by dividing-down SCLK. The divisor is programmable. The frequency of BCLK can range from 8–8.33 Mhz depending upon SCLK.

2. Sync LB, ASync ISA Mode.

The LB interface is synchronous to SCLK. BCLK is derived from a fixed 8 Mhz source. An external oscillator is required.

3. ASync LB, ASync ISA Mode.

The LB interface is asynchronous to SCLK and synchronous to BCLK. BCLK is derived from a fixed 8 Mhz source. An external oscillator is required for BCLK.

5.1.2 Local Bus Interface

The IDMA can be configured to operate with a non-pipelined ACI bus or a pipelined ACI bus. The pipelined protocol is as defined for the local bus.

5.2 Buffered Operations

The IDMA provides the capability to decouple the ISA operations from the ACI bus. Different degrees of decoupling are available and can be programmatically selected. The following describes the capabilities.

5.2.1 Buffered Writes

Memory and/or IO writes to the ISA can be (optionally) buffered in a 1-deep write buffer. This minimizes the wait states for the local CPU on write operations to the ISA.

5.2.2 Decoupled Refreshes

Refreshes for the ACI and ISA memory are decoupled. In the 'decoupled' mode, the local CPU continues to operate on the ACI bus while an ISA refresh is being performed. This assumes that the ACI bus memory refreshes are handled independent of the ISA.

This mode of operation enhances the CPU performance in the system.

5.2.3 Burst Refreshes

In ISA systems refreshes may not get serviced in the 15 us interval due to an on-going DMA or Master transter. The IDMA queues up the refresh requests. Once it gets hold of the bus it will perform back-to-back refreshes.

This ensures that none of the requests are lost and also minimizes the arbitration overhead per refresh cycle.

6 HARDWARE INTERFACE
6.1 Hard Configuration

The IDMA requires hard-configuring the following modes of operation of the device. The table below shows the pins which are sampled at powerup to determine the configuration.

| | |
|---|---|
| SA20M# | |
| | = 0 386 type encodings. |
| | = 1 486 type encodings. |
| HOLD | |
| | = 0 ACI Bus interface is ASynchronous. |
| | = 1 ACI Bus interface is Synchronous. |
| WRILE# | |
| | = 0 Pipelined ACI bus. |
| | = 1 Non-Pipelined ACI bus. |
| WROLE# | |
| | = 0 ISA interface is ASynchronous. |
| | = 1 ISA interface is Synchronous. |

These signals have a 10 k ohm pullup/pulldown on the system board to allow the proper configuration to be sampled.

6.2 BCLK generation

The IDMA generates BCLK when the IDMA is configured for the ISA-Sync mode of operation.

In this mode, the IDMA may extend the high/low time of BCLK to optimize the transfer timings under the following conditions:

1. For ACI-bus initiated cycles to ISA.

High-time is extended is SADS# is sampled at the right time.

Low-time is extended when SRDY# is about to be generated on ACI.

6.3 Address Decoding

Any resource that does not exist on the ACI bus defaults to the ISA. The IDMA will generate ISA cycles for these and will generate the 'ready' on the ACI bus. This includes decoding the complete CSR space.

The only exception to this are resources above the 16 MByte address i.e. from FFFF,FFFF–0100,0000 h, since the IDMA does not have access to a full 32-bit address. For accesses above 16 MByte, the 'ready' for the cycles has to be generated externally (CMC/Memory controller).

6.3.1 ROM Addresses

In ISA systems the BIOS can be accessed at 3 address ranges.

| | |
|---|---|
| FFFF,FFFF - FFFE,0000 | Top ROM |
| 00FF,FFFF - 00FE,0000 | Med ROM |
| 000F,FFFF - 000E,0000 | Bot ROM |

Accesses to the 'Top ROM' always go to the physical ROM. Accesses to the 'Med ROM' can be selected to go to the physical ROM (default) or to the RAM as selected by the BIOS Copy Register, DIS16M bit. Accesses to the 'Bot ROM' are controlled by the BIOS Copy Register.

7 SOFTWARE INTERFACE

The IDMA includes several modes of operation. The hard-configured modes of operation have to be selected at powerup through strapping options.

In addition to these, several modes can be selected through the software programing of the IDMA. The following section describes the software features of the IDMA.

7.2 Configuration and Status Registers

These are a set of IO registers defined to implement the programming of specific features in a manner transparent to the existing PC software.

The CSR's are accessed via 4 IO locations:

| | |
|---|---|
| 0023h, 0022h | Device i.d. ( 0062h for IDMA ) |
| 0026h | Index |
| 0027h | Data port for CSR. |

The address of the CSR is programmed in locations 0022, 0023 and 0026h. The data for the CSR is transferred through port 0027h.

The following table shows the CSR map for the IDMA. Detailed description of each register follows.

| Index | Register | | Function |
|---|---|---|---|
| 00 | FIDR0 | ro | Functional i.d. low |
| 01 | FIDR1 | ro | Functional i.d. high |
| 02 | DIDR0 | rw | Programmable Func. i.d. low |
| 03 | DIDR1 | rw | Programmable Func. i.d. high |
| 04 | IDXRG | rw | Index Register (same as 0026) |
| 05 | DR0 | rw | Device Register low (same as 0023) |
| 06 | DR1 | rw | Device Register hi (same as 0023) |
| 07 | CREV | ro | Chip Revision Number |
| 0F:08 | Reserved | | |
| 10 | BMOD | rw | Broadcast Mode Register |
| 11 | SCTL | rw | System Control Register |
| 1F:12 | Reserved | | |
| 20 | TOM0 | rw | Top of Memory low |
| 21 | Reserved | | |
| 22 | CHRAMB0 | rw | Channel RAM Base Address 0 |
| 23 | CHRAMB1 | rw | Channel RAM Base Address 1 |
| 24 | CHRAMS | rw | Channel RAM Size |
| 25 | Reserved | | |
| 26 | BIOSC | rw | BIOS Copy Register |
| 27 | Reserved | | |
| 28 | ADVID | rw | Video Region Address |
| 29 | Reserved | | |
| 2F:2A | Reserved | | |
| 30 | ADPROM0 | rw | Channel ROM Address, block 0 |
| 37:31 | ADPROMn | rw | Channel ROM Address registers for block 1 to 7 |
| 40 | SPIOA0 | rw | Special IO A, block 0 |
| 41 | SPIOB0 | rw | Special IO B, block 0 |
| 42 | SPIOC0 | rw | Special IO C, block 0 |
| 43 Reserved 5F:44 | SPIOxn | rw | Set of 4 special IO registers per block for block 1 to 7 |
| 7F:60 | Reserved | | |
| 80 | LIF | rw | Local Bus Interface Register |
| 81 | IOIF | rw | IO Bus Interface Register |
| 82 | CKGEN | rw | Clock Generation Register |
| 83 | BUFOP | rw | Buffered operation Select |
| FD:84 | Reserved | | |
| FE | TSTCONF | rw | Test Configuration Register |
| FF | TSTSTAT | rw | Test Status register. |

7.2.1 Functional i.d. High, Low
CSR:<1:0> R/O

These registers contain the functional i.d. of the IDMA. The IDMA responds to CSR operations when the i.d. of the operation matches its functional i.d until the Programmable Functional i.d. gets programmed.

The value in these registers is 00,62.

7.2.2 Programmable Functional i.d. High,Low
CSR:<3:2> R/W

Once both these registers are programmed, the IDMA responds to CSR operations whose i.d. matches these registers. It no longer responds to the i.d. programmed in the FIDR registers.

Poweron default = 00,62h

7.2.3 Index Register
CSR:4   R/W

This register is the same as IO port 0026.
Poweron default = 0000,0000

7.2.4 Device Register High, Low
CSR:<6:5> R/W

These registers are the same as ports 0023 and 0022h.
Poweron default=0000,0000.

7.2.5 Chip Revision Number Register
CSR:7 R/O

This register contains the rev. no. of the IDMA.
The value will change according to the revision number of the IDMA.
Current Poweron default=0000,0000

7.2.6 Broadcast Mode Register
CSR:10 R/W

This register has two modes of operation.

The register will get updated during writes to index 10 irrespective of the i.d.'s programmed. During reads from index 10, IDMA will respond with data only if the i.d. programmed matches its i.d.

| bits | | |
|---|---|---|
| 7 | SPEC | Specific decodings. |
| | | = 0, Specific decodings are not supported. |
| | | = 1, Specific decodings are supported. |
| <6:2> | Reserved | |
| 1 | CSETEN | CSR Setup enable |
| | | = 0, All CSR's except CSR:<1F:10> are disabled. |
| | | = 1, All CSR's are enabled. |
| 0 | NCSREN | |
| | | = 0, Programming thru 22,23,26,27 enabled. |
| | | = 1, Programming thru 22,23,26,27 disabled. |

Poweron default = 0000,0000

7.2.6 System Control Register
CSR:11 R/W
bits

| 7 | TURBO | Turbo mode support |
|---|---|---|
| | | = 0 System emulates a 6/8 Mhz PC AT. |
| | | = 1 System runs at full speed. |
| <6:2> | Reserved | |
| 1 | FASTA20 | Fast A20 Gate |
| | | = 0 Mask A20 |
| | | = 1 Pass A20. |
| 0 | HOTRST | Hot Reset |
| | | = 0 No Reset |
| | | = 1 CPU Reset |

Poweron default = 1000,0000

The TURBO feature is implemented outside the IDMA.
FASTA20 is OR'ed with the KYBDA20 and is used to drive SA20M#. The logical representation of the design is:

SA20M=(FASTA20 or KYBDA20)

7.2.7 Top of Memory Register low
CSR:20 R/W

This register shows the top of the ACI memory in 1 Mbyte increments. Any memory above this defaults to the ISA. The software programs the address bits <23:20> corresponding to the top of the memory e.g. to indicate that the ACI memory range is 002F,FFFF–0000,0000, TOM0 will be programmed as 20h.

bits
    7:4 Correspond to address bits <23:20>    3:0 Reserved
    Power-on Default = 0000,0000

The system powers up assuming 1 MByte of memory is present on the ACI bus.

7.2.8 Channel RAM Registers
CSR:<25:22> R/W

These registers allow selection of one region of memory between 0 and 16 Meg to reside on the ISA. This allows operation of adapter cards with memory mapped peripherals in the 0–16 MByte range. Note: Usage of this register is redundant if the region to be dedicated for channel RAM is above the Top of Memory.

CHRAMB is used to set the Base Address of the region and also indicates whether the region is enabled. CHRAMS is used to set the size of the region. The size of the region is programmable in 16 k increments up to a maximum of 4 MByte.

CHRAMB<1:0> are treated as a 16-bit register.

bits
    15:6              binary encoding of base address.
    5:1     Reserved
    0       ENCHRAM
                      = 0, Channel RAM region is disabled.
                      = 1, Channel RAM region is enabled.
Poweron default = 1000 h bits <15:6> correspond to address bits <23:14>. Therefore if a hole has to created at address 01,0000h, bits <15:6> are 0000,0001,00.

CHRAMS indicates the size of the region.
bits
    <7:0>   binary encoding of the size
Power on default = 0000,0000
Size of the region = (CHRAMS+1) * 16k
e.g. if a 16K region is desired, CHRAMS = 00h.

7.2.9 BIOS Copy Register
CSR:26 R/W

This register aids in copying the BIOS region 000F, FFFF–000E,0000 from PROM to RAM. Reads and Writes to this region can be selected to occur at the ISA PROMs or the ACI memory.

bits
    7       DIS16M  Disable ROM at 16 Meg ( ISA specific )
                    = 0 Mem Address at 00FF,FFFF – 00FE,0000 h are treated as ROM.
                    = 1 Mem Address at 00FF,FFFF – 00FE,0000 h are treated as RAM.
    <6:2>           Reserved
    1               NPRCHWR
                    = 0, Writes go to ISA.
                    = 1, Writes go to ACI memory.
    0               NPRCHRD
                    = 0, Reads come from ISA.
                    = 1, Reads come from ACI memory.
Poweron default = 0000,0000

7.2.10 Video Region Address Register
CSR:28 R/W

The Video Region Address register allows selecting the four 32K video RAM regions,

| | |
|---|---|
| 000A,7FFF - 000A,0000 | Region 0 |
| 000A,FFFF - 000A,8000 | Region 1 |
| 000B,7FFF - 000B,0000 | Region 2 |
| 000B,FFFF - 000B,8000 | Region 3 | to be on the ACI bus or the ISA.

bits
    7   VIDWR
        = 0, Video Writes propagate to ISA.
        = 1, Video Writes stay on ACI Bus.
    6   EN8514
        = 0, 8514 IO Region on ISA.
        = 1, 8514 IO Region on ACI Bus
    5   ENVGA
        = 0, VGA IO Region on ISA
        = 1, VGA IO Region on ACI Bus
    4   ENMDA
        = 0, MDA IO Region on ISA
        = 1, MDA IO Region on ACI Bus
    3   REG32K3
        = 0, Region 3 on ISA
        = 1, Region 3 on ACI bus.
    2   REG32K2
        = 0, Region 2 on ISA
        = 1, Region 2 on ACI bus.
    1   REG32K1
        = 0, Region 1 on ISA
        = 1, Region 1 on ACI bus.
    0   REG32K0
        = 0, Region 0 on ISA
        = 1, Region 0 on ACI bus.
Poweron default = 0000,0000

In addition to the EN8514, ENVGA, ENMDA and REG32K [3:0] bits controlling access to the video region, the VIDWR bit controls whether IO/Memory Writes to the video region propagate to the ISA or stay on the ACI bus. This is to allow compatibility with Video adapter cards that monitor the CPU write cycles to the Video to perform their functions.

7.2.11 Adapter ROM Address<7:0>
CSR:<37:30> R/W

These 8 registers are used to select for each 2K block in the range 000D,FFFF–000C,0000 whether the block is on the ISA or the ACI memory.

Each bit represents one 2K block. For each bit

0=block is on ISA.

1=block is on the ACI bus.

The 64-bits from the 8, 8-bit registers is used to represent the complete range.

e.g. CSR:30 bit0 represents 000C,07FF–000C,0000

CSR:37 bit7 represents 000D,FFFF–000D,F800

Poweron default for each register=0000,0000

7.2.12 Special IO Registers
CSR:<5F:40> R/W

These registers are used to select for 8 blocks of IO each at a 4-byte boundary whether the block resides on the ACI bus or ISA. Each block can have a size from 1 bytes to 128 bytes.

For each block 3 registers are used. e.g. For block 0 SPIOA0 (CSR:40), SPIOB0 (CSR:41) and SPIOC0 (CSR:42) are used. SPIOA0, SPIOB0 and SPIOC0 are described here, the rest of the sets are similar to these.

SPIOB0, SPIOA0 are treated as one 16-bit register and define the base address of the IO region at any 4-byte boundary. They also indicate whether the region is enabled on the ACI bus or not and whether the X-buffer has to be enabled for reading/writing to this address range.

```
bits
    <15:2>      IO address bits <15:2>
    1   ENBUF
            = 0, X-Buffer enabled for this range.
            = 1, X-buffer disabled for this range.
    0   ENSP0
            = 0, Special Register for block 0 disabled.
            = 1, Special Register for block 0 enabled.
Power on default = 0000 h
``` e.g. to set the base at address 0504h, with X-buffer enabled.

SPIOB0,SPIOA0=0505h

SPIOC0 determines the size of the region.

```
bits
    7   Reserved    <6:0>   binary encoding of the
size.
Poweron default = 0000,0000.
```

Size of the region=(SPIOC0+1). e.g. to select a size of 5 bytes, SPIOC0=04h.

ENBUF and ENSP0 are used to determine the configuration of the Special IO Blocks in the system. The following shows the different configurations:

| ENBUF | ENSP0 | |
|---|---|---|
| 0 | 0 | IO Block on ISA, Buffer disabled. |
| 0 | 1 | IO Block on the ACI bus, Buffer disabled. |
| 1 | 0 | Illegal |
| 1 | 1 | IO Block on the ACI bus, Buffer enabled. |

The "11" combination occurs when the IO device (selected by the IO range) resides on the ACI bus but does not support byte steering. The byte steering is supplied by the X-bus interface logic.

7.2.13 Local Bus Interface Register
CSR:80 R/W

This register allows selection of the characteristics of the ACI bus interface. Some of the bits are hard-configured and are Read-Only.

```
bits
    7       R/O     MODE486
                        = 0, 386 type ACI bus.
                        = 1, 486 type ACI bus.
    6       R/O     LB
                        = 0, Pipelined ACI bus.
                        = 1, Non-Pipelined ACI bus.
    5               Reserved
    4       R/O     SYNCLB
                        = 0, Asynchronus ACI bus.
                        = 1, Synchronus ACI bus.
    <3:2>           Reserved
    <1:0>   R/W     WIN[1:0] encoding of no. of clocks
                    allowed for decodes.
Power-on Default = xx0x,0011
```

WIN[1:0] selects the no. of clocks allowed for decodes including the SADS# clock.

No. of clocks=WIN[1:0]+2.

The minimum number is 2 SCLK's, the max. allowed is 5 SCLK's.

7.2.14 IO Bus Interface Register
CSR:81 R/W

This register allows selection of the characteristics of the IO Bus interface. Some of the bits are hard-configured and are Read-Only.

```
bits
    <7:1>           Reserved
    0       R/O     SYNCISA
                        = 0, ASynchronus ISA interface.
                        = 1, Synchronus ISA interface.
Poweron default = 0000,0000
```

7.2.15 Clock Generation Register
CSR:82 R/W

CKGEN provides programming of the clock divisor for generating BCLK from SCLK.

```
bits
    <7:4>           Reserved
    <3:0>           Binary encoding of the divisor.
Poweron default = 0000,0110
```

Note: The only valid values that can be programmed as divisors are 1, 3, 4, 5 and 6. If any other value is programmed, the IDMA will default to 6.

Typical values at different frequencies are

| MHz | bits<3:0> |
|---|---|
| 20 | 0011 |
| 25 | 0011 |
| 33 | 0100 |
| 40 | 0101 |
| 50 | 0110 |

7.2.16 Buffered Operation Select
CSR:83 R/W

The BUFOP register is used to program the IDMA and IDATA for buffered operations.

```
bits
    <7:2>   Reserved
    1       BUFIO
                = 0, IO's are unbuffered
                = 1, IO's are buffered.
    0       BUFMEM
                = 0, Mem operations are unbuffered.
                = 1, Mem operations are buffered.
Poweron default = 0000,0000
```

7.2.17 Refresh Control Register
CSR:84 R/W
Reserved

7.2.17 Test Configuration Register
CSR:FE R/W

The test configuration register allows enabling the on-chip test modes of the IDMA. These modes are only to be used to aid in factory testing of the device. These should not be used during normal operation of the device.

```
bits
    7       TSTEN       Test Enable
                            = 0, Test mode disable
                            = 1, Test mode enable
    <6:0>   TSTCD       Binary encoding of the test modes.
Poweron default = 0000,0000
TSTCD                   Mode
0                       Reset DMA Block
3F-1                    Not Implemented
```

The test mode descriptions are TBD.

7.2.18 Test Status Register
CSR:FF R/W

The Test Status register shows the status of the on-chip tests. The format of this register is TBD.

8 INITIALIZATION

The IDMA has to be set in the correct 'hard configuration' before powering up. At powerup the IDMA comes up in a configuration assuming 1 MByte of RAM on the ACI bus and the rest on the ISA.

All the configuration registers have to be programmed to their proper values before the IDMA can be used.

9 TESTING

Chip-level tests are accomplished by programming the chip in the test mode through the Test Configuration and the Test Status register.

(86C121) ISA DATA PATH

1. OVERVIEW

The 86C121 ISA Data Path (IDP) integrates the complete ISA data buffer logic for 386 and 486 based systems. In conjunction with the ISA DMA Controller (IDMA) part and with two other (CMC—Cache/Memory controller, PIC—Peripheral Interface Controller) devices it implements the complete mother board logic for ISA systems.

2. PIN DESCRIPTION

| LB Data | | Total = 32 |
|---|---|---|
| Signal | Type | Description |
| SD<31:0> | IO | ACI bus data. |
| ISA Data | | Total = 16 |
| Signal | Type | Description |
| ISD<15:0> | IO | ISD<15:0>is the 16-bit ISA data bus. The IDMA is responsible for correctly steering the data whenever data is transferred between the 32-bit ACI bus and the 16-bit ISA. |
| Data Path Controls | | Total = 18 |
| Signal | Type | Description |
| SRESET | I | System Reset on the ACI bus. It resets the internal logic. |
| SCLK | I | Clock on the ACI bus. In the IDMA synchronous mode of operation, CLK is used to latch the data in the SD -> ISD transfers. |
| SRDY# | I | 'Ready' on the ACI bus. In the IDMA synchronous mode of operation, SRDY# is used to latch the data in the SD -> ISD transfers. |
| SBRDY# | I | 'Burst Ready' on the ACI bus. In the IDMA synchronous mode of operation, SBRDY# is used to latch the data in the SD -> ISD transfers. |
| SWAIT# | I | 'Wait' signal on the ACI bus. When asserted, NSRDY is ignored. |
| ENWRLE# | I | 'Enable Write Latch'. During DMA/Master reads from the ACI memory (SD -> ISD), the SD<> data is latched when ENWRLE# and SRDY# are found to be simultaneously asserted. once the data is latched, it stays latched as long as WRILE# is in the latching mode. |
| WRILE# | I | 'Write-Input-Latch-Enable'. Latches the write-data to provide a 1-deep write-buffer for SD -> ISD transfers. |
| WROLE# | I | 'Write-Output-Latch-Enable'. Latches the write-data to provide data hold time during writes to the ISA. |
| WREN#<1:0> | I | 'Write-Enable'. These signals enable bits <15:8> and <7:0> respectively of the ISD<15:0> during SD ISD data transfers. |
| RDLE#<3:0> | I | 'Read-Latch-Enable'. These signals latch data bits <31:24>, <23:16>, <15:8> and <7:0> respectively during ISD -> SD data transfers. |
| RDEN# | I | 'Read-Enable'. This signal enables data on to the SD<> bus during ISD -> SD data transfers. |
| SWPDIR | I | 'Swap-Direction'. This signal sets the direction for the swap when data transfer widths are mismatched during the transfer. SWPDIR = 1 SD -> ISD = 0 SD <- ISD |
| SWPEN#<2:0> | I | 'Swap Enable'. These signals enable the swap when the data widths are mismatched during the transfer. |
| SWPEN2# - | | Swap between byte 3 and byte 1. |
| SWPEN1# - | | Swap between byte 2 and byte 0. |
| SWPEN0# - | | Swap between byte 1 and byte 0. |

3. FUNCTIONAL BLOCKS

FIG. 37 shows a block diagram of this device. The IDP device integrates logic to support the fast timings of the ACI bus. In the synchronous mode, fast clocked registers are needed to implement the equivalent logic in discrete. In the Asynchronous mode, the same logic can be implemented by 8 F543's and 3 F245's.

FIGS. 43(a) to 43(d) show as labelled timing diagrams for this device.

86C130 MCA DMA CONTROLLER

1.0. OVERVIEW

The 86C130 DMA controller is an enhancement over the DMA controller defined by IBM in the PS/2 systems. The DMA controller also integrates the address buffers between the Local Bus and the Micro Channel Bus. The DMA Controller interfaces to most busses. The DMA Controller provides 32 and 128 bit DMA transfers.

Figure 44B:
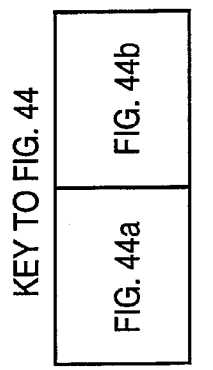
FIG. 44 is a DMA controller block diagram.
Figure 44B:
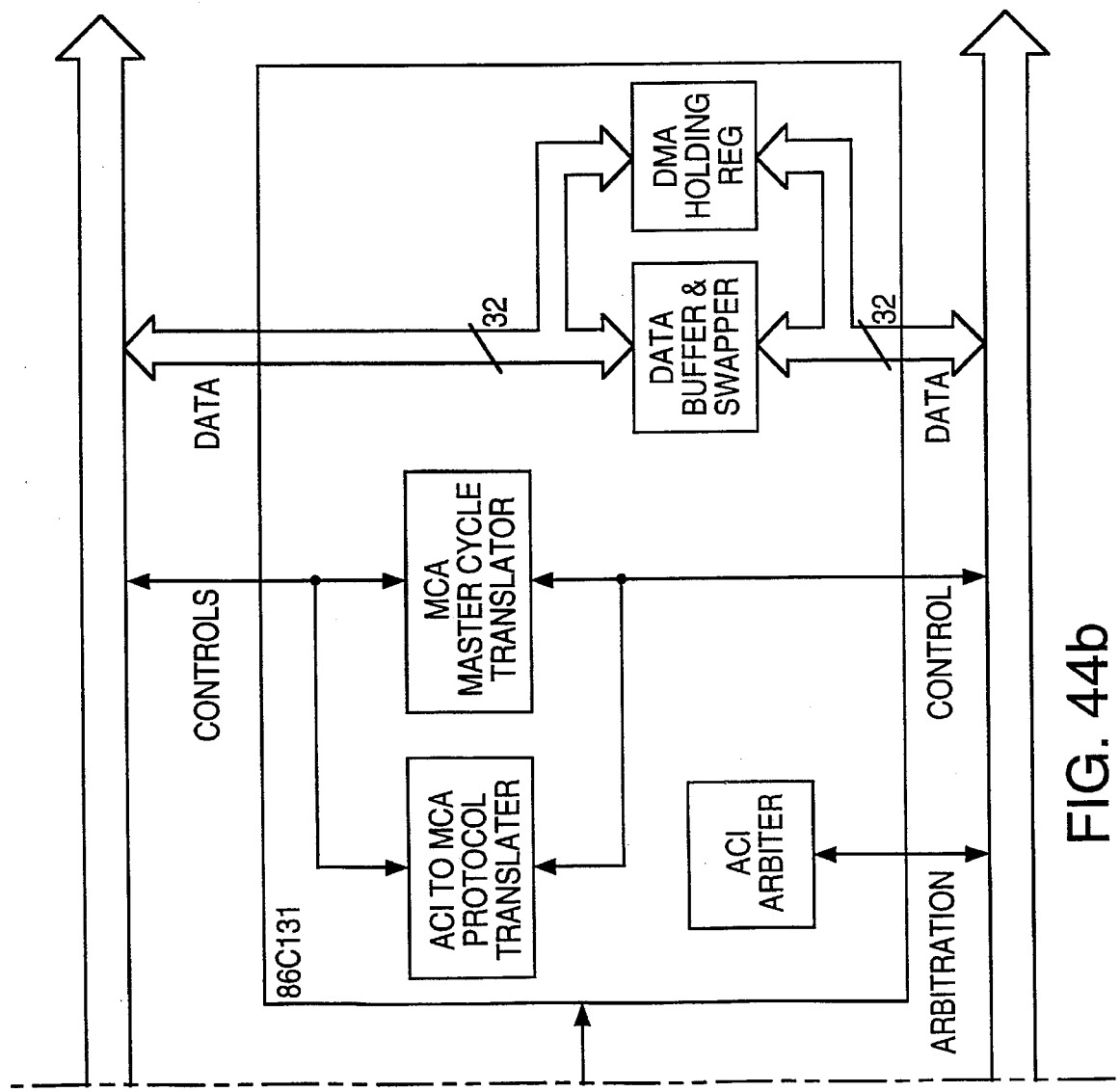
Figure 44A:
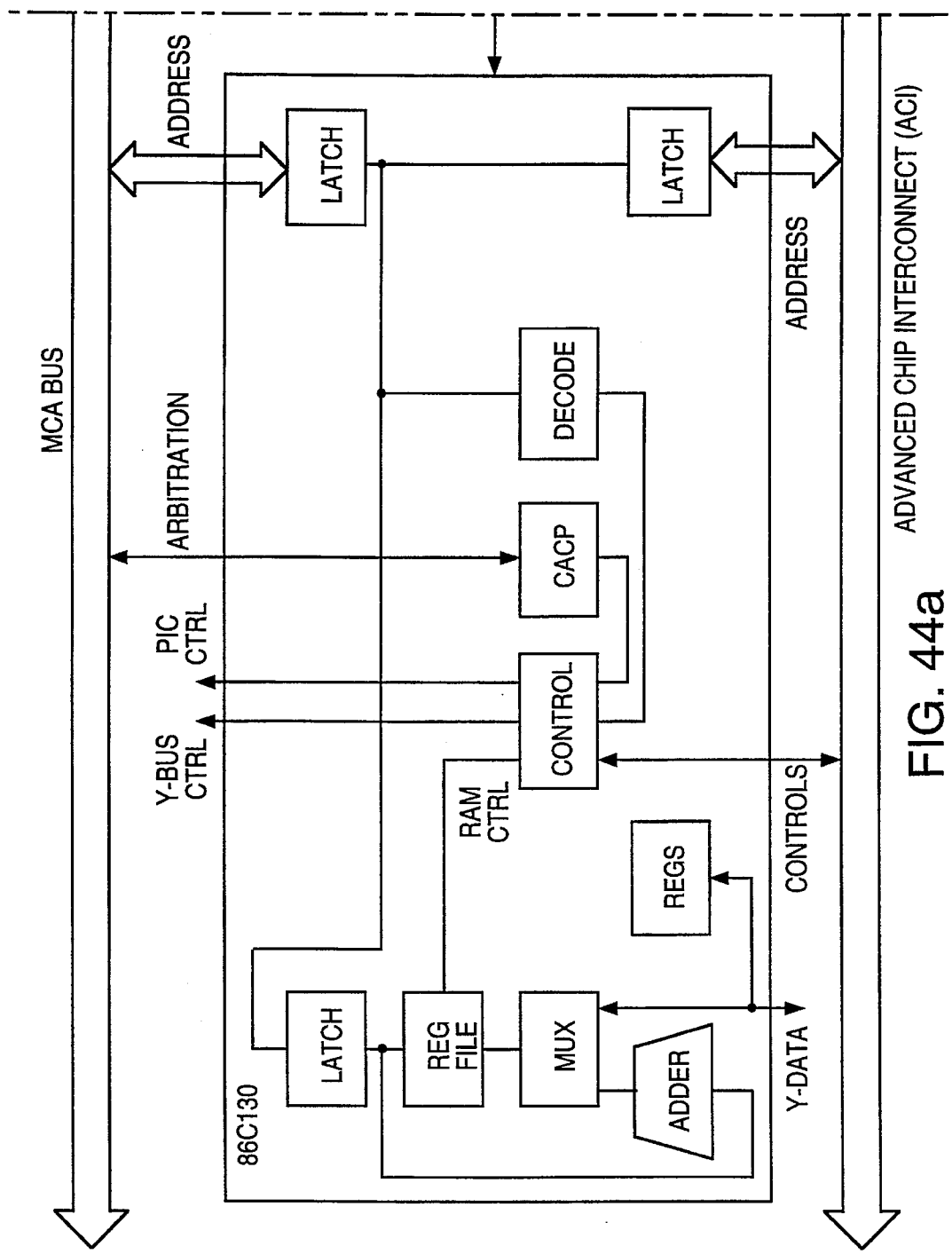

1.1. Major Functions:

FIG. 44 shows a block diagram of the DMA controller and its companion part the 86C131.

1.1.1 CACP Logic:

Provides the Arbitration logic for the Micro Channel. Also implements the Local Arbiter Logic for the Floppy.

1.1.2. DMA Logic:

Implements eight high speed DMA channels. All the channels are enhanced to support 32 bit address and 32 bit data transfers. Supports both the 8237 compatible mode and IBM enhanced mode programming for all the channels.

1.1.3. Address Buffers:

Address Buffers are integrated on chip to support posted writes onto the micro-channel bus.

1.1.4. Decode Logic:

All decode to determine whether memory/IO is on the Local bus or Micro-channel bus is implemented.

1.1.5. X Bus Interface:

Prom Decode, IOR, IOW, INTA required by the X bus are implemented.

3.0. GENERAL ARCHITECTURE

3.1. CACP

The CACP logic in the DMA Controller is implemented as defined in the IBM PS/2 Micro Channel Technical Reference for Models 50/60/80.

The main function of the CACP logic is to arbitrate for control of the Local Bus/Channel for the DMA slaves/masters on the Channel. A DMA slave/master on the Channel requests for control of the Local Bus/Channel by asserting PREEMPT# active low. The CACP logic detects this condition and drives ARBNGNT from low to high. This negative to positive transition on AREBngnt is an indication to all the DMA slaves/masters to drive their pre-assigned arbitration values on the ARB (3:0) lines.

ARBNGNT is defined to be a minimum of 300 ns to 750 ns. Within this time the lower priority DMA devices deassert their ARB lines and the highest priority DMA device continues to drive its ARB value on the bus. On the positive to negative transition of ARBNGnt the highest priority DMA slave/master wins control of the channel. This is called the REQUEST state.

While in the REQUEST state, the DMA Transfer Block is signaled to initiate DMA transfers (Read, Write, Verify) as defined in the DMA Mode Register. When the ARBNGNT signal goes to the REQUEST state the DMA slave/master can request for BURST transfers by asserting BURST# active to the CACP logic. If BURST# is inactive, the DMA transfer will complete after a single transfer and the ARBNGNT signal will be forced high indicating the end of DMA transfer.

While in the REQUEST state NMI# going active forces the ARBNGNT signal hgih. ARBNGNT is again forced low when the CPU has serviced the NMI and cleared the NMI bit in PORT 9Q bit 6.

3.2. PREEMPT Generation

The following are the sources of PREEMPT:

1. REFREQ# going from high to low requests for a refresh cycle.

2. NMI# (NMI because of Parity or Channel Check Errors), or a Bus Timeout condition.

3. FDDRQ (Floppy request) going from low to high if the MASK is reset to enable floppy transfers.

4. IOW of B4 to port 18H for DMA diagnostics.

5. When PORT 90 Bit 4 is set and no refresh request is pending and DMA transfers are in progress on the Channel, in INTR request drives PREEMPT indicating to the DMA slave/master to give up the Channel.

8. PREEMPT is an open collector signal, hence the signal could be driven active by an external DMA slave/master.

The signal is asynchronous to SCLK hence it is synchronized before being used as an input in the CACP state machine. This is to avoid any setup-hold timing violations of the signal to SCLK from one Flip-Flop to another within the chip.

3.3. Bus Timeout

While in the REQUEST state, if refresh request is pending in excess of 7 micro-seconds a Bus Timeout condition is generated if NENTMOUT is enabled i.e. set to 0. If NENTMOUT is disabled no bus timeouts are generated and the refresh request is not honored i.e. no refresh cycles are generated. NENTMOUT is a defined register bit and is used for debug purposes to block bus timeout conditions.

When a Bus Timeout occurs PORT 90 bits 5 and 6 are set. An NMI to processor is also generated. The pulse width of this NMI signal is approximately 15–20 clocks. If the Bus Timeout is caused because of a master device on the channel holding the channel in excess of 7 micro-seconds, the whole DMA controller within the chip is reset other than the refresh counter. Hence all the DMA registers would have to be re-programmed for any further DMA activity.

3.4. Local Arbiters for the Channel

The Local Arbiter logic in the DMA Controller is implemented as defined in the IBM PS/2 Micro Channel Technical Reference for Models 50/60/80.

The Local Arbiters drive the arbitration values on the ARB lines in a consistent manner so as to define the winner at the end of the Arbitration period. Every DMA slave/master on the channel implements this Local Arbiter logic in order to gain control of the channel A Local Arbiter requests for the channel by asserting PREEMPT#. When ARBNGNT goes from low to high, the requesting Local Arbiters drive their respective ARB values on the ARB bus. If a requesting Local Arbiter detects a mismatch on one of its ARB bits, it immediately deasserts all other lower order ARB bits. Hence at the end of the Arbitration period only the highest priority Local Arbiter continues to drive its ARB values on the bus and is the winner.

The DMA Controller defines the Local Arbiters for the floppy and diagnostics.

| Floppy FDDRQ | Arbitration Value | 2 |
| Diagnostic | Arbitration Value | Programmable | the Arbitration value for diagnostic is programmable via ARBUS register 4. If a floppy request and a diagnostic request (via IOW to PORT 18H with command OB4H) are pending at the same time, the ARB value is 2.

3.5. Compatibility/Extended Programming

The various registers in the DMA Controller can be programmed either in the 8237 compatibility mode or the IBM-defined extended mode.

3.5.1 Compatibility to Extended mode translation:

The Address Translation Block builds an unified addressing scheme. The output of the address translation block is an addressing scheme that is compatible to the IBM defined Extended morde. Hence when the DMA RAM registers are accessed in compatibility mode, the address translation block traps on these addresses and translates them to Extended Addressing scheme. In addition to the RAM addresses this block also generates the IO decode signals of all the registers in the DMA controller.

During programming, compatibility addresses are distinguished from extended mode addressing by the decode of IO address 1AH.

IO address 1AH active indicates that the current programming is done in extended mode and no translation is required.

3.6. Byte Pointer

A two bit byte pointer to accesses the multiple bytes of Memory address and TC registers. In the IBM mode only three bytes of the memory address can be programmed (this includes the page register). In the enhanced mode four bytes of the memory address can be programmed. Irrespective of the mode chosen to program the RAM registers, multiple bytes of a register must be completely programmed before starting programming of a new multiple set. In extended mode programming an IOW to PORT 18H resets the byte pointer. In compatibility mode programming the byte pointer is cleared only on a clear byte pointer or a master clear commands.

In the enhanced mode since the memory address register is four bytes deep, all four bytes must be programmed before starting programming of a new set of registers.

3.8. DMA Register Programming

Eight bit IO instructions are supported.

3.9. IBM Registers—32 bits wide:

The IBM default memory registers can be extended to be 32 bits wide by programming register NIBM32 on a channel by channel basis. When a channel is programmed to be 32 bits wide, all memory address register programming for that channel must be for 32 bit addresses.

3.10. Refresh Counter

This is a 11 bit counter and supports refresh cycles for up to 4 M Bit DRAMs.

3.11. RAM Block

The RAM Block implements the Memory Address Register, Page Address Register, Transfer Count Register and the IO Address registers using RAM cells. There are 8 sets of these registers one for each DMA channel. These registers are programmed eight bits at a time. A two bit byte pointer is used to program registers bigger than eight bits.

In order to support the auto-initialize feature of the DMA controller two sets of these registers are maintained, called the current and base registers. During DMA transfers only the current registers are modified. The base registers are copied to the current registers at transfer count time if auto-initialize is enabled.

3.12. DMA Transfer Block

When the CACP logic initiates a DMA request to the DMA controller section of the chip, the Transfer block qualifies this request with the mask bit of the channel for which the request is generated. If the mask bit is set to disable transfers, the Transfer Block asserts the MASTER# signal and allows external device to complete the request. If the mask bit is reset to allow DMA transfers, the Transfer Block generates the various mode decode signals to determine the type of transfer.

The MASTER# signal (once asserted) will continue to be asserted until a transfer is detected on the channel. If no transfers are detected or the bus is held inactive for an in-ordinate amount of time, the CACP generates a Bus Timeout conditions and resets the DMA controller and the MASTER# state machine.

3.13. Adder Block

The DMA controller is programmable for 8/16/32/128 bit wide transfers. Transfer count can be 0 to 64K. Address can be specified to be in increment or decrement mode.

The Adder Block has two adders, one for memory address, one for transfer count.

The memory address adder is 32 bits wide and is capable of incrementing the address by 16, 4, 2, 1, 0 and decrementing by −2 and −1. In the enhanced mode the DMA can be programmed only for address increment mode. The adder increment of 0 is used during auto-initialize mode.

The transfer count adder always decrements by 1. Hence if the transfer count register is programmed for OFFFF (i.e. 64K) transfers and each transfer is 16 bytes wide, the total transfer would be 1M bytes of memory. In comparison in the IBM architecture the total transfer is a maximum of 128K bytes.

The memory adder in the IBM default mode is only 24 bits wide and hence wraps around at the 16M boundary. In the IBM32 mode the adder is 32 bits wide and wraps around at the 4G space.

The memory address from the adder, to IO address form the DMA IO RAM register and refresh address are all multiplexed together and clocked to generate the address on the bus for the current cycle. The address provided by the multiplexer is from address 31 ot 0. The lower two bits of address i.e. A1 and A0 are decoded into Byte enables i.e. BE (3:0) by the Micro Channel Controller.

3.14. Channel Controller Interface Block

The interface block receives commands form the DMA Transfer block to perform Memory read/write and IO read/write cycles on a cycle by cycle basis. The interface block generates DMAS0# and DMAS1# based on these commands.

3.15. Generation of TC#

TC# is asserted a clock after DMAADS# is asserted and held active until a clock after DMARDY# is active. TC# is typically asserted on the last IO cycle for Memory-IO-Memory transfers or on the last Memory transfer on memory only transfers.

3.16. IOR/IOW of 86C130 registers

AL1 IOR/IOW of 86C130 DMA controller registers must be a minimum of 4 wait states i.e. 6 clocks. The 86C130 DMA controller supports only 8 bit IOR/IOW cycles.

All IO registers in the chip in the range OOH–OFFH are qualified by MASTER# inactive. Hence the only register that can be accessed i.e. read/write by the channel master if PORT 3C3.

3.17. DMA Transfer cycles

Figure 45:
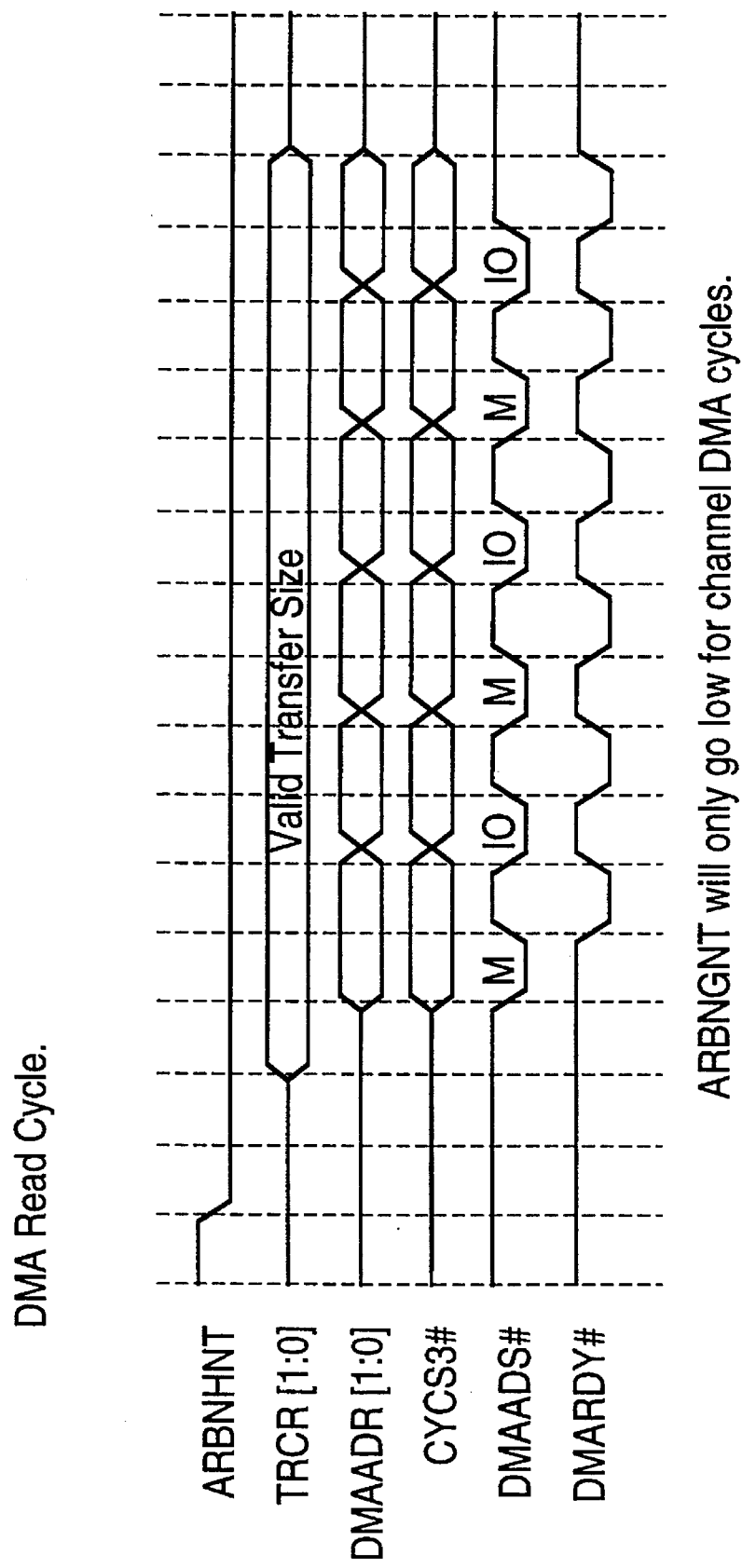
FIGS. 45–47(b) are DMA controller timing diagrams.

There are four major types of cycles:

3.17.1. DMA read Cycles:

This is a memory read followed by an IO write as shown in FIG. 45.

Figure 46:
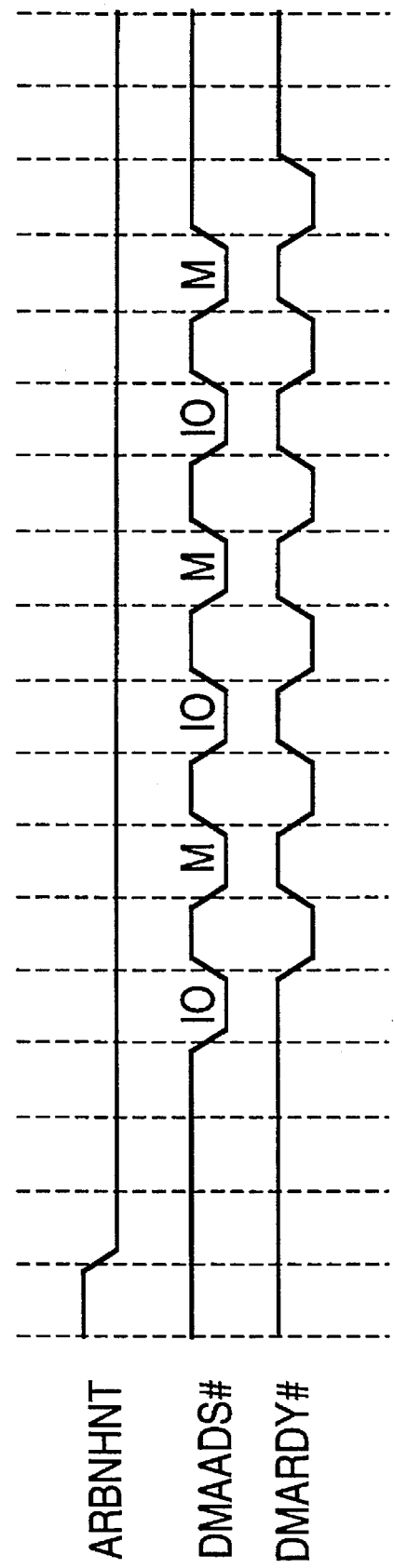

3.17.2. DMA Write Cycles:

This is an IO read followed by a memory write as shown in FIG. 46.

Figure 47A:
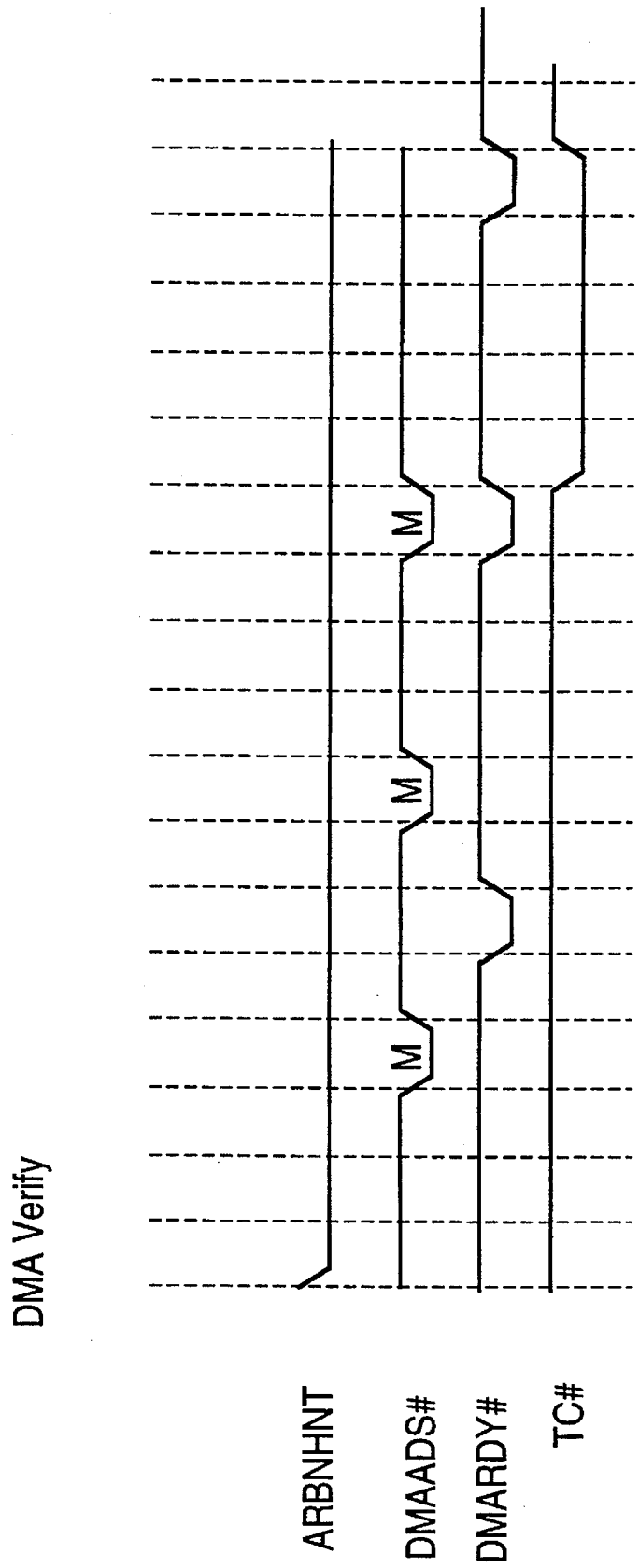

3.17.3. DMA Verify cycles:

These are a memory read or memory write cycles as shown in FIG. 47. During non-burst cycles, the fastest verify cycles are every 4 clocks. This is because the DMA RAMs can be updated only at the rate of every 4 clocks.

The hold registers are not used during verify cycles and the output buffers are tri-stated.

Figure 47B:
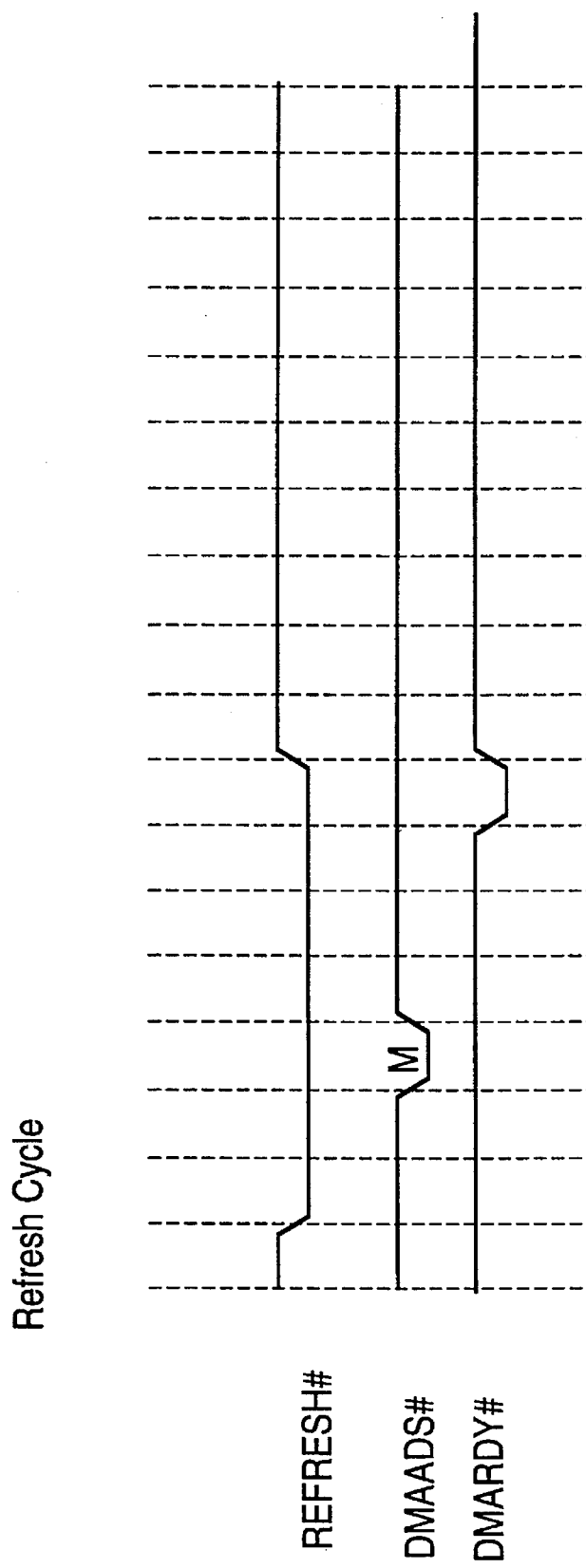

3.17.4. Refresh Cycles:

This is similar to a verify cycle but terminates after a single read as shown in FIG. 47(b).

3.18. Channel Controller Bus Interface

3.18.1 CPU Initiated Cycles

The DMA controller decodes all CPU cycles and indicates via CYCS3# to the micro channel controller whether the current decode resides on the Local Bus or not. If the current decode is on the Local Bus, the Micro Channel controller ignores the cycle. If the current decode on the Micro-channel, the Micro Channel controller drives DMAADS#, DMAMIO#, DMAWR# to the DMA Controller. The Micro Channel controller also drives the Micro-channel control signals. The DMA controller uses the Channel Controller Bus signals to drive IOR, IOW and INTA to the X Bus.

3.18.2. DMA Initiated Cycles

The DMA controller requests the Local Bus by asserting HOLD. The Micro Channel controller returns a HLDA. On receiving HLDA, the 86C130 starts DMA transfers by asserting DMAADS#, DMAMIO#, DMAWR#. CYCS3# is asserted to indicate whether the current cycle belongs on the Local Bus or on the Micro-Channel. If the current cycle is on the Local Bus, the Micro Channel controller completes a micro-channel cycle and returns DMARDY#.

3.18.3. Master Initiated cycles

On Master cycles, the Micro Channel controller decodes Micro-Channel commands and converts them to Channel Controller Bus compatible signals.

4.0. SOFTWARE INTERFACE

4.1. IBM Compatible DMA Registers

Mode Register (Port OB, D6)

There are 8 mode registers one for every DMA slave/master on the channel. The mode register basically defines the type of DMA transfer that this particular DMA device supports i.e. 8/16 bit, Read/Write/Verify, Increment/Decrement, etc. The Mode register is in extended mode format, hence when programming the mode register in compatibility mode, the data is formatted before it is stored in the register.

Since the data is formatted before it is written, a read of the mode register in compatibility mode will not return the data that was written. A mode register programmed in compatibility mode automatically forces 8 bit cycles for channels 3–0 and 16 bit cycles for channels 4–7. no programmed IO is supported.

Mask Register (Port OA, OE, OF, D4, DC, DE):

There are two Mask Registers each 4 bits wide. The purpose of the Mask Register is to block DMA transfers on the channel. If the DMA is masked, and a DMA device request for transfer, no DMA transfers are initiated instead the bus is granted to the requesting device (except for channel 2) to initiate transfers. This is basically Master mode.

At reset time the mask registers are all set and disable DMA transfers. The mask registers can be reset (i.e. DMA enabled) via reset/clear mask register commands in compatibility mode. Once the mask registers are reset, they can be set again via the set/master clear commands in compatibility mode. In the extended mdoe the mask register can be set/reset via direct writes to PORT 18H with commands of 9 for set and A for reset.

Once the mask register is enabled, a DMA transfer is allowed to occur. At the end of the DMA transfer, i.e. when TC occurs, the mask register will be set if auto initialize is disabled. If auto initialize is enabled the mask register will be left reset for more DMA transfers.

The mask registers are write only.

Status Register (Port 08, D0)

There are two status registers each 8 bits wide. Status registers provide the present status of DMA transfers i.e. which channels have reached transfer count and which registers have requested for transfers. The lower nibble refers to TC and the higher nibble refers to DMA request. Hence status register 0 is used for channels 0–3 and status register 1 is used for channels 4–7.

At power on reset the status registers are cleared. They can also be cleared via the master clear commands. The registers are set when a TC or a DMA request occurs for a particular channel. On a read of the registers, the registers are cleared. In compatibility mode the two status registers are read with independent IO addresses (refer to IO decodes). In the extended mode the byte pointer is used to read the two status registers.

The status registers are read only.

Arbus Registers (Function Register 80, 84)

There are two Arbus registers each 4 bits wide. These registers provide the flexibility of reprogramming the arbitration levels of channels 0 and 4.

At reset time the Arbus Register 0 is set to arb value 0 and the Arbus register 4 is set to arb value 4. The registers are read/write and can be programmed in extended mode only. The byte pointer is not used in accessing these registers.

The Arbus registers 0 and 4 are useful in mapping channels 8 thru E to channels 0 and 4. If the registers are programmed for channels 0 thru 7, these registers are bypassed during DMA transfers.

ALTGT20 is ORed with A20GT to generate the signal A20GTX. This signal would be tied to Processor P0 A20M signal.

4.3. CACP Register PORT 90

Bit 7 RW

This is a Read/Write bit used in the IBM architecture to allow CPU cycles (when set) in-between two DMA transfers. In the S3 architecture, since the individual 80486s are decoupled from the Local Bus via the cache controllers, the 80486s are always active and hence the state of this bit does not affect the functioning of the CACP state machine.

Bit 6 RW

This bit when set indicates that a NMI has occurred and forces all arbitrations to be terminated. NMI could have occurred because of a parity error, channel check error, watch dog timeout error or a bus timeout condition. On a power on reset, this bit is set and allows the CPU to run system wide diagnostics (typically POST) and configurations. When this is done the CPU clears this bit enabling the system for arbitrations. Once this bit is cleared by the CPU, only a NMI should be allowed to set his bit i.e. an application should not set this bit.

Bit 5 R

When the CPU reads the state of this bit to be 1, it knows that the occurrence of NMI was due to a Bus Timeout condition. This bit is reset, when a write with data 0 is made to bit 6 of PORT 90.

Bit 5 W

The default state of this bit is 0, disabling extending arbitrations i.e. arbitration time on the Channel is 300 ns. When this bit is set to 1, extended arbitration is enabled and the minimum arbitration time is 700 ns.

Bit 4 RW

In the IBM architecture, this bit when set allows Interrupts to arbitrate for the Channel, which basically allowed the CPU to service the interrupts.

Bits 3–0 R

The reset state of these bits are 0FH, indicating that the current owner of the Channel are the on-board CPUs. ARBNGNT going low, latches the state of the ARB(3:0) into these bits on an adapter that caused the error condition and takes appropriate action.

Default: 4FH.

4.4. CSR's

These are a set of IO registers defined to implement the programming of specific features in a manner transparent to the existing PC software.

The CSR's are accessed via four IO locations:

The address of the CSR is programmed in locations 0022, 0023 and 0026h. The date for the CSR is transferred through port 0027h.

4.4.1 Functional i.d. High, Low CSR: <1:0> R/O

These registers contain the functional i.d. of the MCADMA. The responds to CSR operations when the i.d. of the operation matches its functional i.d. until the Programmable Functional i.d. gets programmed.

The value in these registers is 00,60.

4.4.2 Prog Functional i.d. High, Low CSR: <3:2> R/W

Once both these registers are programmed, the responds to CSR operations whose i.d. matches these registers. It no longer responds to the i.d. programmed in the FIDR registers.

Poweron default=00,60h 4.4.3. Index Register CSR: 4 R/W

This register is the same as IO port 0026.

Poweron default=0000,0000

4.4.4. Device Register High, Low CSR: <6:5> R/W

These registers are the same as ports 0025 and 0024h.

Poweron default=0000,0000.

4.4.5. Chip Revision Number Register CSR: 7 R/O

This register contains the rev. no. of the .

The value will change according to the revision number of the .

Current Poweron default=0000,0000

4.4.6. Broadcast Mode Register CSR:10 R/W

This register has two modes of operation.

The register will get updated during writes to index 10 irrespective of the i.d.'s programmed. During reads from index 10, with respond with date only if the i.d. programmed matches its i.d.

| bits | <7:2> | Reserved |
|---|---|---|
| 1 | ENCSR | CSR Setup enable |
|  |  | = 0, All CSR's except CSR:<1F:10> are disabled. |
|  |  | = 1, All CSR's are enabled. |
| 0 | ENINDEX |  |
|  |  | = 0, Programming thru 22,23,26,27 |
| enabled. |  |  |
|  |  | = 1, Programming thru 22,23,26,27 |
| disabled. |  |  |

-continued

Poweron default = 1111,1100

4.4.7. Mode Register CSR:8 R/W

```
bits
    <7:2>   Reserved
    1       SCANIN      Scan In value
    0       SCANOUT     Scan Out value
Poweron default = 1111,1100
```

4.4.8. System Control Register CSR:11 R/W

```
bits
    <7:2>   Reserved
    1       FASTA20     Fast A20 Gate
                = 0     Disable A20
                = 1     Enable A20.
    0       HOTRST      Hot Reset
                = 0     No Reset
                = 1     CPU Reset
Poweron default = 0000,0000
```

FASTA20 is OR'ed with the KYBDA20 and is used to drive A20GTX. the logical representation of the design is:

A20GTX=(FASTA20 or KYBDA20 or ALTGT20)

4.4.9. Top of Memory Register low CSR:20 R/W

This register shows the top of the local memory in 1 Mbyte increments. Any memory above this defaults to the MCA. The software programs the address bits <31:20> corresponding to the top of the memory.

```
15:4    Correspond to address bits <31:20>
3:0     Reserved
Power-on Default = 0000,0000
```

The system powers up assuming 1 MByte of memory is present on the local bus.

4.4.10. Channel RAM Registers CSR:<25:22> R/W

These registers allow selection of one region of memory between 0 and 16 Meg to reside on the MCA. This allows operation of adapter cards with memory mapped peripherals in the 0–16 MByte range. Usage of this register is redundant if the region to be dedicated for channel RAM is above the Top of Memory.

CHRAMB is used to set the Base Address of the region and also indicates whether the region is enabled. CHRAMS is used to set the size of the region. The size of the region is programmable in 16 k increments up to a max. of 4 MByte.

CHRAMB<1:0> are treated as a 16-bit register.

```
bits
    15:6    binary encoding of base address.
    5:1     Reserved
    0       ENCHRAM
                = 0, Channel RAM region is disables.
                = 1, Channel RAM region is enables.
Poweron default = F000 h
``` bits <15:6> correspond to address bits <23:14>. Therefore if a hole has to created at address 01,0000h, bits <15:6> are 0001,0000,00.

CHRAMS indicates the size of the region.

```
bits
    <7:0>   binary encoding of the size
Power on default = 0000,0000
Size of the region = (CHRAMS+1) * 16k
``` e.g. if a 16K region is desired, CHRAMS=00h.

4.4.11. Video Region Address Register CSR:28 R/W

The Video Region Address register allows selecting the four 32K video RAM regions,

| | |
|---|---|
| 000A,7FFF - 000A,0000 | Region 0 |
| 000A,FFFF - 000A,8000 | Region 1 |
| 000B,7FFF - 000B,0000 | Region 2 |
| 000B,FFFF - 000B,8000 | Region 3 | to be on the local bus or the ISA.

It also indicates whether the Video IO Ports (03DF–03CO h) are on the local bus or the ISA.

```
bits
    7   VIDWR
            = 0, Video Writes propagate to MCA
            = 1, Video Writes stay on Local Bux.
    6   EN8514      (38E9,X2E9,X2E8,X6E9,X6EB,XAE8,XEE9,XEE8)
            = 0, 8514 IO region on MCA
            = 1, 8514 IO region on Local Bus.
    5   ENVGA       (46E8, 03DF - 03CO)
            0, VGA IO region on MCA
            = 1, VGA IO region on Local Bus
    4   ENMDA       (03BF, 03BB - 03BO)
            = 0, MDA IO region on MCA
            = 1, MDA IO region on Local Bus
    3   REG32K3
            = 0, Region 3 on ISA
            = 1, Region 3 on local bus.
    2   REG32K2
            = 0, Region 2 on ISA
            = 1, Region 2 on local bus.
    1   REG32K1
            = 0, Region 1 on ISA
            = 1, Region 1 on local bus.
    0   REG32KO
```

-continued

```
         = 0, Region 0 on ISA
         = 1, Region 0 on local bus.
Poweron default = 0000,0000
```

4.4.11.1. VGA POS registers 100–107H

When bit 5 of PORT 94 is set to be in the setup state i.e. 0 and VGA IO space is defined to be on the Local Bus, all IO accesses in the range 100–107H is forced to be on the Local Bus.

4.4.11.2. Card Select Feed Back Incompatibility:

Card Select Feed Back Register (i.e. PORT 91 bit 0) will not be updated as defined by IBM when the Graphic Devices (i.e. VGA, 8514, etc) are designed to be on the Local Bus.

4.4.12. Adapter ROM Address <7:0> CSR;<37:30> R/W

These 8 registers are used to select for each 2K block in the range 000D,FFFF–000C,0000 whether the block is on the MCA or the local memory.

Each bit represents one 2K block. For each bit
0=block is on MCA.
1=block is on the local bus.

The 64-bits from the 8, 8-bit registers are used to represent the complete range.

e.g. CSR:30 bit0 represents 000C,07FF–000C,0000
CSR:37 bit7 represents 000D,FFFF–000D,F800
Poweron default for each register=0000,0000

4.4.13. Special IO Registers CSR: <5F:40> R/W

These registers are used to select for 8 blocks of IO each at a 4-byte boundary whether the block resides on the local bus or ISA. Each block can have a size from 1 byte to 128 bytes.

For each block 3 registers are used. e.g. For block 0 SPIOA0 (CSR:40), SPIOB0 (CSR:41) and SPIOC0 (CSR:42) are used. SPIOA0, SPIOB0 and SPIOC0 are described here, the rest of the sets are similar to these.

SPIOB0, SPIOA0, are treated as one 16-bit register and define the base address of the IO region at any 4-byte boundary. They also indicate whether the region is enabled on the local bus or not and whether the Y-Buffer has to be enabled for reading/writing to this address range.

```
bits
    <15:2>      IO address bits <15:2>
    1   ENBUS
            = 0, Y-Buffer enabled for this range
            = 1, Y-Buffer disabled for this range
    0   ENSPO
            = 0, Special Register for block 0 disables.
            = 1, Special Register for block 0 enabled.
``` e.g. to set the base at address 0504h, SPIOB0, SPIOA0= 0505h

SPIOC0 determines the size of the region.

```
bits
    7       Reserved
    <6:0>   binary encoding of the size.
```

Size of the region=(SPIOC0+1). e.g. to select a size of 5 bytes, SPIOC0—04h.

ENBUT and ENSPO are used to determine the configuration of the Special IO blocks in the system. The following shows the different configurations.

| ENBUF | ENSPO | |
|---|---|---|
| 0 | 0 | IO Block on MCA, Buffer Disabled |
| 0 | 0 | IO Block on Local Bus, Buffer disabled |
| 1 | 0 | Illegal |
| 1 | 1 | IO Block on Local Bus, Buffer enabled. |

The "11" combination occurs when the IO device (selected by the IO range) resides on the Local Bus but does not support byte steering. The byte steering is supplied by the Y-Bus interface logic.

4.4.14 IBM Enhanced Mode Register:

By setting ETS, the IBM compatible mode register can be used to support 32/128 bit wide DMA transfers on channels 0–7.

4.4.14.1 Register NIBM32 RW CSR 90

When a bit in the NIBM32 register is set to 0 only the lower three bytes of the memory DMA registers can be programmed for that channel. When a bit in the NIBM32 register is set to 1 a 32 bit wide memory address can be programmed for that channel. The bit is used only during program time.

4.4.14.2. Register ETS RE (Enhanced Transfer Size) CSR 91

This register controls the functions of the Mode register bit 6. Bit 6 in the IBM default mode is used for 8/16 bit transfers. In the Enhanced mode bit 6 is redefined for 32/128 bit transfers via the ETS register.

4.4.15. Register General RW CSR 92

| Data Bits | Function | | |
|---|---|---|---|
| 7 | Reserved | | |
| 6 | N486 | = 0 | 80486 compatible |
|   |      | = 1 | 80386 compatible |
| 5 | NWEITEK | = 0 | Weitek installed |
|   |         | = 1 | Weitek not installed |
| 4 | NE1 | = 0 | Port E1 enabled |
|   |     | = 1 | Port E1 not enabled |
| 3 | NPRMCH | = 0 | PROM read/write go to MCA when NE1=1 |
|   |        | = 1 | PROM read/write go to Local Bus when NE11=1 |
| 2,1 | Cnt1 | Cnt0 | |
|     | 0 | 0 | ARBNGNT high for minimum 8 clocks |
|     | 0 | 1 | ARBNGNT high for minimum 10 clocks |
|     | 1 | 0 | ARBNGNT high for minimum 15 clocks |
|     | 1 | 1 | Reserved |
|     | 0 = Enable timeout (NENTMOUT) | | |
|     | 1 = Disable Timeout | | |
| Default: AOH. | | | |

NENTMOUT enables/disables the Bus Timeout feature of the CACP logic. It is primarily used for debug purposes.

| NE1 | ROMEN | NPRMCH | Cycle |
|---|---|---|---|
| 0 | 0 | X | Read on Local Bus; Write to MCA |

| NE1 | ROMEN | NPRMCH | Cycle |
|-----|-------|--------|-------|
| 0 | 1 | X | Read on MCA; Write to Local Bus |
| 1 | X | 0 | Read/Write on MCA |
| 1 | X | 1 | Read/Write on Local Bus |

ROMEN is a bit defined in the register OE1.

86C131 MICRO CHANNEL CONTROLLER

1. OVERVIEW

The 86C131 Micro Channel controller performs the following functions:

(1) Translates the bus protocol into the Micro Channel bus Protocols. It assembles the bytes up to one 32 bit word in both directions (it produces multiple Micro Channel cycles for one local bus cycle as required by the width of the local bus transfer).

(2) Produces local bus cycles and Micro Channel cycles when the DMA controller is master.

(3) Translates the Micro Channel protocol into the local bus protocol when an external master takes over the Micro Channel bus.

(4) Supports central arbitration for the local bus.

(5) Interfaces the DMA controller to the Micro Channel bus. (Interface between the DMA arbitration unit and the bus and between the bus and the DMA controller in slave mode)

Figure 48:
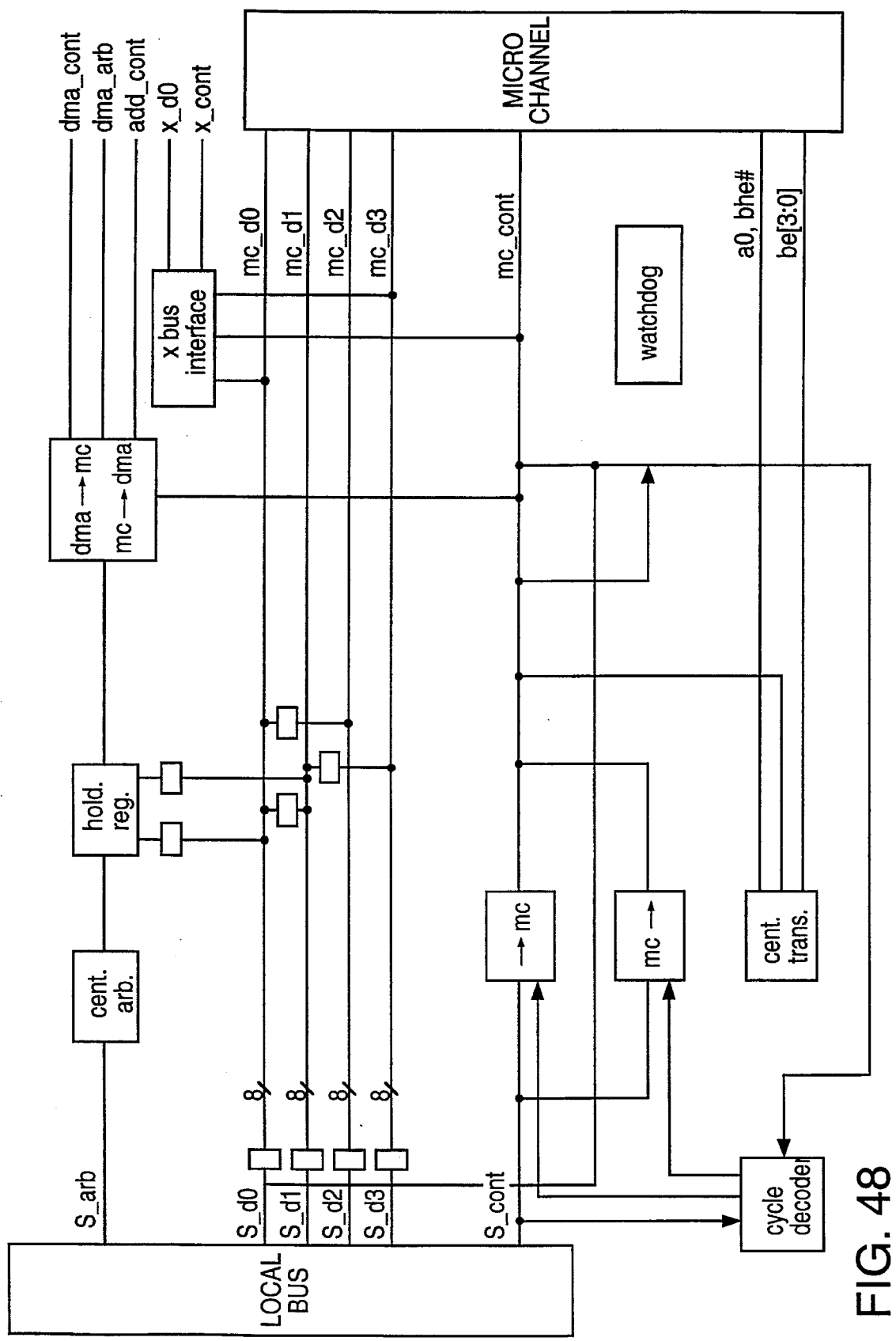
FIG. 48 is a block diagram of the microchannel controller.

FIG. 48 shows a detailed block diagram of the Micro Channel controller.

2. Brief Signal Description

The signals for the micro channel controller are described in three major groups: Bus Interface, Micro Channel Interface, Micro Channel DMA Interface:

2.1 BUS INTERFACE SIGNALS

| Signal | Pins | I/O | Description |
|--------|------|-----|-------------|
| SD[31:0] | 1–32 | I/O | The Bus data lines. |
| SDP[3:0] | 33–36 | I/O | Four even parity bits, each indicating the even parity for each byte on the S3 data Bus. |
| SLSB | 37 | I/O | 486 only command/copy back command. When SLSB is high, only 486-like commands are used. When it is low, copy back masters are on the bus besides the write-through masters. |
| SM/IO# | 38 | I/O | The memory/input-output line defines the bus cycle as a memory cycle or an IO cycle. When it is active low, the cycle is an IO cycle. |
| SD/C# | 39 | I/O | The data/control line defines the bus cycle as a data access or code access. When it is active low, the cycle is a code operation. |
| SW/R# | 40 | I/O | The write/read line defines the bus cycle as a write cycle or read cycle. When active low, the cycle is a read cycle. |

The instruction command encoding for 80386

| SM/IO# | SD/C# | SW/R# | |
|--------|-------|-------|---|
| 0 0 0 | | | Interrupt Acknowledge |
| 0 0 1 | | | Reserved |
| 0 1 0 | | | IO Read |
| 0 1 1 | | | IO Write |
| 1 0 0 | | | Code Read |
| 1 0 1 | | | Special Cycle |
| 1 1 0 | | | Memory Read |
| 1 1 1 | | | Memory Write |

The instruction command encoding for 80486 is:

| SM/IO# | SD/C# | SW/R# | |
|--------|-------|-------|---|
| 0 0 0 | | | Interrupt Acknowledge |
| 0 0 1 | | | Special Cycle |
| 0 1 0 | | | IO Read |
| 0 1 1 | | | IO Write |
| 1 0 0 | | | Code Read |
| 1 0 1 | | | Reserved |
| 1 1 0 | | | Memory Read |
| 1 1 1 | | | Memory Write |

| Signal | Pins | I/O | Description |
|--------|------|-----|-------------|
| SLOCK# | 41 | I/O | This indicates the bus cycle is normal cycle or locked cycle. When active low, the cycle is a locked cycle. |
| SBE[3:0]# | 42–45 | I/O | The byte enable signals indicate which bytes are active during a read or write. |
| SADS# | 46 | I/O | The address status enable indicates that valid address and status on the bus. |
| SRESET# | 47 | I | Reset forces the chip to known states. |
| SRDY# | 48 | I/O | Non-Burst ready indicates the end of the current bus cycle. This used to signal the master that the slave has provided valid data for read and accepted data for write. |
| SBRDY# | 49 | I | Burst ready input, it indicates that the slave has provided valid data for read and accepted data for write. |
| SBLAST# | 50 | I/O | Burst last cycle, it is driven by the controller when the master access the local bus. |
| SWAIT# | 51 | I | Local bus wait signal, it causes the controller to ignore the SRDY# and SBRDY# signals |
| SBOFF# | 52 | O | Back off. It, forces the CPU to float its bus for the next transaction cycle. |
| SBREQ#[3:0] | 53–56 | I | Local bus request, For centralized arbitration, one bus request signal is assigned to each of four masters on local bus. |
| SBGRANT#[3:0] | 57–60 | O | Local bus grant, one bus grant signal is assigned to each of four masters on local bus. |
| SCLK | 61 | I | local bus clock |
| SHOLD | 62 | O | Bus hold request to allow the controller complete control of 486 microprocessor bus |
| SHLDA | 63 | I | Hold acknowledge goes active in response to a hold request. SHLDA goes active to indicate the 486 has given the 486 bus to another local bus master. |

2.2 MICRO CHANNEL INTERFACE SIGNALS

| 2.2 MICRO CHANNEL INTERFACE SIGNALS | | | |
|---|---|---|---|
| ADL# | 1 | I/O | Micro channel address latch. It is an output when the local bus access. When the Micro Channel master accesses, it becomes an input. |
| UM/IO# | 2 | I/O | Micro Channel Memory/IO command. It is an output when the local bus accesses. When the Micro Channel master accesses, it is an input. |
| US0#,US1# | 3-4 | I/O | Micro Channel cycle definition. They are outputs when the local local bus accesses. On the Micro Channel access, they become inputs. |
| UCMD# | 5 | I/O | Micro Channel command. It is output when the local local bus accesses. On the Micro channel accesses, it is an input. |
| CHRDYRTN | 6 | I | Channel Ready Return; When it is high, it indicates the end of current transacton. |
| UBE[3:0]# | 7-10 | I/O | Micro Channel byte enable signals. |
| DS16RTN# | 11 | I | Micro Channel signal indicates to the controller that it accesses to 16 bit slave. |
| DS32RTN# | 12 | I | Micro Channel signal indicates to the controller that it accesses to a 32 bit slave. |
| UDATA[31:0] | 13-44 | I/O | Micro Channel data. They are output when the local bus accesses. On the Micro Channel access, they become outputs. |
| UA[1:0] | 45-46 | I/O | Micro Channel address bit 0 and 1 |
| UBHE# | 47 | I/O | Micro Channel byte high enable |
| TR32 | 48 | I/O | Translate 32. It is an output when the local bus accesses. On the Micro Channel access, it becomes an input. |
| LBRDY | 49 | O | When the channel master has access of the local bus, this signal is driven low to insert wait state on the bus. |

2.3 MICRO CHANNEL DMA INTERFACE SIGNALS

| 2.3 MICRO CHANNEL DMA INTERFACE SIGNALS | | | |
|---|---|---|---|
| DMAADR[1:0] | 1-2 | I | Master cycles. During DMA cycles, it indicates the aligned and misaligned transfer. |
| CYCS3# | 3 | I | Bus cycle, When it is low, it indicates that current decode resides in the bus. |
| MASTER# | 4 | I | It indicates that the Master adapter has won the arbitration. It is used to control the direction of the address and data buffer. |
| S3ADRCLK | 5 | O | Bus address enable clock for address latch on local bus. |
| UCADRCLK/CPUTY | 6 | I/O | Micro Channel address enable clock/CPU type. During reset it is an input. When it is high, 80486 is on the system. When it is low, the 80386 is on the system. When not reset time, it is an output. |
| TR/CR[1:0] | 7-8 | I | DMA transfer size/CSR address. During DMA transfers these signals indicates transfer size. During the CPU cycles these signals indicate CSR decodes. CSR decodes must be qualified by CRDEC# |

When it is in DMA mode:
0 0     - 8 bit transfer
0 1     - 16 bit transfer
1 0     - 32 bit transfer
1 1     - 128 bit transfer
When it is in CPU mode:
0 0     - CSR0 register
0 1     - CSR1 register

2.3 MICRO CHANNEL DMA INTERFACE SIGNALS

|  | | | |
|---|---|---|---|
|  | 1 | 0 | - CSR2 register |
|  | 1 | 1 | - CSR3 register |
| EOT | 9 | O | End of transfer |
| HOLD | 10 | I | Micro Channel DMA Hold. |
| HLDA | 11 | O | Micro Channel DMA Hold Acknowledge. |
| CRDEC#/LBREG# | 12 | I | During the CPU cycle this signal is CRDEC# control register decode. During the master cycles it is LBREG#. When LBREG# is active, the controller tristate data buffers. |
| DMAWR# | 13 | I/O | Output during CPU/Master cycle. Input during DMA cycle. When it is high and it indicates a write cycle. When it is low and it indicates a read cycle. |
| DMAMIO# | 15 | O | DMA Mem/IO cycle |
| DMAADS# | 16 | I/O | Input during DMA cycle and Output during the CPU cycle. |
| DMARDY# | 17 | O | Indicates the end of the current cycle. |

TOTAL SIGNALS = 129

3. GENERAL ARCHITECTURE
3.1 OVERVIEW

The Micro Channel controller provides four major functions: (1) the protocol translation between the local bus and Micro Channel bus (i.e, decodes most of the bus transactions and timing and translates into the Micro Channel transactions and timing and decodes all the Micro Channel transactions and timing and translates to the bus protocol). (2) the central arbitration control for local bus. (3) the data buffer between the local bus and Micro Channel bus. (4) Micro Channel DMA interface and holding register.

To maintain the high performance of the local bus, the Micro Channel controller buffers the data transfer between the local bus and Micro Channel bus. In other words, the local bus is decoupled from the Micro Channel. To separate the data bus from the Channel DMA, the holding register is integrated in the Micro Channel controller.

3.2 Protocol Translation between Local Bus and Micro Channel

The Micro Channel controller decodes most of bus transactions and timing and translates into the Micro Channel transactions and timing. In the other direction, it decodes and translates all the Micro Channel timing and transactions into the local protocol. The main objective of the translation is to optimize the local bus performance and still maintain Micro Channel compatibility.

3.2.1 Local bus To Micro Channel Protocol Translator

This block receives the transactions and it translates them into Micro Channel transactions. The translation is at two levels:

the protocol level (signals and timing)

the transaction type level

The Micro Channel supports fewer types of transactions than the bus. For example this block does not support the burst transfers on the bus. All the legal combinations of SC[4:0] are mapped into legal Micro Channel combinations of S0,S1,M/IO as follows: For each bus transfer of 32 bit or less the Micro Channel controller will generate multiple cycles as required by the width of the addressed Micro Channel slave and the data will be assembled before being sent to the bus master.

3.2.2 Micro Channel Master Cycle Translator

This block produces legal bus cycles when an external master takes over the Micro Channel bus. In this case only the following Micro Channel cycles will translate into bus cycles:

cycles to IO devices residing on the bus cycles to memory residing on the bus.

The IO map and memory map reside on the Channel DMA controller. The Channel DMA controller decodes all the Micro Channel address and generates the control signals to the Micro Channel controller.

A Micro Channel master will be granted the bus only when the above conditions are true and when there is an active Micro Channel cycle pending. Arbitration for the bus is done on a cycle by cycle basis in order to save bandwidth (because the Micro Channel bus is much slower than the bus).

3.3 The Central Translator

This block assists 16 bit Micro Channel external masters to communicate with 32 bit slaves. It translates the A0 and BHE# lines that the 16 bit masters drive into the BE[3:0] lines that the 32 bit slaves use. It also swaps the lower two bytes of data onto the upper two bytes of data when required. These services are not provided for 8 bit slaves.

This block also translates the BE[3:0] lines that a 32 bit master drives into the A0 and BHE# lines that a 16 or 8 bit slave understands. Swapping is not done for external (DMA) 32 bit masters talking to 16 or 8 bit slaves.

3.4 DMA Controller Interface to the Micro Channel

The DMA controller will be connected to the Micro Channel bus like any other adapter. This block will translate the bus cycles into signals that the DMA controller understands while in slave mode (the mode of operation in which the DMA controller receives commands). The other option would be to interface the DMA controller directly to the local bus (for the slave mode only).

3.5 The Bus Central Arbiter

The Micro Channel Controller contains the central arbiter for the local bus. It supports four masters. Each master has a bus request line and a bus grant line. These two signals and the arbitration process are synchronous with the bus clock. The priority schemes supported are:

fixed priority (with fairness)

round robin

4. FUNCTIONAL DESCRIPTION

This describes the detailed functional description for each function block for the Micro Channel controller.

4.1 Local Bus to Micro Channel Protocol Translstion

The Micro Channel controller supports local bus 32 bit transfers in pipeline mode. The arbitration, command, address phases for the next transaction can start during the data phase of the present transaction. In this case, the address on the local bus should be latched on the trailing edge SADS#.

Since the Micro Channel controller supports local bus in 32 bit and the Micro Channel can be either 8/16/32 bit wide, the controller splits the 32 bit cycle into multiple cycles for 8/16 devices on the Micro Channel as necessary.

4.1.1 Posted Write from Local Bus to Micro Channel

Since the frequency of the local bus can be as high as 40 MHZ and the Micro Channel cycle is typically slow, the write transaction is buffered one level deep. In other words, the write transaction is posted. For the case of a back to back write transaction, the controller handles it in the following way:

1. If no Micro Channel master arbitrates the bus and the buffer is empty. The ADRCLK is generated to latch the address in the Micro Channel DMA and CYCS3# is generated from Micro Channel DMA after it decodes the local bus address. After it detects CYCS3#, it generates UCADREN to DMA to latch the address on the Micro Channel bus. After this, the Micro Channel cycle starts. Depending on the local bus frequency, different Micro Channel timing is generated accordingly.

2. The second local cycle can start immediately after the first cycle, however the second cycle cannot complete until the first cycle on the Micro Channel completes. The third cycle can start thereafter.

Figure 49:
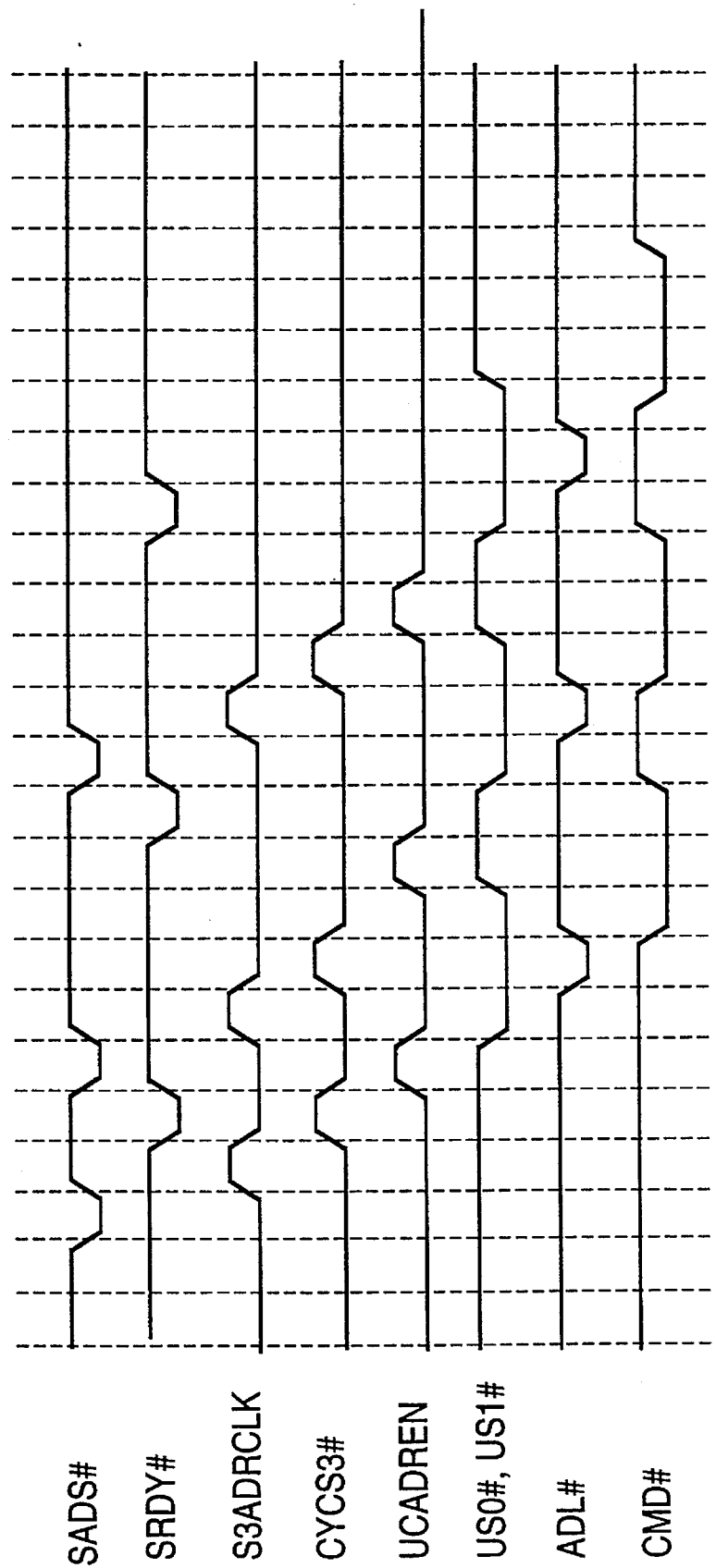
FIGS. 49–58(c) are microchannel controller timing diagrams.

FIG. 49 shows a timing diagram for a posted back-to-back write from the local bus to the microchannel.

4.1.2 Channel Data Buffer and Swapper

The Micro Channel controller supports the data buffer and swapper between the 32 bit device on the local bus and the 8/16/32 devices on the Micro Channel. The controller breaks down the 32 bits into multiple cycles for the 8/16 bit devices on the channel as required. As soon as a cycle starts on the Micro Channel, SBE[3:0], DS16RTN# and DS32RTN# are used to control the burst management state machine to produce the multiple cycles required to complete full 32 bit data from the local bus. The swap logic provides the necessary control signals for data swap for 8/16 device on the channel.

4.1.3 Micro Channel Timing Generator

Six control registers are assigned to program the wait states for the Micro Channel control signals. The default wait states are optimized to provide the highest possible performance with minimum number of wait states for 20 MHZ.

4.2 Micro Channel Master Cycle Translation

The Micro Channel controller produces a legal cycle when an external channel master takes over the Micro Channel bus. The channel DMA keeps all the I/O map and Memory map of the local bus and it decodes all the Micro Channel address and generates the control signals to the Micro Channel controller. A Micro Channel master will be granted the local bus only when it accesses legal devices and there is an active Micro Channel cycle pending.

4.2.1 Posted Write from Micro Channel to Local Bus

Figure 50:
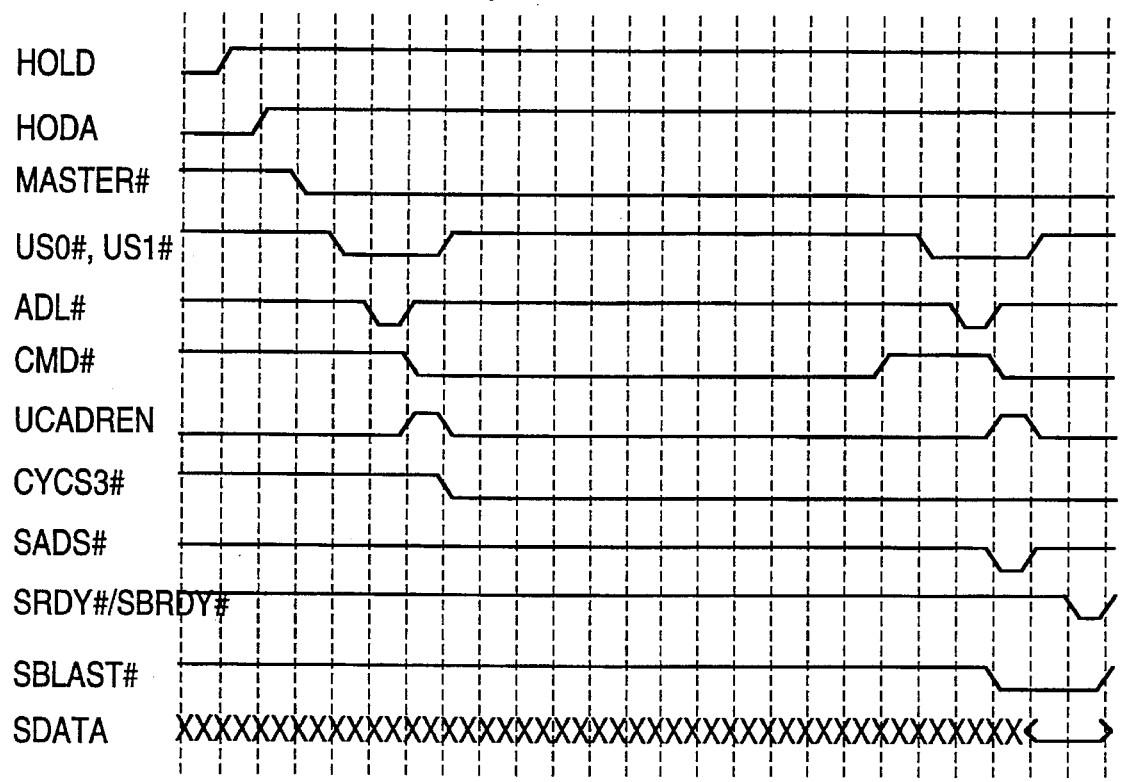

The posted write feature is implemented to decouple the local bus from the slow Micro Channel. The local bus will be granted only if there is an active Micro Channel cycle pending. Any of the cycles referring to the Micro Channel have to be aborted during this period. The timing diagram for the Micro Channel master initiating a back-to-back write is depicted in FIG. 50.

4.2.2 Channel Master Read cycle.

Figure 51:
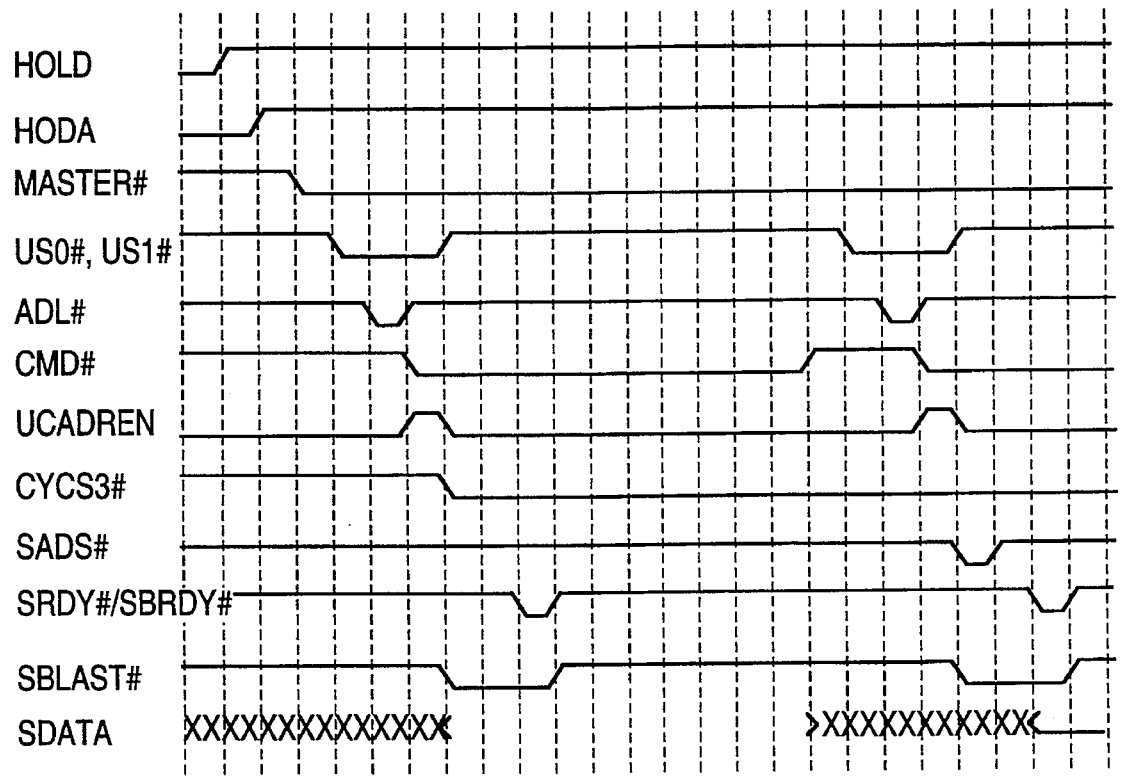

FIG. 51 shows the read cycle.

4.2.3 The Central Translator

This block assists 16 bit Micro Channel external masters to communicate with 32 bit slaves. It translates the UAO and UBHE# lines that the 16 bit Channel masters drive into the BE[3:0] lines that the 32 bit slaves use. It also swaps the lower two bytes of data onto the upper two bytes of data when required. These services are not provided for 8 bit slaves.

This block also translates the UBE[3:0] lines that a 32 bit Channel master drives into the AO and BHE# lines that a 16 or 8 bit Channel slave understands. Swapping is not done for external (DMA) 32 bit masters talking to 16 or 8 bit slaves.

Figure 52:
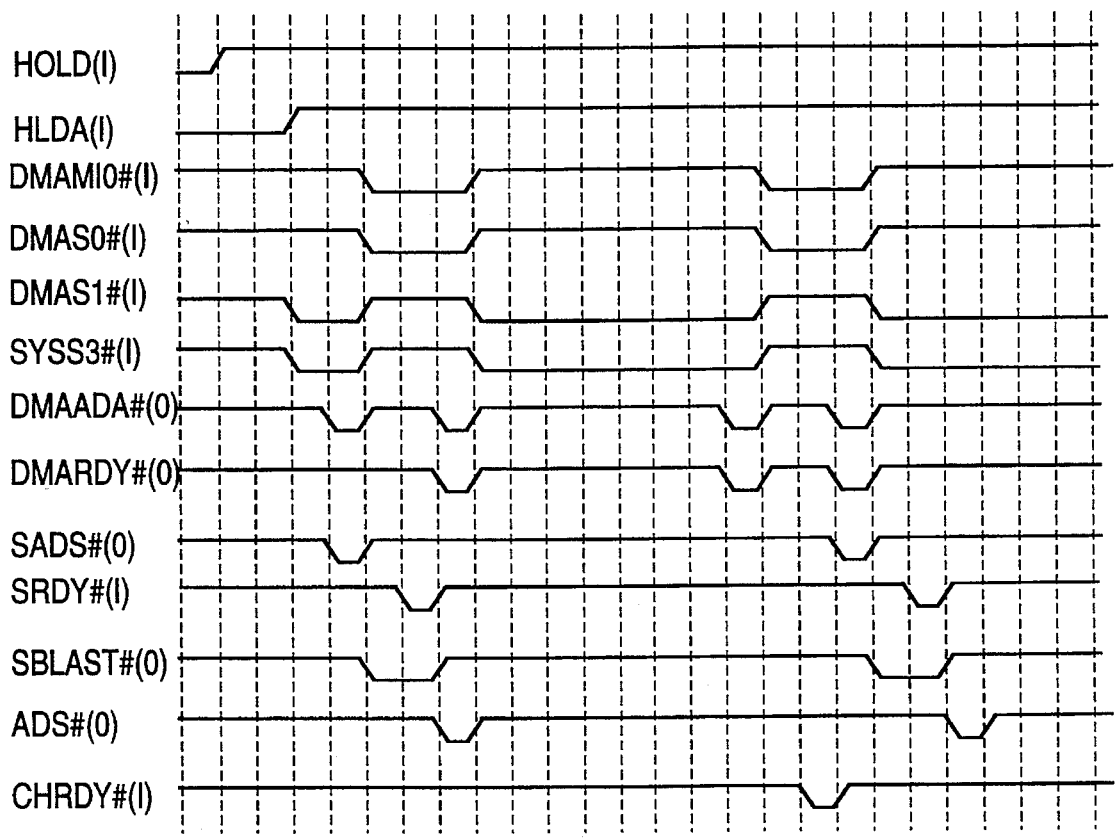

FIG. 52 shows DMA master cycle translation.

4.3 Peripheral Controller Interface

4.3.1 DMA Master Cycle Translation

The Micro Channel DMA controller connects to the local bus and Micro channel through the Micro Channel controller. When the DMA is in master mode, the DMA generates the DMA cycle control signals. The Micro Channel controller decodes all DMA cycle control signals and generates the necessary local bus cycles or the Micro Channel cycles. The DMA holding registers in the Micro Channel controller will do the data swaps required in according to the data size of DMA transfer.

4.3.2 DMA Slave Interface

Figure 53:
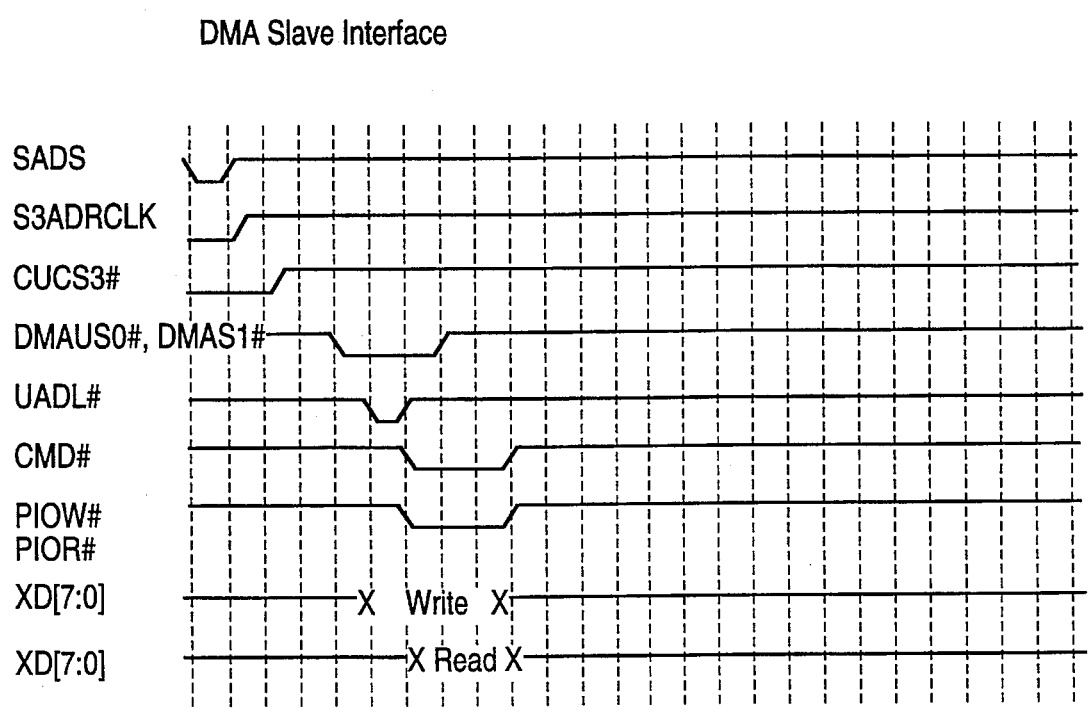

The Micro Channel controller generates the hand-shake control signals to the DMA while in DMA slave mode. When the Channel DMA is in the slave mode of operation in which the DMA controller receives the commands. The DMA controller decodes address according to the PS2 IO map as does the PIC chip described herein. FIG. 53 shows the timing for the DMA slave interface.

4.4 The Local Bus Central Arbiter

A synchronous arbitration scheme is used for the local bus central arbiter. The ARB (request for arbitration) lines change with a certain setup time with respect to the rising edge of the bus clock. The rules for arbitration are as follows:

(1) If there is no bus cycle in progress start an arbitration cycle as soon as any of the ARB(3:0) lines is sampled active. The arbitration cycle will take only one clock period.

(2) If there is a bus cycle in progress start an arbitration cycle when any ARB(3:0) is sampled active and only when ADS# is sampled active. It does not make sense to start a new arbitration cycle before the current bus master had the chance to assert ADS#.

The arbiter has a state machine which looks for an active ADS# as soon as a GNT line was made active. At this moment a cycle is "in progress". Normally a master will assert ADS# as soon as it receives the GNT active and it sees the RDY# active for the current cycle. As soon as ADS# is active the arbiter can start another arbitration cycle.

(3) An arbitration cycle is completed as soon as the arbiter samples the RDY# active for the cycle in progress.

(4) A master can start a new cycle only when it samples its GNT line active. At this point addresses may be pipelined. If a master cannot pipeline then it has to sample its GNT line and wait for RDY# active before asserting ADS#. If a master can pipeline then it has to sample its GNT line and the SNA# line; if GNT and SNA# are active then the master can assert ADS# and its addresses before the end of the current cycle. It then has to wait for the RDY# in order to assert its data on the bus. Notice that: 1) A pipelined cycle can be started only if the current cycle has at least one wait state (for obvious reasons). 2) A "dead" clock tick needs to be present between the end of the current cycle and the moment the pipelined master can assert its data on the bus (in order to avoid clashes on the bus). A pipelined cycle will last for two clock ticks minimum and therefore the cycle tracking state machines of the slaves will not be too complicated.

(5) The arbitration for the case when there is no cache in the system uses the HOLD and HLDA lines of the CPU and the timing is special. If the CPU asserts LOCK# or PLOCK# the S3 bus is kept for the duration of the locked cycles (the locked cycles will be done as an atomic transaction).

(6) Also the bus is kept for more than one cycle when the Micro Channel controller does a series of Micro Channel cycles while the BURST# line on the Micro Channel bus is asserted.

Figure 54:
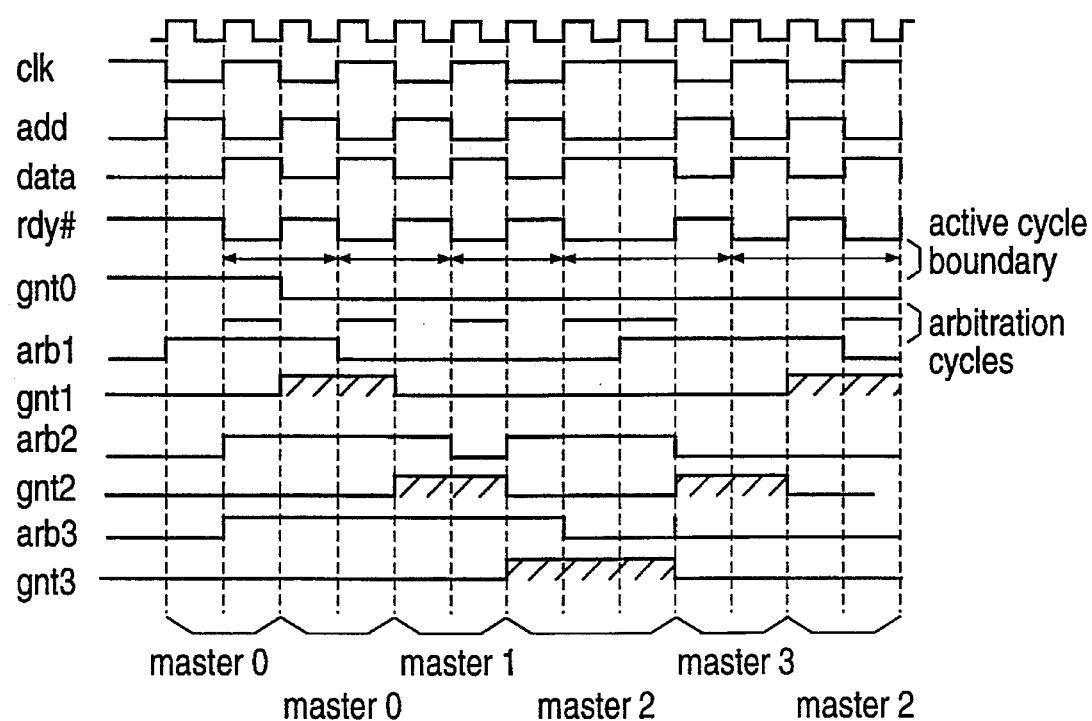
Figure 55:
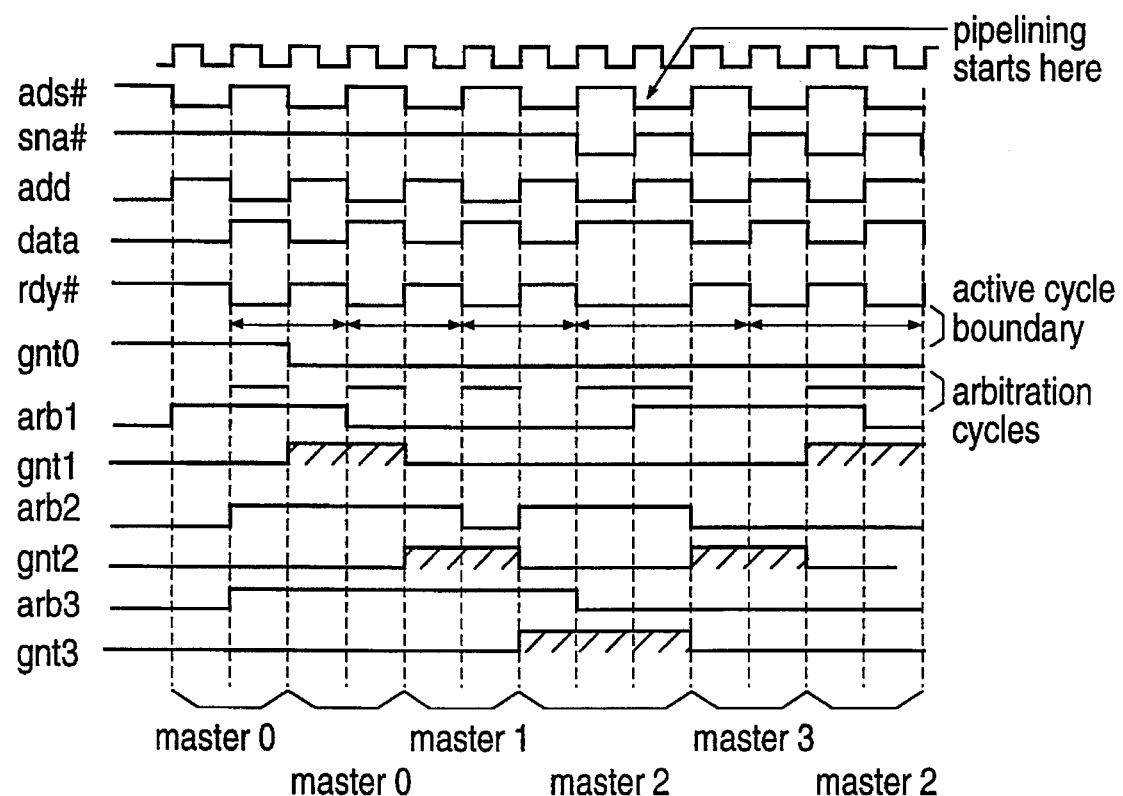

FIG. 54 shows arbitration timing.
FIG. 55 shows pipelined timing.

4.6 Configuration Registers (CSR)

Two CSR registers are assigned to the Micro Channel Controller chip. The CSR programming is described herein.
1. CSRO: Index=80
This tells the controller the speed of the system

| Value | Bus Frequency |
| --- | --- |
| FF-FI | Reserved |
| FO | 20 Mhz |
| EF | 25 Mhz |
| EE | 33 Mhz |
| ED | 40 Mhz |
| EC | 50 Mhz |
| EB-01 | Reserved |
| 00 | Default |

The default value for this register is 00 for the highest speed bus speed.
2. CSR1: Index=81

| Data Bit | Function | |
| --- | --- | --- |
| 7 | DECOUP | = 1 decouple the Micro channel bus and local bus |
| | | = 0 not to decouple |
| 6 | LOEKEN | = 0 lock the bus during the Micro Channel bursting |
| | | = 1 not to lock |
| 5 | F/R | = 0 fixed priority for local bus arbitration |
| | | = 1 rotating priority |
| 4 | NCACHE | = 0 naked 486 system |
| | | = 1 cache on the system |
| 3–0 | Reserved(Default to all 0's) | |

All the bits default to 0's.

5. MICRO CHANNEL TIMING

The following are the Default and Matched Memory cycle timing of the Micro Channel bus as specified in the IBM PS/2 Technical Manual.

5.1 IBM Micro Channel Timing Specification

Figure 56:
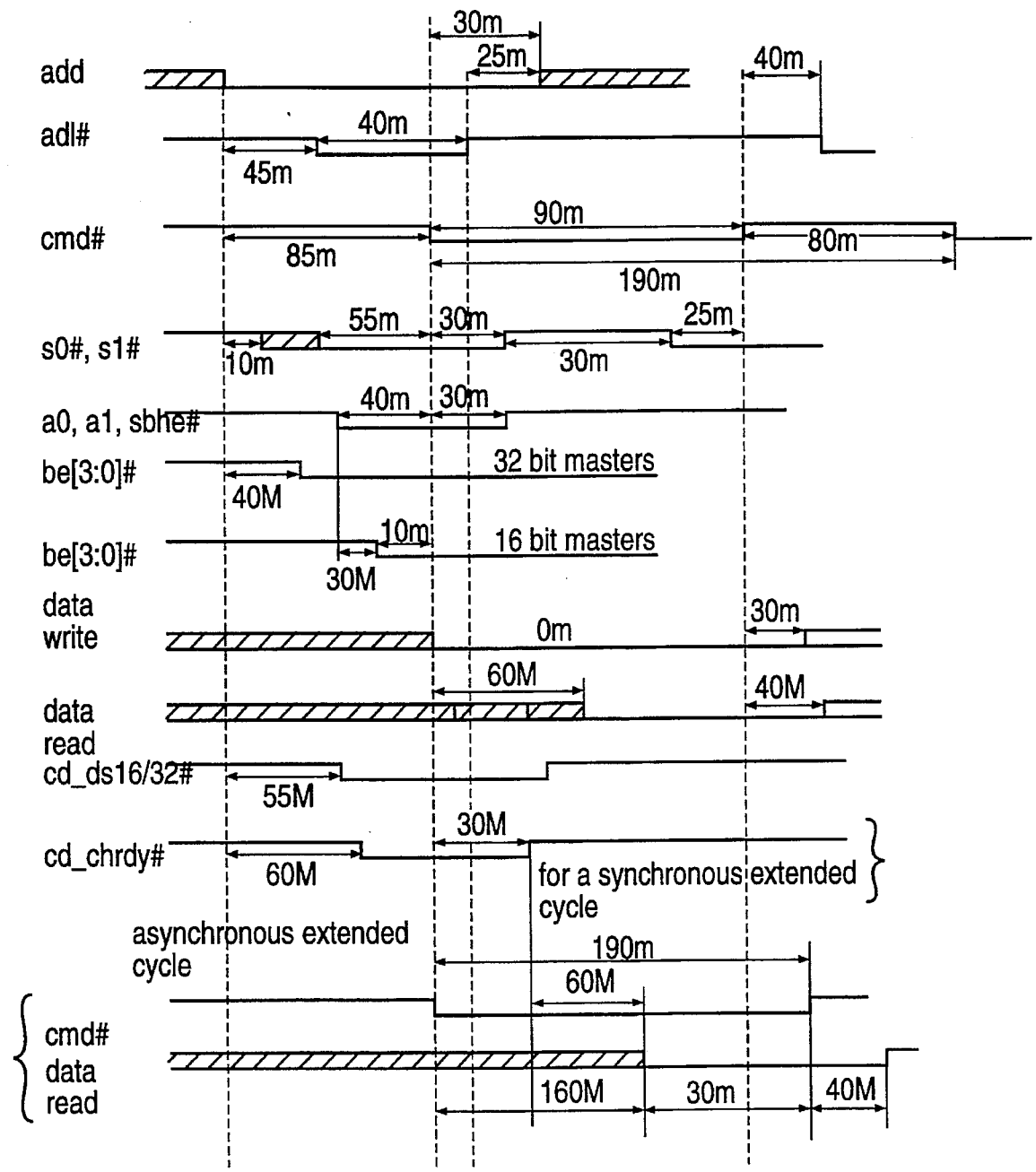
Figure 57:
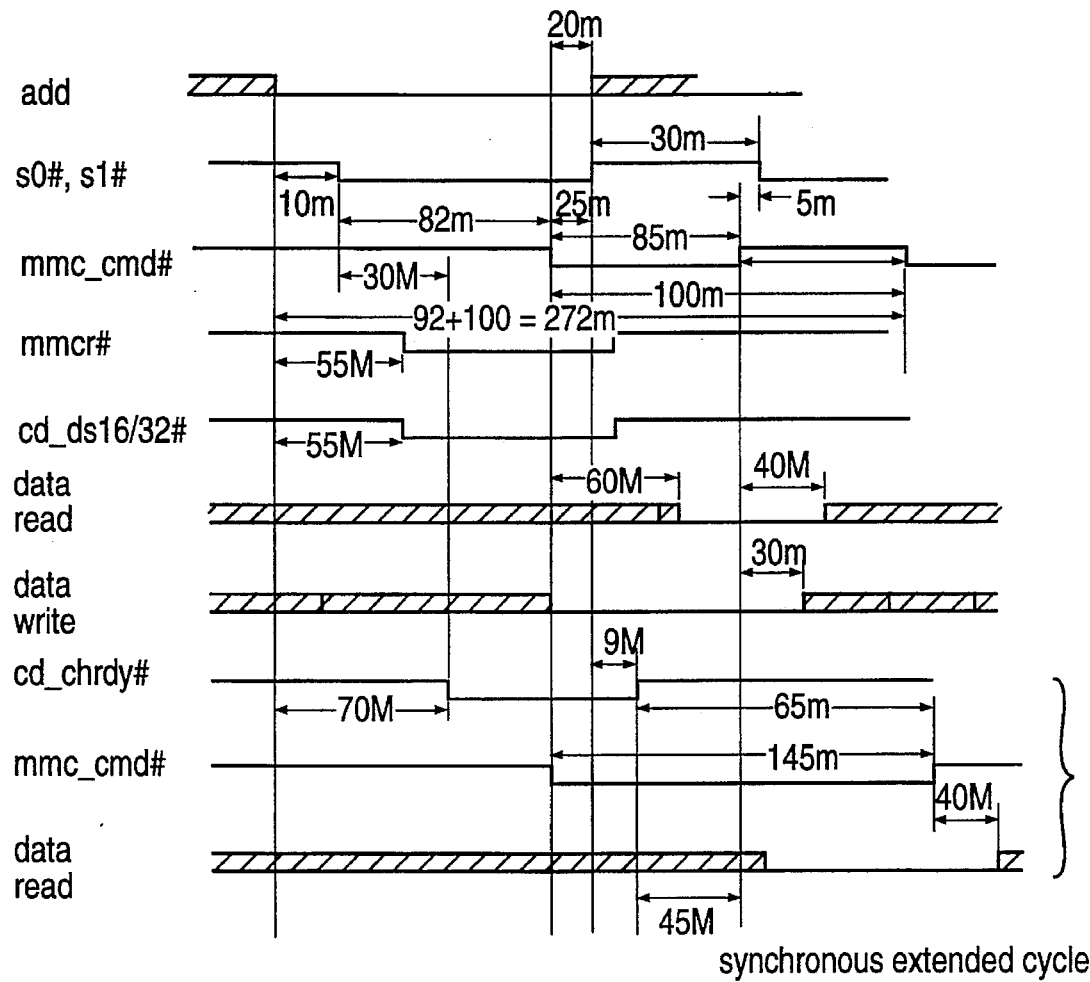

FIG. 56 shows micro channel timing for the default cycle.
FIG. 57 shows micro channel timing for the matched memory cycle.

5.2 Micro Channel Timing for 25/33/40 Mhz

Figure 58A:
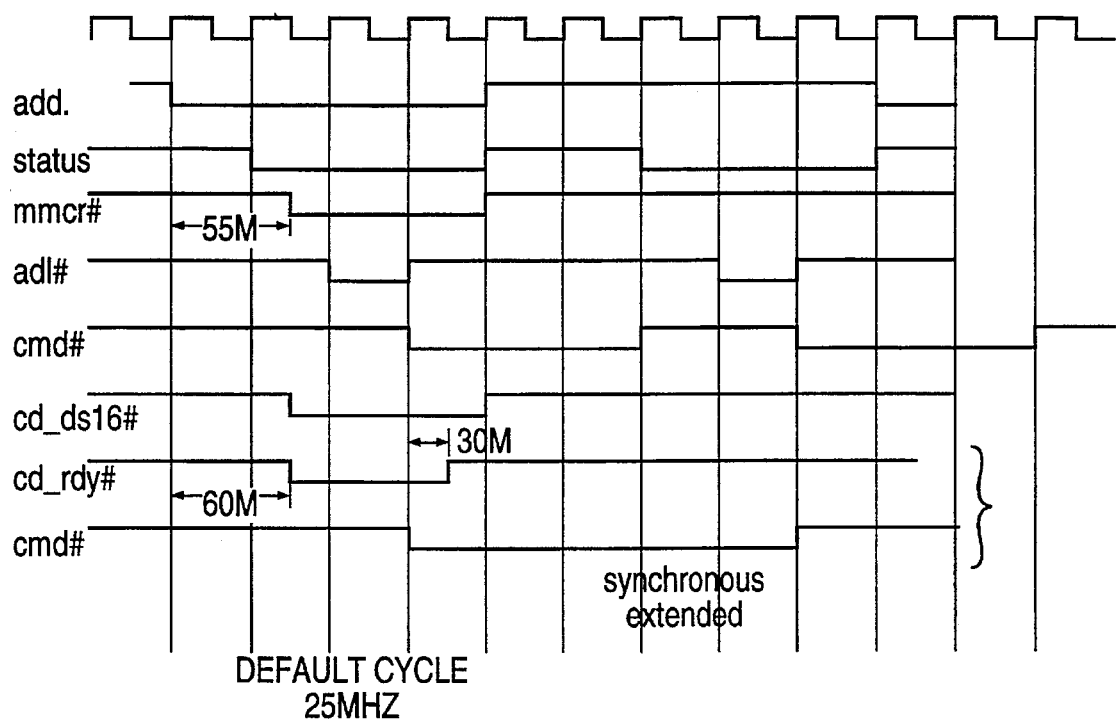
Figure 58B:
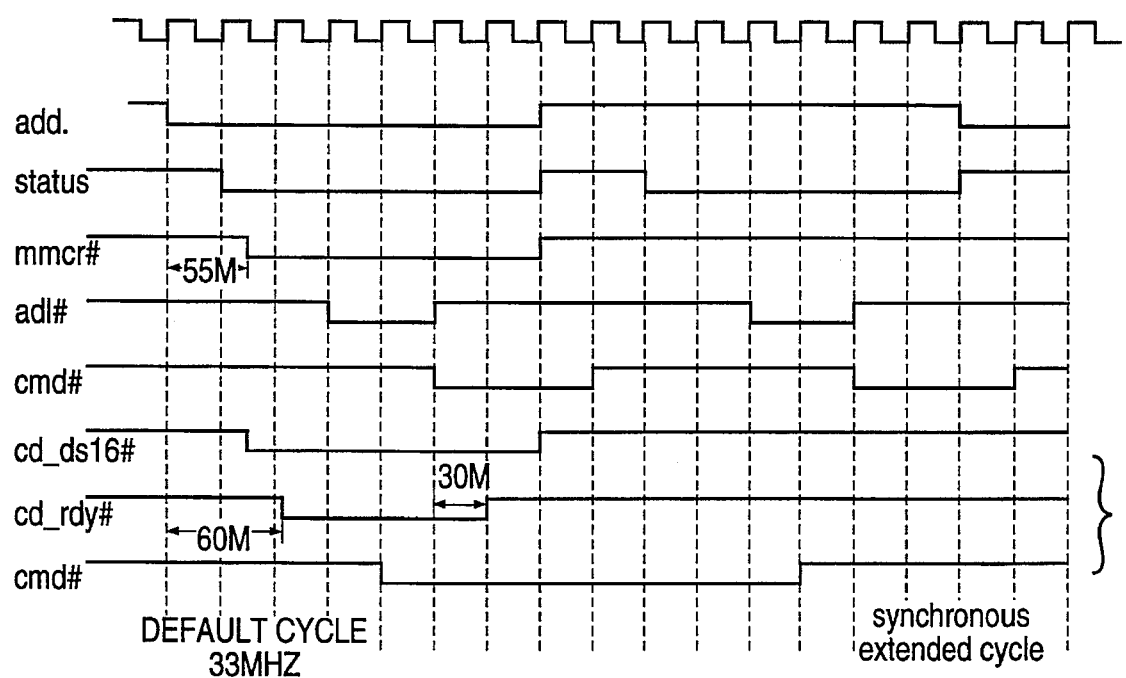
Figure 58C:
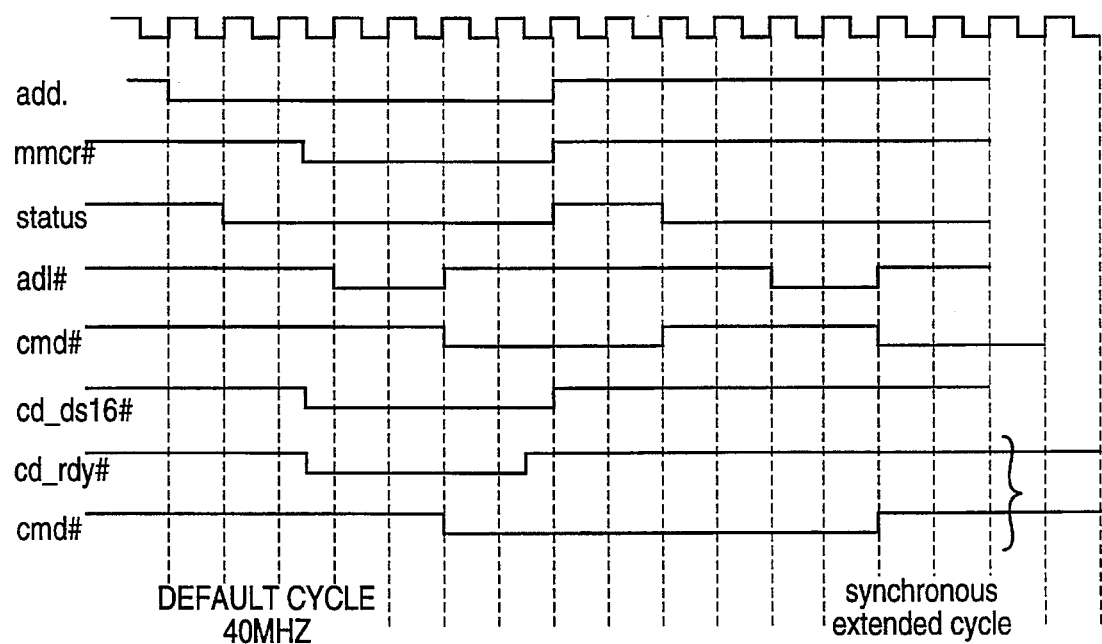

FIGS. 58(*a*), 58(*b*), 58(*c*) show the Default Cycle timings based on 25, 33, 40 Mhz frequencies. Support for Match memory cycle is not provided.

86C150 PERIPHERAL INTERFACE CONTROLLER

The 86C150 Peripheral Interface Controller (PIC) provides support for the standard I/O devices in PC/AT and PS/2 compatible systems. The 86C150 integrates two "8259A" equivalent programmable interrupt controllers, one 8254 compatible timer, a watchdog timer, a parallel port, two serial ports, two system control registers, a card setup port and variety of system status/control ports and functions. Address decodes are also provided for floppy disk controller, keyboard controller, the real-time clock and 2K configuration RAM.

Figure 59:
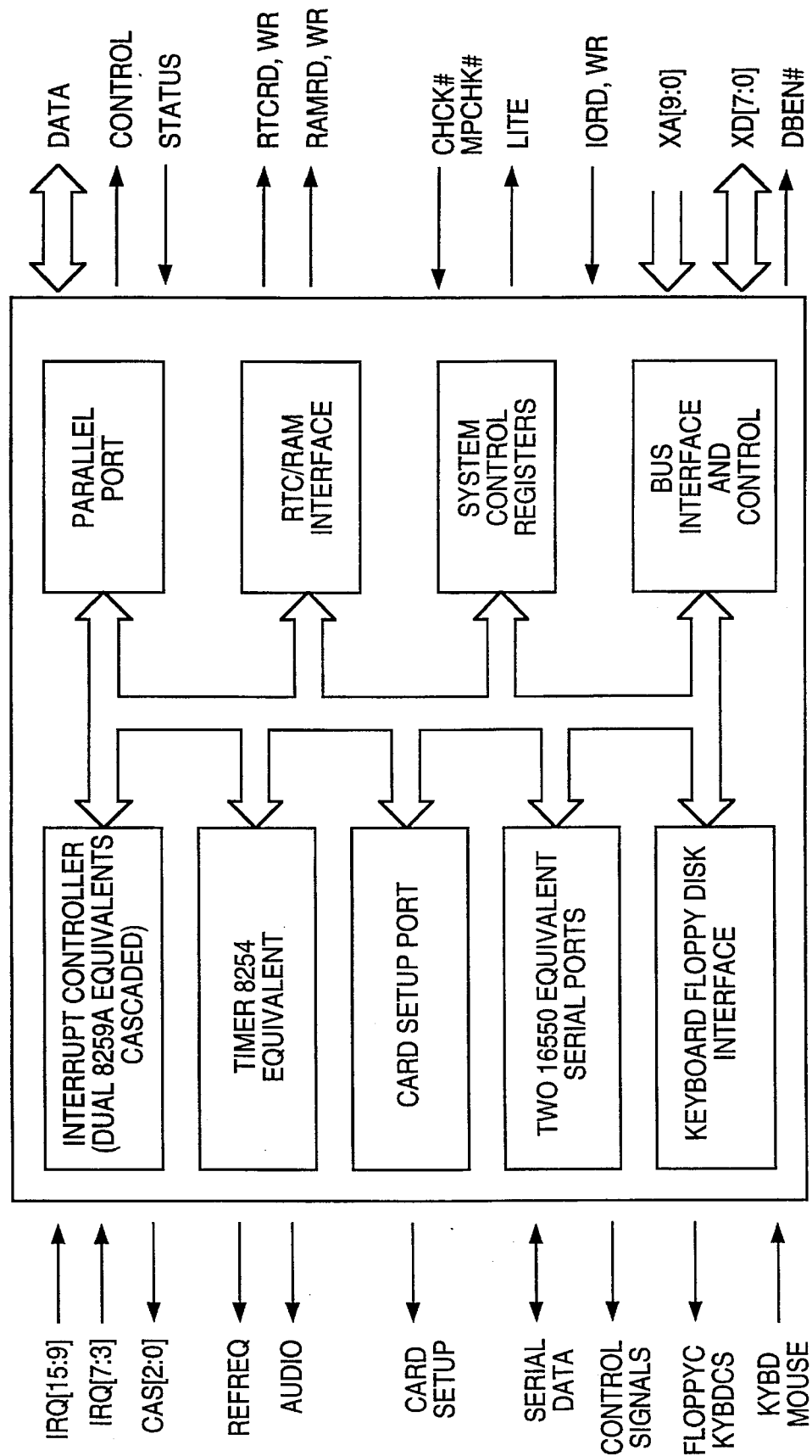
FIGS. 59–62 are block diagrams of the peripheral interface controller.
Figure 60A:
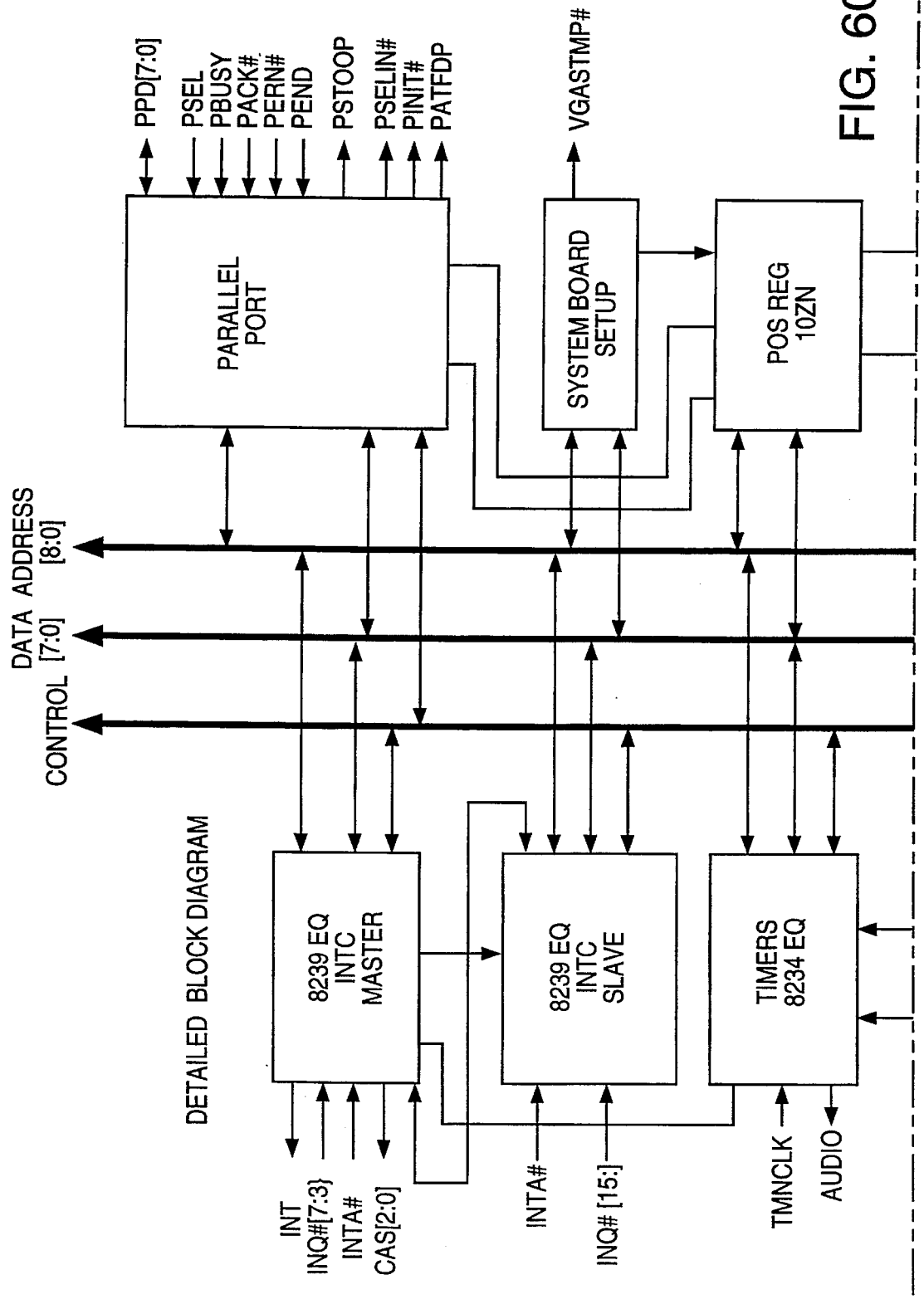
Figure 60B:
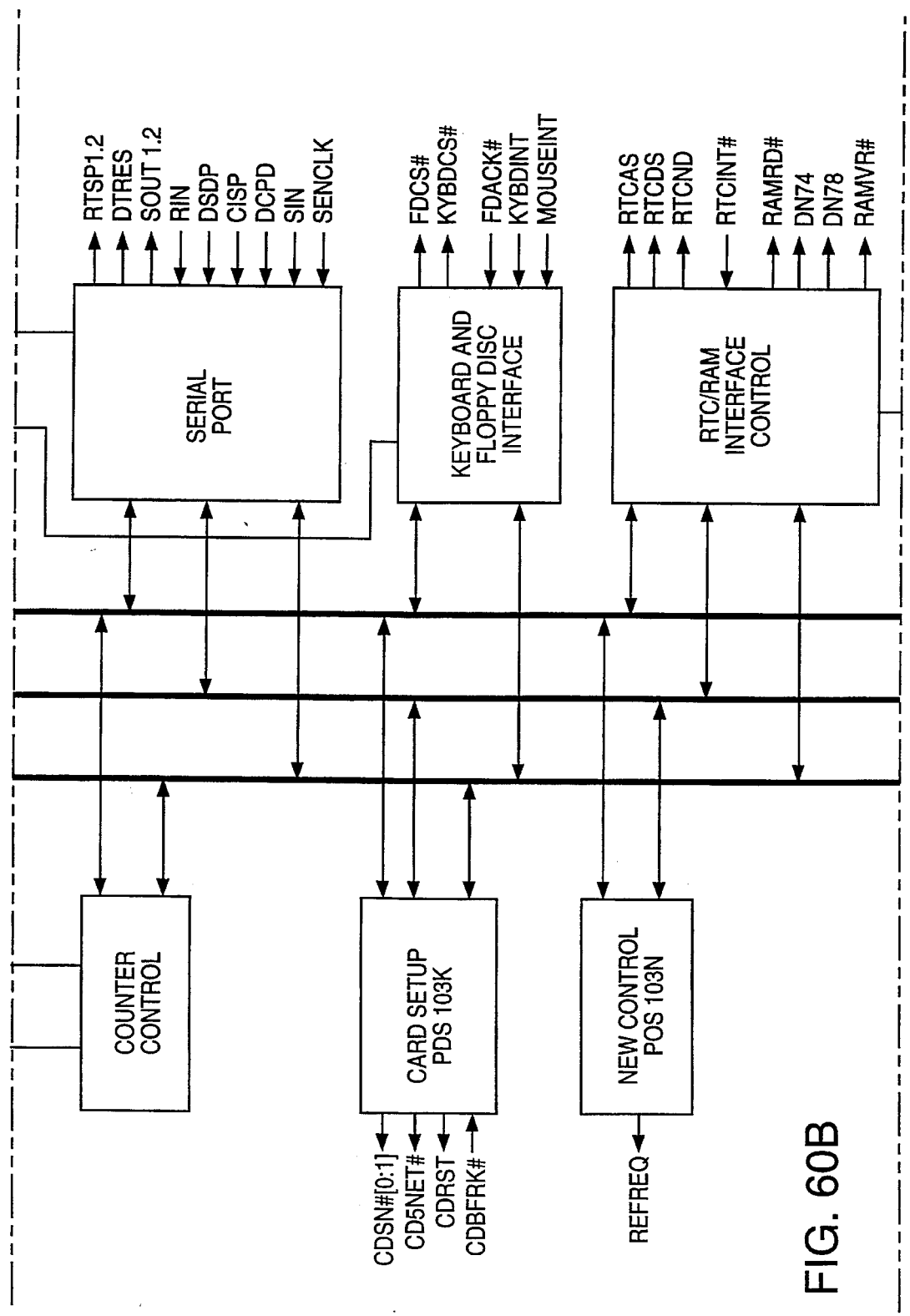
Figure 60C:
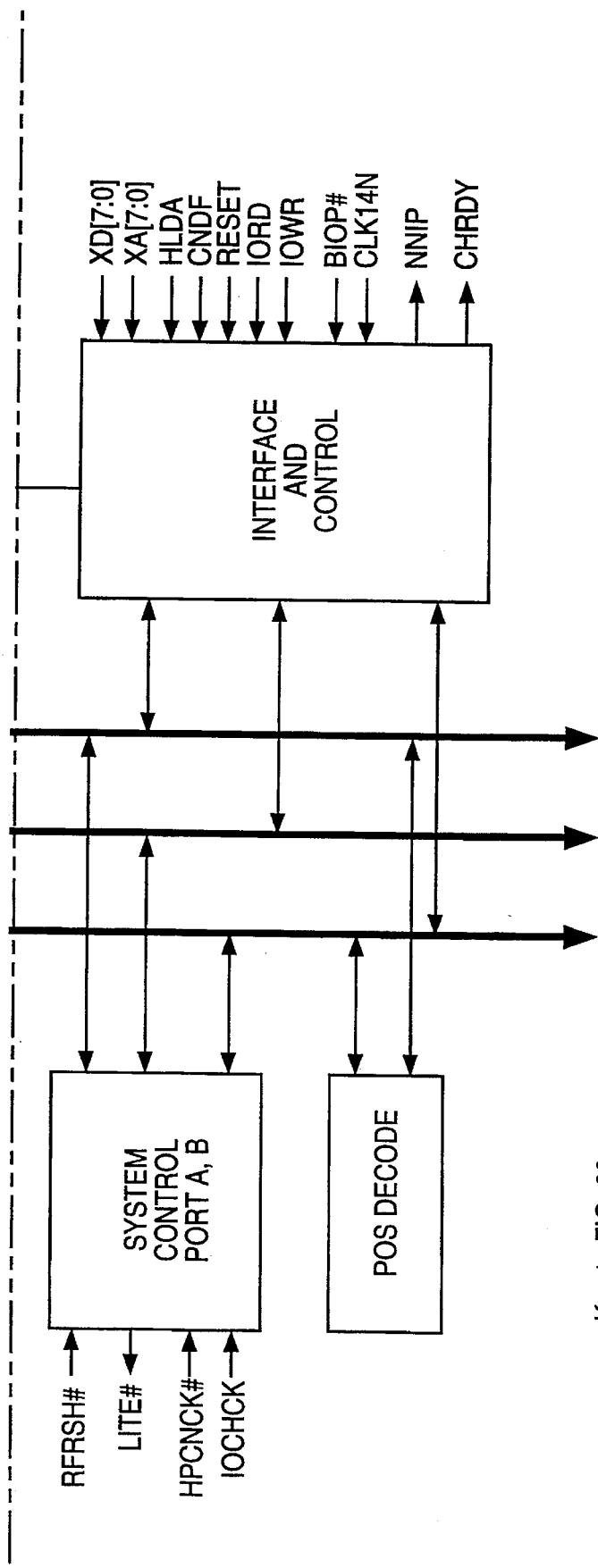

FIG. 59 shows the PIC in a block diagram.
FIG. 60 shows a more detailed block diagram of the PIC.

2. GENERAL ARCHITECTURE

2.1 OVERVIEW

The Peripheral Interface Controller (PIC) provides the essential support for the standard I/O devices in PC/AT and PS/2 compatible systems. It interfaces peripherals with the AT bus or Micro Channel.

The PIC integrates two "8259A" equivalent programmable interrupt controllers which support 15 level of interrupts and three timers for system (timer 0), audio tone generation (timer 2) and watchdog function (timer 3, for PS/2 only). The parallel port is compatible with PC/AT and additionally it also supports Micro Channel Architecture compatible "extended mode" which is bi-directional data transfers. Two "16550-equiv" serial port controllers are also integrated. The PIC also integrates the card setup port (96H) which select one of 8 adapter cards within the system, and system control port A(92H) port B(61H) for the control/status information of the system. Address decodes are provided for variety of system board resident I/O devices including floppy disk controller, keyboard controller, the real-time clock and 2K SRAM.

2.2 INTERRUPTS

Two interrupt controllers are included in the PIC. Each of the interrupt controllers is equivalent to an 8259A. The two devices are programmed to operate in Cascade Mode. The Master controller is located at address 020H–021H and the Slave is located at 0A0H–0A1H. The INT signal of Slave is connected to IR2 of Master (see FIG. 1). Two additional interconnections are made to the interrupt request inputs of the interrupt controllers. The output of Timer 0 in the 8254 timer is connected to IR0 (IRQ0) of the Master controller. The interrupt request from the Real Time Clock is connected to IR0 (IRQ8) of the Slave controller.

Figure 61:
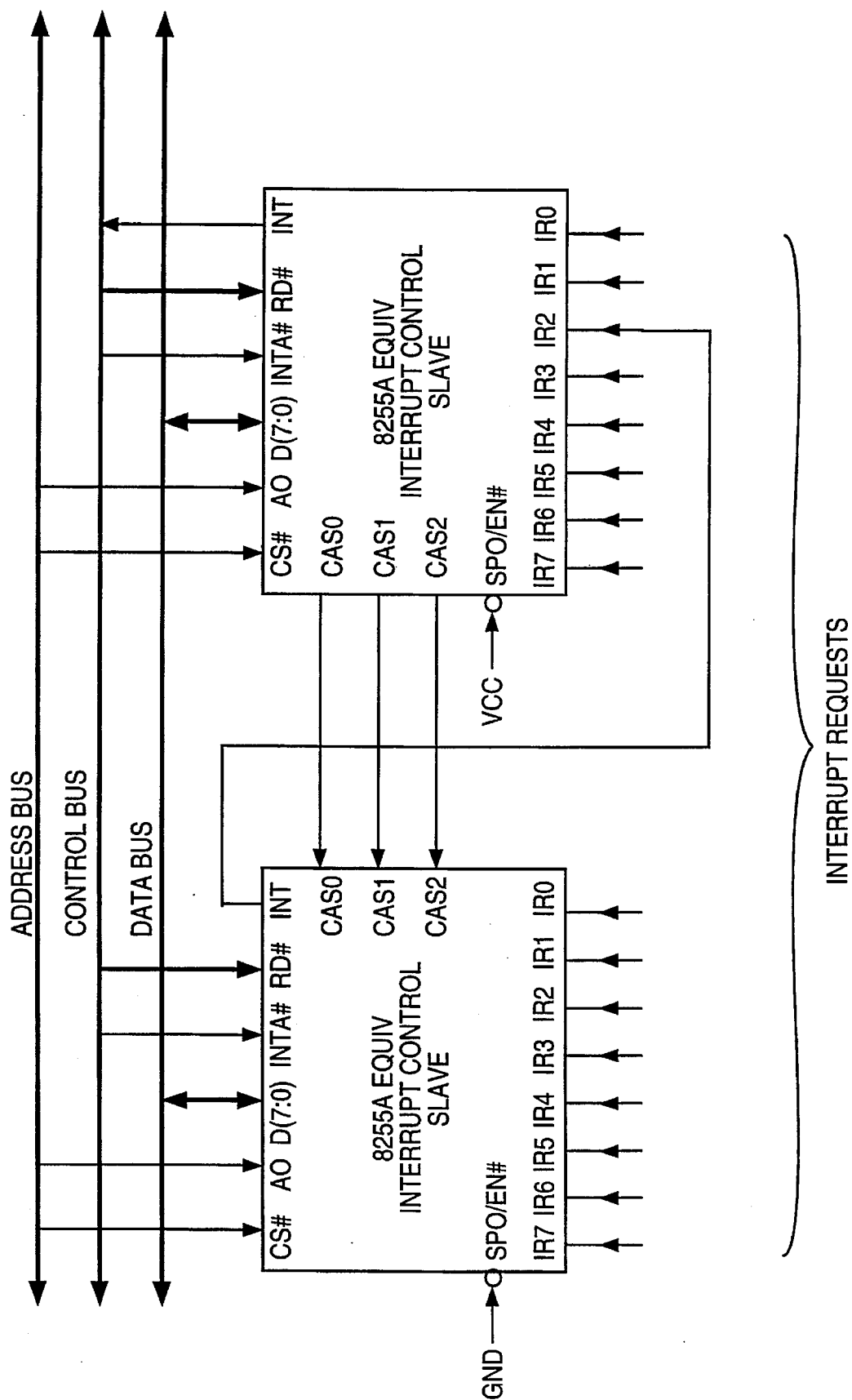

FIG. 61 shows use of the PIC.

The system provides 16 levels of system interrupts. Any or all of the interrupts may be masked, including non-maskable interrupt (except for the Watchdog timer). NMI has the highest interrupt priority. It signals the system microprocessor that a parity error, a channel check, a system channel time-out, or a system watchdog timer time-out has occurred.

2.2.1 OVERVIEW

The programmable interrupt controllers in the PIC function as a system wide interrupt manager. They accept interrupt requests from peripherals, resolve priority on pending interrupts and interrupts in service, issue an interrupt request to the CPU, and provide a vector which is used as an index by the CPU to determine which interrupt service routine to execute. A variety of priority assignment modes are provided, which can be reconfigured at any time during system operation, allowing the complete interrupt subsystem to be restructured, based on the system environment. The controllers should be programmed to operate in either the level sensitive mode for PS/2 system or the edge-triggered mode for PC/AT compatibility. The interrupt assignments are listed below. NMI is the highest priority.

| Interrupt Level Priorities | |
|---|---|
| Level | Function |
| NMI | Parity, Watchdog timer, Channel Check Arbitration time-out |
| IRQ0 | Timer |
| IRQ1 | Keyboard |
| IRQ2 | Cascade Interrupt Input |
| IR03 | Serial Alternate |
| IRQ4 | Serial Primary |
| IRQ5 | Reserved |
| IRQ6 | Floppy Disk |
| IRQ7 | Parallel Port |
| IRQ8 | Real Time Clock |
| IRQ9 | Redirect Cascade |
| IRQ10 | Reserved |
| IRQ11 | Reserved |
| IRQ12 | Mouse |
| IRQ13 | Math Coprocessor Exception |
| IRQ14 | Fixed Disk |
| IRQ15 | Reserved |

2.2.2 CONTROLLER OPERATION

Figure 62:
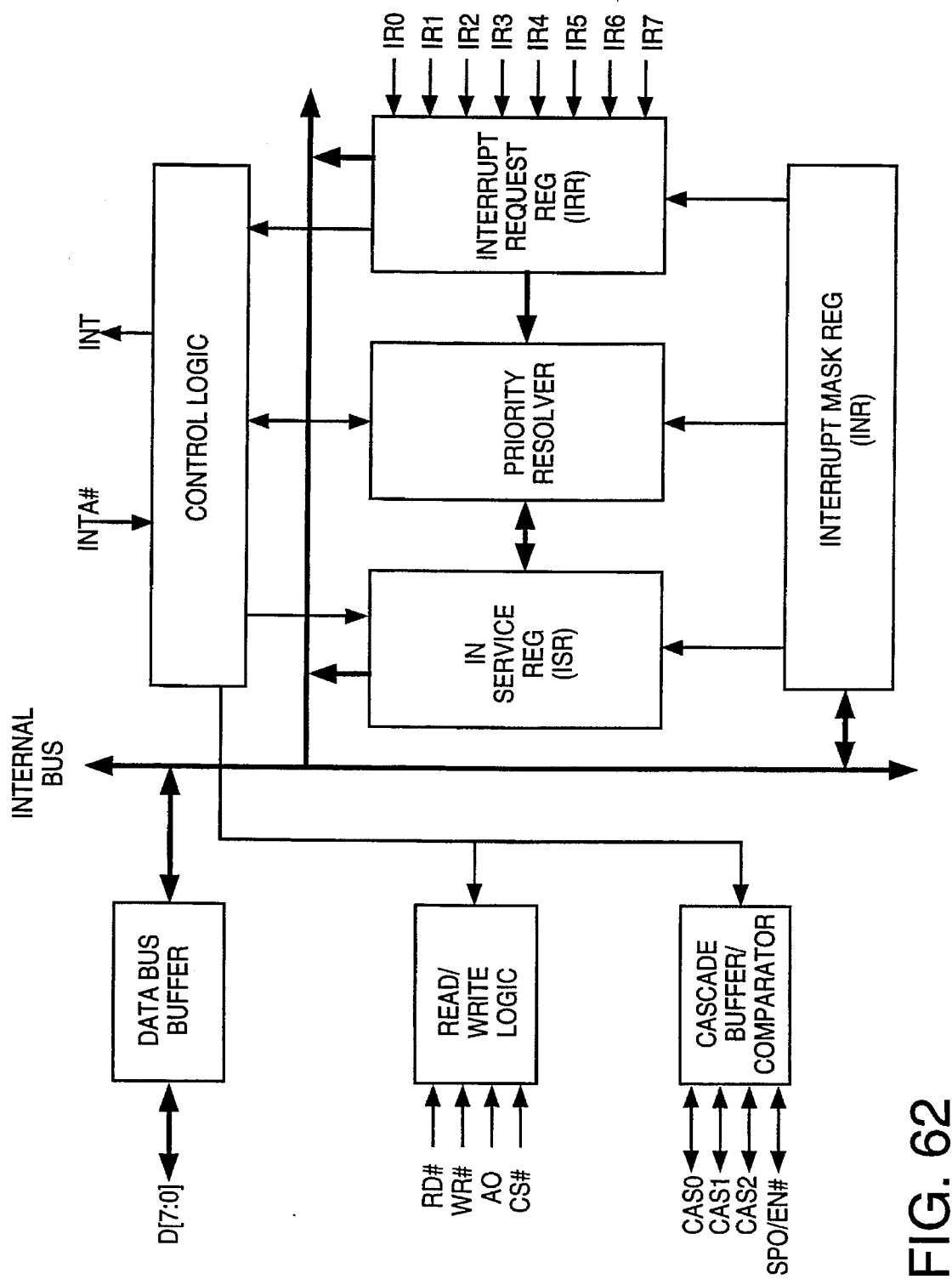

FIG. 62 is the block diagram of the interrupt controller.

The Interrupt Request Register (IRR) is used to store requests from all of the channels which are requesting service. IRR bits are labeled using the channel name IR7–IR0. The In-Service Register (ISR) contains all the channels which are currently being serviced. ISR bits are labeled IS7–IS0 and correspond to IR7–IR0. The Interrupt Mask Register (IMR) allows the CPU to disable any or all of the interrupt channels. The Priority Resolver evaluates inputs from the above three registers, issues an interrupt request, and latches the corresponding bit into the In-Service Register. During interrupt acknowledge cycles, a master controller outputs a code to the slave device which is compared in the Cascade Buffer/Comparator with a three bit ID code previously written. If a match occurs in the slave controller, it will generate an interrupt vector. The contents of the Vector Register are used to provide the CPU with an interrupt vector during interrupt acknowledge (INTA) cycles.

2.2.3 INTERRUPT SEQUENCE

The PIC allows the CPU to perform an indirect jump to a service routine in response to a request for service from a peripheral device. The indirect jump is based on a vector which is provided by the PIC on the second of two INTA cycles. The first INTA cycle is used for resolving priority and the second cycle is for transferring the vector to the CPU. The interrupt sequences are shown as follows:

1) One or more of the interrupt requests (IR7–IR0) become active, setting the corresponding IRR bit(s).

2) The interrupt controller resolves priority based on the state of the IRR, IMR ISR and asserts the INT output if appropriate.

3) The CPU accepts the interrupt and responds with an INTA cycle.

4) During the first INTA cycle, the highest priority ISR bit is set and the corresponding IRR bit is reset. The internal cascade address is generated and the XD7–XD0 outputs remain tri-stated.

5) The CPU will execute the second INTA cycle, during which the 86C150 will drive an 8-bit vector onto the data bus which will be latched by the CPU.

6) At the end of the second INTA cycle, the ISR bit will be cleared if the automatic End Of Interrupt mode is selected. Otherwise, the ISR bit must be cleared by an End Of Interrupt (EOI) command from the CPU at the end of the interrupt service routine.

2.2.4 END OF INTERRUPT

EOI is defined as the condition which causes an ISR bit to be reset. Determination of which ISR bit is to be reset can be done by a CPU command or the Priority Resolver can be instructed to clear the highest priority ISR bit.

The controller can determine the correct ISR bit to reset when operated in modes which do not alter the fully nested structure, since the current highest priority ISR bit is necessarily the last level acknowledged and serviced. In conditions where the fully nested structure is not preserved a specific EOI must be generated at the end of the interrupt service routine. An ISR bit that is masked, in Special Mask Mode by a IMR bit, will not be cleared by a non-specific EOI command. The interrupt controller can optionally generate an Automatic End Of Interrupt (AEOI) on the trailing edge of the second INTA cycle.

2.2.5 PRIORITY ASSIGNMENT

Assignment of priority is based on an interrupt channel's position relative to the other channels in the interrupt controller. After the initialization sequence, IR0 has the highest priority, IR7 has the lowest and priority assignment is fixed (Fixed Priority Mode). Priority assignment can be rotated either manually (Specific Rotation Mode) or automatically (Automatic Rotation Mode) by programming Operational Command Word 2 (OCW2).

2.2.5.1 FIXED PRIORITY MODE

This is the default condition which exists unless rotation is enabled, or the controller is programmed for Polled Mode. In fixed priority mode, interrupts are fully nested with the highest priority assigned to IR0 and lowest assigned to IR7.

2.2.5.2 SPECIFIC ROTATION MODE

The programmer can change priorities by programming the bottom priority and thus fixing all other priorities; i.e., if IR5 is programmed as the bottom priority device, then IR6 will have the highest one.

The Set Priority command is issued in OCW2 where R=1, SL=1.L0–L2 is the binary priority level code of the bottom priority device.

2.2.5.3 AUTOMATIC ROTATION MODE

In some applications there are a number of interrupting devices of equal priority. In this mode a device, after being serviced, receives the lowest priority, so a device requesting an interrupt will have to wait, in the worst case until each of 7 other devices are serviced at most once. An example is given below.

| Before Rotation (IR4 the highest priority requiring service) | | | | | | | | |
|---|---|---|---|---|---|---|---|---|
| ISR status | IS7 | IS6 | IS5 | IS4 | IS3 | IS2 | IS1 | IS0 |
|  | 0 | 1 | 0 | 1 | 0 | 0 | 0 | 0 |

| Priority Status | 7 Lowest | 6 | 5 | 4 | 3 | 2 | 1 | 0 Highest |
|---|---|---|---|---|---|---|---|---|

After Rotation

| ISR Status | IS7 0 | IS6 1 | IS5 0 | IS4 0 | IS3 0 | IS2 0 | IS1 0 | IS0 0 |
|---|---|---|---|---|---|---|---|---|
| Priority Status | 2 | 1 | 0 High | 7 Lowest | 6 | 5 | 4 | 3 |

2.2.6 PROGRAMMING THE INTERRUPT CONTROLLER

Two types of commands are used to control the interrupt controller, Initialization Command Words (ICWs) and Operational Command Words (OCWs).

2.2.6.1 INITIALIZATION COMMAND WORD

The initialization process consists of writing a sequence of 4 bytes to each interrupt controller. The initialization sequence is started by writing the first initialization command word (ICW1) to address 0020H (00A0H) with a 1 on bit 4 of the data byte. The interrupt controller interprets this as the start of an initialization sequence and does the following:

1) The edge sense circuit is reset, which means that following initialization, an IR input must make a low-to-high transition to generate an interrupt.
2) The Interrupt Mask Register is cleared.
3) IR7 input is assigned priority 7.
4) The slave mode address is set to 7.
5) Special Mask Mode is cleared.
6) The IRR is selected for Status Read operation.
7) If IC4 (bit 0 of ICW1)=0, then all functions selected in ICW4 are set to zero.

The next three I/O writes to address 0021H (00A1H) will load ICW2–ICW4. The initialization sequence can be terminated at any point by writing to address 0020H (00A0H) with a 0 in data bit 4.

ICW1 - Address 0020H (00A0H) Write Only Register

| Bit | A0 | D7 | D6 | D5 | D4 | D3 | D2 | D1 | D0 |
|---|---|---|---|---|---|---|---|---|---|
| Bit | 0 | A7 | A6 | A5 | 1 | LTIM | ADI | SNGL | IC4 |

| | |
|---|---|
| D7–D5 | Are address A7–A5 of interrupt vector address. |
| D4 | Indicates to the interrupt controller that an initialization sequence is starting and must be a 1 to write ICW1. |
| D3 | If LTIM=1, the interrupt controller will operate in the level triggered mode. LTIM=0 is in edge triggered mode. |
| D2 | Call Address Internal. ADI=1 then internal=4. ADI=0 then internal=8. |
| D1 | SNGL=1, single 8259A is used and IS NOT RECOMMENDED FOR THIS DEVICE. SNGL=0, means in Cascade Mode. |
| D0 | If this bit is set; ICW4 has to be read. If ICW4 is not needed, set IC4=0. |

ICW2 - Address 0021H (00A1H) Write Only Register

| Bit | A0 | D7 | D6 | D5 | D4 | D3 | D2 | D1 | D0 |
|---|---|---|---|---|---|---|---|---|---|
| Bit | 1 | A15 | A14 | A13 | A12 | A11 | A10 | A9 | A8 |

D7–D0  A15–A8 of interrupt vector address.

ICW3 - Address 0021H (Master Device)

| Bit | A0 | D7 | D6 | D5 | D4 | D3 | D2 | D1 | D0 |
|---|---|---|---|---|---|---|---|---|---|
| Bit | 1 | S7 | S6 | S5 | S4 | S3 | S2 | S1 | S0 |

D7–D0  Select which IR inputs have Slave Mode Controllers connected. ICW3 in the Master controller must be written with a 04H for Slave controller to function.

ICW3 - Address 00A1H (Slave Device)

| Bit | A0 | D7 | D6 | D5 | D4 | D3 | D2 | D1 | D0 |
|---|---|---|---|---|---|---|---|---|---|
| Bit | 1 | 0 | 0 | 0 | 0 | 0 | ID2 | ID1 | ID0 |

D2–D0  ID2 to ID0 identify the slave.

ICW4 - Address 0021H (00A1H)

| Bit | A0 | D7 | D6 | D5 | D4 | D3 | D2 | D1 | D0 |
|---|---|---|---|---|---|---|---|---|---|
| Bit | 1 | 0 | 0 | 0 | SFNM | BUF | M/S | AEOI | UP |

| | |
|---|---|
| D4 | SFNM. If SFNM=1, the special fully nested mode is programmed. |
| D3 | BUF. If BUF=1, the buffered mode is programmed. If BUF=0, non buffered mode is selected. |
| D2 | M/S. If buffered mode is selected, M/S=1 means the 8259A is programmed to be a master, M/S=0 means the 8259A is a slave. |
| D1 | AEOI. If AEOI=1, the automatic end of interrupt mode is programmed. |
| D0 | UP. Microprocessor Mode. |

2.2.6.2 OPERATION COMMAND WORD

After the initialization command words are programmed into the 8259A, the chip is ready to accept interrupt requests at its input lines. However, during the 8259A operation, a selection of algorithms can command the chip to operate in various modes through the Operation Command Words (OCWs).

OCW1 - Address 0021H (00A1H)

| Bit | A0 | D7 | D6 | D5 | D4 | D3 | D2 | D1 | D0 |
|---|---|---|---|---|---|---|---|---|---|
| Bit | 1 | M7 | M6 | M5 | M4 | M3 | M2 | M1 | M0 |

D7–D0  M7–M0 represent the eight mask bits. It sets and clears the mask bits in Interrupt Mask Register. M=1 indicates the channel is masked. M=0 indicates the channel is enabled.

OCW2 - Address 0020H (00A0H)

| Bit | A0 | D7 | D6 | D5 | D4 | D3 | D2 | D1 | D0 |
|---|---|---|---|---|---|---|---|---|---|
| Bit | 0 | R | SL | EOI | 0 | 0 | L2 | L1 | L0 |

D7–D5  R, SL, EOI. These three bits control the Rotate and End of Interrupt modes and combinations of the two.

| R | SL | EOI | |
|---|---|---|---|
| 0 | 0 | 1 | Non-specific EOI command |
| 0 | 1 | 1 | Specific EOI command |
| 1 | 0 | 1 | Rotate on non-specific EIO command |
| 1 | 0 | 0 | Rotate in automatic EIO mode (set) |
| 0 | 0 | 0 | Rotate in automatic EIO mode (clear) |
| 1 | 1 | 1 | Rotate on specific EIO command |
| 1 | 1 | 0 | Set priority command |
| 0 | 1 | 0 | No operation |

D2–D0  L2–L0. These three bits are internally decoded to select which interrupt channel is to be affected by the Specific command.

OCW3 - Address 0020H (00A0H)

| Bit | A0 | D7 | D6   | D5  | D4 | D3 | D2 | D1 | D0  |
|-----|----|----|------|-----|----|----|----|----|-----|
|     | 0  | 0  | ESMM | SMM | 0  | 1  | P  | RR | RIS |

Bit

D6    ESMM. When this bit is set to 1, it enables the set/reset Special Mask Mode function which is controlled by D5 (SMM).

D5    SMM. If ESMM=1, write a 1 to SMM will enable the Special Mask Mode while a 0 to SMM will disable the Special Mask Mode.

D2    P. Polled Mode is enabled by writing a 1 to this bit. This mode is useful if there is a routine command common to several levels so that the INTA sequence is not needed (saves ROM space).

D1    RR. When RR bit is set to 1, reading the Status Port at address 0021H (00A1H) will cause the contents of IRR or ISR (determined by RIS bit) to be placed on XD7–XD0.

D0    RIS. This bit selects between the IRR and the ISR during Status Read operations if RR=1.

2.3 TIMERS

The PIC integrates an 8254 compatible timer/counter. The timer section provides three programmable timer/counters; Channel 0, Channel 2, and Channel 3. Channel 0 and Channel 2 are 16 bit counters similar in function to those contained in 8254. Channel 3, called Watchdog Timer, is an 8 bit counter which operates only in mode 0. The counter control unit has to monitor various situations while writing the command words to 8254 to guarantee that each channel is programmed correctly.

2.3.1 CHANNEL 0: SYSTEM TIMER

GATE0 is always enabled, which will make timer mode 1 and mode 5 invalid for Channel 0.

CLK0 is driven by 1.19 Mhz.

OUT0's rising edge will set IRQ0 latch which is connected to IR0 of Master Interrupt Controller. The latch may be cleared by a system reset, an interrupt acknowledge cycle with a vector of hex 08, or an I/O write to port hex 061 with bit 7 equal to 1. Signals derived from OUT0 are used to gate and clock Channel 3. For proper operation of Channel 3 time-out function, Channel 0 must be programmed to either mode 2 or mode 3. Channel 0's counter can either be programmed to operate in 16-bit binary or BCD count down.

2.3.2..CHANNEL 1: REFRESH REQUEST GENERATOR

GATE1 is always tied on.

CLK1 is driven by 1.19 MHZ.

OUT1 is the refresh request signal. Channel 1 is programmed as a rate generator to produce a 15-microsecond period signal and is used at AT only.

2.3.3 CHANNEL 2: TONE GENERATION FOR SPEAKER

GATE2 is controlled by bit 0 of port hex 061. Setting this bit causes GATE2 to go high.

CLK2 is driven by 1.19 MHZ.

OUT2 is connected to two places. One connection is to the input port hex 061, bit 5. OUT2 is also logically ANDed with port hex 061, bit1. The output of the AND gate drives the "audio sum node" signal.

This channel supports all program modes. Channel 2's counter may be programmed to operate in 16-bit binary or BCD count down mode.

2.3.4 CHANNEL 3: WATCHDOG TIMER

GATE3 is tied to IRQ0.

CLK3 is tied to Channel 0's OUT0 inverted.

OUT3 when high drives the NMI active.

The Watchdog timer detects when IRQ0 is active for more than one period of OUT0. If IRQ0 is active when a rising edge of OUT0 occurs, the count is decremented. When the count is decremented to 0, an NMI is generated. Thus, the Watchdog timer may be used to detect when IRQ0 is not being serviced. This is useful to detect error conditions.

BIOS interfaces are provided to enable and disable the Watchdog timer. When the Watchdog timer times out, it causes an NMI and sets port hex 092, bit 4. This bit may be cleared by using the BIOS interface to disable the Watchdog timer.

Channel 3 only operates in mode 0, 8-bit binary and is for PS/2 system only. Channel 3 operation is defined only when Channel 0 is programmed to operate in mode 2 or mode 3. When Channel 3 is enabled and IRQ0 is active for more than one period of OUT0, an INHIBIT signal is generated which prevents writing data to Channel 0 or Channel 3. INHIBIT is never active when Channel 3 is disabled.

2.3.5 TIMERS PROGRAMMING AND CONTROL

The system treats the programmable interval timer as an arrangement of five external I/O ports. Three ports are treated as count registers and two are control registers for mode programming. Counters are programmed by writing a control word and then an initial count. The count must follow the count format specified in the control word.

2.3.5.1 CONTROL FUNCTION FOR CHANNEL 0 AND 2

The following are I/O registers allocated to Counter 0 and 2:

0040h    Read/Write Counter 0
0042h    Read/Write Counter 2
0043h    Write only Control Byte for Channel 0 or 2
Port Hex 0040 - Count Register - Channel 0

Before accessing port 0040h, port 0043 must be programmed with the appropriate control word followed by an initial count value to port 0040h.

Port Hex 0042—Count Register—Channel 2

Before accessing port 0042h, port 0043h must be programmed with the appropriate control word, followed by an initial count value to port 0042h.

Port Hex 0043—Control Byte—Channel 0 or 2

This is a write-only register. The bit definitions are as follows:

| Bit | Label | | Function |
|-----|-------|---|----------|
|     | Counter Control Bit Assignments Port 0043 Hex | | |
| 7, 6 | SC1, | SC0 | Counter Select |
|      | 0    | 0   | Select Counter 0 |
|      | 0    | 1   | Reserved |
|      | 1    | 0   | Select Counter 2 |
|      | 1    | 1   | Reserved |
| 5, 4 | RW1, | RW0 | Byte Select |
|      | 0    | 0   | Counter Latch Command |
|      | 0    | 1   | Read/Write Counter Bits 0–7 only |
|      | 1    | 0   | Read/Write Counter Bits 8–15 only |
|      | 1    | 1   | Read/Write Counter Bits 0–7 first then Bits 8–15 |
| 3, 2, 1 | M2, | M1, M0 | Mode |
|      | 0    | 0   0 | Mode 0 Interrupt on Terminal Count |
|      | 0    | 0   1 | Mode 1 Re-triggerable One Shot |
|      | x    | 1   0 | Mode 2 Rate Generator |
|      | x    | 1   1 | Mode 3 Square Wave |
|      | 1    | 0   0 | Mode 4 Software Re-triggerable Strobe |

| Counter Control Bit Assignments Port 0043 Hex | | | |
|---|---|---|---|
| Bit | Label | | Function |
| | 1 | 0 1 | Mode 5 Hardware Re-triggerable Strobe |

2.3.5.2 CONTROL FUNCTION FOR CHANNEL 3
0044h Read/Write Counter 3
0047h Write only Control Byte for Channel 3
Port Hex 0044 - Counter Register - Channel 3

Before accessing port 0044h, port 0047 must be programmed with the appropriate control word, following by an initial count value to port 0044h.

Port Hex 0047 - Control Byte - Channel 3
This is write only register. The bit definitions are as follow:

| Counter Control Bit Assignments Port 47 Hex | | | |
|---|---|---|---|
| Bits | Label | | Function |
| 7, 6 | SC1, | SC0 | Counter Select |
| | 0 | 0 | Select Counter 3 |
| | 0 | 1 | Reserved |
| | 1 | 0 | Reserved |
| | 1 | 1 | Reserved |
| 5, 4 | RW1, | RW0 | Byte Select |
| | 0 | 0 | Counter Latch Command |
| | 0 | 1 | Read/Write Counter Bits 0–7 only |
| | 1 | 0 | Reserved |
| | 1 | 1 | Reserved |
| 3, 2, 1, 0 | Must be = 0 | | Mode 0 and Binary count only |

2.4 PARALLEL PORT

The PIC integrates a parallel port to provide support for devices that require 8 bits parallel data transfer. The parallel port is compatible with PC/AT implementation which is unidirectional data transfers, namely output, additionally it also supports Micro Channel Architecture extended mode which is bi-directional data transfers.

2.4.1 PARALLEL PORT PROGRAMMABLE OPTION SELECT

The parallel port can be programmed to reside at three different I/O locations, and the desired location can be selected by setting bits[6, 5] in system POS register 102. The assignments are as follows:

| Parallel Port Assignment | | |
|---|---|---|
| Bit 6 | Bit 5 | Function |
| 0 | 0 | LPT1(PARALLEL 1) |
| 0 | 1 | LPT2(PARALLEL 2) |
| 1 | 0 | LPT3(PARALLEL 3) |
| 1 | 1 | UNDEFINED |

2.4.2 PARALLEL PORT CONFIGURATION

The corresponding address assignments are shown below:

| | Data Address | Status Address | Control Address |
|---|---|---|---|
| Parallel 1 | 03BC | 03BD | 03BE |
| Parallel 2 | 0378 | 0379 | 037A |
| Parallel 3 | 0278 | 0279 | 027A |

2.4.3 PARALLEL PORT EXTENDED MODE

The parallel port extended mode is for Micro Channel only. The extended mode option of the parallel port can be selected by setting port 102 bit 7 to a zero. In the extended mode, the parallel port is configured to support bi-directional data transfers. The possible configurations for the parallel port in the extended mode are shown below:

| Port Mode | Port Direction | POS 102 Bit 7 | Parallel Ctl Direction bit | System Reset |
|---|---|---|---|---|
| Extended | Write | 0 | 0 | 1 |
| Extended | Write | 0 | 0 | 0 |
| Extended | Read | 0 | 1 | 0 |
| Compatible | Write | 1 | NA | 0 |

2.4.4 DATA ADDRESS PORT

The data address port is the 8-bit data port for both the compatible and extended modes. For the compatible mode, a write operation to this port immediately presents data to the connector pins. A read operation from this port in the compatible mode produces the data that was last written to it.

In the extended mode, a write operation to this port latches the data but it is only presented to the connector pins if the direction bit was set to Write in the parallel control port. A read operation in the extended mode produces either:

1) The data previously written if the direction bit in the parallel control port is set to Write.

2) The data on the connector pins from another device if the direction bit is set to Read.

2.4.5 PARALLEL PORT STATUS PORT

The status port is a read-only port in either mode. A read operation to this port presents the system microprocessor with the interrupt pending status of the interface as well as the real time status of the connector pins as shown in the following figure. An interrupt is pending when the interrupt status bit is set to 0.

| Port bit | Port Data |
|---|---|
| BIT 7 | BUSY# |
| BIT 6 | ACK# |
| BIT 5 | PE |
| BIT 4 | SELECT |
| BIT 3 | ERROR# |
| BIT 2 | IRQ# STATUS |
| BIT 1, 0 | RESERVED |
| Bit 7 | When low, it indicates that the port is currently busy and cannot accept new data. |
| Bit 6 | This bit represents the current state of the printer ACK# signal. When this bit is set to 0, the printer is ready to accept another byte of data. |
| Bit 5 | When this bit is set to 1, the printer has detected the end of paper. |
| Bit 4 | This bit represents the current state of the 'select' signal. When this bit is set to 1, the printer has been selected. |
| Bit 3 | This bit represents the current state of the printer 'error#' signal. When this bit is set to 0, the printer has encountered an error condition. |
| Bit 2 | When this bit is set to 0, the printer has acknowledged the previous transfer using the 'acknowledge#' signal. |
| Bit 1, 0 | Reserved |

2.4.6 PARALLEL PORT CONTROL PORT

The parallel control port is a read or write port. A write operation to this port latches the six least-significant data bits of the bus. The sixth bit corresponds to the direction control bit and is only applicable in the extended mode. The remaining five bits are compatible with previous implementations as shown in the following figure. A read operation to the parallel control port presents the system microprocessor the data that was last written to it, with the exception of the write-only direction bit.

| Port Bit | Port Data |
|---|---|
| Bit 7, 6 | Reserved |
| Bit 5 | Direction |
| Bit 4 | IRQ EN |
| Bit 3 | Pin 17 (SLCT IN) |
| Bit 2 | Pin 16 (INIT#) |
| Bit 1 | Pin 14 (AUTO FD XT) |
| Bit 0 | Pin 1 (STROBE) |
| Bit 7, 6 | Reserved |
| Bit 5 | This bit controls the direction of the data port. This is a Write-only bit. |
| Bit 4 | This bit enables the parallel port interrupt. When this bit is set to 1, an interrupt occurs when the 'acknowledge#' signal changes from active to inactive. |
| Bit 3 | This bit controls the 'select in' (SLCT IN) signal. When this bit is set to 1, the printer is selected. |
| Bit 2 | This bit controls the 'initialize printer' (INIT#) signal. When this bit is set to 0, the printer starts. |
| Bit 1 | This bit controls the 'automatic feed XT' (AUTO FD XT) signal. When this bit is set to 1, the printer will automatically line feed after each line is printed. |
| Bit 0 | This bit controls the 'strobe' signal to the printer. When this bit is set to 1, data is pulse-clocked into the printer. |

2.5 SYSTEM CONTROL PORT A AND PORT B

The I/O location at 0092H and 0061H provide variety of control and status information for the system as described below:

2.5.1 SYSTEM CONTROL REGISTER A; PORT 0092H

Port 0092H supports the fixed disk drive light, alternate system microprocessor reset, Pass A20, Watchdog timer status, and CMOS security lock. The following shows the bit definitions for port 0092H.

| Bit | Rd/Wr | Function |
|---|---|---|
| 7 | R/W | Light A |
| 6 | R/W | Light B |
| 5 | R/W | Reserved=0 |
| 4 | R | Watchdog Timer Status |
| 3 | R/W | Security Lock Latch |
| 2 | R/W | Reserved=0 |
| 1 | R/W | Alternate Gate A20 |
| 0 | R/W | Alternate Hot Reset |
| Bit 7, 6 | | These bits control the fixed disk activity light. Setting either bit to 1 turns the fixed disk activity light on. The power-on reset condition of each bit is 0. |
| Bit 5 | | Reserved |
| Bit 4 | | Read only, indicates Watchdog timer status. A high indicates that the Watchdog timer time-out. |
| Bit 3 | | This R/W bit provides the security lock for the secured area of the RT/CMOS. Setting this bit to 1, electrically locks the 8-byte password. |
| Bit 2 | | Reserved |
| Bit 1 | | This R/W bit can be used to control address bit A20 when the microprocessor is in the Real Address Mode. When this bit is set to 1, the 'A20' signal is active. When this bit is set to 0, A20 is inactive. |
| Bit 0 | | This bit must be set to 0 by a system reset or a write operation. When set, the alternate reset signal will be pulsed for 100 to 125 ns. The reset |

| Bit | Rd/Wr | Function |
|---|---|---|
| | | occurs after a minimum delay of 6.72 micro sec. After writing this bit from 0 to 1, the latch remains set so POST can read this bit. If the bit is a 0, POST assumes the system was just powered on. If the bit is a 1, POST assumes a switch from the Protected Mode to the Real Mode has taken place. |

2.5.2 SYSTEM CONTROL REGISTER B; PORT 0061H

Port B is accessed by I/O read or write operations to I/O address 0061H. The following shows the bit definitions.

| Bit | RD/WR | Function |
|---|---|---|
| 7 | WR | Reset IRQ0 |
| | RD | Parity Check |
| 6 | WR | Reserved |
| | RD | Channel Check |
| 5 | WR | Reserved |
| | RD | Timer 2 Output |
| 4 | WR | Reserved |
| | RD | Refresh Detect |
| 3 | RD/WR | Enable Channel Check |
| 2 | RD/WR | Enable Parity Check |
| 1 | RD/WR | Enable Speaker Data |
| 0 | RD/WR | Timer 2 Gate |
| Bit 7 | | A write operation with this bit set to 1, resets IRQ0. For a read operation, this bit indicates the state of the Parity Check latch. If the bit is equal to 1, a parity check has occurred. |
| Bit 6 | | For a read operation, this bit returns the state of the Channel Check latch. If the bit is equal to 1, a channel check has occurred. |
| Bit 5 | | For a read operation, this bit returns the condition of timer/counter 2 output signal. |
| Bit 4 | | For a read operation, this bit toggles for each refresh request. |
| Bit 3 | | A write operation with this bit set to 0 enables channel check. This bit is set to 1 during a power-on reset. A read operation returns the result of the last write operation to this bit. |
| Bit 2 | | A write operation with this bit set to 0 enables parity check. This bit is set to 1 during a power-on reset. A read operation returns the result of the last write operation to this bit. |
| Bit 1 | | A write operation with this bit set to 1 enables speaker data. This bit is set to 1 during a power-on reset. A read operation returns the result of the last write operation to this bit. |
| Bit 0 | | A write operation with this bit set to 1 enables the timer 2 gate. Setting this bit turns the gate off. A read operation returns the result of the last write operation to this bit. |

2.6 SYSTEM BOARD SETUP

The integrated I/O functions of the system board use POS information during the setup procedure. The diskette drive controller, serial port, and parallel port are treated as a single device. Although the VGA is an integrated part of the system board, POS treats it as a separate device. The Setup Enable register is used to place the system board or the video subsystem into setup.

2.6.1 SYSTEM BOARD SETUP ENABLE (PORT 0094H)

The Setup Enable register is a read/write register at I/O address 0094H. The bit definitions are shown below.

| Bit | Function |
|---|---|
| 7 | System Board Functions +Enable/−Setup |
| 6 | Reserved |
| 5 | VGA +Enable/−Setup |
| 4–0 | Reserved |

-continued

| Bit | Function |
|---|---|
| Bit 7 | When set to 1, this bit enables various functions of the system board and system board resident I/O functions. When set to 0, these functions are placed in setup. |
| Bit 5 | When set to 1, this bit enables the VGA. When set to 0, the VGA is placed in the setup mode. |

2.6.2 SYSTEM BOARD I/O PORT CONTROL (POS 0102H)

When bit 7 of the Setup Enable Register is set to 0, the diskette drive controller, serial and parallel interfaces are controlled by a bit pattern written to port 0102H, the System Board I/O byte.

A read operation to port 0102H returns the current state of the respective system board function. All bits are read/write. The bit definitions are given below.

| Bit | Function |
|---|---|
| 7 | Enable/Disable Parallel Extended Mode |
| 6 | Parallel Port Select (High Bit) |
| 5 | Parallel Port Select (Low Bit) |
| 4 | Enable/Disable Parallel Port |
| 3 | Serial Port Select |
| 2 | Enable/Disable Serial Port |
| 1 | Enable/Disable Diskette Drive Interface |
| 0 | Enable/Disable System Board |
| Bit 7 | When set to 0, this bit allows the parallel port to be configured as an 8-bit parallel bidirectional interface. When set to 1, the bidirectional mode is disabled. |
| Bit 6, 5 | The state of these bits selects the configuration of the system board parallel port. |
| Bit 4 | When set to 1, this bit enables the system board parallel port, if bit 0 is set to 1. When set to 0, the system board parallel port is disabled. |
| Bit 3 | When set to 1, this bit sets the system board serial port as Serial 1. When set to 0, the system board serial port is set to Serial 2. |
| Bit 2 | When set to 1, the bit enables the system board serial port, if bit 0 is set to 1. When set to 0, the system board serial port is disabled. |
| Bit 1 | When set to 1, this bit enabled the diskette drive interface providing bit 0 is set to 1. When set to 0, the diskette drive interface is disabled. |
| Bit 0 | When set to 1, this bit allows bits 4, 2 and 1 to enable and disable their respective devices. When set to 0, the diskette drive interface, system board serial port, system board parallel port are disabled regardless of the state of bits 4, 2 and 1. |

2.7 CARD SETUP

The 86C150 integrates the Card Setup Port (0096H), which generates the card setup lines to the individual Micro Channel connectors. This port also features a software generated reset capability that resets the Micro Channel, serial port, and parallel port independently of the reset of the system. The bit definitions are shown below. The register is a read/write register.

| Bit | RD/WR | Function |
|---|---|---|
| 7 | R/W | Channel Reset |
| 6–4 | R/W | Reserved |
| 3 | R/W | Card Select Enable |
| 2–0 | R/W | Card Select bits 2–0 |

2.7.1 CARD SELECT FEEDBACK REGISTER (PORT 0091H)

When an access to the address space of the adapter occurs, the adapter responds by setting the 'card select feedback' signal to 0. The card select feedback signal is latched by the system board and made available on subsequent cycles.

In order to determine if the VGA, the system board, or an adapter is addressed and functioning, the card select feedback byte is provided. This byte can be read at address 0091H. Bit 0 of this byte is set to 1 whenever the card select feedback signal was active on a previous cycle or when the system board I/O devices are accessed by an I/O cycle. Bit 0 is reset by the read operation. Bit 1 through 7 are reserved. This byte is Read-Only.

2.7.2 MEMORY CONTROL REGISTER (PORT 0103H)

The port at address 0103H controls the refresh rate to the memory and enables the system board RAM memory. To access this register, I/O address 0096H bit 3 must be set to 0 to avoid sending a 'setup' signal to one of the channel connectors. Also, I/O address 0094H bit 7 must be set to 0, causing the system board to accept setup cycles. After accessing the Memory Control Register, I/O address 0094H, bit 7 must be set to 1. The register is accessed using I/O address 0103H and is Write-Only.

| Bit | Function |
|---|---|
| 7–2 | Reserved=0 |
| 1 | Fast Refresh |
| 0 | Reserved |
| Bit 7–2 | Reserved. These bits must be set to 0. |
| Bit 1 | When this bit is set to 0, a fast refresh of approximately 0.8 microseconds is selected. When set to 1, a normal refresh of approximately 15.12 microseconds is selected. |
| Bit 0 | Reserved. |

2.8 SERIAL PORT

The PIC integrates two NS16550 equivalent serial ports. The NS16550 controller is functionally compatible to the NS16450 controller. To programs, the NS16550 appears to be identical to the serial port of IBM PC/AT Serial/Parallel adapter. Support for the controller is restricted to the functions which are identical to the NS16450. Using the controller in the FIFO mode may result in non-detectable data error.

The serial port controller provides the following functions:

a) Full double buffering in the character mode, eliminating the need for precise synchronization b) False-start bit detection c) Line-break generation and detection d) Modem control functions:

Clear to send (CTS)

Request to send (RTS)

Data set ready (DSR)

Data terminal ready (DTR)

Ring indicator (RI)

Data carrier detect (DCD)

e) Capable of running all existing 16450 software f) Adds or deletes standard asynchronous communication bits (start, stop, and parity) to or from the serial data g) Programmable baud generator divides any input clock by 1 to 65, 535 and generates the 16× clock h) In the FIFO mode, transmitter and receiver are each buffered with 16 byte FIFO's to reduce the number of interrupts presented to the CPU i) Fully programmable serial-interface characteristics:
5-, 6-, 7-, or 8-bit characters
Even, odd, or no-parity bit generation and detection
1-, 1½-, or 2-stop bit generation
Baud generation

2.8.1 PORT SETUP AND INTERRUPT

The PIC integrates two serial ports into the chip. It is configured and enabled by ESR: 1 (extended setup register 1). In IBM mode, only one serial port is selected. The selection of either port is determined by the bit 7 of the system board setup enable register (Hex 0094) and bit 3 of the system board I/O byte (Hex 0102). When bit 7 of the setup enable register is set to 0, the serial port is controlled by bit 3 of the system board I/O byte. A 1 in bit 3 sets the serial port as serial 1, and a 0 sets it as serial 2. When configured as serial 1, the I/O address is at 03F8–03FF Hex. As serial 2, the port is at address 02F8–02FF Hex.

Two interrupt lines are provided to the system. Interrupt level 4 (IRQ4) is for Serial 1 and interrupt level 3 (IRQ3) is for Serial 2. To allow the controller to send interrupts to the interrupt controller, bit 3 of the Modem Control register must be set to 1.

2.8.2 PROGRAMMABLE BAUD-RATE GENERATOR

The controller has a programmable baud-rate generator that can divide the clock input (1.8432 MHZ) by a divisor from 1 to 65, 535. The output frequency of the baud-rate generator is the baud rate multiplied by 16. Two 8-bit latches store the divisor in a 16-bit binary format. These divisor latches must be loaded during setup to ensure desired operation of the baud-rate generator. When either of the divisor latches is loaded, a 16-bit baud counter is immediately loaded. This prevents long counts on the first load.

2.8.3 REGISTERS

The controller has a number of accessible registers. The system programmer may gain access to or control any of the controller registers through the system microprocessor. These registers are used to control the controller operations and to transmit and receive data. They are listed as follow:

| DLAB State | Address Hex | R/W | Register |
|---|---|---|---|
| For Serial 1: | | | |
| 0 | 03F8 | W | Transmitter Holding Register |
| 0 | 03F8 | R | Receiver Buffer Register |
| 1 | 03F8 | R/W | Divisor Latch, Low Byte |
| 1 | 03F9 | R/W | Divisor Latch, High Byte |
| 0 | 03F9 | R/W | Interrupt Enable Register |
| X | 03FA | R | Interrupt Identification Register |
| X | 03FA | W | FIFO Control Register |
| X | 03FB | R/W | Line Control Register |
| X | 03FC | R/W | Modem Control Register |
| X | 03FD | R | Line Status Register |
| X | 03FE | R | Modem Status Register |
| X | 03FF | R/W | Scratch Register |
| For Serial 2: | | | |
| 0 | 02F8 | W | Transmitter Holding Register |
| 0 | 02FB | R | Receiver Buffer Register |
| 1 | 02F8 | R/W | Divisor Latch, Low Byte |
| 1 | 02F9 | R/W | Divisor Latch, High Byte |
| 0 | 02F9 | R/W | Interrupt Enable Register |
| X | 02FA | R | Interrupt Identification Register |
| X | 02FA | W | FIFO Control Register |
| X | 02FB | R/W | Line Control Register |
| X | 02FC | R/W | Modem Control Register |
| X | 02FD | R | Line Status Register |
| X | 02FE | R | Modem Status Register |
| X | 02FF | R/W | Scratch Register |

2.9 REAL-TIME CLOCK AND CONFIGURATION RAM

The PIC integrates all logic required to support an external battery backed up real time clock/SRAM chip (MC146818A). The MC146818A contains the real time clock and 64 bytes of nonvolatile RAM. The internal clock circuitry uses 14 bytes of this memory, and the rest is allocated to configuration and system status information. In addition to the 64-byte CMOS RAM, a 2K nonvolatile RAM extension is provided for configuration and system information.

2.9.1 ADDRESS MAP

The following figure shows the RTC/CMOS RAM bytes and their addresses.

| Address(hex) | Function |
|---|---|
| 000–00D | Real-Time Clock Information |
| 00E | Diagnostic Status Byte |
| 00F | Shut Down Status Byte |
| 010 | Diskette Drive Byte |
| 011 | First Fixed Disk Type Byte |
| 012 | Second Fixed Disk Type Byte |
| 013 | Reserved |
| 014 | Equipment Byte |
| 015–016 | Low and High Base Memory Bytes |
| 017–018 | Low and High Memory Expansion Bytes |
| 019–031 | Reserved |
| 032–033 | Configuration CRC Bytes |
| 034–036 | Reserved |
| 037 | Data Century Byte |
| 038–03F | Reserved |

2.9.2 RTC/CMOS RAM I/O OPERATION

When performing I/O operations to the RTC/CMOS RAM addresses, interrupts should be inhibited to avoid having interrupt routines change the CMOS address register before data is read or written. Port 0070H should be left to point to status register D of the RTC/CMOS.

The following steps are required to perform I/O operations to the RTC/CMOS RAM addresses:

1) OUT to port 0070H with the RTC/CMOS address that will be written to.

The NMI mask bit resides in bit 7 of port 0070H. Writing a 1 to this bit inhibits interrupts due to a memory parity error or a channel check. The mask bit does not inhibit interrupts due to the Watchdog timer or system channel time-out. The least significant 6 bits provide the address for the RTC/CMOS RAM 2) OUT to port 0071H with the data to be written.

Reading RTC/CMOS RAM requires the following steps:

1) OUT to port 0070H with the CMOS address that is to be read from.

2) IN from port 0071H, and the data read is returned in the AL register.

Note: A write to port 0070H must be followed immediately by a read from address 0071H to ensure proper operation of the real-time clock.

2.9.3 2K CMOS RAM EXTENSION

The system board has a 2K CMOS RAM extension for configuration and diagnostic information. These bytes are reserved. The real time clock is accessed via ports 0070H–0071H, while the configuration RAM is accessed via ports 0074H–0076H. RAM data is accessed via port 0076H, while ports 0074H and 0075H serve as an indirect address latch for the RAM. A summary is given below.

| RTC/CMOS AND RAM SUPPORT ADDRESSES | |
| --- | --- |
| Address | Function |
| 0070H | Real-Time Clock Address |
| 0071H | Real-Time Clock Data |
| 0074H | RAM Address (Lower) |
| 0075H | RAM Address (Upper) |
| 0076H | RAM Data |

2.10 KEYBOARD AND FLOPPY DISK CONTROLLER INTERFACE

The PIC provides interface signals to keyboard controller and floppy disk controller as well.

2.10.1 KEYBOARD/AUXILIARY DEVICE CONTROLLER

The keyboard/auxiliary device controller is a function of the Intel 8042 chip. The keyboard is connected to one of the two connectors in the rear of the system unit. This connector is dedicated to the keyboard. An auxiliary device connects to the other controller connector. The auxiliary device may be any type of serial input device compatible with the 8042 interface. It could be a mouse, touch pad, track-ball or keyboard.

The 8042 receives the serial data, checks the parity, translates keyboard scan codes and presents the data to the system as a byte of data at data port I/O address 0060H.

I/O address 0064 is the command/status port. When the system reads port 0064H, it receives status information from the 8042. When the system write to the port, the 8042 interprets the byte as a command.

The PIC provides a chip select for the 8042. This decode maps to port 0060H and 0064H. The 86C150 also receives interrupt from keyboard and mouse.

2.10.2 FLOPPY DISK CONTROLLER

The PIC provides the decode signal required by the Intel 82077 Floppy Disk Controller. The decode addresses ports 03F0H–03F7H. The PIC also inputs the 82077's DMA acknowledge in support of the system feedback function.

3. PS/2 SYSTEM I/O ADDRESS MAP

| Address | Device |
| --- | --- |
| 0000–001F | DMA Controller |
| 0020, 0021 | Interrupt Controller 1, 8259AA |
| 0040, 0042, 0043, 0044, 0047 | System Timers |
| 0060 | Keyboard Auxiliary Device |
| 0061 | System Control Port B |
| 0064 | Keyboard Auxiliary Device |
| 0070, 0071 | RT/CMOS and NMI Mask |
| 0074, 0075, 0076 | Reserved |
| 0081, 0082, 0083, 0087 | DMA Page Register (0–3) |
| 0089, 008A, 008B, 008F | DMA Page Register (4–7) |
| 0090 | Central Arb. Control Port |
| 0091 | Car Select Feedback |
| 0092 | System Control Port A |
| 0093 | Reserved |
| 0094 | System Board Setup |
| 0096, 0097 | POS, Channel Connector Select |
| 00A0, 00A1 | Interrupt Controller 2, 8259AA |
| 00F0–00FF | Math Coprocessor |
| 0100–0107 | Programmable Option Select |
| 0278–027B | Parallel Port 3 |
| 02F8–02FF | serial port 2 (RS-232-C) |
| 0378–037B | Parallel Port 2 |
| 03BC–03BF | Parallel Port 1 |
| 03B4, 03B5, 03BA, 03C0–03C5 | Video Subsystem |
| 03CE, 03CF, 03D4, 03D5, 03DA | Video Subsystem |
| 03C6–03C9 | Video DAC |
| 03F0–03F7 | Diskette Drive Controller |
| 03F8–03FF | Serial Port 1 (RS-232-C) |

| DMA I/O Address Space | | | |
| --- | --- | --- | --- |
| Address R/W (Hex) | Description | Bit | Byte Ptr |
| 0000 | Channel 0, memory address reg (R/W) | 00–15 | yes |
| 0001 | Channel 0, transfer count reg (R/W) | 00–15 | yes |
| 0002 | Channel 1, memory address reg (R/W) | 00–15 | yes |
| 0003 | Channel 1, transfer count reg (R/W) | 00–15 | yes |
| 0004 | Channel 2, memory address reg (R/W) | 00–15 | yes |
| 0005 | Channel 2, transfer count reg (R/W) | 00–15 | yes |
| 0006 | Channel 3, memory address reg (R/W) | 00–15 | yes |
| 0007 | Channel 3, transfer count reg (R/W) | 00–15 | yes |
| 0008 | Channel 0–3, status reg | 0–7 | |
| 000A | Channel 0–3, mask reg (W) | 0–2 | |
| 000B | Channel 0–3, mode reg (W) | 0–2 | |
| 000C | Clear byte pointer (W) | N/A | |
| 000D | Master clear (W) | N/A | |
| 000E | Channel 0–3, clear mask reg (W) | 0–3 | Yes |
| 000F | Channel 0–3, write mask reg | 0–7 | Yes |
| 0018 | extended function reg (W) | 0–7 | |
| 001A | extended function execute (W) | 0–7 | |
| 0081 | channel 2, page table add reg (R/W) | 0–7 | |
| 0082 | channel 3, page table add reg (R/W) | 0–7 | |
| 0083 | channel 1, page table add reg (R/W) | 0–7 | |
| 0087 | channel 0, page table add reg (R/W) | 0–7 | |
| 0089 | channel 6, page table add reg (R/W) | 0–7 | |
| 008A | channel 7, page table add reg (R/W) | 0–7 | |
| 008B | Channel 5, page table add reg (R/W) | 0–7 | |
| 008F | Channel 4, page table add reg (R/W) | 0–7 | |

DMA I/O Address Space

| Address R/W (Hex) | Description | Bit | Byte Ptr |
|---|---|---|---|
| 00C0 | Channel 4, memory address reg (R/W) | 00–15 | Yes |
| 00C2 | Channel 4, transfer count reg (R/W) | 00–15 | Yes |
| 00C4 | Channel 5, memory address reg (R/W) | 00–15 | Yes |
| 00C6 | Channel 5, transfer count reg (R/W) | 00–15 | Yes |
| 00C8 | Channel 6, memory address reg (R/W) | 00–15 | Yes |
| 00CA | Channel 6, transfer count reg (R/W) | 00–15 | Yes |
| 00CC | Channel 7, memory address reg (R/W) | 00–15 | Yes |
| 00CE | Channel 7, transfer count reg (R/W) | 00–15 | Yes |
| 00D0 | Channel 4–7, status reg | 0–7 | |
| 00D4 | Channel 4–7, mask reg | 0–2 | |
| 00D6 | Channel 4–7, mode reg (W) | 0–7 | |
| 00D8 | Clear byte pointer (W) | N/A | |
| 00D8 | Master clear (W) | N/A | |
| 00DC | Channel 4–7, clear mask reg (W) | | |
| 00DE | Channel 4–7, write mask reg (W) | 0–3 | |

A byte pointer allows 8-bit ports to access consecutive bytes of registers greater than 8 bits. These registers are:
    Memory Address registers (3 bytes)
    Transfer Count registers (2 bytes)
    I/O Address registers (2 bytes)

| Address | Description | |
|---|---|---|
| | Programmable Interrupt Controller | |
| 0020 | ICW1, OCW2, OCW3 (Write) | PIC#1 |
| 0020 | IRR, ISR/Interrupt level (Read) | PIC#1 |
| 0021 | ICW2, ICW3, ICW4, OCW1 (Write) | PIC#1 |
| 0021 | IMR (Read) | PIC #1 |
| 00A0 | ICW1, OCW2, OCW3 (Write) | PIC#2 |
| 00A0 | IRR, ISR/Interrupt level (Read) | PIC#2 |
| 00A1 | ICW2, ICW3, ICW4, OCW1 (Write) | PIC#2 |
| 00A1 | IMR (Read) | PIC #2 |
| | Programmable Timer/Counter | |
| 0040 | Counter#0 (Read/Write) | |
| 0042 | Counter#2 (Read/Write) | |
| 0043 | Control word for counters #0 & #2 (write) | |
| 0044 | Counter#3 (Read/Write) | |
| 0047 | Control word for counters #3 (write) | |
| | Keybord/Auxiliary Device Controller | |
| 0060 (Read/Write) | 8042 Keyboard Controller data port | |
| 0064 port (R/W) | 8042 Keyboard Controller command/status | |
| | Real Time Clock (RTC), CMOS RAM Control | |
| 0070 | RTC/CMOS and NMI Mack (Write) | |
| 0071 | RTC/CMOS data port (Read/Write) | |
| 0074 | extended CMOS Ram Address (Write) | |
| 0075 | extended CMOS Ram Address (Write) | |
| 0076 | extended CMOS Ram data port (Read/Write) | |
| | System Control Port | |
| 0061 | System Control Port B | |
| 0092 | System Control Port A | |
| | Micro Channel Control | |
| 0090 | Central Arbitration register (Read/Write) | |
| 0091 | Card Selected Feedback | |
| 0094 | System Board Enable/setup register | |
| 0095 | Reserved | |
| 0096 | Adapter Enable/Setup register | |
| 0097 | Reserved | |
| 0100 (LSB) | POS register 0 - System/Adapter ID Byte | |
| 0101 (MSB) | POS register 1 - System/Adapter ID Byte | |

-continued

| Address | Description | |
|---|---|---|
| 01021 | POS register 2 - Option Select Data Byte | |
| 01032 | POS register 3 - Option Select Data Byte | |
| 01043 | POS register 4 - Option Select Data Byte | |
| 01054 | POS register 5 - Option Select Data Byte | |
| 0106 (LSB) | POS register 6 - Sub-address Extension | |
| 0107 (MSB) | POS register 7 - Sub-address Extension | |
| | Serial I/O Port | |
| Bit 7 of Line Control Reg. | | |
| F8 | Transmitter Holding register (W) | 0 |
| 03F8 | Receiver Buffer register (R) | 0 |
| 03F8 | divisor Latch, Low Byte (R/W) | 1 |
| 03F9 | divisor Latch, High Byte (R/W) | 1 |
| 03F9 | Interrupt Enable Register (R/W) | 0 |
| 03FA | Interrupt Identification Register | (R)X |
| 03FA | FIFO CONTROL register (W) | X |
| 03FB | Line Control register (R/W) | X |
| 03FC | Modem Control Register (R/W) | X |
| 03FD | Line Status register (R) | X |
| 03FE | Modem Status register (R) | X |
| 03FF | Scratch Register (R/W) | X |
| | Secondary Serial Port | |
| Bit 7 of Line Control Reg. | | |
| 02F8 | Transmitter Holding register (W) | 0 |
| 02F8 | Receiver Buffer register (R) | 0 |
| 02F8 | divisor Latch, Low Byte (R/W) | 1 |
| 02F9 | divisor Latch, High Byte (R/W) | 1 |
| 02F9 | Interrupt Enable Register (R/W) | 0 |
| 02FA | Interrupt Identification Register | (R)X |
| 02FA | FIFO CONTROL register (W) | X |
| 02FB | Line Control register (R/W) | X |
| 02FC | Modem Control Register(R/W) | X |
| 02FD | Line Status register (R) | X |
| 02FE | Modem Status register (R) | X |
| 02FF | Scratch Register (R/W) | X |
| Parallel Port 1: | | |
| 03BC | Data Port (R/W) | |
| 03BD | Status Port (R) | |
| 03BE | Control Port (R/W) | |
| 03BF | Reserved | |
| Parallel Port 2: | | |
| 0378 | Data Port (R/W) | |
| 0379 | Status Port (R) | |
| 037A | Control Port (R/W) | |
| 037B | Reserved | |

| Address | Description | |
|---|---|---|
| Parallel Port 3: | | |
| 0278 | Data Port (R/W) | |
| 0279 | Status Port (R) | |
| 027A | Control Port (R/W) | |
| 027B | Reserved | |
| | Math Coprocessor | |
| 00F0 | Coprocessor Clear Busy | |
| 00F1 | Coprocessor Reset | |
| | VGA Subsystem | |
| 03BA | Input Status Register 1 (R) | Monochrome Emulation |
| 03BA | Feature Control Register (W) Monochrome Emulation | |
| 03DA | Input Status Register 1 (R) | Color Emulation |
| 03DA | Feature Control Register (W) Color Emulation | |
| 03C2 | Miscellaneous Output Register (W) | |
| 03C2 | Input Status Register (R) | |
| 03CC | Miscellaneous Output Register (R) | |
| 03CA | Feature Control Register (R) | |
| 03C3 | Video Subsystem Enable (R/W) | |
| Attribute registers: | | |
| 03B4 | Index register (R/W) Monochrome Emulation | |
| 03B5 | other CRT Controller register (R/W) Monochrome Emulation | |
| D4 | Index register (R/W) | Color Emulation |
| 03D5 | other CRT Controller register (R/W) Color Emulation | |
| Sequencer Register | | |
| 03C4 | Address Register (R/W) | |
| 03C5 | Other Sequencer Registers (R/W) | |
| Graphics Registers | | |
| 03CE | Address Register | |
| 03CF | Other Graphics Registers | |
| DAC | Registers | |
| 03C6 | FEL Mask (R/W) | |
| 03C7 | DAC State Register (R) | |
| 03C7 | PEL Address (Read Mode) (R/W) | |
| 03C8 | PEL Address (Write Mode) (R/W) | |
| 03C9 | PEL Data Register (R/W) | |
| | Diskette Drive Controller | |
| 03F0 | Status Register A (R) | |
| 03F1 | Status Register B (R) | |
| 03F2 | Digital Output Register (W) | |
| 03F3 | Reserved | |
| 03F4 | Diskette Drive Controller Status Register (R) | |
| 03F5 | Data Register (R/W) | |
| 03F6 | Reserved | |
| 03F7 | Digital Input Register (R) | |
| Interrupt Assignments | | |
| Level | Function | |
| NMI | Parity | |
| | Watchdog Timer | |
| | Arbitration time-out | |
| | channel check | |
| IRQ0 | Timer | |
| IRQ1 | Keyboard | |
| IRQ2 | Cascaded | |
| IRQ8 | Real Time Clock | |
| IRQ9 | Redirect Cascade | |
| IRQ10 | Reserved | |
| IRQ11 | Reserved | |
| IRQ12 | Mouse | |
| IRQ13 | Math Coprocessor Exception | |
| IRQ14 | Fixed Disk | |
| IRQ15 | Reserved | |
| IRQ3 | Secondary Serial Port | |
| IRQ4 | Primary Serial Port | |
| IRQ5 | Reserved | |
| IRQ6 | Diskette | |

| Address | Description |
|---|---|
| IRQ7 | Parallel Port |

ARBITRATION BUS PRIORITY ASSIGNMENTS

The following shows the assignment of arbitration levels. The functions with lowest number for its arbitration level has the highest priority

| Arbitration Level | Primary Assignment |
|---|---|
| −2 | Memory Refresh |
| −1 | NMI |
| 0 | DMA channel 0 * |
| 1 | DMA channel 1 |
| 2 | DMA channel 2 |
| 3 | DMA channel 3 |
| 4 | DMA channel 4 * |
| 5 | DMA channel 5 |
| 6 | DMA channel 6 |
| 7 | DMA channel 7 |
| 8 | Reserved |
| 9 | Reserved |
| A | Reserved |
| B | Reserved |
| C | Reserved |
| D | Reserved |
| E | Reserved |
| F | System Microprocessor |

*These DMA channels are programmable to any arbitration level.

4. TIMING DIAGRAMS

Figure 63:
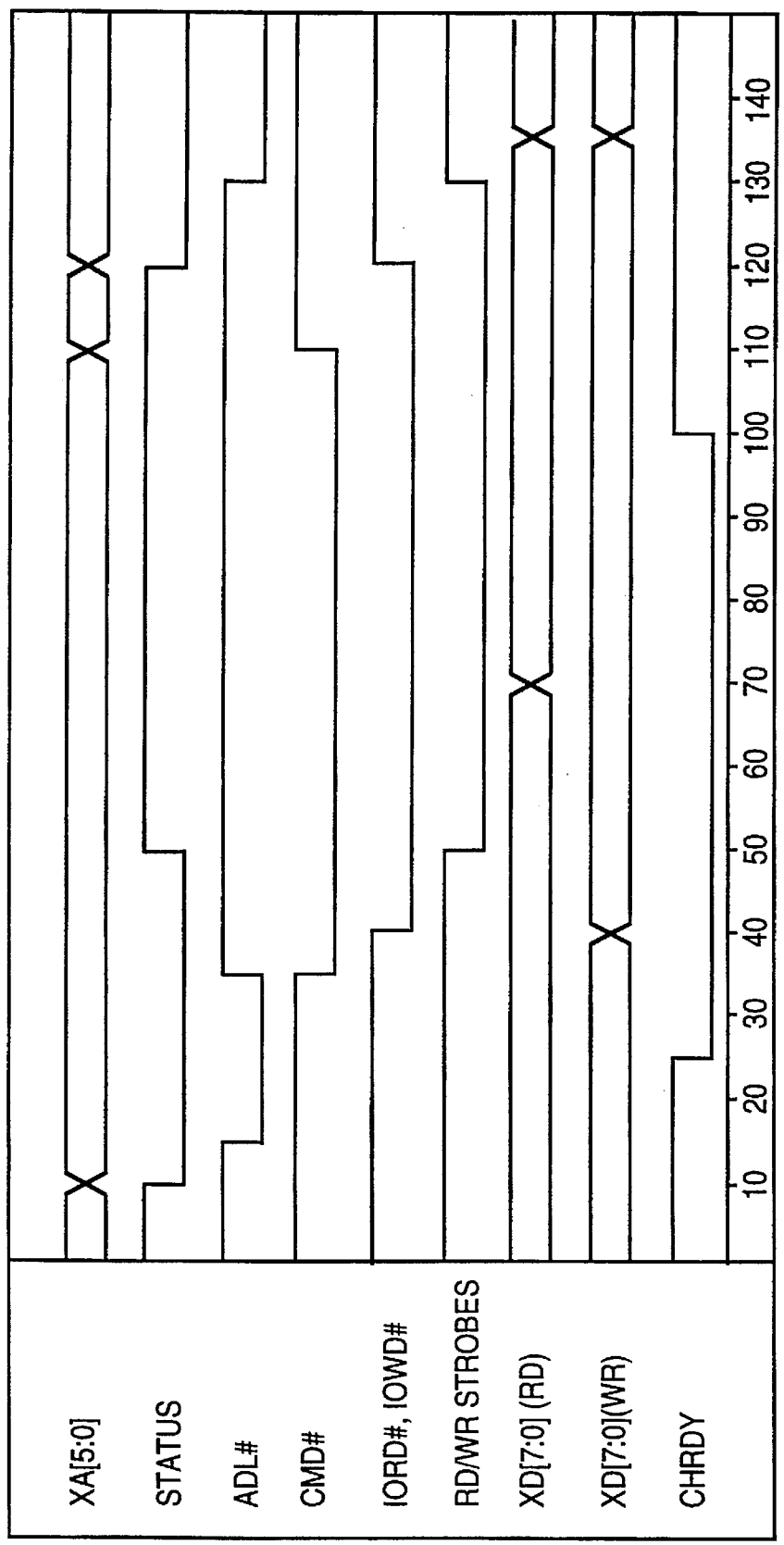
FIGS. 63–66 are timing diagrams for the peripheral interface controller.
Figure 64:
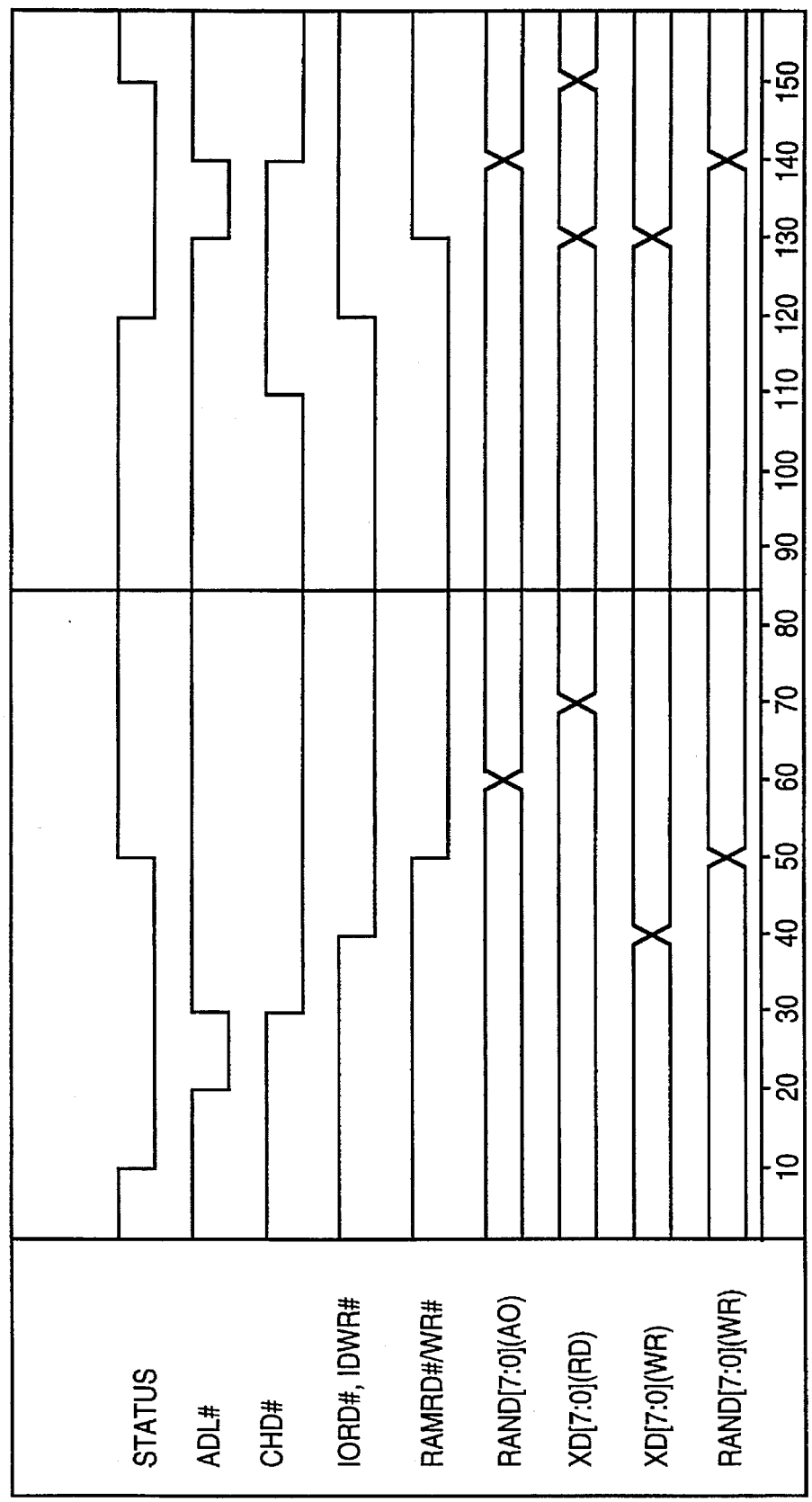
Figure 66:
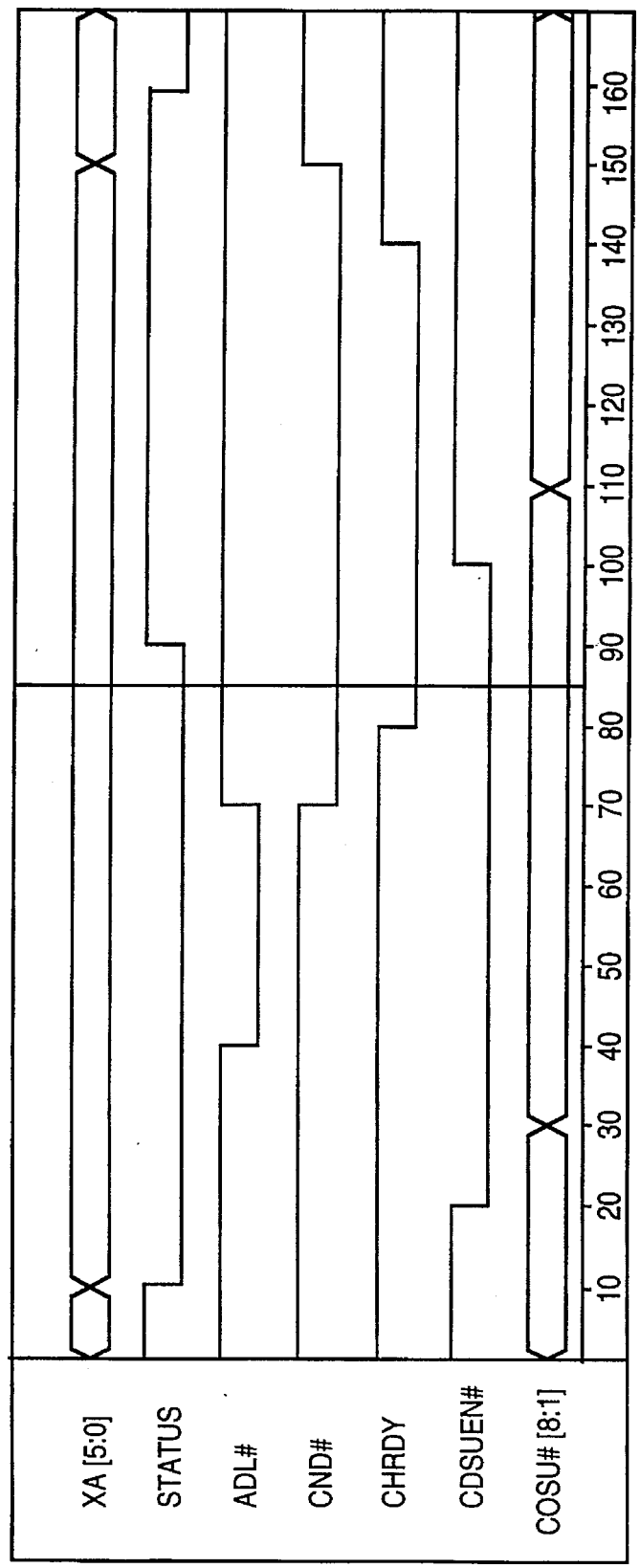

FIG. 63 shows the peripheral read/write cycle.
FIG. 64 shows RAM READ/WRITE timing.
FIG. 65 shows the INTA sequence.
FIG. 66 shows the setup cycle.

5. SOFTWARE INTERFACE 5.1 CONFIGURATION AND STATUS REGISTER PROGRAMMING

All CSRs are addressed through four I/O locations, port 24h, 25h, 26, and 27h. Port 24h and 25h will contain the device id assigned at initialization, and port 26h will contain the index into the individual CSRs in the chip. I/O port 27h will contain the data to be read/written to the chip. The functional ID for this chip is hard coded with the code 0070H.

5.2 PIC CONFIGURATION REGISTER

Index 20 is a read/write register used for serial and parallel port configuration. The bit definitions for MCA are as follow. It is used with POS102 to enable/disable the system board peripheral devices.

| Bit | Function |
|---|---|
| 7-1 | Reserved |
| 0 | Serial 2 enable |

The bit definitions of index 20 register for ISA are shown below.

| Bit | Function |
|---|---|
| 7-6 | Reserved |
| 5 | FDC enable/disable |
| 4 | Parallel port select |
| 3 | Parallel port enable |
| 2 | Serial port select |

-continued

| Bit | Function |
|---|---|
| 1 | Serial port 1 enable |
| 0 | Serial port 2 enable |
| Bit 7-6 | Reserved |
| Bit 5 | When set to 1, this bit enables the diskette drive interface. When set to 0, the diskette drive interface is disabled |
| Bit 4 | Setting this bit to 1 configure the parallel port as parallel port 1. When set this bit to 0, configure the parallel port as parallel port 2. |
| Bit 3 | When set to 1, it enables parallel port. When set to 0, it disables the parallel port. |
| Bit 2 | When set to 1, this bit configures the serial.1 as a primary serial port and serial 2 as the alternate serial port. When set to 0, the serial 1 becomes the alternate and serial 2 becomes the primary. |
| Bit 1 | When set to 1, the serial port 1 is enabled. When set to 0, the serial port 1 is disabled. |
| Bit 0 | When set to 1, the serial port 2 is enabled. When set to 0, the serial port 2 is disabled. |

86C302/86C402 INTEGRATED CACHE & MEMORY CONTROLLER

1.0—OVERVIEW

The 86C302/86C402 Integrated Cache & Memory Controller (CMC) integrates the Cache and Memory control functions for the 386 and 486 processor based systems. It can be used in high-integration ISA/MCA/EISA based systems. The PIC (Peripheral Interface Controller) and the bus-specific interface devices (specific to ISA/MCA/EISA) are the only other devices required to implement a highly integrated motherboard. The 86C302 is the 386 version and the 86C402 is the 486 version.

1.2—CMC Block Diagram

Figure 67:
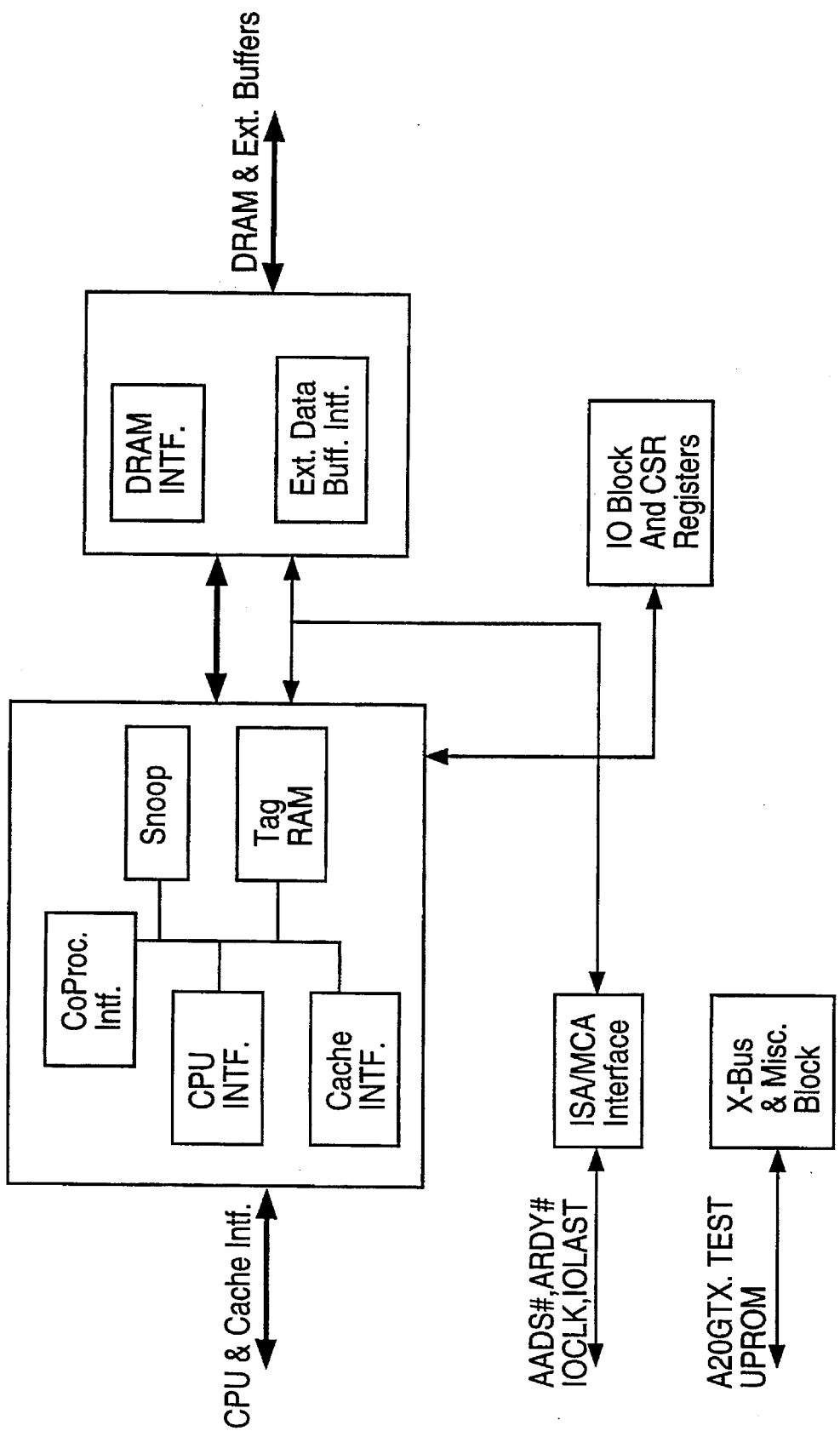
FIGS. 67–74 are block diagrams of the cache and memory controller.

FIG. 67 shows a block diagram of this device.

Figure 68:
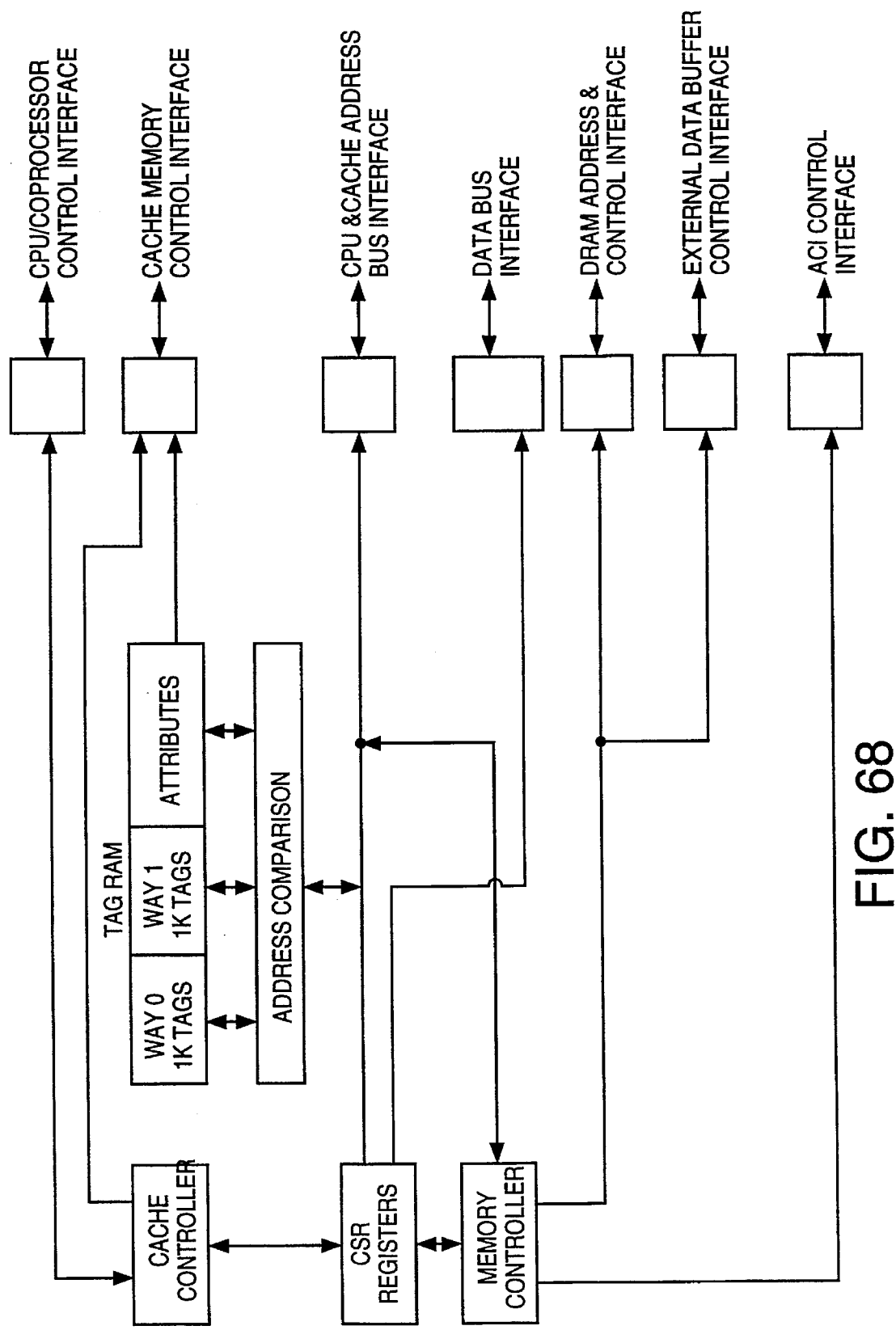

FIG. 68 shows a more detailed block diagram.

3.0—HARDWARE INTERFACE

Three possible system configurations utilizing the CMC chip are shown in the following.

3.1—Interleaved Memory with Discrete Mem. Buffers

Figure 69:
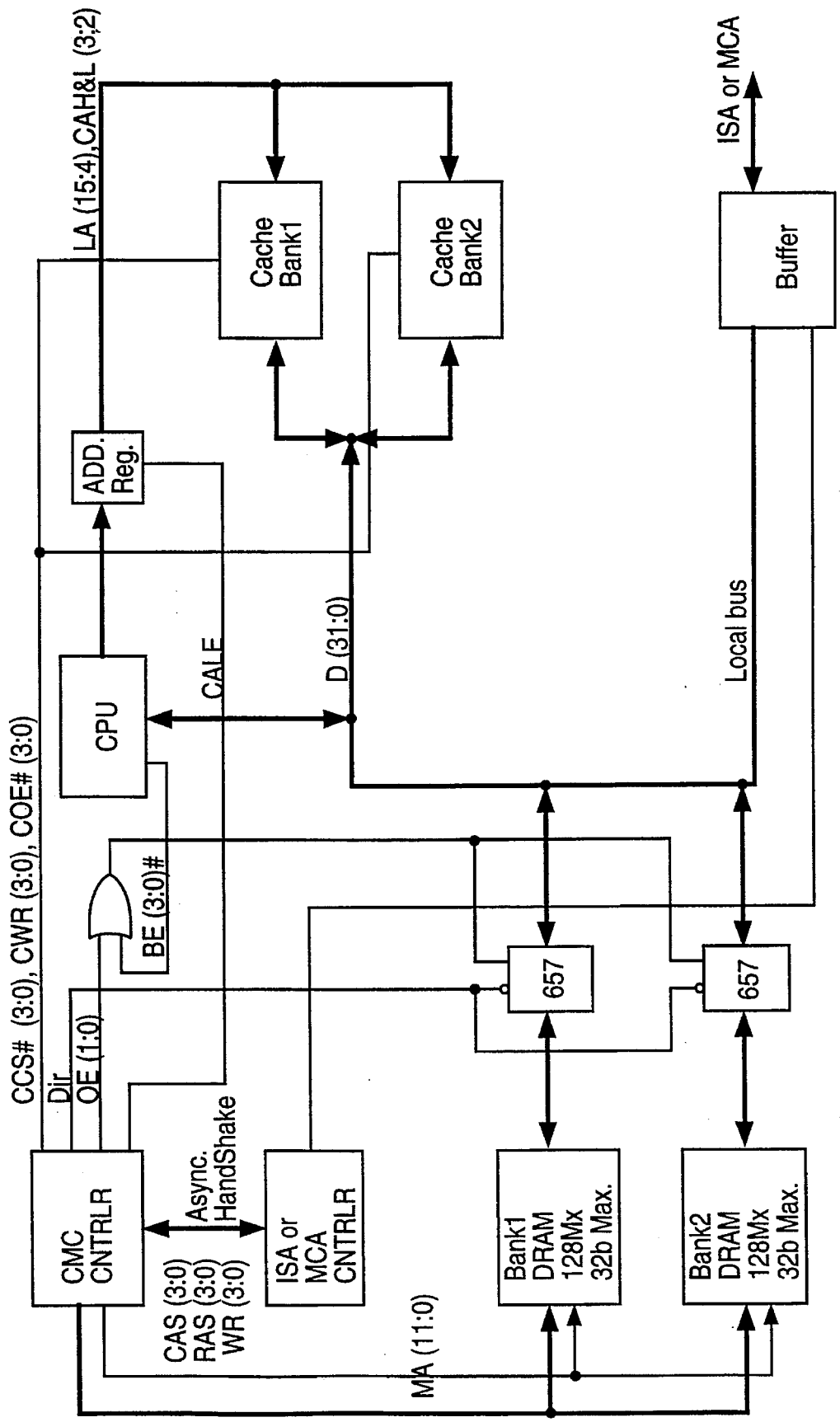

FIG. 69 shows a block diagram of a system with interweaved memory with discrete buffers.

3.2—System with Cache Bypass for 386 Systems

Figure 70:
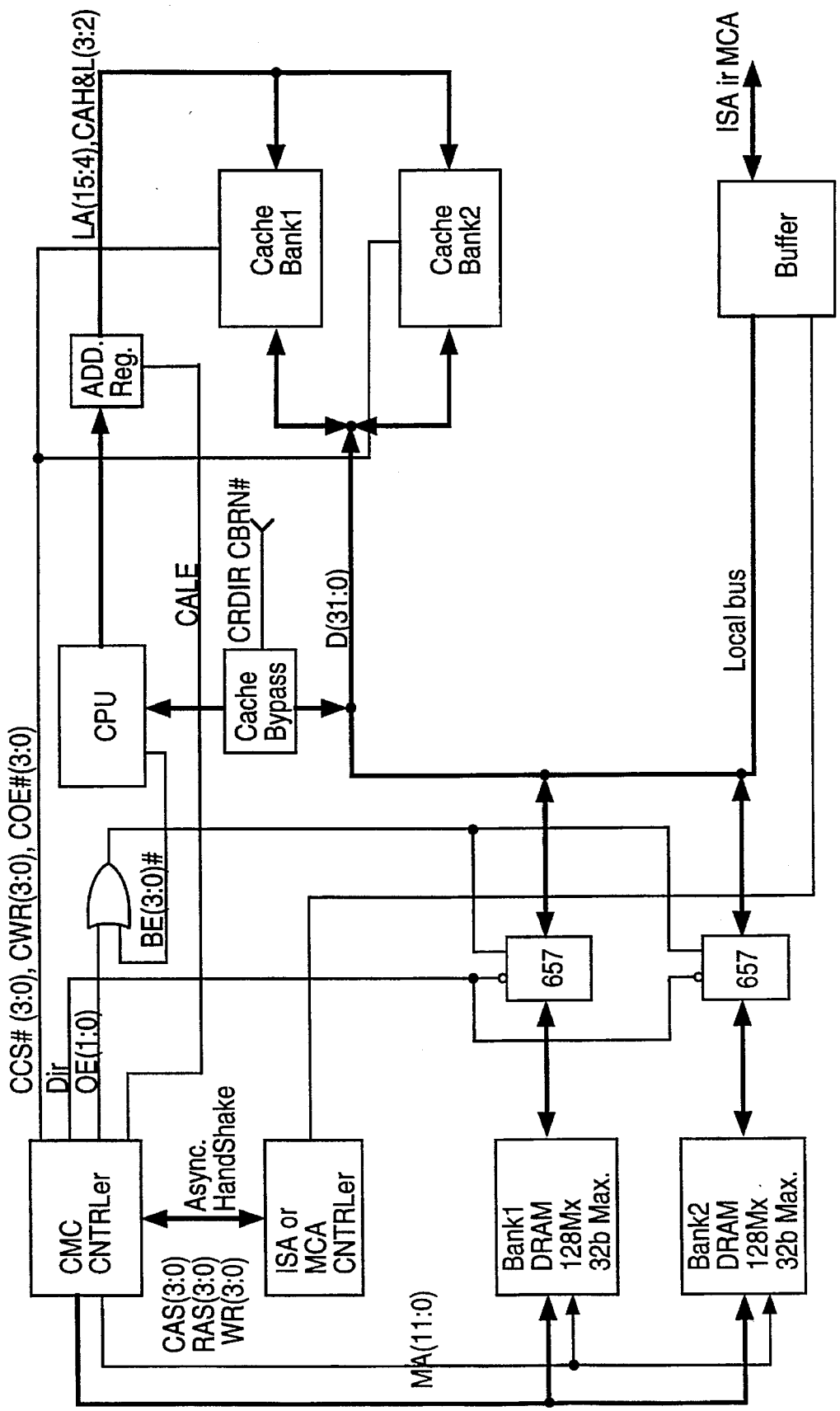

FIG. 70 shows a block diagram of a 386 system with cache bypass.

3.3—Special Feature Description

The CMC design can be used in both 386 or 486 based systems.

For a 486 design, CLK to the CMC is the same frequency as the clock supplied to ISA/MCA and 486.

For a 386 design, CLK2 (required by the 386) is buffered internally and driven directly by CMC, CLK is also generated by CMC and supplied to the rest of the system.

3.4—Strap Option Modes

The following modes will be selected by hardware at power up time. Two dual function pins as described in the pinout description are used to drive this information during reset. This information is latched internally in the CMC at the trailing edge of reset. External tristate buffers that are driving these signals into CMC must also be tristated upon deassertion of reset which pins are:

| 486/386 mode. | ISA/MCA mode. | Sync/Async mode |
|---|---|---|
| 0 = 386 | 0 = ISA/EISA | 0 = Sync |
| 1 = 486 | 1 = MCA | 1 = Async |

4.0—FUNCTIONAL BLOCKS

4.1—Local CPU Interface

This block provides the interface to the local CPU which can be either an Intel 80386 or 80486. This interface includes:

Reset to the CPU and the rest of the system is generated by CMC. The CMC receives two reset inputs and generates two reset outputs.

The system clocks are driven by CMC device. The main 2× Osc. clock is only driven to CMC. The 2× clock for 386 and 1× clock for 486, ISA/MCA devices, Synchronous SRAM is generated by the CMC. The CMC contains a programmable wait state generator for slowing down the CPU. This allows emulation of the system running at a 6 to 8 MHZ clock rate for compatibility reasons.

This device does not support the pipelining feature of 386 CPU. However it supports the line fill/Eviction bursts for both 386 or 486 processors.

In a 386 based system the burst counter (during a Line fill) behaves in the same way as in 80486 based systems. The CMC gives the first DWORD to 386 and asserts the LHOLD signal to hold the processor from coming back until it is done writing the rest of the burst data into the cache. The following table shows how the CMC sequences through the burst operation based on the address of the first DWORD:

| First Adr | Burst Sequence |
|---|---|
| 0 | 0,4,8,C |
| 4 | 4,0,C,8 |
| 8 | 8,C,0,4 |
| C | C,8,4,0 |

4.2—Cache Interface

4.2.1—Cache Controller—Features

The cache can be configured as follows:

1—copy back with or without one level deep write buffer

2—write through with or without one level deep write buffer.

In all the above cases the cache tags can be configured as a direct map cache or as a two way associative cache.

CPU READ—Copyback

If the current cycle is a hit and the directory entry is valid then the cache controller produces READY for the CPU and the data is supplied from the external SRAM.

If the current cycle is a hit but the directory entry is invalid then the cache controller fetches a new line (16 bytes) and marks the directory entry as valid and clean.

If the current cycle is a miss and the cache is direct map then examine the dirty bit. If the line is dirty then do a line eviction and fetch a new line; mark the directory entry as valid and clean. If the line is clean then do a line fill and mark the directory entry as valid and clean.

If the current cycle is a miss and the cache is two way set associative then use the LRU algorithm in order to select a directory entry; if this entry is dirty then evict the line and after that do a line fill. Mark this directory entry as valid and clean.

CPU WRITE—Copyback

If the current cycle is a hit and valid then write the information to the cache line and mark the directory entry as valid and dirty. If the current cycle is a miss and the cache is direct map and the line is clean then fill the line, do the write and mark the line as valid and dirty. If the line is dirty then do a line eviction, fill the line, do the write and mark it as valid and dirty. If the cache is two way set associative then use the LRU algorithm in order to select a line; if the line is clean then do a line fill, do the write and mark the line as valid and dirty. If the line is dirty then evict it, fill the line, do the write and mark the line as valid and dirty.

CPU READ—Write Thru

If the current cycle is a hit to a valid line then the cache produces READY to the CPU and it supplies the data from the cache SRAM.

If the current cycle is a miss and the cache is direct map then do a line fill and mark it as valid. If the cache is two way set associative then use the LRU algorithm in order to select a line and fill it; mark it as valid.

CPU WRITE—Write Thru

If the current cycle is a hit then update the cache and post the write.

If the current cycle is a miss then post the write.

4.2.3—Cache Protocol Description (for the case when the DMA device owns it)

From the cache point of view a DMA cycle looks like a CPU cycle. The addresses and the control signals appear on the same pins and have the same timing in both cases. The cache does different operations depending on whether the CPU is a 386 or a 486 (the 486 has a primary cache which has to be maintained coherent with the main memory).

1—Copy back cache, 386 mode, DMA read cycles.

If the current cycle is a hit to a valid and clean line do nothing.

If the current cycle is a hit to a valid and dirty line intervene and keep the line as valid and dirty.

If the current cycle is a miss then do nothing.

2—Copy back cache, 386 mode, DMA write cycles.

If the current cycle is a miss then do nothing.

If the current cycle is a hit to a valid and clean line then do the write to the cache and keep the line valid and clean; also do the write to the main memory.

If the current cycle is a hit to a valid and dirty line then do the write to the cache and keep the line as valid and dirty; do not write to the main memory.

3—Write through cache, 386 mode, DMA read cycles.

If the current cycle is a hit or a miss do nothing.

4—Write through cache, 386 mode, DMA write cycles.

If the current cycle is a miss do nothing.

If the current cycle is a hit to a valid line then update the cache and the memory and keep the line as valid.

5—Copy back cache, 486 mode, DMA read cycles.

If the current cycle is a hit to a valid and clean line then do nothing.

If the current cycle is a hit to a valid and dirty line then intervene and keep the line as valid and dirty.

If the current cycle is a miss then do nothing.

6—Copy back cache, 486 mode, DMA write cycle.

If the current cycle is a miss then do nothing.

If the current cycle is a hit to a valid and clean line then invalidate the 486 cache line, update the secondary cache and keep the line as valid and clean; also update the main memory. If the current cycle is a hit to a valid and dirty line then invalidate the 486 cache line, write the data to the secondary cache and keep the line as valid and dirty. Do not write to the main memory.

7—Write through cache, 486 mode, DMA read cycles. Hit or miss do nothing.

8—Write through cache, 486 mode, DMA write cycles.

If the current cycle is a miss then do nothing.

If the current cycle is a hit then invalidate the line in both the primary and secondary cache and write the data to the main memory.

4.2.4—Option Bits

OPT1. If OPT1 is high then the cache is in direct map mode; if OPT1 is low then the cache is in two way set associative mode.

OPT2. If OPT2 is high then the cache is in copy back mode; if OPT2 is low then the cache is in write through mode.

OPT3. If OPT3 is high then the cache is in 128 kbyte mode; if OPT3 is low then the cache is in 64 kbyte mode.

OPT4. If OPT4 is high then the cache is in 386 mode; if OPT4 is low then the cache is in 486 mode (this option might need an external pin;

OPT5. If OPT5 is high then the cache data storage is implemented using asynchronous SRAM; if OPT5 is low then the cache storage is implemented using synchronous SRAM.

OPT6. Reserved.

OPT7. If OPT7 is high then the cache has an external one level deep write buffer (implemented in discrete components); if OPT7 is low then the cache does not have such a write buffer.

OPT8. Reserved.

4.2.5—Other Cache Controls and Options

1—The cache can be enabled or disabled. An option bit is provided for this (OPT9). If the cache is in write through mode then the cache is simply frozen and all CPU accesses become misses. In this mode the CPU can do a cache dump to the main memory (the CPU can access the cache data RAM and the cache TAG RAM).

If the cache is in copy-back mode then the CPU is stopped and all the dirty lines in the cached are flushed to the main memory. After this process is finished the cache is frozen and all the CPU accesses become misses. OPT11 allows the CPU to disable the copy-back cache with or without the cache flush process. This may come in handy when an absolutely clean start is needed.

2—The cache can be reset at reset time or after it was disabled (the same as the cache flush operation). OPT10 active causes all the tag valid bits to be set to invalid, all the line valid bits to be set to invalid and all the line dirty bits to be set to clean. This is done automatically at reset time or it can be also done after the cache was disabled and a cold start is needed. During normal operation the cache has to first be disabled and then reset.

3—Opt12. The cache can be placed in diagnostic mode and the CPU can address directly the TAG directory through an 8 bit port (using the CSR registers).

4—Opt13. The CPU can disable the cache and it can map the cache RAM as part of the main memory at location TBD.

5—Opt14. If Opt14 is high then the 486 instructions INVD and WBINVD have effect. If Opt14 is low then these instructions do not affect the secondary cache.

6—Opt15. If Opt15 is low then the size of the cache is 32 kbyte (irrespective of the state of OPT3). If Opt15 is high then the size of the cache is determined by OPT3.

7—Opt16. If Opt16 is high then the cache data RAM uses an interleaved configuration. If Opt16 is low then the cache memory is not interleaved.

4.2.6—Cache Configurations

The cache controller needs external components in order to achieve maximum performance. For example in write through mode the cache needs an external write buffer in order to minimize the impact of the writes. Two options are available:

1—No external write buffer for a low cost system;

2—One level deep write buffer implemented using four external latches (like 74F646). Such arrangement gets rid of wait states in about 40% of the total write cycles.

The cache controller fills the lines in burst mode (16 bytes in a burst—four fetches of four bytes each). A cache bypass is used in order to decrease the miss penalty in bursting caches. The cache first fetches the location where the miss occurred and it gives it to the CPU before filling the rest of the line. The 386 implementation requires four bidirectional buffers. The 486 implementation does not require external components.

Another option is to use synchronous or asynchronous SRAM for the cache data store. The asynchronous SRAM requires four external latches in the address path because the CPU addresses do not meet the SRAM hold time for the case of a write cycle.

Figure 71:
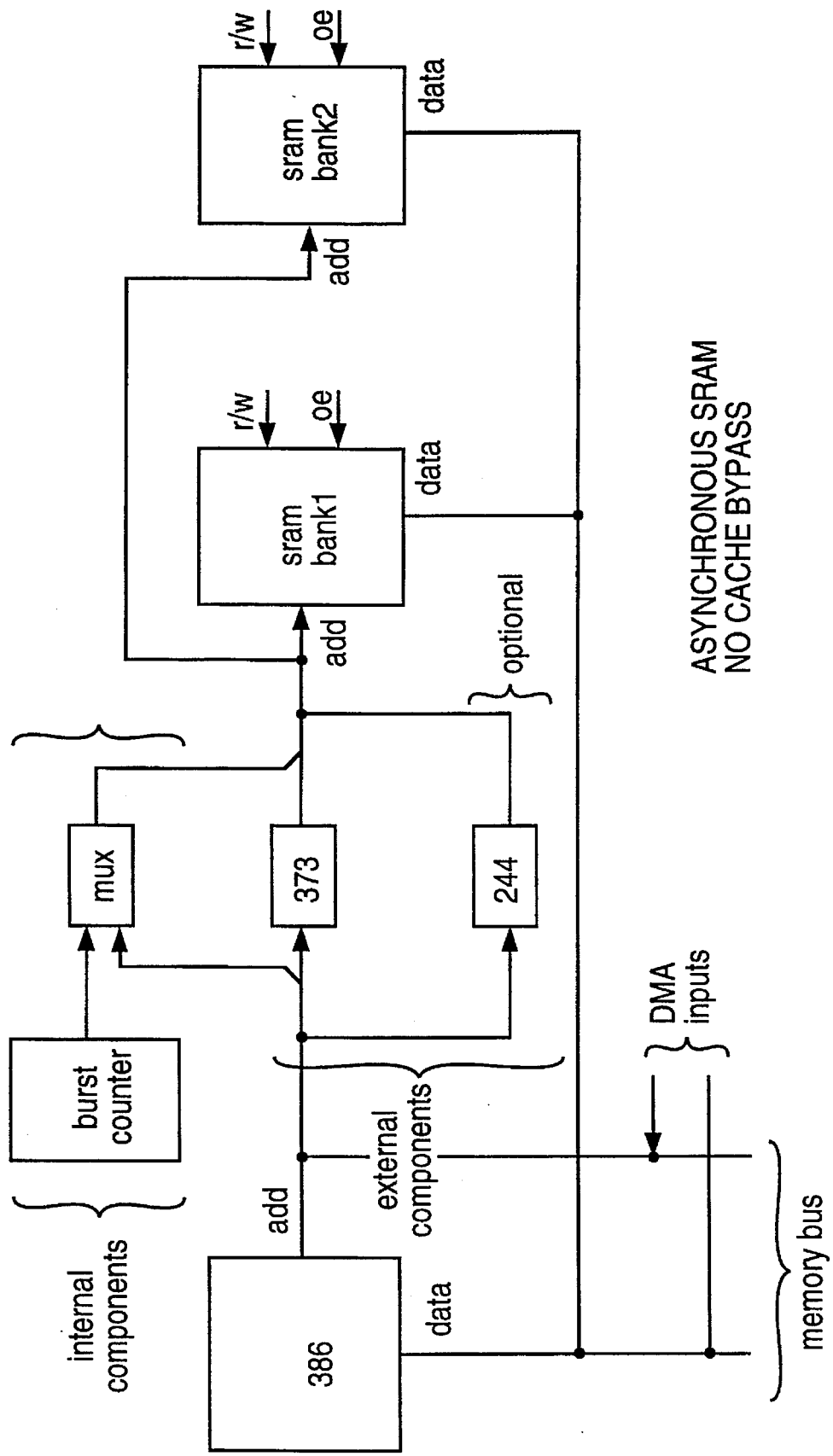

FIG. 71 shows asynchronous SRAM timing with no cache bypass.

Figure 72:
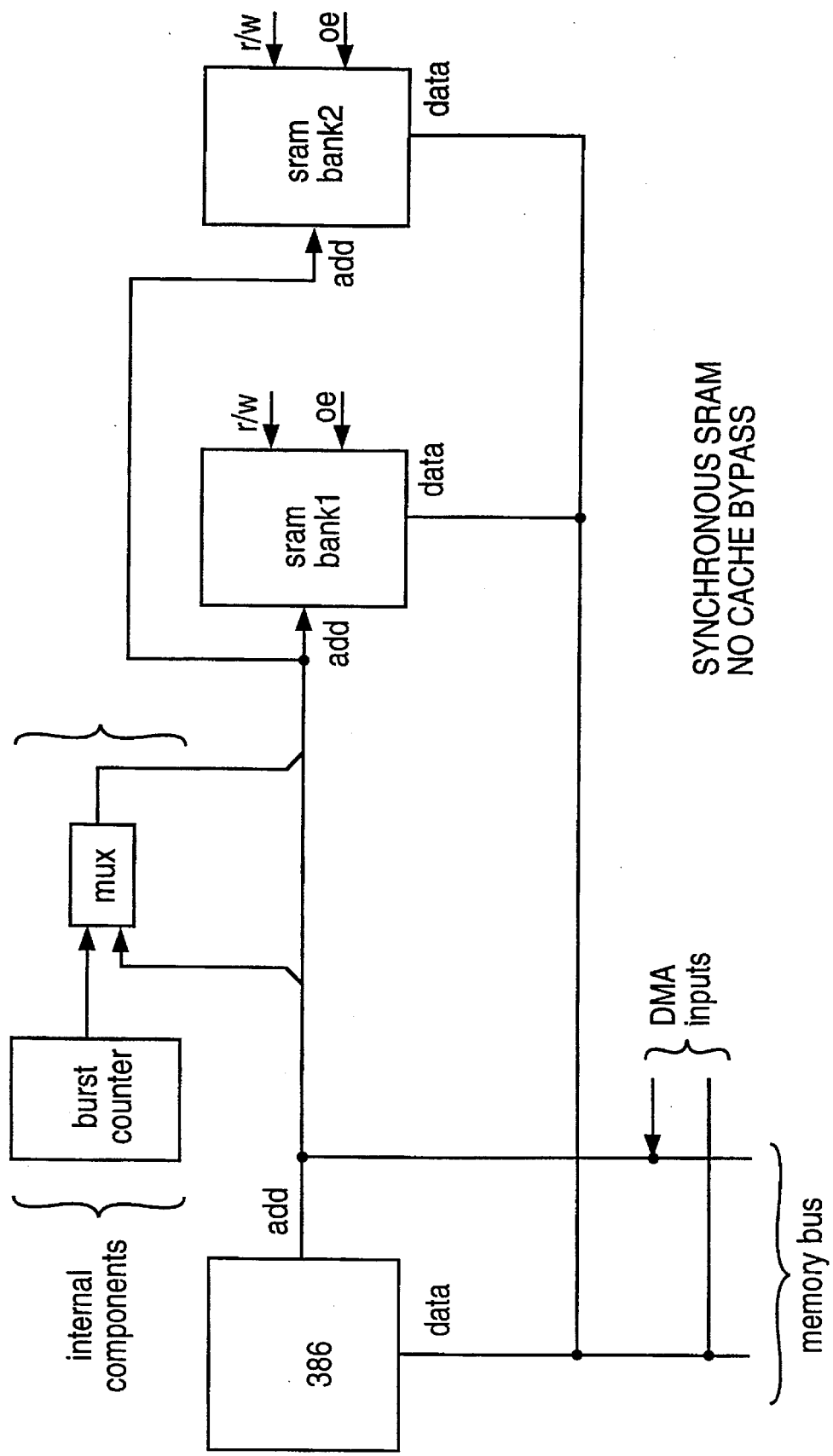

FIG. 72 shows synchronous SRAM timing with no cache bypass.

Figure 73:
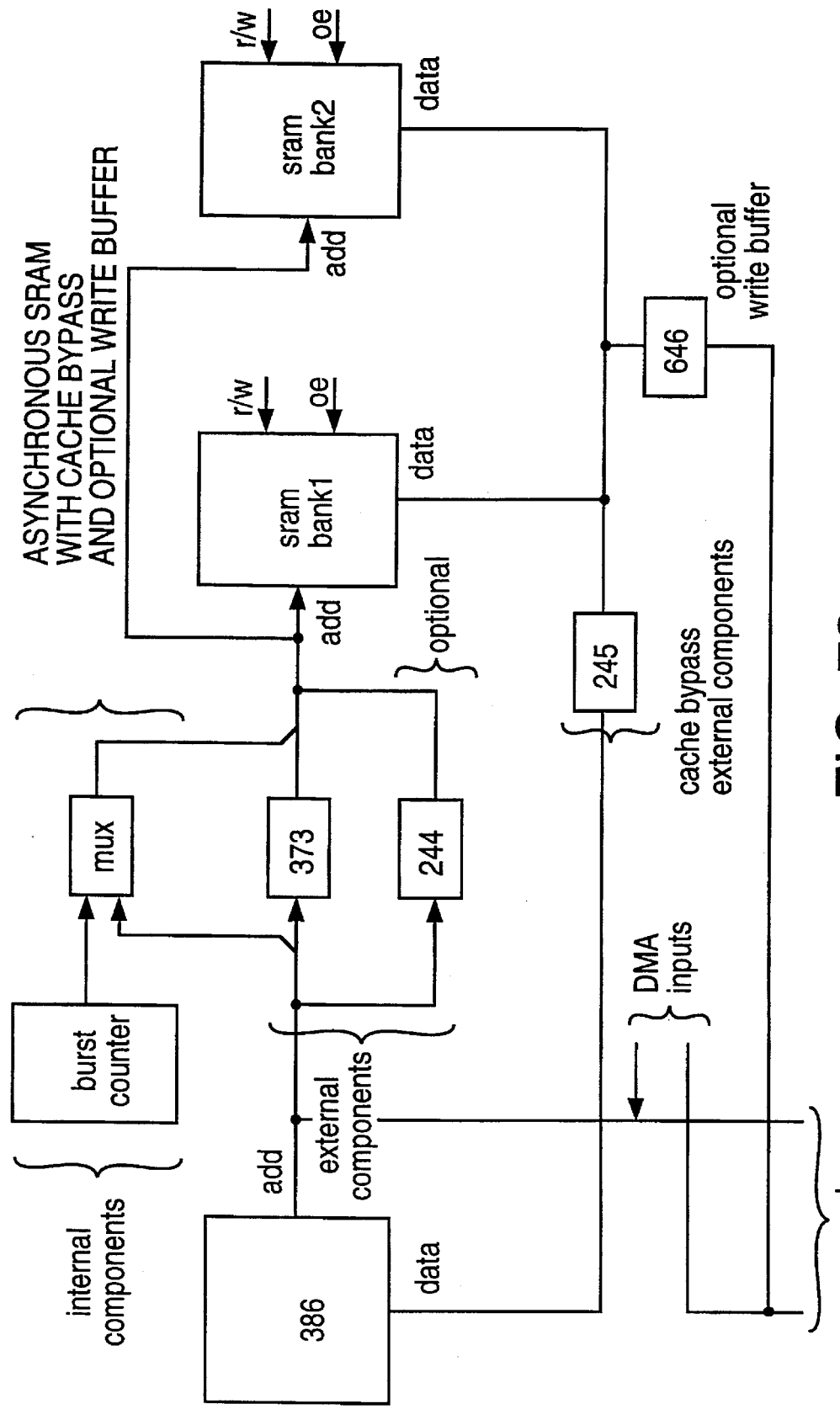

FIG. 73 shows asynchronous SRAM timing with cache bypass.

4.2.7—The Tag Structure

Figure 74:
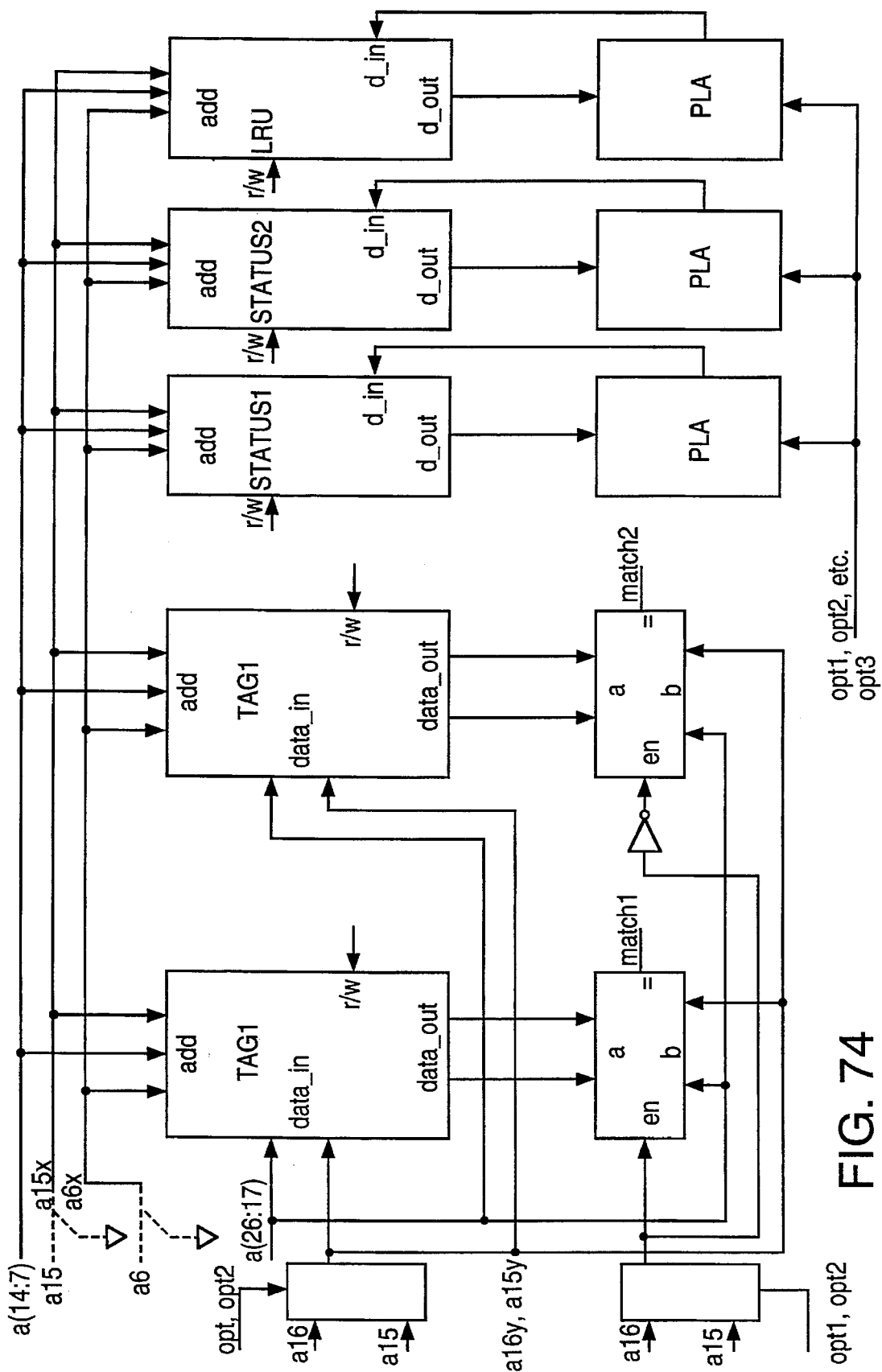

The cache controller contains five RAM blocks:

1—The first set of TAGS
2—The second set of TAGS
3—The first set of status bits
4—The second set of status bits
5—The LRU block FIG. 74 shows the cache controller in additional detail.

This TAG structure allows the following options:

1—128 kbyte of cache, two way set associative with 16 bytes per line and two status bits for each line (enough to support a copy back cache)

2—128 kbyte of cache, direct map with 16 byte per line and two status bits for each line 3—64 kbyte of cache, two way set associative with 16 byte per line and two status bits for each line 4—64 kbyte of cache, direct map with 16 byte per line and two status bits for each line.

5—32 kbyte of cache, direct map or two way set associative, 16 bytes per line, two status bits per line and one LRU bit.

There is one bit per tag entry in order to implement the LRU replacement algorithm for the two way set associative cache organization.

The following referenced figure shows how the CPU addresses are used in the different configurations. Note that only 128 Mbytes of address space (27 bits of address) is cached. The first four bits of address (3:0) are used in order to address bytes within a line. The 128 kbyte cache configurations use the next three bits (5:4) in order to address a line within a block (8 lines per block). Notice that 8*16 bytes of data is associated with each tag and that all this data is lost when a tag is replaced. The 64 kbyte cache configurations use bits (5:4) to address lines within a block (4 lines per block).

Figure 75:
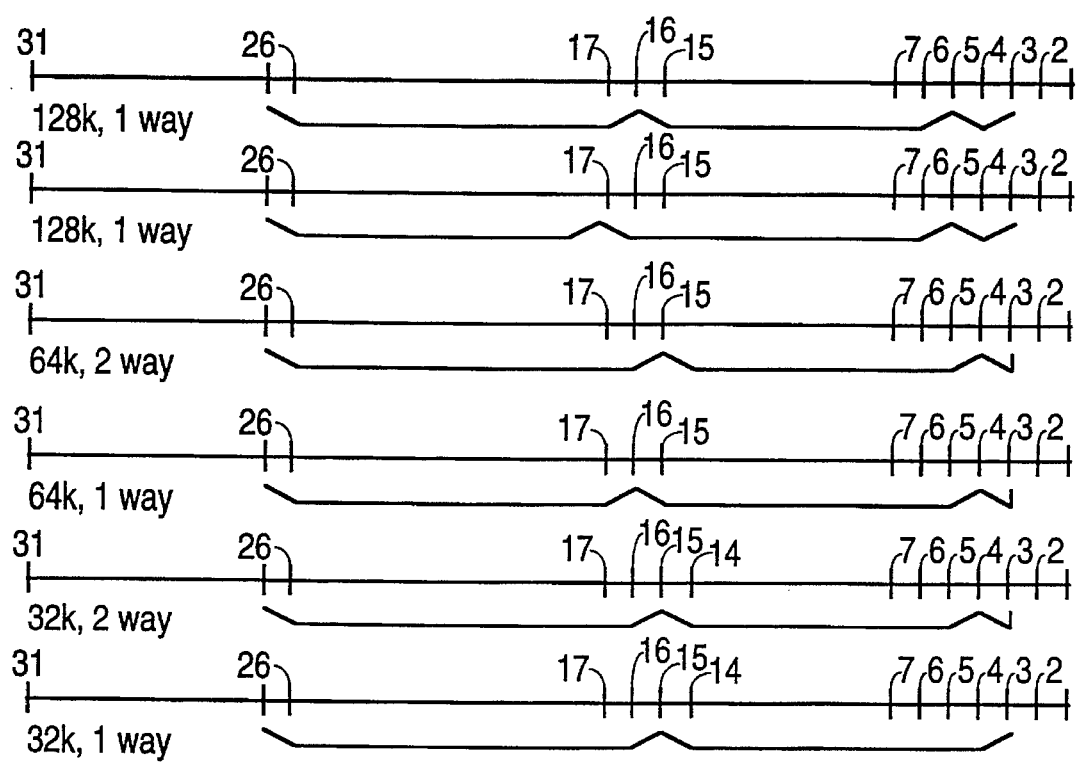
FIGS. 75–77 are timing diagrams for the cache and memory controller.

FIG. 75 shows the address partition scheme.

4.2.8—Cache Timing

Support is provided for 386 and 486 CPUs. Each processor has its own timing which must be accounted for.

386 TIMING

Figure 76:
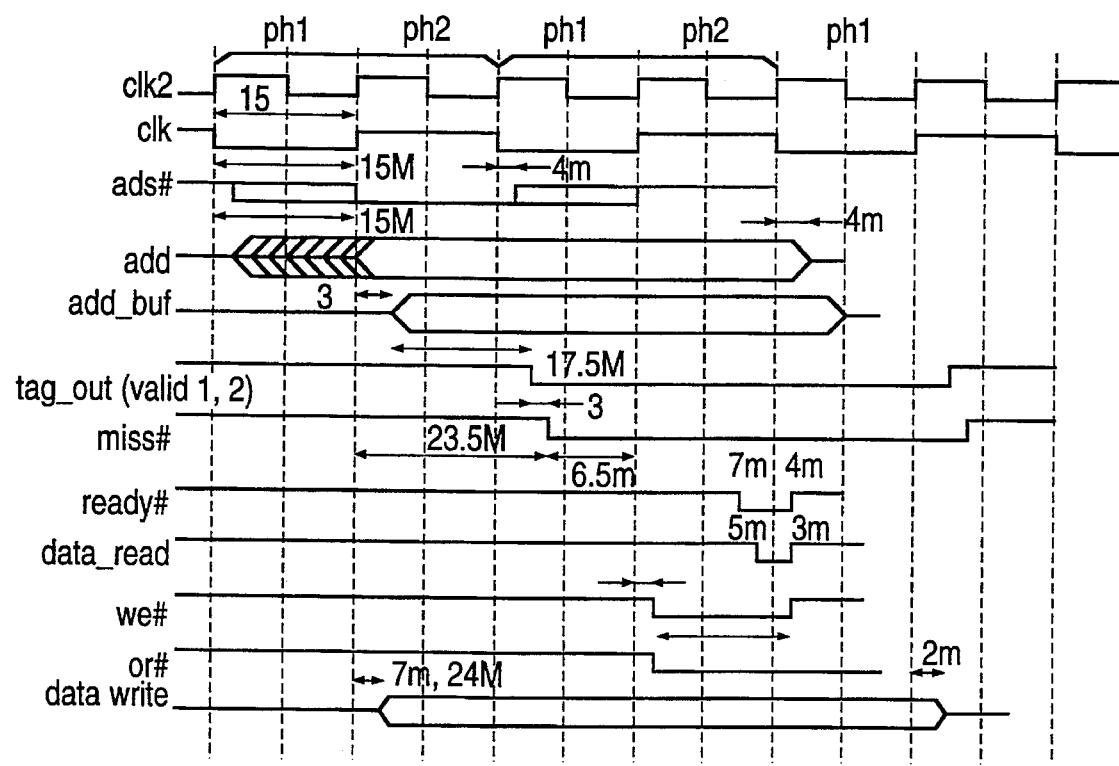

FIG. 76 shows timing for the 386 case.

.C.4.2.8.2—486 CPU

Figure 77:
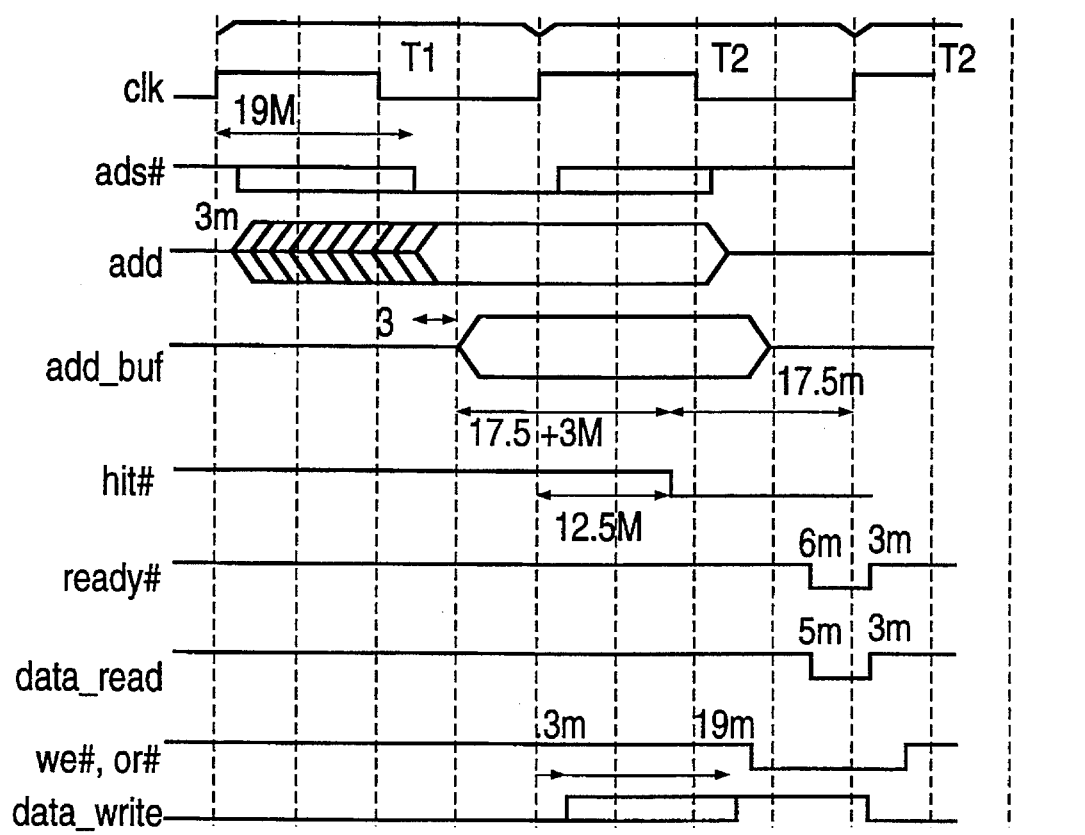

FIG. 77 shows timing for the 486 case.

4.2.9—Cache Data RAM

Figure 78:
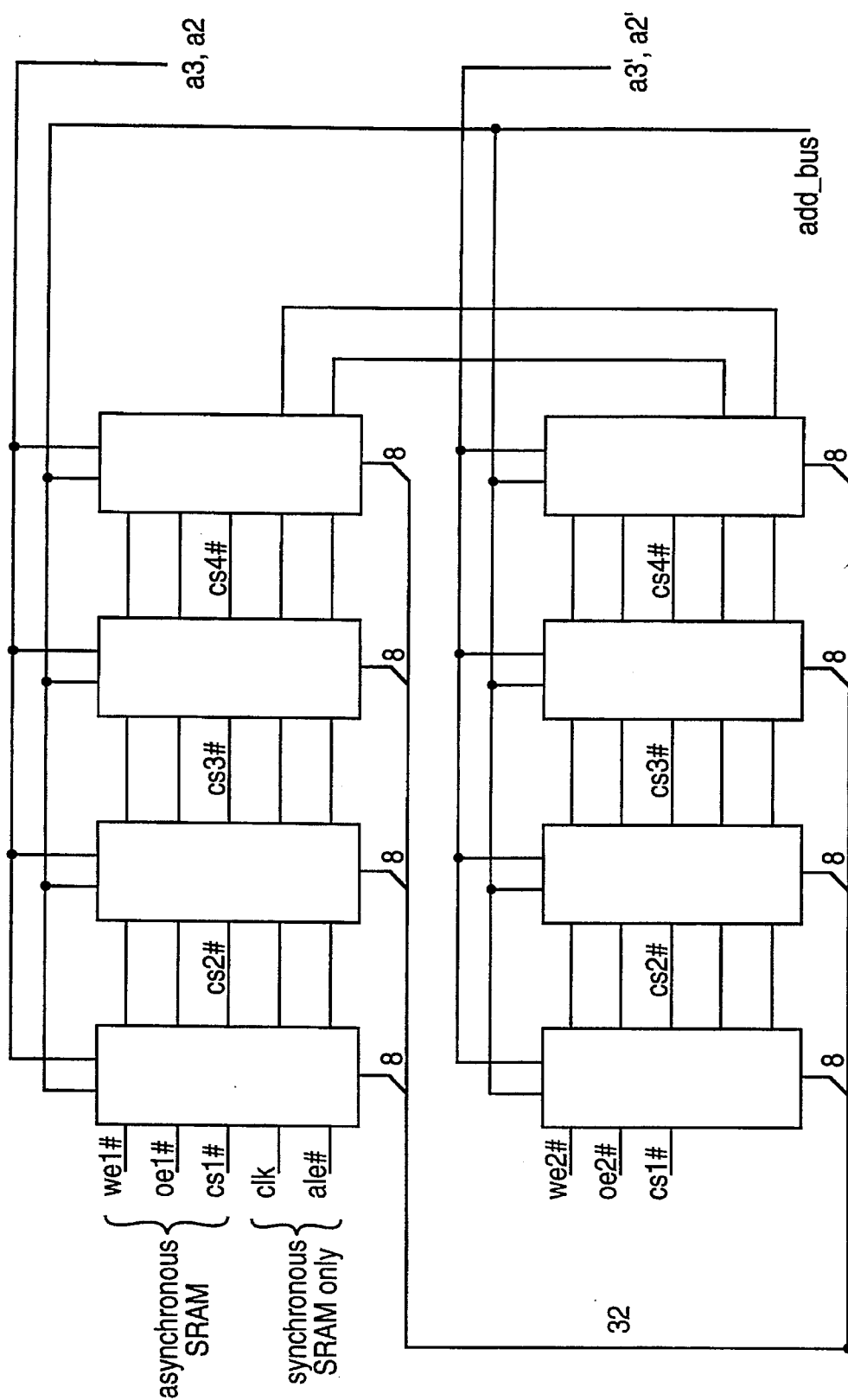
FIGS. 78–79 are memory structures of the cache and memory controller.

FIG. 78 shows the cache data SRAM structure.

4.3—DRAM Interface

The CMC supports up to 8 banks of DRAM for a maximum of 128 MBytes of memory. Each individual bank has its own separate lower and upper boundary registers for mapping anywhere within the allowable CMC's memory addressing range. Individual banks can be populated with different size/speed/type DRAM devices i,e. mix and match among banks.

Interleaving is supported in order to achieve one clock burst transfer rate per double word during the line fill. Two way set interleaving modes are supported. Interleave Modes can be selected per each two banks through the appropriate CSR registers. It is possible therefore to have a configuration in which some of the banks are paired and interleaved and some that are independently mapped. When a pair of banks are interleaved the lowest bank's related CSR register bits are used and it is assumed that the interleaving banks are of the same size/speed/type DRAMs.

The CMC contains a RAS time-out mechanism with the result that the penalty of accessing DRAM's as long as the accesses are within the same row are minimized.

DRAM device types supported are: Static Column & Fast Page mode. Size/configuration supported are: 256K×1, 256K×4, 1M×1, 1M×4, 4M×1, 4M×4. Speeds supported are: 100,80,70,60 nsec.

The RAM arrays are decoupled from the local bus thru discrete buffers (74657 for copy back cache, 74646 for write thru cache). Parity checking per byte is done by 74657 or 74280 buffers.

The CMC can be configured to run in a cache less system (i,e. no external cache). Due to the high speed transfer rate of the main memory and assuming consecutive accesses are generally within the same row of the array, the transfer rate during the burst is 6 clocks per 4 Dwords.

4.3.3—DRAM Address Decoding

The CMC supports 8 banks of memory. There are separate sets of CSR registers for each bank. This allows each bank to be independently mapped anywhere within the CMC's addressing range through a set of boundary registers. In addition each bank can separately be programmed to contain different speed DRAMs (100/80/70/60 ns) and different types (static column/fast page). When interleave mode is selected, the interleaving banks act as a pair and the lowest bank's CSR bits are used for programming. The base memory can be programmed to be 256/512/640K. The 256K base memory option supports LIM 4.0's additional 28 (16K) windows.

Support is provided to relocate the 384K of expanded memory. BIOS and DIAG. ROM area can be shadowed by switching from read ROM/write RAM to read RAM/write protect condition. Support for both LIM 3.2 & 4.0 is provided. When LIM 3.2 is enabled there are only eight 16K windows at 000C,0000–000D,FFFF to map into 32 MBytes of expanded memory. When LIM 4.0 is selected there will be additional 28 windows between 0004,0000–0009,FFFF. The CMC also decodes the addressing range FFFE, 0000–FFFF,FFFF and generates an output signal called the upper ROM. It also decodes the address range C000, 0000–C1FF,FFFF where the Weitek coprocessor's address range resides.

When the CMC to ISA/MCA interface is synchronous and the addresses do not fall within the CMC's addressing range, the addresses are ignored. However if the interface is asynchronous the CMC generates AADS# and waits for ARDY# signal from the ISA/MCA devices to resync the signal back to the CPU.

Figure 79:
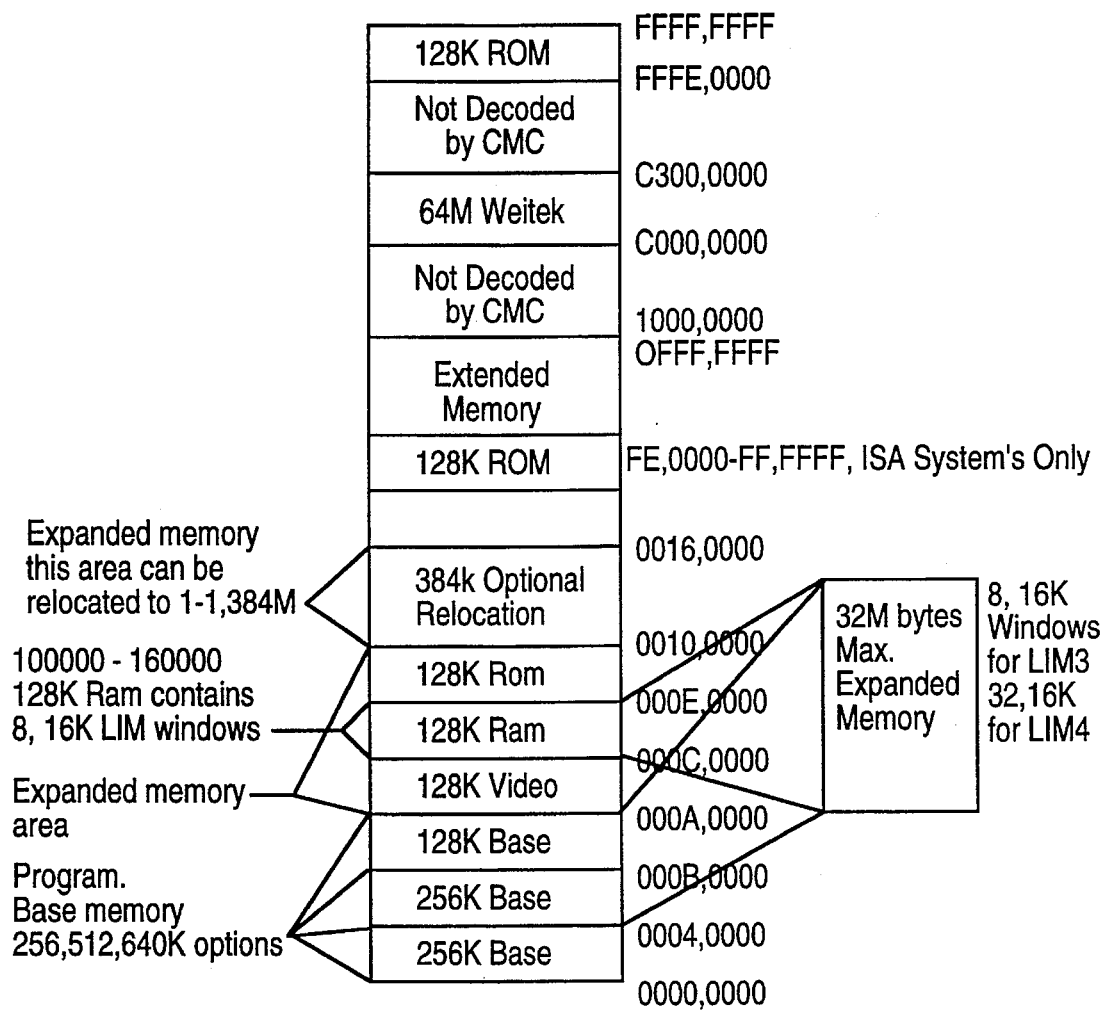

FIG. 79 shows a map of the memory controller.

4.3.4—Mem. Data Buffer Interface

A 74F657 device is used as the memory data buffer. The 74F657 is a bidirectional buffer with parity generation and detection. This part is byte wide and the number of buffers required depend on the memory array's configuration as shown below:

| RAM Configuration | # of discrete Buffers |
|---|---|
| 2 way interleaved | 8 |
| non-interleaved system | 4 |

The 74F657 supports parity. In the write through systems there is a CSR option bit to replace 657's with 646s. That provides a one level register to post the write. Since the 74646 does not have in chip parity generation and checking therefore additional 74280's needs to be added to the system to support parity.

4.3.5—Main Memory Refresh

Main memory is refreshed in an staggered fashion and is completely hidden from the main processor. The 15 microsec refresh clock is provided to CMC thru REFREQ input line. The CMC refreshes every pair of two banks at a different time within that 15 micro-sec time frame so that the load on the power supply during the refresh operation is minimized. Refresh is done by asserting "CAS before RAS". Only DRAMs which support this feature should be used.

4.4—ISA/MCA Interface

Arbitration is handled by the CPU through its HOLD-HLDA mechanism. IOHOLD is generated by ISA/MCA controllers. It is synchronized within CMC and LHOLD is driven by CMC to the local CPU. When the CPU asserts LHLDA it goes through the CMC before IOHLDA is asserted back to ISA. The IO interface to CMC can be synchronous or asynchronous. When the interface is synchronous, ISA/MCA accesses to/from memory during DMA look the same as the local processor. When the interface is asynchronous two hand shake signals are used between the two sides.

Figure 80:
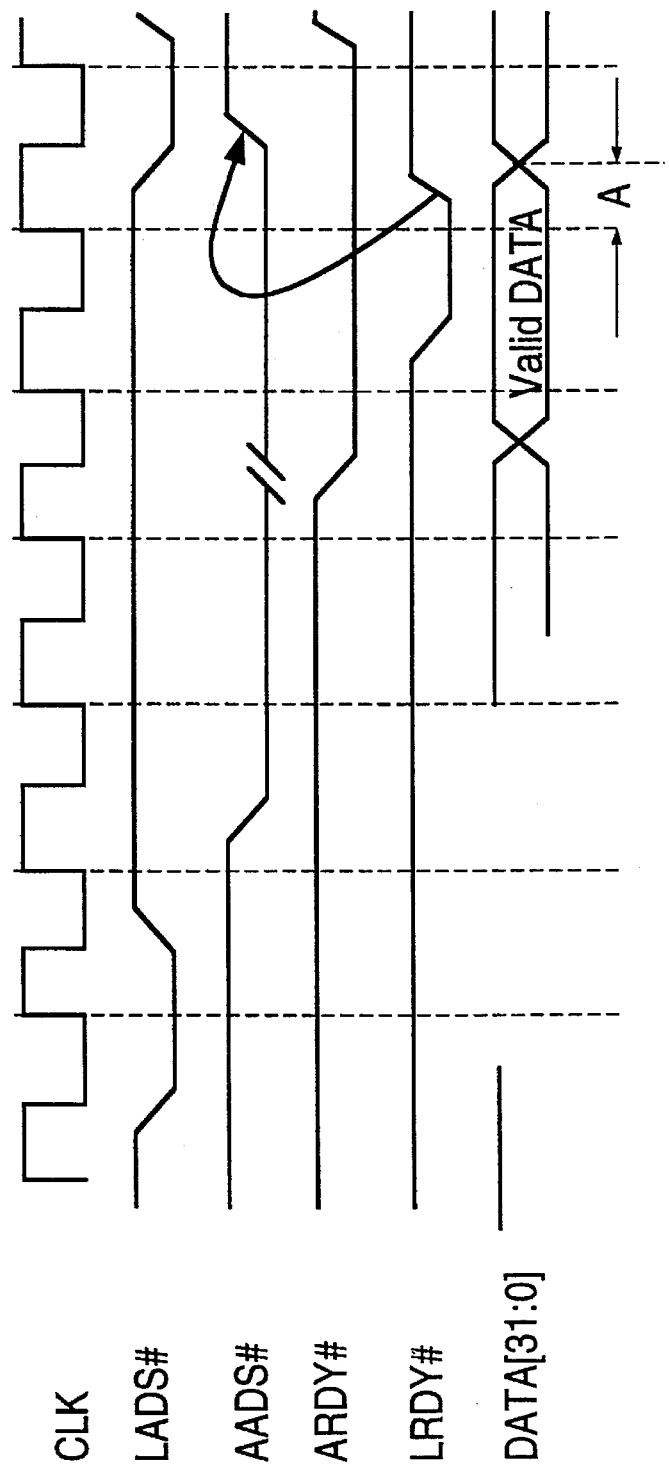
FIG. 80 is a timing diagram for the cache and memory controller.

FIG. 80 shows asynchronous arbitration.

4.5—IO Block

The IO Block provides all the IO registers implemented by the CMC.

4.5.1—Software Interface

The CMC contains control and status registers (CSRs) that are accessible via IO read and write operations. All control registers are byte size and are readable. All control registers must be programmed during initialization; however they can also be dynamically changed by the software. CSRs are addressed thru four IO locations:

| Port | Usage |
|---|---|
| 22h | Low byte of chip id |
| 23h | High byte of chip id |
| 26h | CSR index |
| 27h | CSR data port |

Ports 22,23&26H are write only ports, used to address all CSRs. Ports 22H&23H contain the device id assigned at initialization, port 26H contains the index into individual CSRs in CMC. IO port 27H contains data to be read/written from/to this device.

To address the CSRs the following sequence of IO operations must be done:
1—Write device_id into port 22H & 23H
2—Write index into port 26H
3—Read/write from/to port 27H The following are the bit definitions of the CSR registers. CSRs 00H thru 0FH are architecturally defined to have the same meaning but they are looked at only when that device is selected. CSR registers 10 thru 1F are broadcast registers and are looked at all the time by all the devices. On power up all the CSR registers are reset to zero as default state.

4.5.2—Compatible CSR Registers

Compatible CSR registers are required for compatibility. They can be adressesed via their port addresses. Each compatible CSR has an equivalent CSR register, except ports F0H & F1H.

4.6.2—A20GTX/Fast Reset

A20GTX input from ISA/MCA controllers is internally gated with CPU A20 line in order to create the Address 20 to the main memory. There is a port provided through both CSRs or compatibility ports in order to do fast software reset of the CPU.

The above description of the invention is illustrative and not limiting; further versions and modifications will be apparent to one skilled in the art in the light of this disclosure.

We claim:

1. A local system bus for a micro-processor based computer system including a plurality of controllers connected between the local system bus and at least one microprocessor, a system memory or an I/O bus, one of the controllers being a bus master and another being a bus slave during a bus transaction, the local system bus comprising:

lines for carrying an address driven by the bus master and received by the bus slave;

lines for carrying data driven by the bus master and received by the bus slave during a write transaction or driven by the bus slave and received by the bus master during a read transaction;

lines for carrying signals generated by the bus master and received by the bus slave, for defining a transaction in progress;

lines for carrying control signals for micro-processor operations;

lines for carrying status signals asserted by the bus slave for indicating a status of the bus slave further comprising lines for carrying interrupt signals; and lines for carrying arbitration signals, wherein the lines for carrying arbitration signals comprise a line for carrying a bus hold request for permitting another controller to gain control of the local system bus.

2. A local system bus as in claim 1, further comprising at least one line for carrying a signal for partial read and write operations.

3. A local system bus as in claim 1, further comprising at least one line for carrying a signal indicating a parity of the data.

4. A local system bus as in claim 1, wherein the lines for defining a transaction comprise a line for carrying a signal indicating whether the transaction involves memory operations or I/O operations.

5. A local system bus as in claim 1, wherein the lines for defining a transaction comprise a line for carrying a signal indicating data transactions or instruction fetch transactions.

6. A local system bus as in claim 1, wherein the lines for defining a transaction comprise a line for carrying a signal indicating whether the transaction involves write operations or read operations.

7. A local system bus as in claim 1, wherein the lines for defining a transaction comprise a line for carrying a signal indicating whether the transaction is a normal transaction or a locked transaction.

8. A local system bus as in claim 1, wherein the lines for defining a transaction comprise a line for carrying a signal supporting copy-back operations.

9. A local system bus as in claim 1, wherein the lines for defining a transaction comprise a line carrying a signal for write-through cache operations.

10. A local system bus as in claim 1, wherein the control signal lines comprise a line carrying a signal indicating a valid address being on the local system bus.

11. A local system bus as in claim 1, wherein the control signal lines comprise a line for carrying a signal indicating an end of a data cycle.

12. A local system bus as in claim 1, wherein the control signal lines comprise a line for carrying a signal indicating a bit size of a bus master involved in a current cycle.

13. A local system bus as in claim 1, wherein the control signal lines comprise a line for carrying a signal indicating a bit size of a bus slave recipient of a current cycle.

14. A local system bus as in claim 1, wherein the control signal lines comprise a line for carrying a signal indicating a bus slave being ready to receive a next line address.

15. A local system bus as in claim 1, wherein the lines for carrying status signals comprise a line for carrying a signal indicating the bus slave having provided valid data in response to a read or having accepted data in response to a write.

16. A local system bus as in claim 1, wherein the lines for carrying status signals comprise a line for carrying a signal indicating the bus slave being not ready to handle a required transaction.

17. A local system bus as in claim 1, wherein the lines for carrying status signals comprise a line for carrying a signal asserted by a bus slave for extending a snoop cycle of a current transaction.

18. A local system bus as in claim 1, wherein the lines for carrying status signals comprise a line for carrying a signal indicating a parity error on the lines for carrying data during a data cycle.

19. A local system bus as in claim 1, wherein the lines for carrying status signals comprise a line for carrying a signal indicating that a non-master cache controller will retain a copy of addressed data in a current transaction.

20. A local system bus as in claim 1, wherein the lines for carrying status signals comprise a line for carrying a signal indicating whether a current transaction is cacheable.

21. A local system bus as in claim 1, wherein the lines for carrying status signals comprise a line for carrying a signal indicating a processor controller intervening in the local system bus transaction.

22. A local system bus as in claim 1, further comprising lines for carrying interrupt signals.

23. A local system bus as in claim 22, wherein the lines for carrying interrupt signals comprise a line for carrying an interrupt request signal.

24. A local system bus as in claim 22, wherein the lines for carrying interrupt signals comprise a line for carrying a non-maskable interrupt signal.

25. A local system bus as in claim 22, further comprising an additional line for carrying a signal for resetting the micro-processor based computer system.

26. A local system bus as in claim 25, further comprising an additional line for carrying a local processor reset signal.

27. A local system bus as in claim 1, wherein the lines for carrying arbitration signals comprise a line for carrying a local system bus request signal.

28. A local system bus as in claim 1, wherein the lines for carrying arbitration signals comprise a line for carrying a local system bus grant signal to one of the controllers.

29. A local system bus as in claim 1, wherein the lines for carrying arbitration signals comprise a line for carrying an acknowledge signal indicating whether the local system bus is given up in response to a bus hold request.

30. A local system bus as in claim 1, further comprising lines for carrying signals supporting a distributed arbitration.

31. A local system bus as in claim 1, wherein each local system bus transaction comprises a sequence of phases.

32. A local system bus as in claim 31, wherein said phases comprise arbitration, command, address, data and status phases.

33. A local system bus as in claim 32, wherein the arbitration, command and address phases for a next transaction can start during the data phase of a present transaction.

34. A local system bus as in claim 33, wherein the local system bus operates at two bus speeds.

35. A local system bus as in claim 1, wherein the micro-processor based computer system comprises a peripheral control bus connected to the I/O bus and to each controller for programming peripheral devices connected to the local system bus.

36. A local system bus as in claim 35, wherein distributed interrupts are supported as follows:

an interrupt request being generated onto the local system bus by an interrupt controller;

an interrupt acknowledge sequence being generated by one of the controllers connected between the local system bus and the micro-processor and an interrupt vector being driven during the interrupt acknowledge;

the interrupt vector being captured by every controller connected between the local system bus and the micro-processor;

an interrupt signal generated by one of the controllers that is enabled by the captured interrupt vector being sent to an associated micro-processor, and a protection signal being generated by the enabled controller for preventing any of the controllers from acknowledging any subsequent interrupt request;

an interrupt acknowledger being generated by the associated micro-processor to the enabled controller; and a prevention signal being released by the enabled controller in response to receiving of the interrupt knowledge.

37. A local system bus as in claim 36, wherein the interrupt vector is carried on the peripheral control bus to enable any of the controllers to capture the interrupt vector.

38. A local system bus as in claim 1, wherein an arbitration for control of the local system bus is as follows:

signals being generated onto the local system bus by a cache controller that requires the local system bus;

a selected bus owner being determined in response to the generated signals;

the selected bus owner waiting for a current bus owner to relinquish the local system bus by driving a grant signal onto the local system bus; and the selected bus owner assuming control of the local system bus.

39. A micro-processor based computer system including at least a first micro-processor and a cache memory, a system memory, and input/output devices, the computer system comprising:

a local system bus for connecting the micro-processor to the cache memory;

an input/output bus for connecting to the input/output devices;

a first controller for connecting the local system bus to the I/O bus;

wherein the local system bus operates at a higher data rate than does the input/output bus;

at least one cache controller connected between the first micro-processor and the local system bus; and a second cache controller connected between the local system bus and the system memory.

40. A computer system as in claim 39, wherein the input/output bus is one of an ISA, MCA or EISA bus.

41. A computer system as in claim 39, further comprising a peripheral control connected to the input/output bus and at least one cache controller for programming peripheral devices connected to the local system bus.

42. The computer system of claim 41, further comprising means for allowing a peripheral device connected to the local system bus to control a speed of data transfers to or from another peripheral device connected to the local system bus.

43. A computer system as in claim 39, wherein the first micro-processor has a first clocking scheme, and further comprising a second micro-processor having a second clocking scheme differing from the first clocking scheme and connected to the local system bus.

44. The computer system of claim 39, further comprising means for connecting at least a second micro-processor to the local system bus.

* * * * *